United States Patent
Kojima et al.

(10) Patent No.: US 12,495,890 B2
(45) Date of Patent: Dec. 16, 2025

(54) MOLDED ARTICLE FOR ORAL CARE PRODUCT AND ORAL CARE PRODUCT

(71) Applicant: SUNSTAR INC., Osaka (JP)

(72) Inventors: Ikumi Kojima, Osaka (JP); Yukinori Wada, Osaka (JP)

(73) Assignee: SUNSTAR INC., Osaka (JP)

( * ) Notice: Subject to any disclaimer, the term of this patent is extended or adjusted under 35 U.S.C. 154(b) by 193 days.

(21) Appl. No.: 17/732,404

(22) Filed: Apr. 28, 2022

(65) Prior Publication Data

US 2023/0189972 A1 Jun. 22, 2023

(30) Foreign Application Priority Data

Dec. 17, 2021 (JP) .................. 2021-205256

(51) Int. Cl.
*A46B 5/02* (2006.01)
*B29C 45/16* (2006.01)

(52) U.S. Cl.
CPC ............... *A46B 5/02* (2013.01); *A46B 5/026* (2013.01); *B29C 45/16* (2013.01); *A46B 2200/1066* (2013.01)

(58) Field of Classification Search
CPC .. A46B 5/026; A46B 5/02; A46B 3/04; A46B 5/00; B29L 2031/425; B29C 45/16; B29C 45/1676
See application file for complete search history.

(56) References Cited

U.S. PATENT DOCUMENTS

2012/0210530 A1* 8/2012 Wong ................. A46B 15/0016
15/167.1
2017/0347781 A1 12/2017 Jimenez et al.

FOREIGN PATENT DOCUMENTS

| CN | 1968621 | 5/2007 |
|---|---|---|
| CN | 102105082 | 6/2011 |
| CN | 103442614 | 12/2013 |
| CN | 217309458 | 8/2022 |
| JP | H11254475 | 9/1999 |
| JP | 2002034659 | 2/2002 |

(Continued)

OTHER PUBLICATIONS

"Search Report of Europe Counterpart Application", issued on Oct. 18, 2022, p. 1-p. 7.

(Continued)

*Primary Examiner* — Jacob T Minskey
*Assistant Examiner* — Elisa H Vera
(74) *Attorney, Agent, or Firm* — JCIPRNET

(57) ABSTRACT

A molded article (20) for an oral care product includes a primary molded part (P) that includes a covering target part (PC), a secondary molded part (Q) that includes a covering part (Q40) covering the covering target part (PC), and an exposed structure (500) that includes one or a plurality of penetration parts (P100) penetrating the covering part (Q40). The penetration part (P100) includes an exposed surface exposed with respect to the covering part (Q40). The penetration part (P100) is provided in the primary molded part (P) such that a force received by the primary molded part (P) from a resin material corresponding to the secondary molded part (Q) so as to deform the primary molded part (P) in a secondary molding step of molding the secondary molded part (Q) is able to be transferred to a mold through the exposed surface.

16 Claims, 50 Drawing Sheets

(56) References Cited

FOREIGN PATENT DOCUMENTS

| | | |
|---|---|---|
| JP | 2005185649 | 7/2005 |
| JP | 2013126494 | 6/2013 |
| JP | 2018198796 | 12/2018 |
| WO | 2011075133 | 6/2011 |

OTHER PUBLICATIONS

"Office Action of Europe Counterpart Application", issued on Jun. 3, 2025, p. 1-p. 7.
"Office Action of China Counterpart Application", issued on Jul. 9, 2025, with English translation thereof, p. 1-p. 20.

\* cited by examiner

MOLDED ARTICLE FOR ORAL CARE PRODUCT AND ORAL CARE PRODUCT

CROSS-REFERENCE TO RELATED APPLICATIONS

This application claims the priority benefit of Japanese Patent Application No. 2021-205256, filed on Dec. 17, 2021. The entirety of the above-mentioned patent application is hereby incorporated by reference herein and made a part of this specification.

BACKGROUND

Technical Field

The disclosure relates to a molded article for an oral care product and an oral care product.

Description of Related Art

Multi-colored molded articles are known as an example of molded articles for an oral care product. For example, a multi-colored molded article includes a primary molded part and a secondary molded part. Patent Document 1 describes a toothbrush that is an example of an oral care product.

Patent Document

Patent Document 1: Japanese Patent Laid-Open No. 2018-198796

SUMMARY

In a molded article including a primary molded part and a secondary molded part, it is preferable that a position of the secondary molded part with respect to the primary molded part be made stable.

A molded article for an oral care product according to the disclosure includes a primary molded part that includes a covering target part, a secondary molded part that includes a covering part covering the covering target part, and an exposed structure that includes one or a plurality of penetration parts penetrating the covering part. The penetration part includes an exposed surface exposed with respect to the covering part. The penetration part is provided in the primary molded part such that a force received by the primary molded part from a resin material corresponding to the secondary molded part so as to deform the primary molded part in a secondary molding step of molding the secondary molded part is able to be transferred to a mold through the exposed surface.

Figure 1:
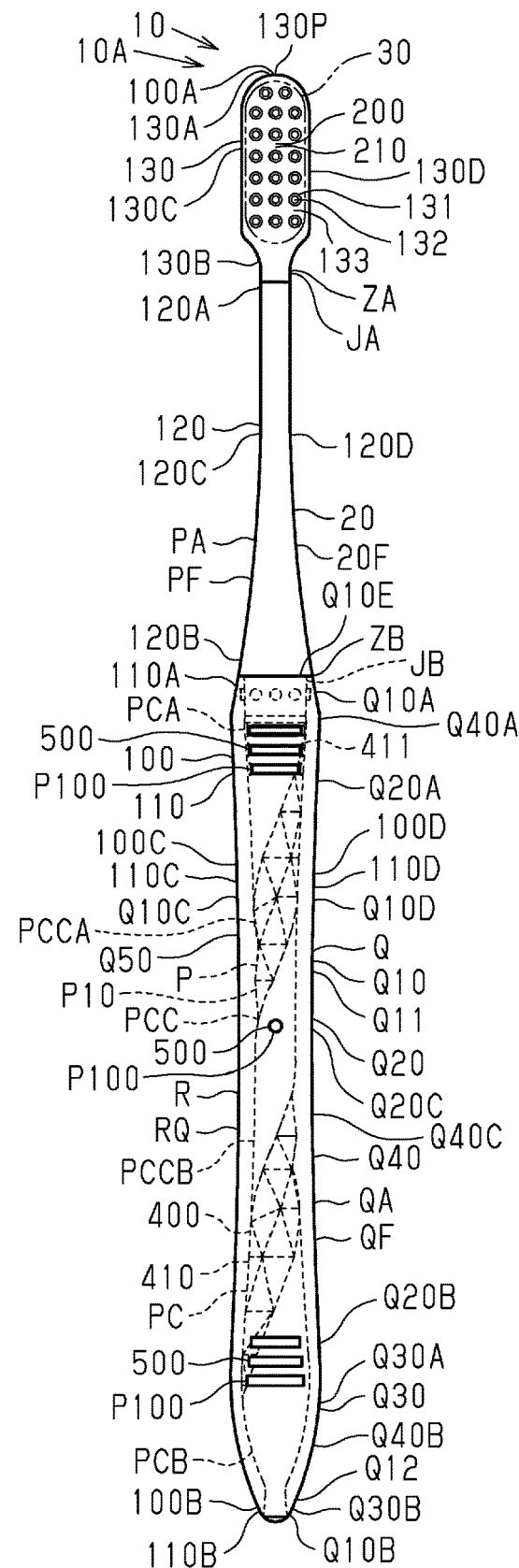
FIG. 1 is a front view of a toothbrush according to a first embodiment.

DESCRIPTION OF THE EMBODIMENT (Description of Oral Care Product)

Examples of an oral care product include a toothbrush, an interdental brush, a mucous membrane care brush, a floss with a holder, and a check mirror.

For example, an oral care product includes a molded article and a functional member. The molded article includes a main body. A constitution of the main body can be arbitrarily selected. For example, the main body includes a handle, a neck, and a head. The handle is constituted to be suitable for a hand grip. The neck is provided between the handle and the head. The neck is connected to the handle and the head. The head is constituted such that the functional member can be supported.

The molded article is a single-colored molded article or a multi-colored molded article. Examples of the multi-colored molded article include a two-colored molded article. For example, the two-colored molded article includes a primary molded part and a secondary molded part.

Examples of a raw material of the single-colored molded article include a hard thermoplastic resin, a soft thermoplastic resin, and a soft thermosetting resin. For example, the raw material of the single-colored molded article is selected in accordance with the function or the like of the oral care product.

When a hard thermoplastic resin is selected as the raw material of the single-colored molded article, the raw material of the single-colored molded article may include one kind of hard thermoplastic resin or two or more kinds of hard thermoplastic resin.

When a soft thermoplastic resin is selected as the raw material of the single-colored molded article, the raw material of the single-colored molded article may include one kind of soft thermoplastic resin or two or more kinds of soft thermoplastic resin.

When a soft thermosetting resin is selected as the raw material of the single-colored molded article, the raw material of the single-colored molded article may include one kind of soft thermosetting resin or two or more kinds of soft thermosetting resin.

Examples of a raw material of the primary molded part include a hard thermoplastic resin, a soft thermoplastic resin, and a soft thermosetting resin. For example, the raw material of the primary molded part is selected in accordance with the function or the like of the oral care product.

When a hard thermoplastic resin is selected as the raw material of the primary molded part, the raw material of the primary molded part may include one kind of hard thermoplastic resin or two or more kinds of hard thermoplastic resin.

When a soft thermoplastic resin is selected as the raw material of the primary molded part, the raw material of the primary molded part may include one kind of soft thermoplastic resin or two or more kinds of soft thermoplastic resin.

When a soft thermosetting resin is selected as the raw material of the primary molded part, the raw material of the primary molded part may include one kind of soft thermosetting resin or two or more kinds of soft thermosetting resin.

Examples of a raw material of the secondary molded part include a hard thermoplastic resin, a soft thermoplastic resin, and a soft thermosetting resin. For example, the raw material of the secondary molded part is selected in accordance with the function or the like of the oral care product.

When a hard thermoplastic resin is selected as the raw material of the secondary molded part, the raw material of the secondary molded part may include one kind of hard thermoplastic resin or two or more kinds of hard thermoplastic resin.

When a soft thermoplastic resin is selected as the raw material of the secondary molded part, the raw material of the secondary molded part may include one kind of soft thermoplastic resin or two or more kinds of soft thermoplastic resin.

When a soft thermosetting resin is selected as the raw material of the secondary molded part, the raw material of the secondary molded part may include one kind of soft thermosetting resin or two or more kinds of soft thermosetting resin.

Examples of the hard thermoplastic resin include an olefin-based resin, a polyamide-based resin, a saturated polyester-based resin, a polymethylmethacrylate, a cellulose propionate, a thermoplastic polyurethane, a polycarbonate, a polyacetal, and an acrylonitrile butadiene styrene (ABS) resin.

Examples of the olefin-based resin include a propylene-based polymer and an ethylene-based polymer.

Examples of the propylene-based polymer include a homopolymer, a random copolymer, and a block copolymer.

Examples of the ethylene-based polymer include a homopolymer, a random copolymer, and a block copolymer.

Examples of the saturated polyester-based resin include a polyethylene terephthalate, a polybutylene terephthalate, a polytrimethylene terephthalate, and a polycyclohexylene dimethylene terephthalate.

Examples of a thermoplastic resin classified based on properties related to visible light transmittance include an opaque resin, a translucent resin, and a transparent resin.

Examples of the transparent resin include a saturated polyester-based resin, an acrylic resin, a polycarbonate, a polystyrene resin, an acrylonitrile styrene (AS) resin, and a silicone resin.

Examples of the soft thermoplastic resin include a thermoplastic elastomer.

Examples of the thermoplastic elastomer include a polystyrene-based thermoplastic elastomer, a polyolefin-based thermoplastic elastomer, a vinyl chloride-based thermoplastic elastomer, a polyurethane-based thermoplastic elastomer, a polyester-based thermoplastic elastomer, a polyamide-based thermoplastic elastomer, and a polybutadiene-based thermoplastic elastomer.

Examples of the soft thermosetting resin include a thermosetting elastomer.

Examples of the thermosetting elastomer include a silicone-based thermosetting resin, a urethane-based thermosetting resin, a fluorine-based thermosetting resin, a synthetic rubber, and a natural rubber.

Examples of the synthetic rubber include a styrene butadiene rubber, a butadiene rubber, a chloroprene rubber, an isoprene rubber, a butyl rubber, an ethylene propylene rubber, an acrylonitrile butadiene rubber, a silicone rubber, a fluororubber, an acrylic rubber, a urethane rubber, a polysulfide rubber, a chlorinated butyl rubber, and an epichlorohydrin rubber.

The functional member has predetermined functions related to oral care. The functional member is provided in the molded article. For example, the functional member is provided in the head of the main body.

Examples of the functional member of a toothbrush include tufts. Examples of the functional member of an interdental brush include tufts and a rubber brush. Examples of the functional member of a mucous membrane care brush include tufts, a rubber brush, and a sponge brush. Examples of the functional member of a floss with a holder include a dental floss. Examples of the functional member of a check mirror include a mirror.

In the molded article for an oral care product, for example, a first axial direction, a second axial direction, a first width direction, a second width direction, a first thickness direction, and a second thickness direction are defined. The first axial direction is a direction opposite to the second axial direction. The first width direction is a direction opposite to the second width direction. The first thickness direction is a direction opposite to the second thickness direction.

An axial direction is a generic name for the first axial direction and the second axial direction. The axial direction is parallel to an X axis. A width direction is a generic name for the first width direction and the second width direction. The width direction is parallel to a Y axis. A thickness direction is a generic name for the first thickness direction and the second thickness direction. The thickness direction is parallel to a Z axis. A center axis of the molded article for an oral care product is parallel to the axial direction.

The X axis and the Y axis define a first reference surface. The X axis and the Z axis define a second reference surface. The Y axis and the Z axis define a third reference surface.

In the molded article for an oral care product, for example, an inward radial direction and an outward radial direction are defined. The inward radial direction and the outward radial direction are parallel to the third reference surface. The inward radial direction is a direction toward the center axis of the molded article for an oral care product. The outward radial direction is a direction opposite to the inward radial direction. A radial direction is a generic name for the inward radial direction and the outward radial direction.

In the molded article for an oral care product, for example, a first circumferential direction and a second circumferential direction are defined. The first circumferential direction is a direction along the exterior shape of a cross section orthogonal to the center axis of the molded article. The second circumferential direction is a direction opposite to the first circumferential direction. A circumferential direction is a generic name for the first circumferential direction and the second circumferential direction.

For example, viewpoints related to the oral care product are defined as follows. A front view is a viewpoint when the oral care product is viewed in the second thickness direction from the first reference surface. A rear view is a viewpoint when the oral care product is viewed in the first thickness direction from the first reference surface. A first side view is a viewpoint when the oral care product is viewed in the second width direction from the second reference surface. A second side view is a viewpoint when the oral care product is viewed in the first width direction from the second reference surface. A side view is a generic name for the first side view and the second side view.

For example, a breadth related to the molded article is defined as follows. The breadth related to the molded article is indicated by a diameter of a cross section orthogonal to the center axis of the molded article.

First Embodiment

Figure 2:
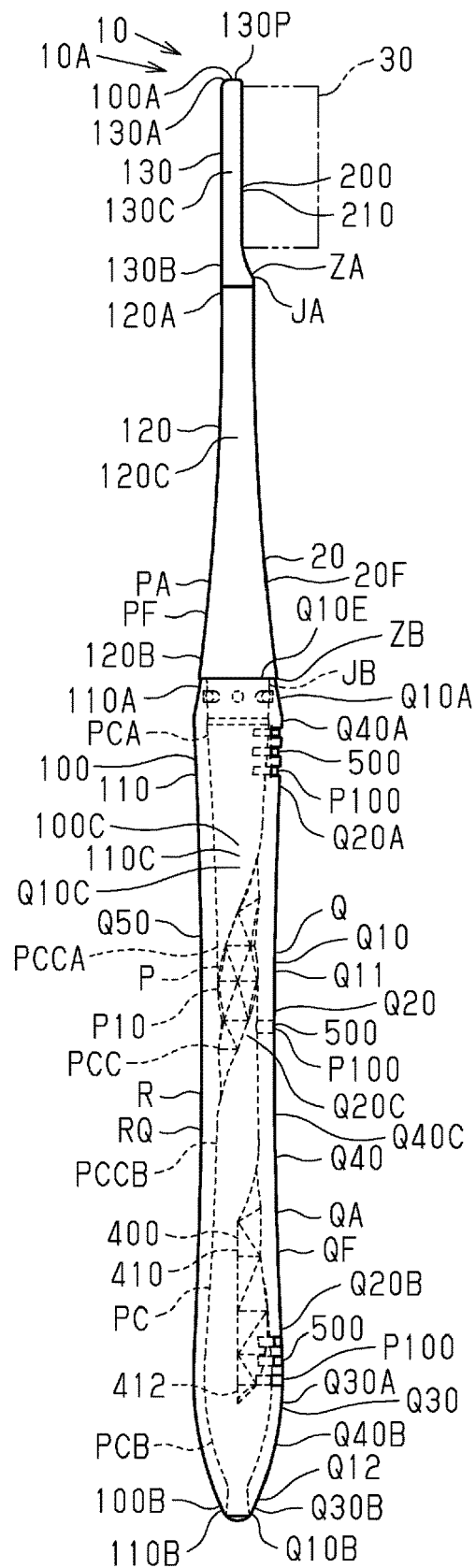
FIG. 2 is a side view of the toothbrush in FIG. 1.

FIGS. 1 and 2 will be referred to. In the present embodiment, an oral care product 10 is a toothbrush 10A. The toothbrush 10A includes a molded article 20 and a functional member 30. For example, the molded article 20 is a two-colored molded article.

The molded article 20 includes a main body 100. The constitution of the main body 100 can be arbitrarily selected. The constitution of the main body 100 is not limited to the exemplified constitution. For example, the main body 100 includes a handle 110, a neck 120, and a head 130. A center axis of the main body 100 defines the center axis of the molded article 20.

The main body 100 includes a first end part 100A and a second end part 100B. The first end part 100A is positioned in the first axial direction with respect to the center of the main body 100 in the axial direction. The second end part 100B is positioned in the second axial direction with respect to the center of the main body 100 in the axial direction.

The main body 100 includes a first side part 100C and a second side part 100D. The first side part 100C is positioned in the first width direction with respect to the center of the main body 100 in the width direction. The second side part 100D is positioned in the second width direction with respect to the center of the main body 100 in the width direction.

A constitution of the handle 110 can be arbitrarily selected. The constitution of the handle 110 is not limited to the exemplified constitution. The handle 110 is constituted to be suitable for a grip. The head 130 is constituted such that the functional member 30 can be supported.

The handle 110 includes a first end part 110A and a second end part 110B. The first end part 110A is positioned in the first axial direction with respect to the center of the handle 110 in the axial direction. The second end part 110B is positioned in the second axial direction with respect to the center of the handle 110 in the axial direction. The second end part 110B constitutes the second end part 100B of the main body 100.

The handle 110 includes a first side part 110C and a second side part 110D. The first side part 110C is positioned in the first width direction with respect to the center of the handle 110 in the width direction. The second side part 110D is positioned in the second width direction with respect to the center of the handle 110 in the width direction. The first side part 110C constitutes the first side part 100C of the main body 100. The second side part 110D constitutes the second side part 100D of the main body 100.

A constitution of the neck 120 can be arbitrarily selected. The constitution of the neck 120 is not limited to the exemplified constitution. The neck 120 is provided between the handle 110 and the head 130. The neck 120 is connected to the handle 110. The neck 120 is connected to the head 130.

The neck 120 includes a first end part 120A and a second end part 120B. The first end part 120A is positioned in the first axial direction with respect to the center of the neck 120 in the axial direction. The second end part 120B is positioned in the second axial direction with respect to the center of the neck 120 in the axial direction. The second end part 120B of the neck 120 is connected to the first end part 110A of the handle 110.

The neck 120 includes a first side part 120C and a second side part 120D. The first side part 120C is positioned in the first width direction with respect to the center of the neck 120 in the width direction. The second side part 120D is positioned in the second width direction with respect to the center of the neck 120 in the width direction.

A constitution of the head 130 can be arbitrarily selected. The constitution of the head 130 is not limited to the exemplified constitution. In an example, the head 130 is a thin type. The smallest thickness of the head 130 is equal to or smaller than the smallest breadth of the neck 120. In the illustrated example, the smallest thickness of the head 130 is smaller than the smallest breadth of the neck 120. The head 130 includes a plurality of opening parts 131. The opening parts 131 are provided with holes 132. The holes 132 open on a front surface 133 of the head 130.

The head 130 includes a first end part 130A and a second end part 130B. The first end part 130A is positioned in the first axial direction with respect to the center of the head 130 in the axial direction. The first end part 130A constitutes the first end part 100A of the main body 100. The second end part 130B is positioned in the second axial direction with respect to the center of the head 130 in the axial direction. The second end part 130B of the head 130 is connected to the first end part 120A of the neck 120.

The head 130 includes a first side part 130C and a second side part 130D. The first side part 130C is positioned in the first width direction with respect to the center of the head 130 in the width direction. The first side part 130C constitutes the first side part 100C of the main body 100. The second side part 130D is positioned in the second width direction with respect to the center of the head 130 in the axial direction. The second side part 130D constitutes the second side part 100D of the main body 100.

A constitution of the functional member 30 can be arbitrarily selected. The constitution of the functional member 30 is not limited to the exemplified constitution. In an example, the functional member 30 includes a plurality of tufts. Some of the tufts are disposed in the holes 132 and are fixed to the head 130.

FIGS. 3 to 6 will be referred to, A constitution of the molded article 20 can be arbitrarily selected. The constitution of the molded article 20 is not limited to the exemplified constitution. In an example, the molded article 20 includes a primary molded part P and a secondary molded part Q. An outer surface 20F of the molded article 20 includes an outer surface PF of the primary molded part P and an outer surface QF of the secondary molded part Q.

For example, a raw material of the primary molded part P is selected in consideration of properties related to softening and hardening, properties related to softness and hardness, and transparency.

In regard to properties related to softening and hardening, for example, a thermoplastic resin is selected. In regard to properties related to softness and hardness, for example, a hard resin is selected. With regard to transparency, for example, an opaque resin is selected.

In an example, a hard and opaque thermoplastic resin is selected as the raw material of the primary molded part P. For example, a polyacetal, a polypropylene, or a saturated polyester-based resin is selected as a hard and opaque thermoplastic resin.

For example, a raw material of the secondary molded part Q is selected in consideration of properties related to softening and hardening, properties related to softness and hardness, and transparency.

In regard to properties related to softening and hardening, for example, a thermoplastic resin is selected. In regard to properties related to softness and hardness, for example, a hard resin is selected. In regard to transparency, for example, a transparent resin or a translucent resin is selected.

In an example, a hard and transparent thermoplastic resin or a hard and translucent thermoplastic resin is selected as the raw material of the secondary molded part Q. For example, an AS resin, an ABS resin, or a polycarbonate is selected as a hard and transparent thermoplastic resin. For example, a polypropylene or a polyethylene is selected as a hard and translucent thermoplastic resin.

In an example, the molded article 20 includes a pressurized structure 200. The pressurized structure 200 is constituted such that it can be pressurized by means of ejector pins. In an extruding step of taking out the molded article 20 from a mold, a pressurized part of the molded article 20 constituting the pressurized structure 200 is pressed by one or a plurality of ejector pins.

In an example of a method of manufacturing the molded article 20, the extruding step includes a primary extruding step and a secondary extruding step. In the primary extruding step, the pressurized part of the primary molded part P is pressed by the ejector pins. In the secondary extruding step, the pressurized part of the secondary molded part Q is pressed by the ejector pins.

A constitution of the pressurized structure 200 can be arbitrarily selected. The constitution of the pressurized structure 200 is not limited to the exemplified constitution. In an example, the pressurized structure 200 includes a particular part 210 and a protrusion part 220.

A constitution of the particular part 210 can be arbitrarily selected. The constitution of the particular part 210 is not limited to the exemplified constitution. In an example, the particular part 210 includes a pressurized part. The particular part 210 is provided in the head 130. The particular part 210 includes the front surface 133 of the head 130.

A constitution of the protrusion part 220 can be arbitrarily selected. The constitution of the protrusion part 220 is not limited to the exemplified constitution. In an example, the protrusion part 220 includes a pressurized part. The protrusion part 220 is constituted to protrude with respect to the main body 100. The protrusion part 220 is constituted such that it can be pressurized by means of the ejector pins.

Figure 6:
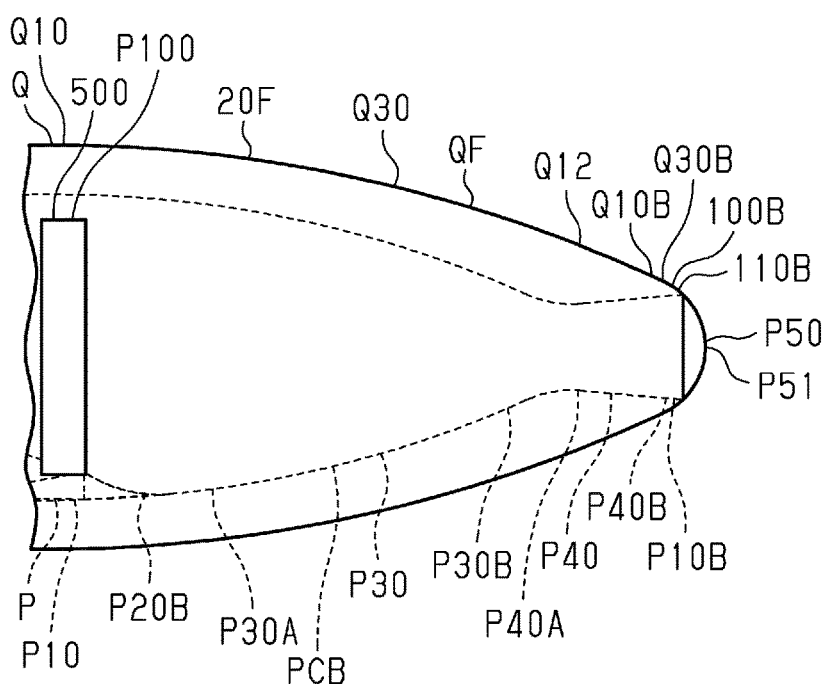
FIG. 6 is an enlarged view of a portion of the molded article in FIG. 1.

In an example, the protrusion part 220 is constituted as a part scheduled to be removed from the molded article 20 (which will hereinafter be referred to as "a removal scheduled part 300"). FIG. 6 illustrates the second end part 100B of the main body 100 in which the protrusion part 220 has been removed.

A relationship between the protrusion part 220 and a gate of the molded article 20 will be exemplified. In a first example, the protrusion part 220 is included in the primary molded part P. The protrusion part 220 is constituted as a part different from a gate of the primary molded part P. In a second example, the protrusion part 220 is included in the primary molded part P. The protrusion part 220 includes the gate of the primary molded part P.

In a third example, the protrusion part 220 is included in the secondary molded part Q. The protrusion part 220 is constituted as a part different from a gate of the secondary molded part Q. In a fourth example, the protrusion part 220 is included in the secondary molded part Q. The protrusion part 220 includes the gate of the secondary molded part Q.

Figure 7:
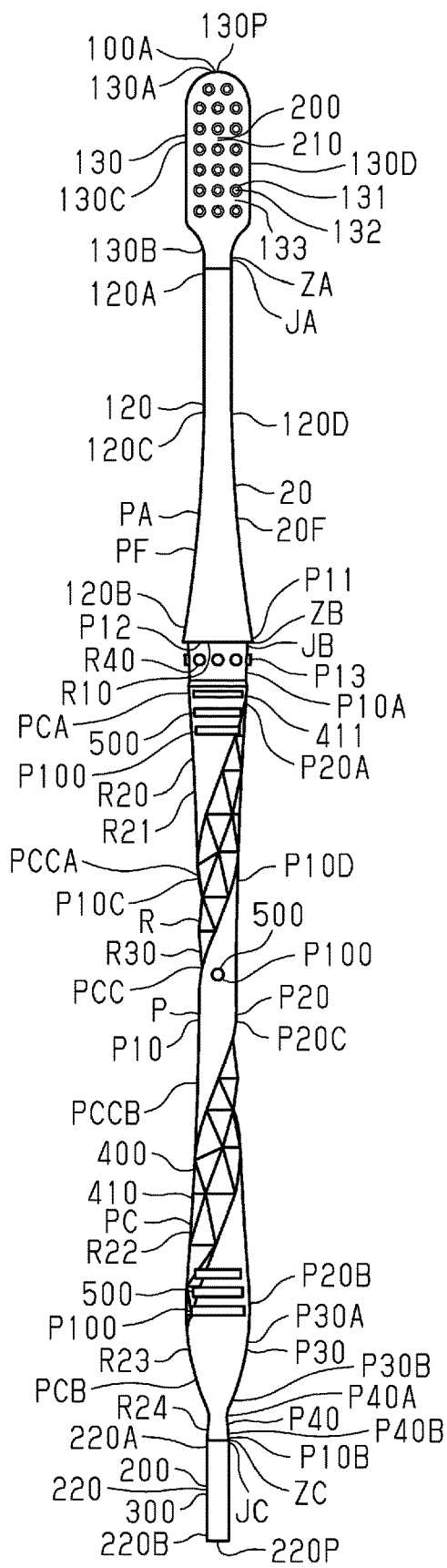
FIG. 7 is a front view of a primary molded part in FIG. 3.
Figure 8:
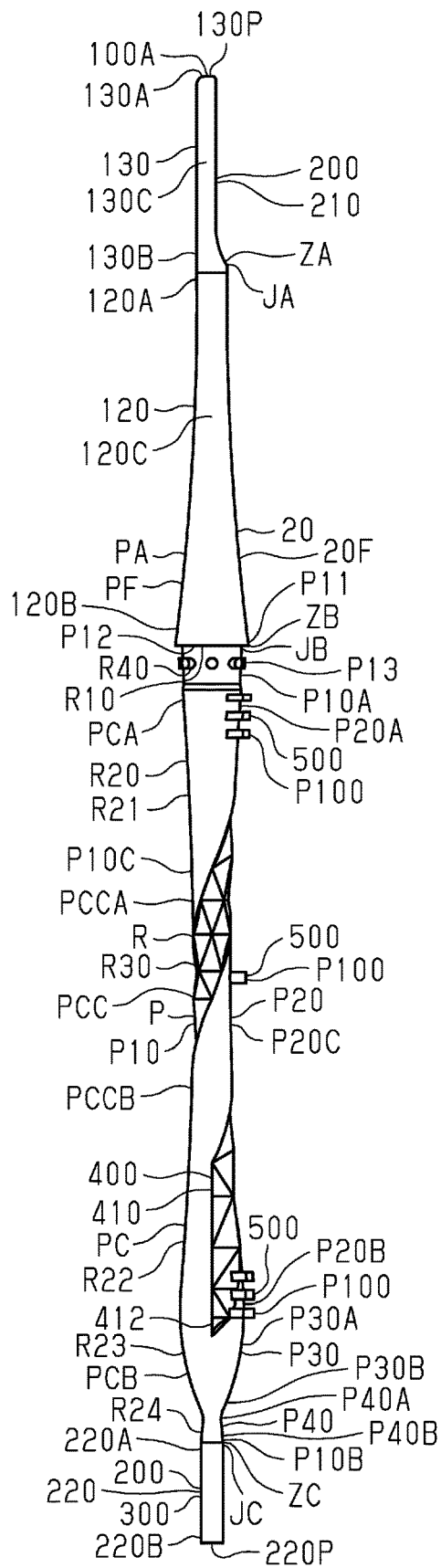
FIG. 8 is a side view of the primary molded part in FIG. 3.
Figure 9:
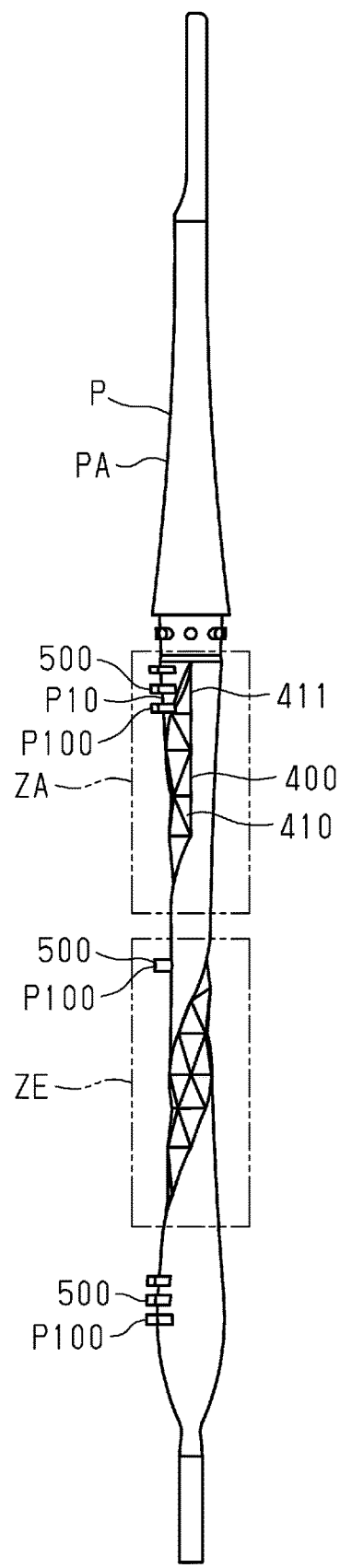
FIG. 9 is a second side view of the primary molded part.
Figure 10:
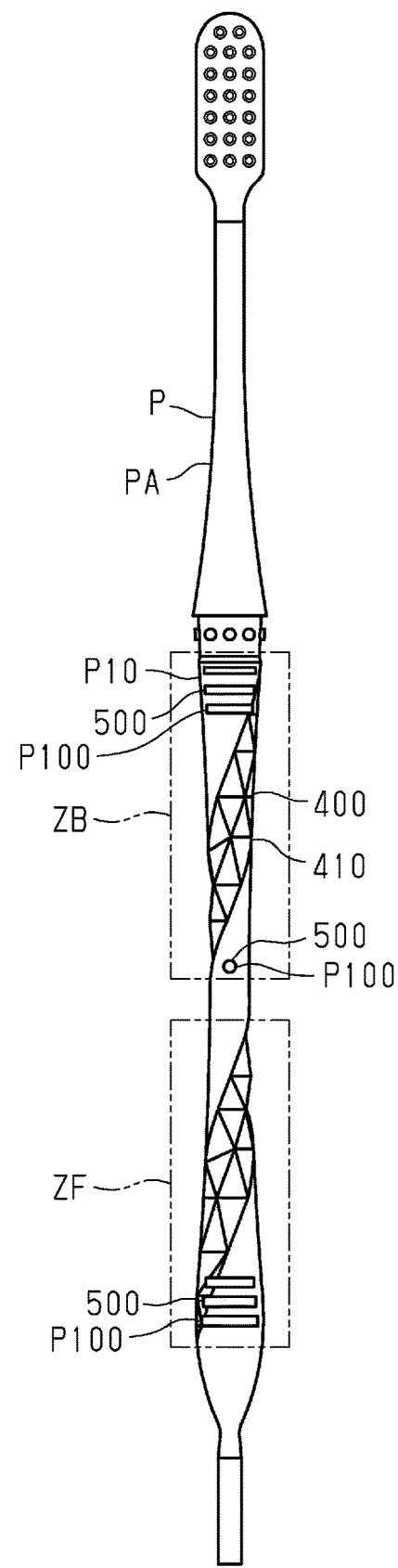
FIG. 10 is a front view of the primary molded part.
Figure 11:
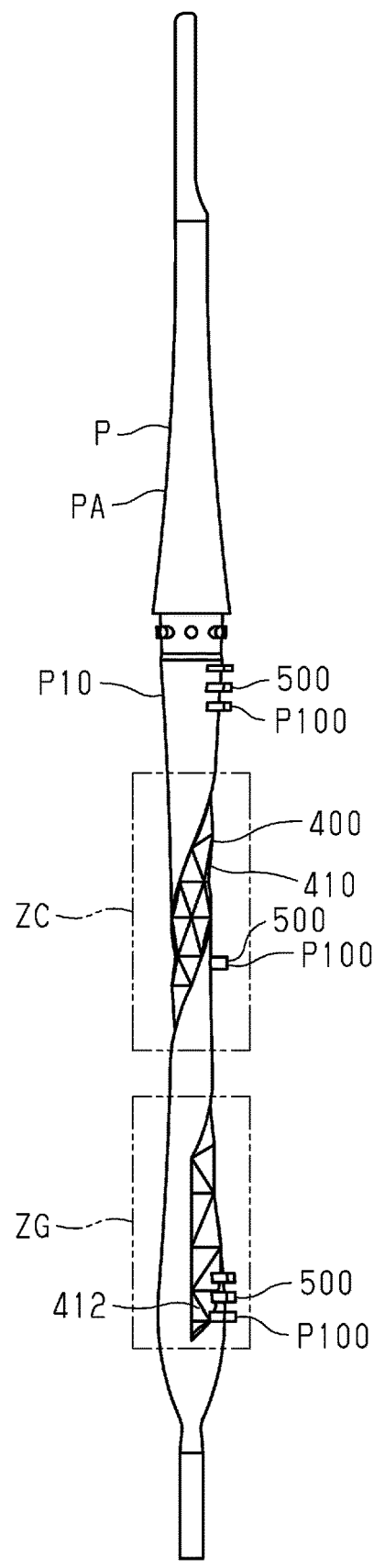
FIG. 11 is a first side view of the primary molded part.
Figure 12:
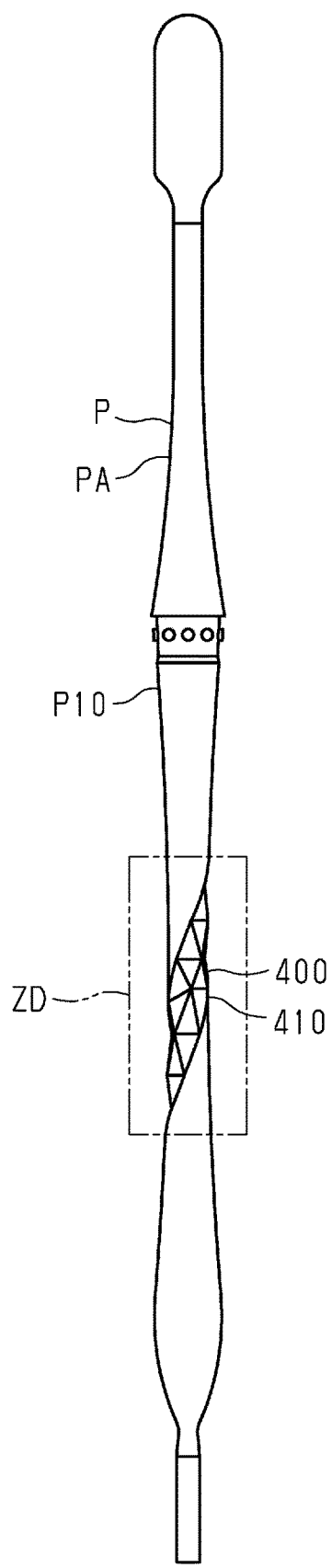
FIG. 12 is a rear view of the primary molded part.
Figure 13:
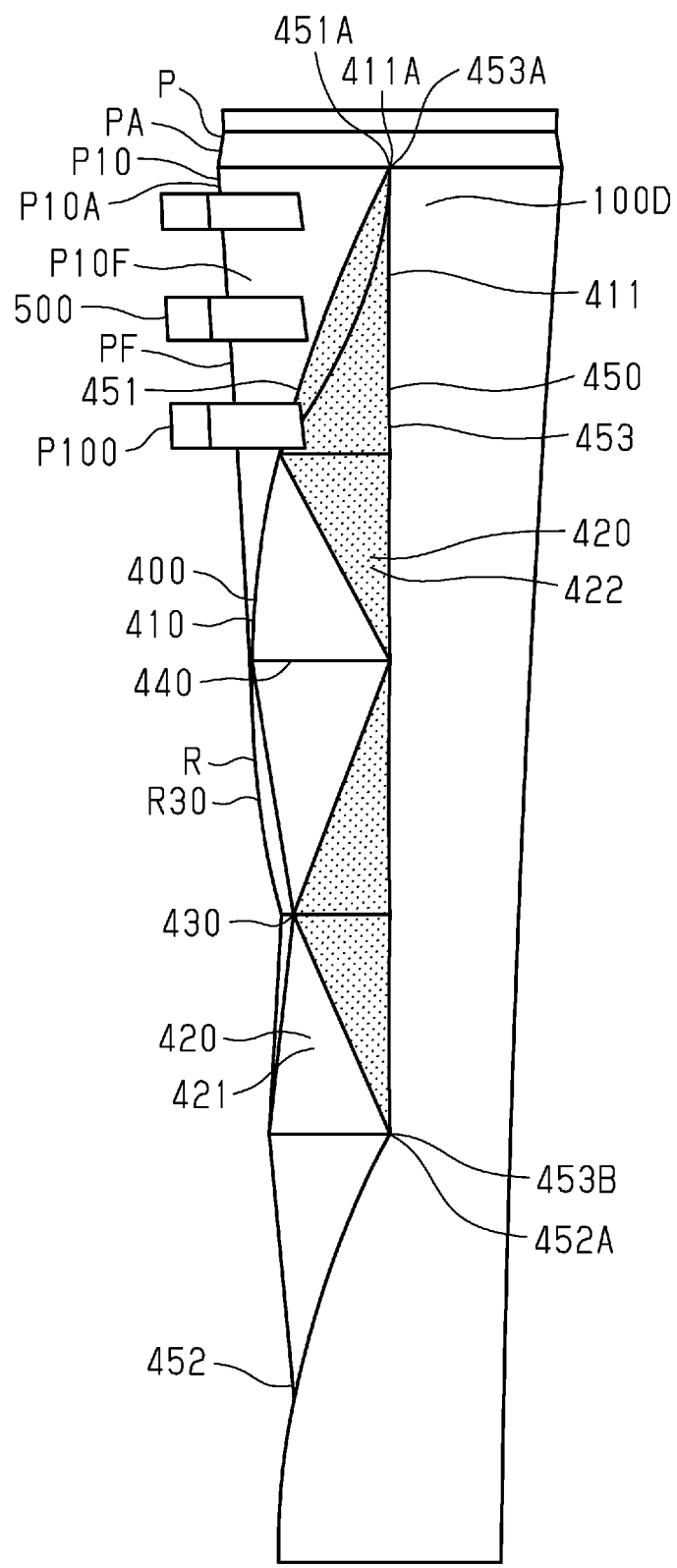
FIG. 13 is an enlarged view of a ZA part in FIG. 9.
Figure 14:
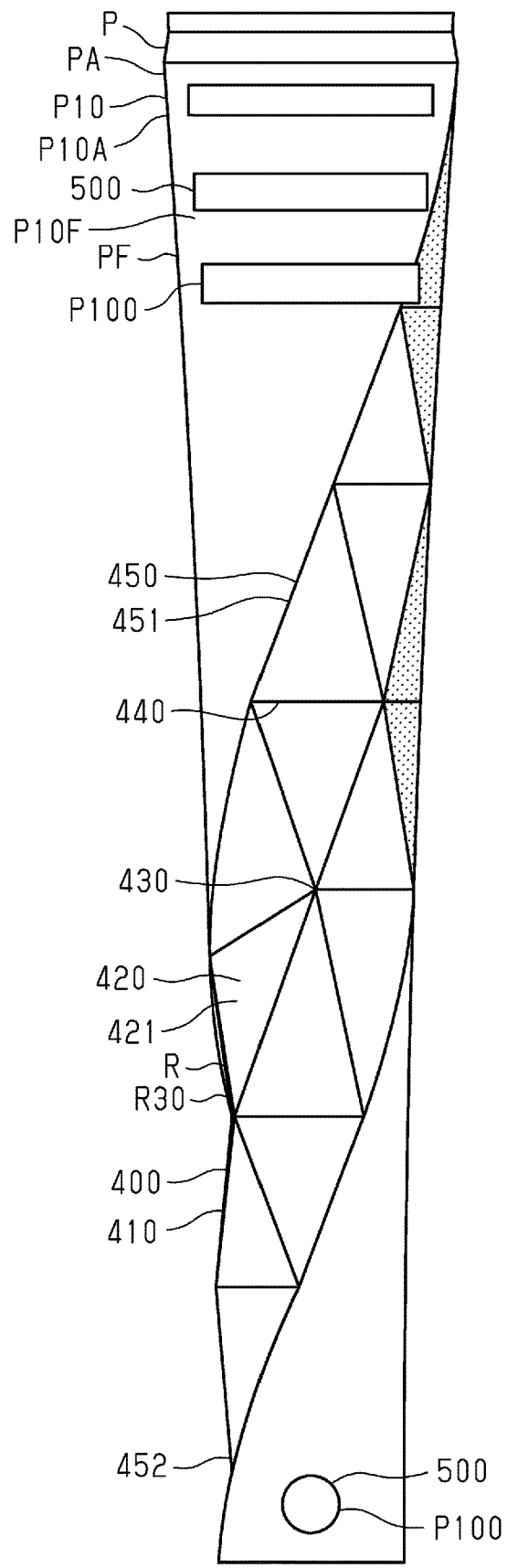
FIG. 14 is an enlarged view of a ZB part in FIG. 10.
Figure 15:
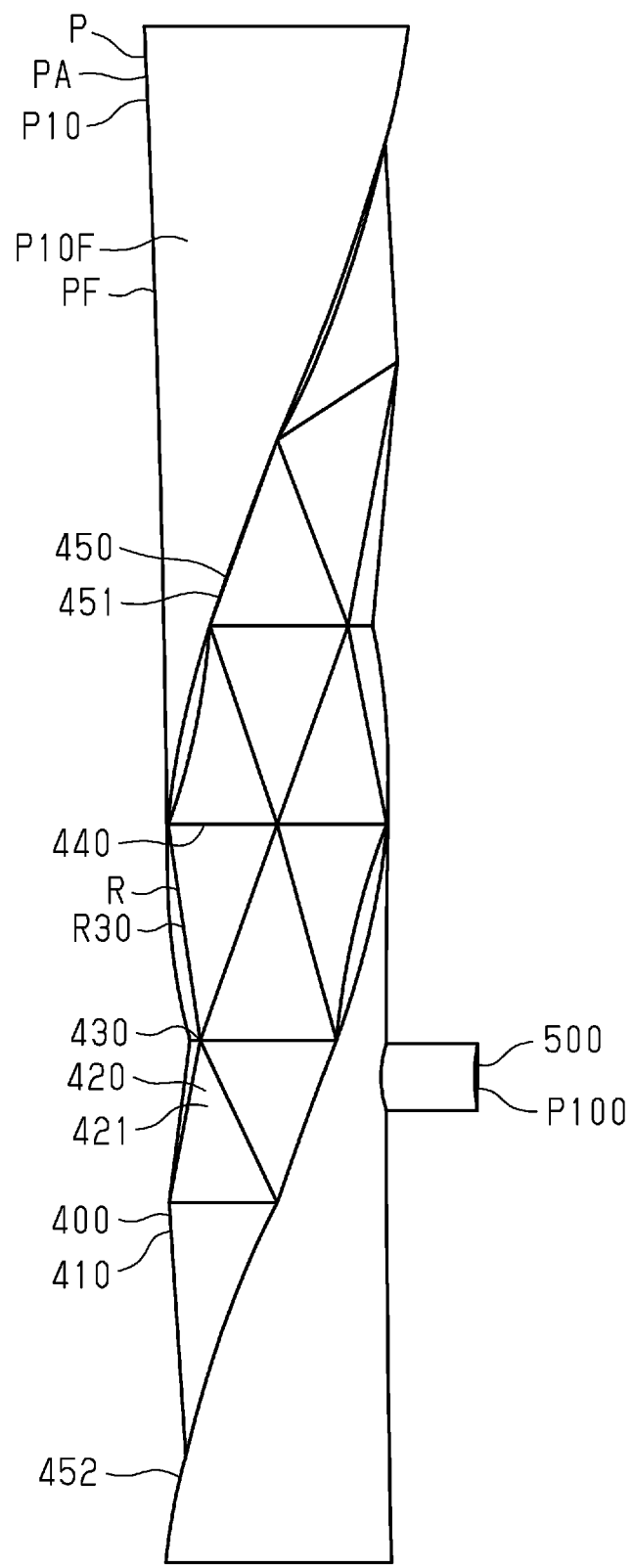
FIG. 15 is an enlarged view of a ZC part in FIG. 11.
Figure 16:
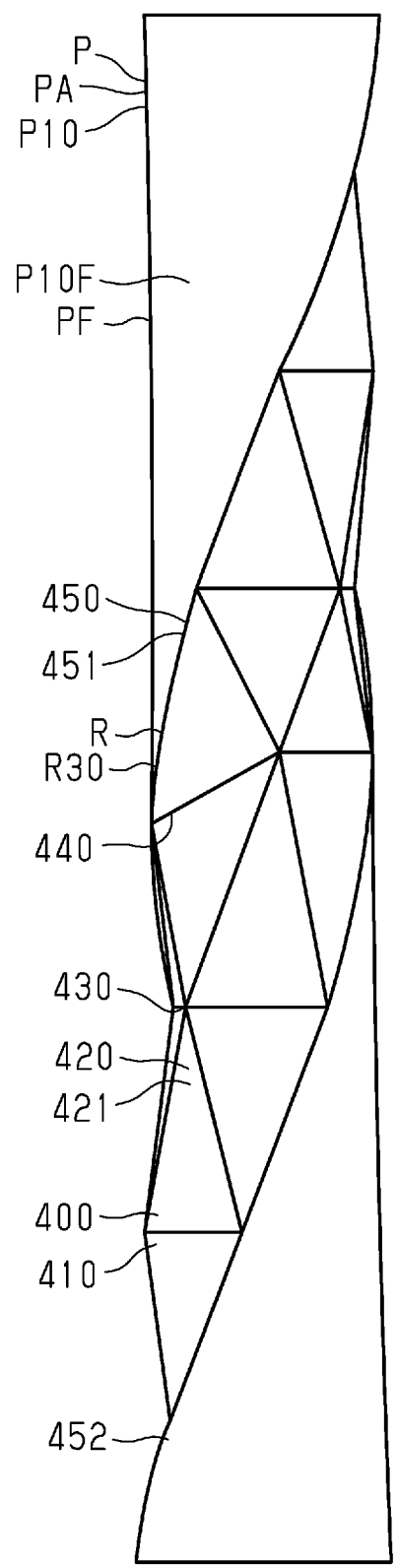
FIG. 16 is an enlarged view of a ZD part in FIG. 12.
Figure 17:
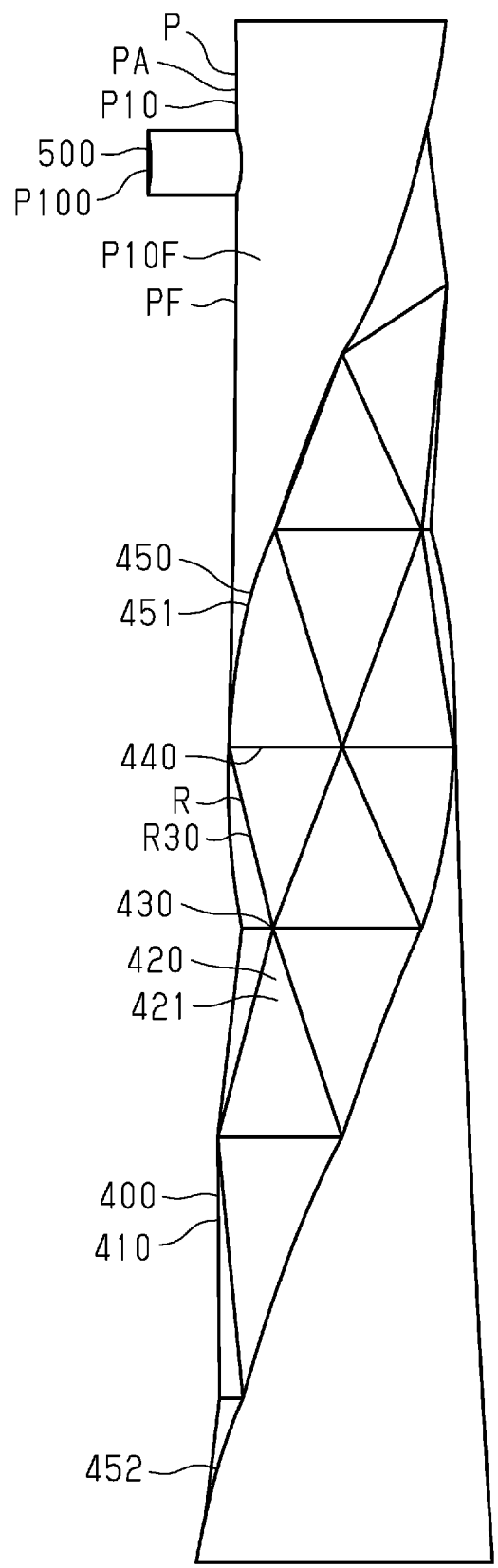
FIG. 17 is an enlarged view of a ZE part in FIG. 9.
Figure 18:
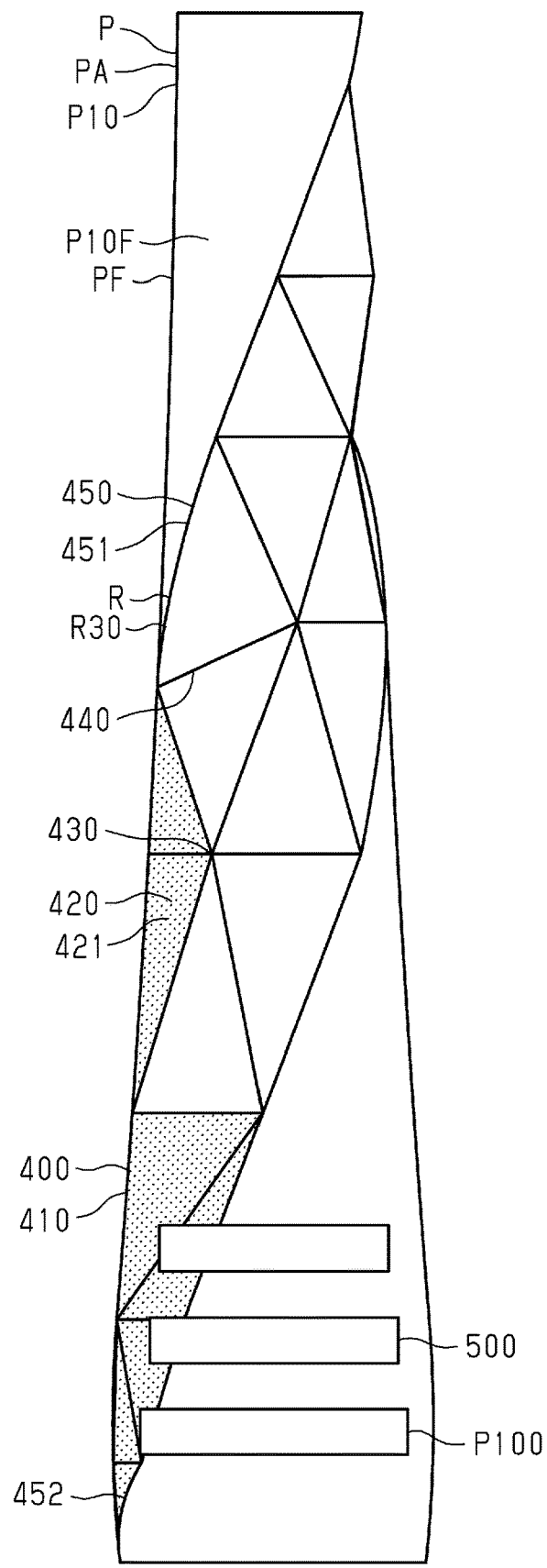
FIG. 18 is an enlarged view of a ZF part in FIG. 10.
Figure 19:
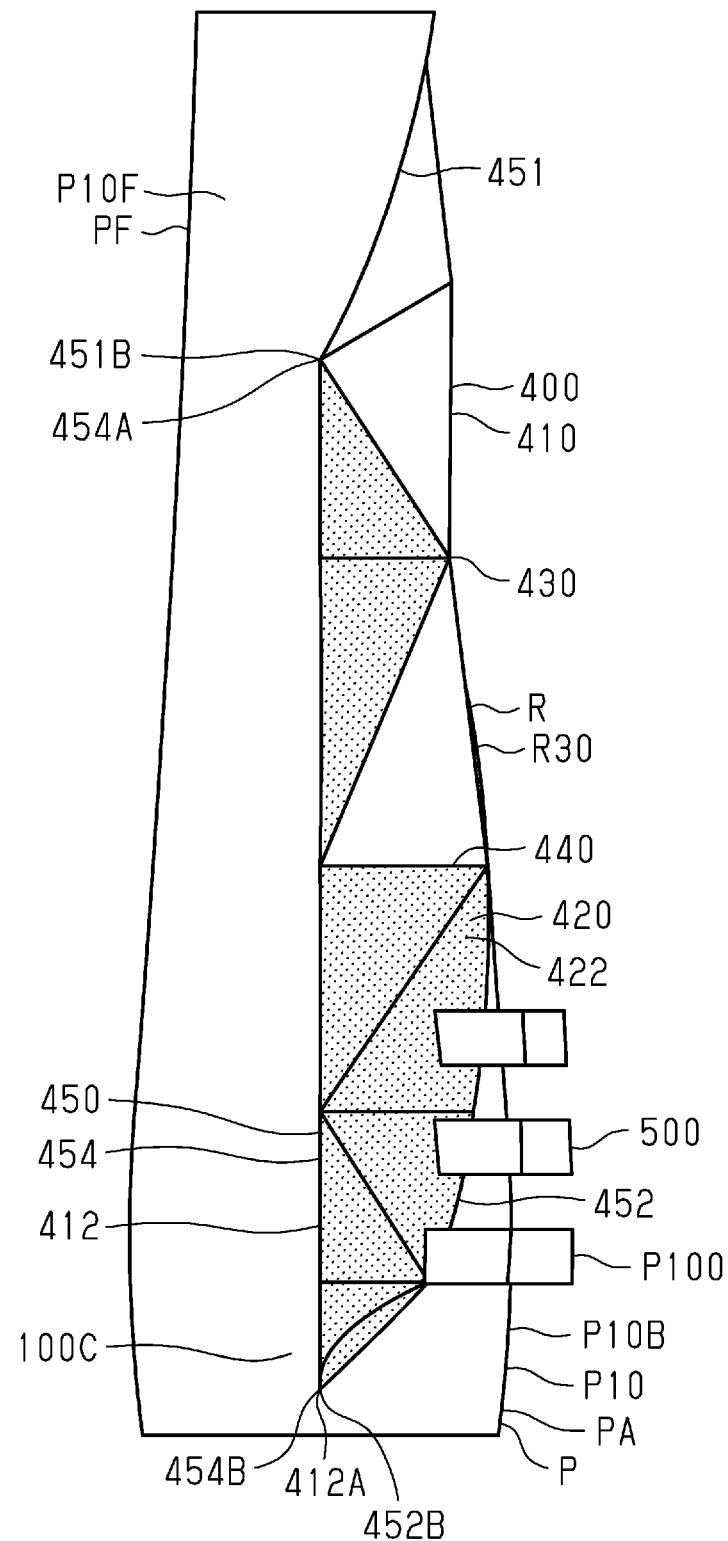
FIG. 19 is an enlarged view of a ZG part in FIG. 11.

FIGS. 7 and 8 will be referred to, A constitution of the primary molded part P can be arbitrarily selected. The constitution of the primary molded part P is not limited to the exemplified constitution. In an example, the primary molded part P includes a primary main body constitution part PA and the protrusion part 220. The protrusion part 220 is connected to the primary main body constitution part PA. The protrusion part 220 is constituted to protrude with respect to the primary main body constitution part PA.

A constitution of the primary main body constitution part PA can be arbitrarily selected. The constitution of the primary main body constitution part PA is not limited to the exemplified constitution. The primary main body constitution part PA constitutes the main body 100 of the molded article 20. In an example, the primary main body constitution part PA includes a primary handle constitution part P10, the neck 120, and the head 130.

The primary main body constitution part PA includes a covering target part PC. The covering target part PC is a part to be covered by a covering part Q40 of the secondary molded part Q. A constitution of the covering target part PC can be arbitrarily selected. The constitution of the covering target part PC is not limited to the exemplified constitution.

The constitution of the covering target part PC will be exemplified. In a first example, the covering target part PC includes at least a portion of the primary handle constitution part P10. In a second example, the covering target part PC includes at least a portion of the neck 120. In a third example, the covering target part PC includes at least a portion of the head 130. In a fourth example, the covering target part PC includes at least two of the constitutions of the first to third examples.

In an example, the covering target part PC extends in the axial direction. The covering target part PC includes a first end part PCA, a second end part PCB, and an intermediate part PCC. The first end part PCA is positioned in the first axial direction with respect to the center of the covering target part PC in the axial direction. The second end part PCB is positioned in the second axial direction with respect to the center of the covering target part PC in the axial direction.

The intermediate part PCC is positioned between the first end part PCA and the second end part PCB. The intermediate part PCC includes a first intermediate part PCCA and a second intermediate part PCCB. The first intermediate part PCCA is positioned in the first axial direction with respect to the center of the covering target part PC in the axial direction. The first intermediate part PCCA is connected to the first end part PCA. The second intermediate part PCCB is positioned in the second axial direction with respect to the center of the covering target part PC in the axial direction. The second intermediate part PCCB is connected to the second end part PCB.

A constitution of the primary handle constitution part P10 can be arbitrarily selected. The constitution of the primary handle constitution part P10 is not limited to the exemplified constitution. The primary handle constitution part P10 constitutes the handle 110.

The primary handle constitution part P10 includes a first end part P10A and a second end part P10B. The first end part P10A is positioned in the first axial direction with respect to the center of the primary handle constitution part P10 in the axial direction. The second end part P10B is positioned in the second axial direction with respect to the center of the primary handle constitution part P10 in the axial direction.

The first end part P10A constitutes the first end part 110A of the handle 110. The second end part P10B constitutes the second end part 110B of the handle 110. The first end part P10A is connected to the second end part 120B of the neck 120. The first end part P10A is thinner than the second end part 120B of the neck 120.

The primary handle constitution part P10 includes a first side part P10C and a second side part P10D. The first side part P10C is positioned in the first width direction with respect to the center of the primary handle constitution part P10 in the width direction. The second side part P10D is positioned in the second width direction with respect to the center of the primary handle constitution part P10 in the width direction.

In an example, the primary main body constitution part PA includes a stepped part P11. The stepped part P11 is provided between the second end part 120B of the neck 120 and the first end part P10A of the primary handle constitution part P10. The stepped part P11 includes an intermediate surface P12. The intermediate surface P12 is a surface between an upper part of the stepped part P11 and a lower part of the stepped part P11.

The intermediate surface P12 is provided between the outer surface PF of the second end part 120B of the neck 120 and the outer surface PF of the first end part P10A of the primary handle constitution part P10. For example, the intermediate surface P12 is a flat surface. For example, the intermediate surface P12 is parallel to the third reference surface.

In an example, the primary handle constitution part P10 includes one or a plurality of protrusion parts P13. In the illustrated example, the primary handle constitution part P10 includes the plurality of protrusion parts P13.

The plurality of protrusion parts P13 is provided in the first end part P10A. The plurality of protrusion parts P13 protrudes in a direction orthogonal to the center axis of the main body 100 with respect to the outer surface PF of the first end part P10A. The plurality of protrusion parts P13 is arranged with intervals therebetween around a center axis of the handle 110.

In an example, the primary handle constitution part P10 includes a constricted part P20. The constricted part P20 includes a first end part P20A, a second end part P20B, and an intermediate part P20C.

The first end part P20A is positioned in the first axial direction with respect to the intermediate part P20C in the axial direction. The second end part P20B is positioned in the second axial direction with respect to the intermediate part P20C in the axial direction. The intermediate part P20C is positioned between the first end part P20A and the second end part P20B in the axial direction.

The first end part P20A constitutes a thick part in the constricted part P20. The second end part P20B constitutes a thick part in the constricted part P20. The intermediate part P20C constitutes a thin part in the constricted part P20. A breadth of the constricted part P20 narrows from the first end part P20A and the second end part P20B toward the intermediate part P20C in the axial direction. The thinnest part in the constricted part P20 is included in the intermediate part P20C.

In an example, the primary handle constitution part P10 includes a tapered part P30. The tapered part P30 is positioned in the second axial direction with respect to the constricted part P20. The tapered part P30 is connected to the constricted part P20. A center axis of the tapered part P30 is coaxial with a center axis of the constricted part P20. An outer diameter of the tapered part P30 decreases toward the second axial direction.

The tapered part P30 includes a first end part P30A and a second end part P30B. The first end part P30A is positioned in the first axial direction with respect to the center of the tapered part P30 in the axial direction. The second end part P30B is positioned in the second axial direction with respect to the center of the tapered part P30 in the axial direction. The first end part P30A is connected to the second end part P20B of the constricted part P20.

In an example, the primary handle constitution part P10 includes a main body protrusion part P40. The main body protrusion part P40 is connected to the tapered part P30. The main body protrusion part P40 protrudes in the second axial direction with respect to the tapered part P30. A center axis of the main body protrusion part P40 is coaxial with the center axis of the constricted part P20. The main body protrusion part P40 is thinner than the thinnest part of the constricted part P20.

The main body protrusion part P40 includes a first end part P40A and a second end part P40B. The first end part P40A is positioned in the first axial direction with respect to the center of the main body protrusion part P40 in the axial direction. The second end part P40B is positioned in the second axial direction with respect to the center of the main body protrusion part P40 in the axial direction. The first end part P40A is connected to the second end part P30B of the tapered part P30.

In an example, the shape of the main body protrusion part P40 is a tapered shape. An outer diameter of the main body protrusion part P40 decreases toward the second axial direction. The largest outer diameter of the main body protrusion part P40 is smaller than a breadth of the thinnest part of the constricted part P20.

The second end part P10B of the primary handle constitution part P10 can be arbitrarily selected. A constitution of the second end part P10B is not limited to the exemplified constitution.

In an example in which the tapered part P30 and the main body protrusion part P40 are included in the primary handle constitution part P10, the second end part P10B is constituted of the tapered part P30 and the main body protrusion part P40.

In an example in which the tapered part P30 is included in the primary handle constitution part P10 and the main body protrusion part P40 is not included, the second end part P10B is constituted of the tapered part P30.

Figure 3:
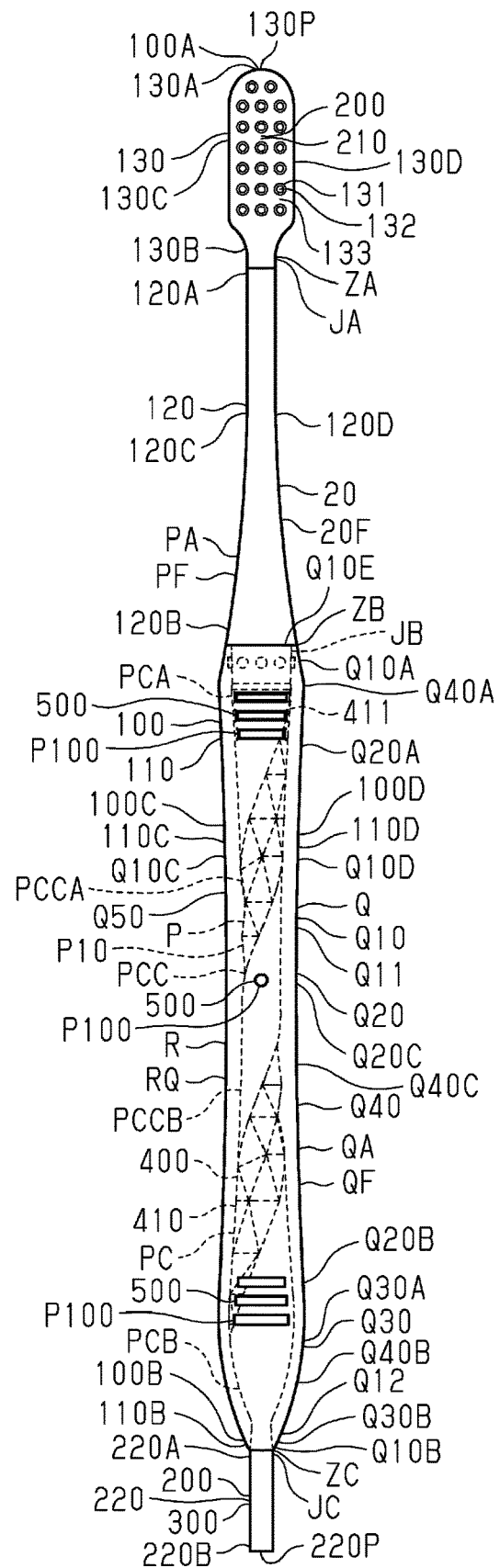
FIG. 3 is a front view of a molded article in FIG. 1.
Figure 4:
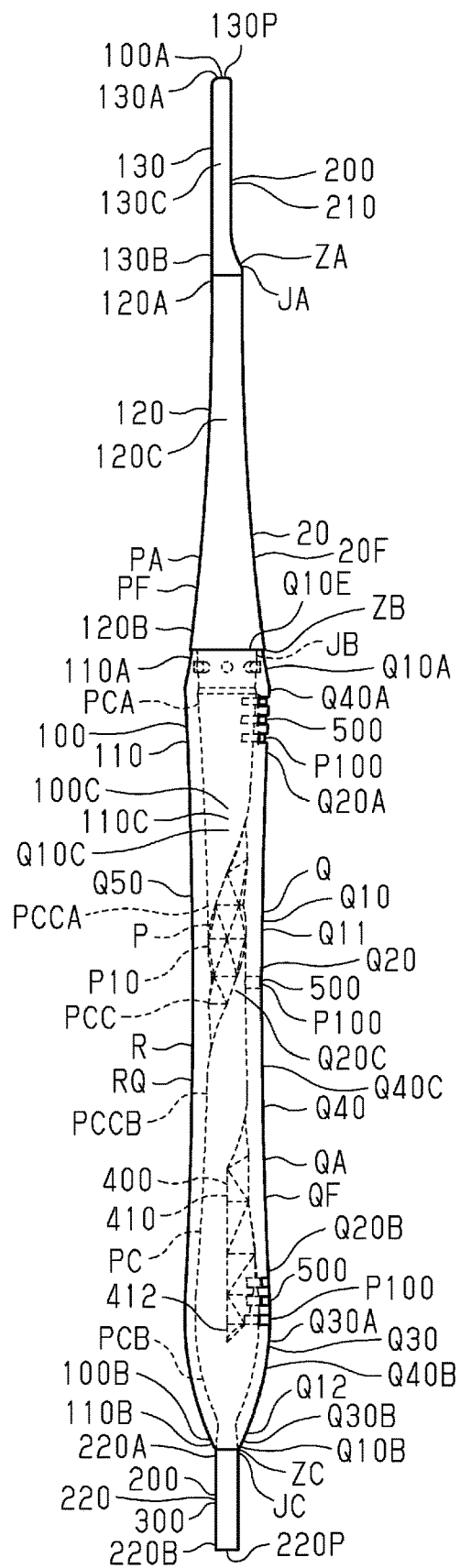
FIG. 4 is a side view of the molded article in FIG. 1.

FIGS. 3 and 4 will be referred to, A constitution of the secondary molded part Q can be arbitrarily selected. The constitution of the secondary molded part Q is not limited to the exemplified constitution. In an example, the secondary molded part Q includes a secondary main body constitution part QA.

A constitution of the secondary main body constitution part QA can be arbitrarily selected. The constitution of the secondary main body constitution part QA is not limited to the exemplified constitution. The secondary main body constitution part QA constitutes the main body 100 of the molded article 20. In an example, the secondary main body constitution part QA includes a secondary handle constitution part Q10.

A constitution of the secondary handle constitution part Q10 can be arbitrarily selected. The constitution of the secondary handle constitution part Q10 is not limited to the exemplified constitution. The secondary handle constitution part Q10 is joined to the outer surface PF of the primary handle constitution part P10. The secondary handle constitution part Q10 is constituted such that at least a portion of the outer surface PF of the primary handle constitution part P10 is covered.

The secondary handle constitution part Q10 constitutes a grip part in the handle 110. A raw material of the secondary handle constitution part Q10 differs from the raw material of the primary handle constitution part P10.

The secondary handle constitution part Q10 includes a first end part Q10A and a second end part Q10B. The first end part Q10A is positioned in the first axial direction with respect to the center of the secondary handle constitution part Q10 in the axial direction. The second end part Q10B is positioned in the second axial direction with respect to the center of the secondary handle constitution part Q10 in the axial direction.

The first end part Q10A of the secondary handle constitution part Q10 includes an end surface Q10E. For example, the end surface Q10E is a flat surface. For example, the end surface Q10E is parallel to the third reference surface. The end surface Q10E faces the intermediate surface P12 of the stepped part P11 of the primary main body constitution part PA. The end surface Q10E comes into contact with the intermediate surface P12 of the stepped part P11.

The secondary handle constitution part Q10 includes a first side part Q10C and a second side part Q10D. The first side part Q10C is positioned in the first width direction with respect to the center of the secondary handle constitution part Q10 in the width direction. The second side part Q10D is positioned in the second width direction with respect to the center of the secondary handle constitution part Q10 in the width direction. The first side part Q10C constitutes the first side part 100C of the main body 100. The second side part Q10D constitutes the second side part 100D of the main body 100.

In an example, the secondary handle constitution part Q10 includes a first constitution part Q11 and a second constitution part Q12. The second constitution part Q12 is positioned in the second axial direction with respect to the first constitution part Q11.

The first end part P10A of the primary handle constitution part P10, the constricted part P20, and the tapered part P30 are disposed inside the first constitution part Q11. The first constitution part Q11 covers the outer surface PF of the first end part P10A, the outer surface PF of the constricted part P20, and the outer surface PF of the tapered part P30.

The main body protrusion part P40 of the primary handle constitution part P10 is disposed inside the second constitution part Q12. The second constitution part Q12 covers a side surface of the outer surface PF of the main body protrusion part P40.

In an example, the secondary handle constitution part Q10 includes a constricted part Q20. The constricted part Q20 includes a first end part Q20A, a second end part Q20B, and an intermediate part Q20C.

The first end part Q20A is positioned in the first axial direction with respect to the intermediate part Q20C. The second end part Q20B is positioned in the second axial direction with respect to the intermediate part Q20C. The first end part Q20A constitutes a thick part in the constricted part Q20. The second end part Q20B constitutes a thick part in the constricted part Q20. The intermediate part Q20C constitutes a thin part in the constricted part Q20.

A breadth of the constricted part Q20 narrows from the first end part Q20A and the second end part Q20B toward the intermediate part Q20C in the axial direction. The thinnest part in the constricted part Q20 is included in the intermediate part Q20C.

The first end part Q20A of the constricted part Q20 is constituted such that it corresponds to the first end part P20A of the constricted part P20 of the primary handle constitution part P10. The first end part Q20A of the constricted part Q20 covers the outer surface PF of the first end part P20A of the constricted part P20.

The second end part Q20B of the constricted part Q20 is constituted such that it corresponds to the second end part P20B of the constricted part P20 of the primary handle constitution part P10. The second end part Q20B of the constricted part Q20 covers the outer surface PF of the second end part P20B of the constricted part P20.

The intermediate part Q20C of the constricted part Q20 is constituted such that it corresponds to the intermediate part P20C of the constricted part P20 of the primary handle constitution part P10. The intermediate part Q20C of the constricted part Q20 covers the outer surface PF of the intermediate part P20C of the constricted part P20.

In an example, the secondary handle constitution part Q10 includes a tapered part Q30. The tapered part Q30 includes a portion of the first constitution part Q11 and the second constitution part Q12. An outer diameter of the tapered part Q30 decreases toward the second axial direction. The tapered part Q30 includes a first end part Q30A and a second end part Q30B. The first end part Q30A is positioned in the first axial direction with respect to the center of the tapered part Q30 in the axial direction. The second end part Q30B is positioned in the second axial direction with respect to the center of the tapered part Q30 in the axial direction. The first end part Q30A is connected to the second end part Q20B of the constricted part Q20.

The second end part Q10B of the secondary handle constitution part Q10 can be arbitrarily selected. A constitution of the second end part Q10B is not limited to the exemplified constitution. In an example in which the tapered part Q30 is included in the secondary handle constitution part Q10, the second end part Q10B is constituted of the tapered part Q30.

A constitution of the second end part 110B of the handle 110 can be arbitrarily selected. In an example, the second end part 110B is constituted of the second end part P10B of the primary handle constitution part P10 and the second end part Q10B of the secondary handle constitution part Q10.

Figure 5:
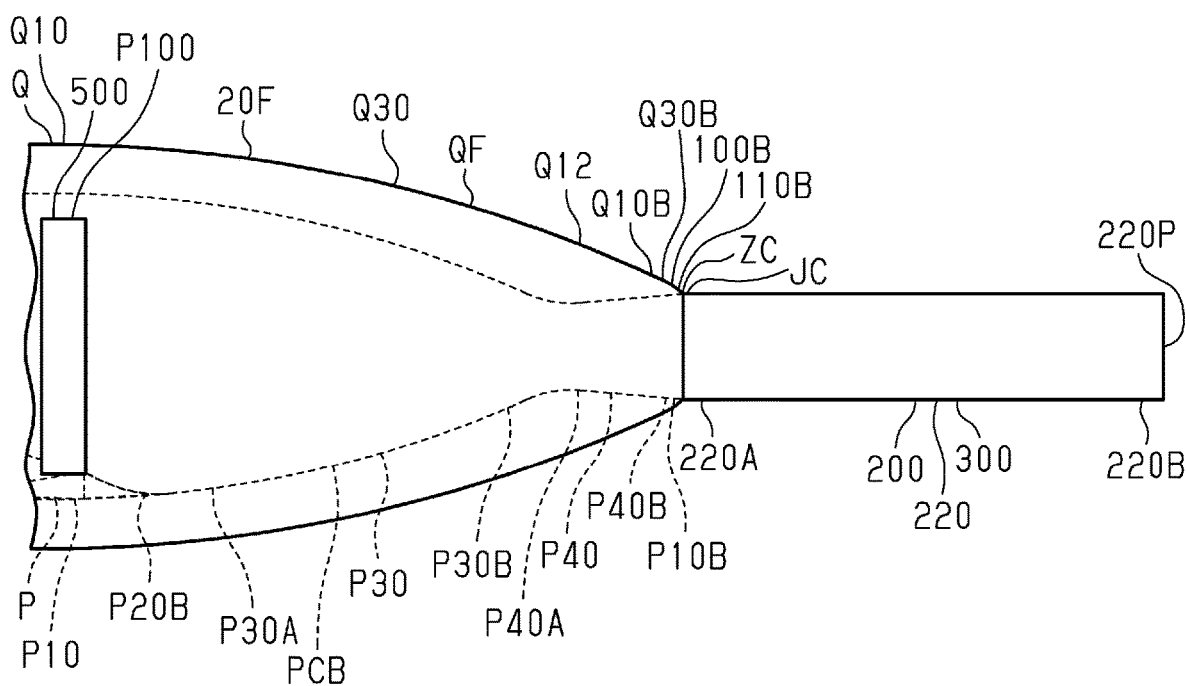
FIG. 5 is an enlarged view of a portion of the molded article in FIG. 3.

FIGS. 5 and 6 will be referred to. The protrusion part 220 is connected to the second end part 110B of the handle 110. The protrusion part 220 protrudes toward the second axial direction with respect to the second end part 110B of the handle 110. A center axis of the protrusion part 220 is coaxial with the center axis of the handle 110.

In an example, the protrusion part 220 is connected to the primary handle constitution part P10. The protrusion part 220 protrudes toward the second axial direction with respect to the second end part P10B of the primary handle constitution part P10.

The protrusion part 220 includes a first end part 220A and a second end part 220B. The first end part 220A is positioned in the first axial direction with respect to the center of the protrusion part 220 in the axial direction. The second end part 220B is positioned in the second axial direction with respect to the center of the protrusion part 220 in the axial direction. The first end part 220A is connected to the second end part P10B of the primary handle constitution part P10. In an example, the first end part 220A is connected to the second end part P40B of the main body protrusion part P40.

In an example, the protrusion part 220 is a columnar body. Examples of the columnar body include a pillar, a prism, and an antiprism. In the illustrated example, the protrusion part 220 is a pillar.

A breadth of the protrusion part 220 can be arbitrarily selected. The breadth of the protrusion part 220 is not limited to the exemplified breadth. In an example, the protrusion part 220 is thinner than the main body 100. An outer diameter of the protrusion part 220 is smaller than the smallest thickness of the head 130. The outer diameter of the protrusion part 220 is smaller than an outer diameter of the thinnest part of the constricted part P20.

In the molded article 20 in a state in which the protrusion part 220 has been removed, the primary molded part P includes a tip part P50. The tip part P50 is a part of the protrusion part 220 remaining in the molded article 20 without being removed.

The tip part P50 is connected to the second end part P40B of the main body protrusion part P40. The tip part P50 protrudes in the second axial direction with respect to the main body protrusion part P40. The tip part P50 includes an end surface P51.

The tip part P50 is not covered by the secondary handle constitution part Q10. The tip part P50 is positioned outside the secondary handle constitution part Q10. The tip part P50 protrudes in the second axial direction with respect to the second end part Q10B of the secondary handle constitution part Q10.

In an example, the end surface P51 is a curved surface bulging toward the second axial direction. The end surface P51 constitutes the outer surface PF of the second end part 110B of the handle 110.

FIGS. 1 to 4 will be referred to. In an example, the molded article 20 includes a decoration part 400. The decoration part 400 is constituted such that the molded article 20 is decorated. A constitution of the decoration part 400 can be arbitrarily selected. The constitution of the decoration part 400 is not limited to the exemplified constitution. In an example, the decoration part 400 is provided in at least one of the primary molded part P and the secondary molded part Q.

For example, a method of forming the decoration part 400 is classified into primary decoration and secondary decoration. The primary decoration is a method of forming the decoration part 400 during molding of the molded article 20. The secondary decoration is a method of forming the decoration part 400 after molding of the molded article 20.

Examples of the primary decoration include copying of a decorative film, pasting of a decorative film, pasting of a soft skin material, pasting of other skin materials, in-mold coating, in-mold reacting, molding of a pigmented layer, and copying of a particular surface for decoration formed in a mold.

Examples of the secondary decoration include copying of a decorative film, pasting of a decorative film, pasting of a soft skin material, pasting of other skin materials, painting, printing, plating, vacuum film formation, electrostatic flocking, laser marking, chemical coating, and dyeing. The decoration part 400 provided in the primary molded part P includes at least one of the decoration part 400 formed by the primary decoration and the decoration part 400 formed by the secondary decoration.

In the molded article 20 in a state in which the protrusion part 220 has not been removed, the decoration part 400 is provided in the following part, for example.

In an example in which the decoration part 400 is provided in the primary molded part P, the decoration part 400 is provided in at least one of the primary main body constitution part PA and the protrusion part 220.

In an example in which the decoration part 400 is provided in the primary main body constitution part PA, the decoration part 400 is provided in at least one of the primary handle constitution part P10, the neck 120, and the head 130.

In an example in which the decoration part 400 is provided in the primary handle constitution part P10, the decoration part 400 is provided in at least one of the first end part P10A, the second end part P10B, the first side part P10C, the second side part P10D, the stepped part P11, the protrusion parts P13, the constricted part P20, the tapered part P30, and the main body protrusion part P40.

In the molded article 20 in a state in which the protrusion part 220 has been removed, the decoration part 400 is provided in the following part, for example.

In an example in which the decoration part 400 is provided in the primary molded part P, the decoration part 400 is provided in the primary main body constitution part PA.

In an example in which the decoration part 400 is provided in the primary main body constitution part PA, the decoration part 400 is provided in at least one of the primary handle constitution part P10, the neck 120, and the head 130.

In an example in which the decoration part 400 is provided in the primary handle constitution part P10, the decoration part 400 is provided in at least one of the first end part P10A, the second end part P10B, the first side part P10C, the second side part P10D, the stepped part P11, the protrusion parts P13, the constricted part P20, the tapered part P30, and the tip part P50.

The decoration part 400 provided in the secondary molded part Q includes at least one of the decoration part 400 formed by the primary decoration and the decoration part 400 formed by the secondary decoration.

In an example in which the decoration part 400 is provided in the secondary molded part Q, the decoration part 400 is provided in the secondary main body constitution part QA.

In an example in which the decoration part 400 is provided in the secondary main body constitution part QA, the decoration part 400 is provided in the secondary handle constitution part Q10.

In an example in which the decoration part 400 is provided in the secondary handle constitution part Q10, the decoration part 400 is provided in at least one of the first end part Q10A, the second end part Q10B, the first side part Q10C, the second side part Q10D, the first constitution part Q11, the second constitution part Q12, the constricted part Q20, and the tapered part Q30.

FIGS. 9 to 19 will be referred to. In an example, the decoration part 400 includes a surface projection part 410. A constitution of the surface projection part 410 can be arbitrarily selected. The constitution of the surface projection part 410 is not limited to the exemplified constitution.

The surface projection part 410 is formed by the primary decoration. In an example, a mold used for manufacturing the molded article 20 includes a particular surface for decoration. The particular surface has a shape corresponding to the surface projection part 410. The surface projection part 410 is formed by copying of the particular surface of the mold.

In an example, the surface projection part 410 is provided in the primary molded part P. The surface projection part 410 is provided in the primary main body constitution part PA. The surface projection part 410 is provided in the primary handle constitution part P10. The surface projection part 410 is constituted such that unevenness is applied to the outer surface PF of the primary handle constitution part P10.

In an example, a reference line is set with respect to the surface projection part 410. The surface projection part 410 includes a set of outer circumferential parts positioned with an interval therebetween in the axial direction, the width direction, or the circumferential direction. For example, the reference line is set as follows. In a first example, a line positioned between a set of outer circumferential parts is set as a reference line. In a second example, an outer circumferential part of the surface projection part 410 constituted to lie in an extending direction of the surface projection part 410 is set as a reference line.

The surface projection part 410 includes a first end part 411 and a second end part 412. The first end part 411 is positioned in the first axial direction with respect to the center of the reference line of the surface projection part 410. The second end part 412 is positioned in the second axial direction with respect to the center of the reference line of the surface projection part 410.

The first end part 411 is provided in the first end part P10A of the primary handle constitution part P10. The first end part 411 is provided in the second side part 100D of the primary handle constitution part P10. The first end part 411 includes a first tip 411A.

The second end part 412 is provided in the second end part P10B of the primary handle constitution part P10. The second end part 412 is provided in the first side part 100C of the primary handle constitution part P10. The second end part 412 includes a second tip 412A.

The surface projection part 410 includes one or a plurality of geometrically-shaped surfaces 420. Examples of the shapes of the geometrically-shaped surfaces 420 include a polygonal shape, an elliptic shape, a fan shape, and a Reuleaux polygonal shape. An elliptic shape includes an elliptic shape having a long axis and a short axis, and a circle.

Examples of the polygonal shape include a regular polygonal shape and a general polygonal shape. Examples of the regular polygonal shape include a regular triangular shape, a square shape, and a regular pentagonal shape. Examples of the general polygonal shape include a triangular shape, a quadrangular shape, a pentagonal shape, a hexagonal shape, a heptagonal shape, an octagonal shape, a nonagonal shape, and a decagonal shape. Examples of the triangular shape include an isosceles triangle shape, a right-angled triangular shape, and a right-angled isosceles triangle shape. Examples of the quadrangular shape include a rectangular shape, a rhombic shape, a parallelogram shape, a trapezoidal shape, an isosceles trapezoid shape, and a kite shape.

In an example, the surface projection part 410 includes a plurality of geometrically-shaped surfaces 420. The constitution of the surface projection part 410 based on the relationship between the plurality of geometrically-shaped surfaces 420 will be exemplified. In a first example, the kinds of figures are the same regarding all of the plurality of geometrically-shaped surfaces 420. In a second example, the kinds of figures are the same regarding some of the plurality of geometrically-shaped surfaces 421. In a third example, the kinds of figures differ regarding all of the plurality of geometrically-shaped surfaces 420.

Examples of details of the first example include eleventh to thirteenth examples. In the eleventh example, the figures are congruent regarding all of a plurality of types of geometrically-shaped surfaces 420. In the twelfth example, the figures are congruent regarding some of the plurality of geometrically-shaped surfaces 420. In the thirteenth example, the figures are non-congruent regarding all of the plurality of geometrically-shaped surfaces 420.

Examples of details of the second example include twenty-first to twenty-third examples. In the twenty-first example, the figures are congruent regarding all of the plurality of geometrically-shaped surfaces 420 having the same kinds of figures. In the twenty-second example, the figures are congruent regarding some of the plurality of geometrically-shaped surfaces 420 having the same kinds of figures. In the twenty-third example, the figures are non-congruent regarding all of the plurality of geometrically-shaped surfaces 420 having the same kinds of figures.

Examples of a form related to disposition of the plurality of geometrically-shaped surfaces 420 include a first disposition form and a second disposition form. In the first disposition form, the plurality of geometrically-shaped surfaces 420 is regularly disposed. In the second disposition form, the plurality of geometrically-shaped surfaces 420 is irregularly disposed.

Examples of details of the first disposition form include an eleventh disposition form and a twelfth disposition form. In the eleventh disposition form, the plurality of geometrically-shaped surfaces 420 is disposed along the reference line. Examples of the reference line include a straight line, a waved line, a helix, and a curve in the circumferential direction. In the twelfth disposition form, the plurality of geometrically-shaped surfaces 420 is disposed on the basis of a reference different from the reference line.

Examples of details of the eleventh disposition form include an 111th disposition form and an 121st disposition form. In the 111th disposition form, each of the geometrically-shaped surfaces 420 included in the plurality of geometrically-shaped surfaces 420 comes into contact with other geometrically-shaped surfaces 420 included in the plurality of geometrically-shaped surfaces 420. In the 121st disposition form, each of the geometrically-shaped surfaces 420 included in the plurality of geometrically-shaped surfaces 420 does not come into contact with other geometrically-shaped surfaces 420 included in the plurality of geometrically-shaped surfaces 420.

Contents of the 111th disposition form when the geometrically-shaped surfaces 420 corresponding to the 111th disposition form have polygonal shapes will be exemplified. Each of the geometrically-shaped surfaces 420 included in the plurality of geometrically-shaped surfaces 420 share at least one of a side and a vertex with at least one of other geometrically-shaped surfaces 420 included in the plurality of geometrically-shaped surfaces 420.

The plurality of geometrically-shaped surfaces 420 disposed on the basis of the first disposition form will be referred to as "a first group". The plurality of geometrically-shaped surfaces 420 disposed on the basis of the eleventh disposition form will be referred to as "an eleventh group". The plurality of geometrically-shaped surfaces 420 disposed on the basis of the 111th disposition form will be referred to as "an 111th group". The plurality of geometrically-shaped surfaces 420 disposed on the basis of the 121st disposition form will be referred to as "an 121 st group".

The plurality of geometrically-shaped surfaces 420 disposed on the basis of the twelfth disposition form will be referred to as "a twelfth group". The plurality of geometrically-shaped surfaces 420 disposed on the basis of the second disposition form will be referred to as "a second group". The constitution of the surface projection part 410 based on the disposition form of the plurality of geometrically-shaped surfaces 420 will be exemplified.

In a first example, the surface projection part 410 includes at least one first group and includes no second group. In a second example, the surface projection part 410 includes at least one first group and at least one second group.

In a third example, the surface projection part 410 includes at least one second group and includes no first group. In a fourth example, on the premise of the first example or the second example, the surface projection part 410 includes a plurality of first groups.

In a fifth example, on the premise of the fourth example, a plurality of first groups includes at least one eleventh group and at least one twelfth group. In a sixth example, on the premise of the fourth example, a plurality of first groups includes a plurality of eleventh groups and at least one twelfth group.

In a seventh example, on the premise of the fourth example, a plurality of first groups includes a plurality of eleventh groups and a plurality of twelfth groups. In an eighth example, on the premise of the fourth example, a plurality of first groups includes a plurality of eleventh groups and includes no twelfth group.

In a ninth example, on the premise of the fourth example, a plurality of first groups includes at least one eleventh group and a plurality of twelfth groups. In a tenth example, on the premise of the fourth example, a plurality of first groups includes a plurality of twelfth groups and includes no eleventh group.

In an eleventh example, on the premise of any of the sixth to eighth examples, a plurality of eleventh groups includes at least one 111th group and at least one 121st group. In a twelfth example, on the premise of any of the sixth to eighth examples, a plurality of eleventh groups includes a plurality of 111th groups and at least one 121st group.

In a thirteenth example, on the premise of any of the sixth to eighth examples, a plurality of eleventh groups includes a plurality of 111th groups and a plurality of 121st groups. In a fourteenth example, on the premise of any of the sixth to eighth examples, a plurality of eleventh groups includes a plurality of 111th groups and includes no 121st group.

In a fifteenth example, on the premise of any of the sixth to eighth examples, a plurality of eleventh groups includes at least one 111th group and a plurality of 121st groups. In a sixteenth example, on the premise of any of the sixth to eighth examples, a plurality of eleventh groups includes a plurality of 121st groups and includes no 111th group.

In an example in which at least one 111th group is included in the surface projection part 410, the surface projection part 410 includes one of or both one or a plurality of mountain shape parts 430 and one or a plurality of valley shape parts 440. The mountain shape part 430 is constituted of at least two adjacent geometrically-shaped surfaces 420. The valley shape part 440 is constituted of at least two adjacent geometrically-shaped surfaces 420.

A constitution of the mountain shape part 430 will be exemplified. In a first example, when two adjacent geometrically-shaped surfaces 420 share a side, the mountain shape part 430 is constituted with the sharing side as an apex part. In a second example, when at least two adjacent geometrically-shaped surfaces 420 share a vertex, the mountain shape part 430 is constituted with the sharing vertex as an apex part.

A constitution of the valley shape part 440 will be exemplified. In a first example, when two adjacent geometrically-shaped surfaces 420 share a side, the valley shape part 440 is constituted with the sharing side as a bottom part. In a second example, when at least two adjacent geometrically-shaped surfaces 420 share a vertex, the valley shape part 440 is constituted with the sharing vertex as an apex part.

In the illustrated example, the surface projection part 410 includes a plurality of geometrically-shaped surfaces 420. The disposition form of the plurality of geometrically-shaped surfaces 420 is the 111th disposition form. The surface projection part 410 includes one 111th group.

For example, the plurality of geometrically-shaped surfaces 420 constituting the 111th group is classified into first type geometrically-shaped surfaces 421 and second type geometrically-shaped surfaces 422. The plurality of geometrically-shaped surfaces 420 includes a plurality of first type geometrically-shaped surfaces 421 and a plurality of second type geometrically-shaped surfaces 422.

The first type geometrically-shaped surfaces 421 are surfaces mainly constituting the surface projection part 410. The second type geometrically-shaped surfaces 422 are surface constituting the surface projection part 410 accompanying the first type geometrically-shaped surfaces 421. In FIGS. 13, 14, 18, and 19, dots are applied to the second type geometrically-shaped surfaces 422.

The shape of the first type geometrically-shaped surfaces 421 are polygonal shapes. In the illustrated example, the shapes of the first type geometrically-shaped surfaces 421 are isosceles triangle shapes. All of the plurality of first type geometrically-shaped surfaces 421 are congruent. The shape of the second type geometrically-shaped surfaces 422 differ from the shapes of the first type geometrically-shaped surfaces 421. In the illustrated example, for example, the shapes of the second type geometrically-shaped surfaces are triangular shapes, figures in which one of sides of a triangular shape is replaced with an arc, and figures constituted of arcs and chords.

Some of the plurality of second type geometrically-shaped surfaces 422 are provided in the first end part 411 of the surface projection part 410. The remaining portions of the plurality of second type geometrically-shaped surfaces 422 are provided in the second end part 412 of the surface projection part 410.

The outer surface PF of the primary handle constitution part P10 includes a foundation surface P10F and the geometrically-shaped surfaces 420. The foundation surface P10F is a surface in the vicinity of the geometrically-shaped surfaces 420. The foundation surface P10F is a curved surface. The geometrically-shaped surfaces 420 are flat surfaces.

For example, the geometrically-shaped surfaces 420 intersect at least one of the first reference surface, the second reference surface, and the third reference surface.

At least one geometrically-shaped surface 420 included in the surface projection part 410 faces the inside of the secondary molded part Q in the first axial direction.

At least one geometrically-shaped surface 420 included in the surface projection part 410 faces the inside of the secondary molded part Q in the second axial direction.

At least one geometrically-shaped surface 420 included in the surface projection part 410 faces the inside of the secondary molded part Q in the first circumferential direction.

At least one geometrically-shaped surface 420 included in the surface projection part 410 faces the inside of the secondary molded part Q in the second circumferential direction.

The disposition form related to the plurality of geometrically-shaped surfaces 420 is the 111th disposition form. The reference line is a helix. A relationship between two adjacent geometrically-shaped surfaces 420 is classified into a first relationship, a second relationship, and a third relationship.

In the first relationship, two adjacent geometrically-shaped surfaces 420 share an equal side of the isosceles triangle shape. In the second relationship, two adjacent geometrically-shaped surfaces 420 share a vertex of the isosceles triangle shape. In the third relationship, two adjacent geometrically-shaped surfaces 420 share a base of the isosceles triangle shape.

The surface projection part 410 includes a plurality of mountain shape parts 430. Each mountain shape part 430 is constituted of two geometrically-shaped surfaces 420 having the first relationship or two geometrically-shaped surfaces 420 having the second relationship. An apex part of the mountain shape part 430 is constituted of the equal side shared by two geometrically-shaped surfaces 420 or the vertex shared by two geometrically-shaped surfaces 420.

The surface projection part 410 includes a plurality of valley shape parts 440. Each valley shape part 440 is constituted of two geometrically-shaped surfaces 420 having the third relationship. A bottom part of the valley shape part 440 is constituted of the base shared by two geometrically-shaped surfaces 420.

The surface projection part 410 includes an outer circumferential part 450. The outer circumferential part 450 constitutes a boundary between the surface projection part 410 and the foundation surface P10F of the primary handle constitution part P10.

For example, the outer circumferential part 450 includes a first outer circumferential part 451, a second outer circumferential part 452, a third outer circumferential part 453, and a fourth outer circumferential part 454.

The shape of the first outer circumferential part 451 is a helix. The first outer circumferential part 451 includes a first tip 451A and a second tip 451B.

The shape of the second outer circumferential part 452 is a helix. The second outer circumferential part 452 includes a first tip 452A and a second tip 452B.

The third outer circumferential part 453 is positioned between the first tip 451A of the first outer circumferential part 451 and the first tip 452A of the second outer circumferential part 452. The shape of the third outer circumferential part 453 is a straight line. The linear third outer circumferential part 453 is constituted of the plurality of second type geometrically-shaped surfaces 422 provided in the first end part 411 of the surface projection part 410.

The third outer circumferential part 453 includes a first tip 453A and a second tip 453B. The first tip 453A is connected to the first tip 451A of the first outer circumferential part 451. The second tip 453B is connected to the first tip 452A of the second outer circumferential part 452.

The fourth outer circumferential part 454 is positioned between the second tip 451B of the first outer circumferential part 451 and the second tip 452B of the second outer circumferential part 452. The shape of the fourth outer circumferential part 454 is a straight line. The linear fourth outer circumferential part 454 is constituted of the plurality of second type geometrically-shaped surfaces 422 provided in the second end part 412 of the surface projection part 410.

The fourth outer circumferential part 454 includes a first tip 454A and a second tip 454B. The first tip 454A is connected to the second tip 451B of the first outer circumferential part 451. The second tip 454B is connected to the second tip 452B of the second outer circumferential part 452.

A connection part between the first tip 451A of the first outer circumferential part 451 and the first tip 453A of the third outer circumferential part 453 corresponds to the first tip 411A of the first end part 411 of the surface projection part 410.

A connection part between the second tip 451B of the second outer circumferential part 452 and the second tip 454B of the fourth outer circumferential part 454 corresponds to the second tip 412A of the second end part 412 of the surface projection part 410.

FIGS. 1 to 4 will be referred to. The secondary molded part Q includes the covering part Q40. A constitution of the covering part Q40 can be arbitrarily selected. The constitution of the covering part Q40 is not limited to the exemplified constitution. The covering part Q40 is constituted such that the outer surface PF of the covering target part PC of the primary molded part P is covered. The covering part Q40 is joined to the outer surface PF of the covering target part PC.

The outer surface QF of the covering part Q40 and the outer surface PF of the covering target part PC positioned in the vicinity of the covering part Q40 constitute a portion of the outer surface 20F of the molded article 20. In an example, the covering part Q40 is constituted such that the outer surface PF of the primary molded part P positioned in the vicinity of the covering part Q40 and the outer surface QF of the covering part Q40 are connected to each other. A portion of the outer surface 20F of the molded article 20 constituted of the outer surface QF of the covering part Q40 and the outer surface PF of the primary molded part P positioned in the vicinity of the covering part Q40 is a smooth surface.

The covering part Q40 is constituted such that it extends in the axial direction. The covering part Q40 includes a first end part Q40A, a second end part Q40B, and an intermediate part Q40C in the axial direction.

The first end part Q40A is positioned in the first axial direction with respect to the center of the covering part Q40 in the axial direction. The first end part Q40A covers the outer surface PF of the primary handle constitution part P10. The first end part Q40A is joined to the outer surface PF of the primary handle constitution part P10.

The second end part Q40B is positioned in the second axial direction with respect to the center of the covering part Q40 in the axial direction. The second end part Q40B covers the outer surface PF of the primary handle constitution part P10. The second end part Q40B is joined to the outer surface PF of the primary handle constitution part P10.

The intermediate part Q40C covers the outer surface PF of the primary handle constitution part P10. The intermediate part Q40C is joined to the outer surface PF of the primary handle constitution part P10. The intermediate part Q40C is provided between the first end part Q40A and the second end part Q40B in the axial direction.

The covering part Q40 is constituted such that it extends in the circumferential direction of the molded article 20. The covering part Q40 is constituted such that it makes one round around the center axis of the molded article 20.

In the illustrated example, the covering part Q40 is included in the secondary handle constitution part Q10. The covering part Q40 is constituted as the secondary handle constitution part Q10.

The first end part Q40A of the covering part Q40 corresponds to the first end part Q10A of the secondary handle constitution part Q10. The second end part Q40B of the covering part Q40 corresponds to the second end part Q10B of the secondary handle constitution part Q10. The intermediate part Q40C of the covering part Q40 corresponds to an intermediate part of the secondary handle constitution part Q10 positioned between the first end part Q10A and the second end part Q10B.

In an example, the covering part Q40 includes a decoration exterior part Q50. A constitution of the decoration exterior part Q50 can be arbitrarily selected. The constitution of the decoration exterior part Q50 is not limited to the exemplified constitution. The decoration exterior part Q50 is constituted such that the decoration part 400 is covered.

Examples of a part provided with the decoration exterior part Q50 include an example A and an example B.

In the example A, the decoration part 400 is provided in at least the primary molded part P of the molded article 20. The decoration exterior part Q50 is provided on at least the outer surface PF of the primary molded part P. For example, the example A may adopt at least one form of an example A1 and an example A2.

In the example A1, the decoration part 400 is provided in at least the primary main body constitution part PA of the primary molded part P. The decoration exterior part Q50 is provided on at least the outer surface PF of the primary main body constitution part PA. For example, the example A1 may adopt at least one form of examples A11 to A13.

In the example A2, the decoration part 400 is provided in at least the protrusion part 220 of the primary molded part P. The decoration exterior part Q50 is provided on at least the outer surface PF of the protrusion part 220.

In the example A11, the decoration part 400 is provided in at least the primary handle constitution part P10 of the primary main body constitution part PA. The decoration exterior part Q50 is provided on at least the outer surface PF of the primary handle constitution part P10. For example, the example A11 may adopt at least one form of examples A111 to A119.

In the example A12, the decoration part 400 is provided in at least the neck 120 of the primary main body constitution part PA. The decoration exterior part Q50 is provided on at least the outer surface PF of the neck 120.

In the example A13, the decoration part 400 is provided in at least the head 130 of the primary main body constitution part PA. The decoration exterior part Q50 is provided on at least the outer surface PF of the head 130.

In the example A111, the decoration part 400 is provided in at least the first end part P10A of the primary handle constitution part P10. The decoration exterior part Q50 is provided on at least the outer surface PF of the first end part P10A.

In the example A112, the decoration part 400 is provided in at least the second end part P10B of the primary handle constitution part P10. The decoration exterior part Q50 is provided on at least the outer surface PF of the second end part P10B.

In the example A113, the decoration part 400 is provided in at least the first side part P10C of the primary handle constitution part P10. The decoration exterior part Q50 is provided on at least the outer surface PF of the first side part P10C.

In the example A114, the decoration part 400 is provided in at least the second side part P10D of the primary handle constitution part P10. The decoration exterior part Q50 is provided on at least the outer surface PF of the second side part P10D.

In the example A115, the decoration part 400 is provided in at least the stepped part P11 of the primary handle constitution part P10. The decoration exterior part Q50 is provided on at least the outer surface PF of the stepped part P11.

In the example A116, the decoration part 400 is provided in at least the protrusion parts P13 of the primary handle constitution part P10. The decoration exterior part Q50 is provided on at least the outer surface PF of the protrusion parts P13.

In the example A117, the decoration part 400 is provided in at least the constricted part P20 of the primary handle constitution part P10. The decoration exterior part Q50 is provided on at least the outer surface PF of the constricted part P20.

In the example A118, the decoration part 400 is provided in at least the tapered part P30 of the primary handle constitution part P10. The decoration exterior part Q50 is provided on at least the outer surface PF of the tapered part P30.

In the example A119, the decoration part 400 is provided in at least the main body protrusion part P40 of the primary handle constitution part P10. The decoration exterior part Q50 is provided on at least the outer surface PF of the main body protrusion part P40.

In the example B, the decoration part 400 is provided in at least the secondary molded part Q of the molded article 20. The decoration exterior part Q50 is provided on at least the outer surface QF of the secondary molded part Q. For example, the example B may adopt a form of an example B1.

In the example B1, the decoration part 400 is provided in at least the secondary main body constitution part QA of the secondary molded part Q. The decoration exterior part Q50 is provided on at least the outer surface QF of the secondary main body constitution part QA. For example, the example B1 may adopt a form of an example B11.

In the example B11, the decoration part 400 is provided in at least the secondary handle constitution part Q10 of the secondary main body constitution part QA. The decoration exterior part Q50 is provided on at least the outer surface QF of the secondary handle constitution part Q10. For example, the example B11 may adopt at least one form of examples B111 to B118.

In the example B111, the decoration part 400 is provided in at least the first end part Q10A of the secondary handle constitution part Q10. The decoration exterior part Q50 is provided on at least the outer surface QF of the first end part Q10A.

In the example B112, the decoration part 400 is provided in at least the second end part Q10B of the secondary handle constitution part Q10. The decoration exterior part Q50 is provided on at least the outer surface QF of the second end part Q10B.

In the example B113, the decoration part 400 is provided in at least the first side part Q10C of the secondary handle constitution part Q10. The decoration exterior part Q50 is provided on at least the outer surface QF of the first side part Q10C.

In the example B114, the decoration part 400 is provided in at least the second side part Q10D of the secondary handle constitution part Q10. The decoration exterior part Q50 is provided on at least the outer surface QF of the second side part Q10D.

In the example B115, the decoration part 400 is provided in at least the first constitution part Q11 of the secondary handle constitution part Q10. The decoration exterior part Q50 is provided on at least the outer surface QF of the first constitution part Q11.

In the example B116, the decoration part 400 is provided in at least the second constitution part Q12 of the secondary handle constitution part Q10. The decoration exterior part Q50 is provided on at least the outer surface QF of the second constitution part Q12.

In the example B117, the decoration part 400 is provided in at least the constricted part Q20 of the secondary handle constitution part Q10. The decoration exterior part Q50 is provided on at least the outer surface QF of the constricted part Q20.

In the example B118, the decoration part 400 is provided in at least the tapered part Q30 of the secondary handle constitution part Q10. The decoration exterior part Q50 is provided on at least the outer surface QF of the tapered part Q30.

In the illustrated example, the decoration exterior part Q50 is included in the secondary main body constitution part QA. The decoration exterior part Q50 is included in the secondary handle constitution part Q10. The decoration exterior part Q50 is constituted such that the surface projection part 410 provided in the primary handle constitution part P10 is covered. In an example, the outer surface QF of the decoration exterior part Q50 is smoother than the outer surface PF of the surface projection part 410.

Figure 20:
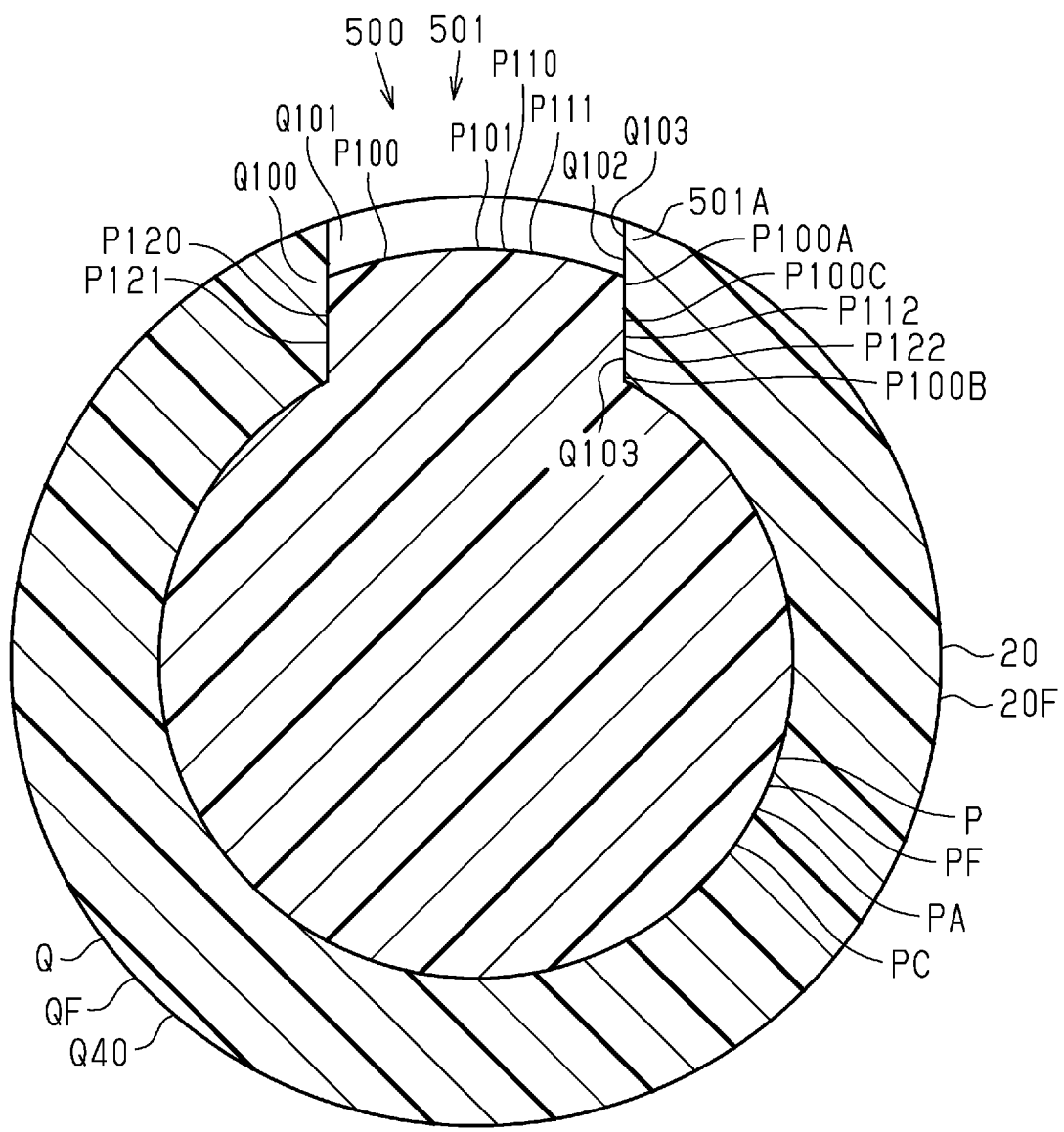
FIG. 20 is a cross-sectional view (1) of the molded article parallel to a third reference surface.
Figure 21:
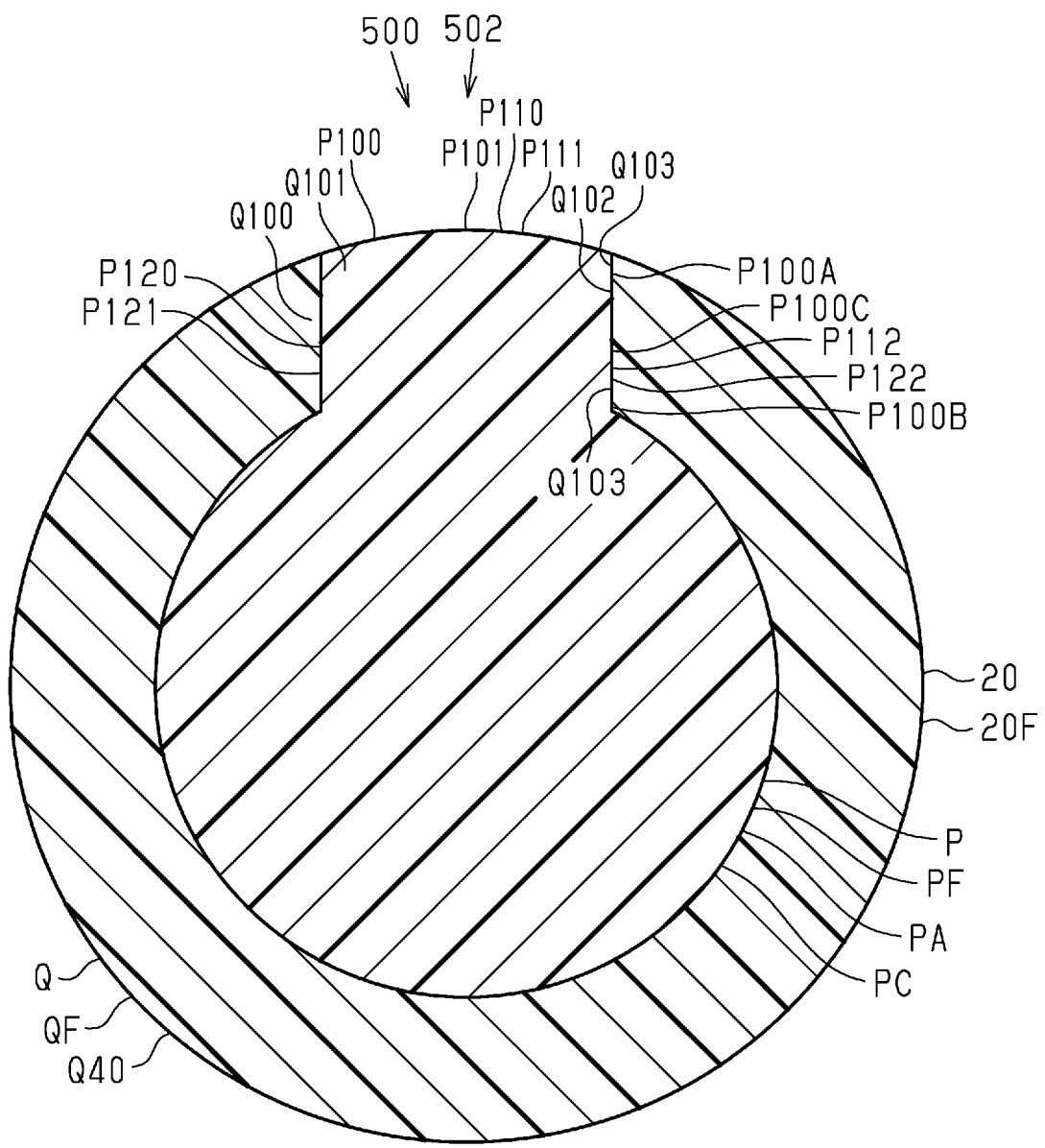
FIG. 21 is a cross-sectional view (2) of the molded article parallel to the third reference surface.
Figure 22:
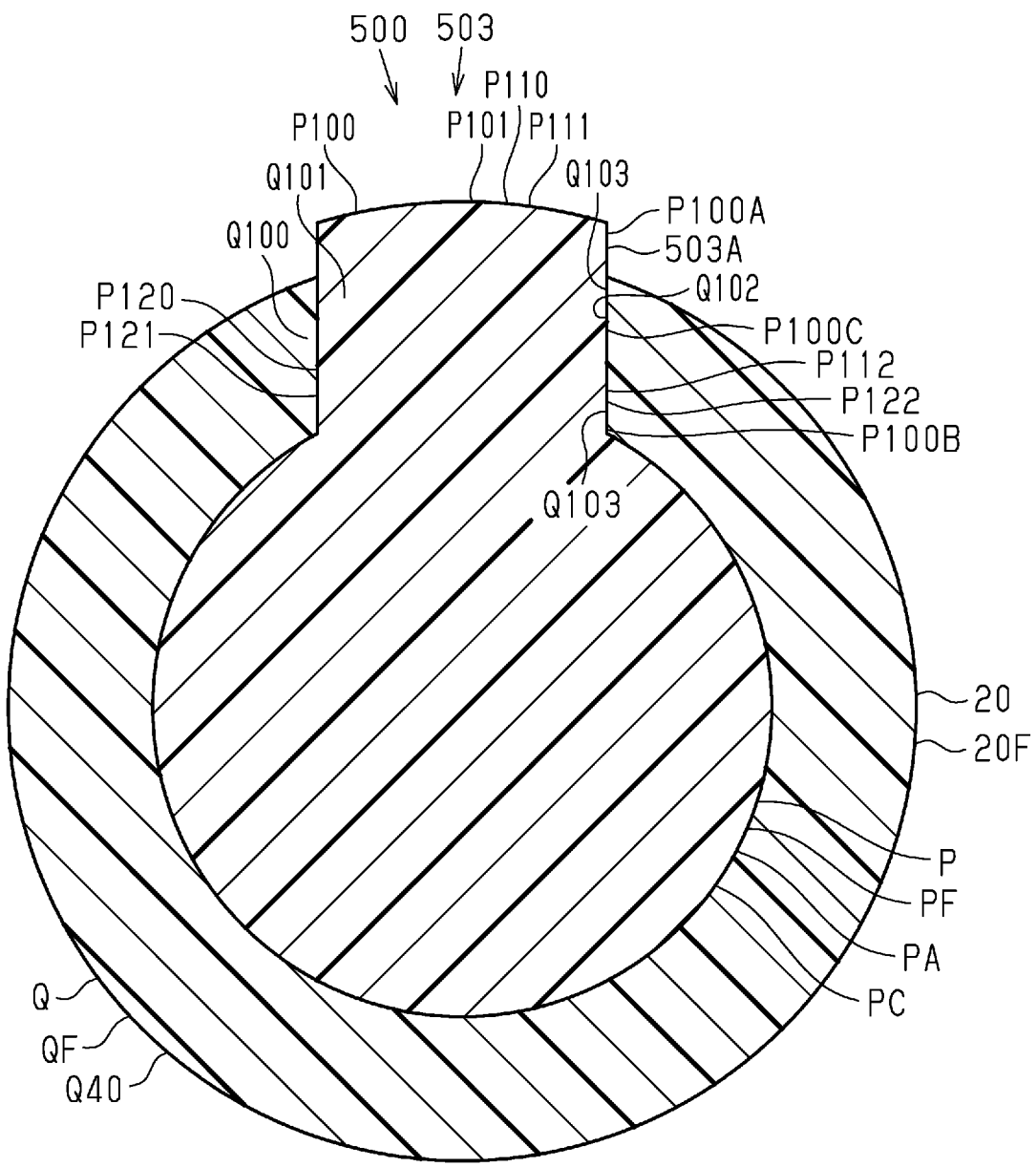
FIG. 22 is a cross-sectional view (3) of the molded article parallel to the third reference surface.

FIGS. 20 to 22 will be referred to. The molded article 20 includes an exposed structure 500. The exposed structure 500 is constituted such that a part exposed with respect to the covering part Q40 of the secondary molded part Q is included in the primary molded part P. A constitution of the exposed structure 500 can be arbitrarily selected. The constitution of the exposed structure 500 is not limited to the exemplified constitution.

The exposed structure 500 includes one or a plurality of penetration parts P100. A constitution of the penetration part P100 can be arbitrarily selected. The constitution of the penetration part P100 is not limited to the exemplified constitution. The penetration parts P100 are provided in the primary molded part P. The penetration parts P100 are constituted such that a force applied to the primary molded part P in a secondary molding step of molding the secondary molded part Q can be transferred to the mold.

The penetration parts P100 are constituted to protrude with respect to the outer surface PF of the covering target part PC of the primary molded part P. In an example, the penetration parts P100 are constituted to protrude in a direction including a component of the outward radial direction. The penetration part P100 includes an outer surface P110. The outer surface P110 includes a top surface P111 and a side surface P112.

The exposed structure 500 includes one or a plurality of penetration disposition parts Q100. A constitution of the penetration disposition part Q100 can be arbitrarily selected. The constitution of the penetration disposition part Q100 is not limited to the exemplified constitution. The penetration disposition parts Q100 are provided in the secondary molded part Q. The penetration disposition parts Q100 are constituted such that the penetration parts P100 can be disposed therein.

The penetration disposition part Q100 includes a penetration space Q101, an inner circumferential surface Q102, and two opening parts Q103. The penetration space Q101 is constituted such that the penetration part P100 can be disposed therein. The inner circumferential surface Q102 defines the penetration space Q101. One opening part Q103 opens on the outer surface QF of the secondary molded part Q. The other opening part Q103 opens on an inner circumferential surface of the secondary molded part Q facing the outer surface PF of the primary molded part P.

The shape of the top surface P111 of the penetration part P100 will be exemplified. In a first example, at least a portion of the top surface P111 is a curved surface. The center on the curved surface is set in the inward radial direction or the outward radial direction with respect to the top surface P111. Examples of details of the first example include an eleventh example and a twelfth example. In the eleventh example, the entire top surface P111 is a curved surface. In the twelfth example, a portion of the top surface P111 is a curved surface. The remaining portion of the top surface P111 is a surface other than the curved surface.

In a second example, at least a portion of the top surface P111 is a flat surface.

Examples of details of the second example include a twenty-first example and a twenty-second example. In the twenty-first example, the entire top surface P111 is a flat surface. In the twenty-second example, a portion of the top surface P111 is a flat surface. The remaining portion of the top surface P111 is a surface other than a flat surface.

The penetration part P100 includes an exposed surface P101. The exposed surface P101 is constituted such that it is exposed with respect to the covering part Q40 of the secondary molded part Q. The exposed surface P101 is constituted such that it comes into contact with the mold in the secondary molding step. The exposed surface P101 constitutes a portion of the outer surface 20F of the molded article 20. The exposed surface P101 is included on the outer surface P110 of the penetration part P100.

In an example, the penetration parts P100 are provided in the primary molded part P such that a force received by the primary molded part P from a resin material corresponding to the secondary molded part Q so as to deform the primary molded part P in the secondary molding step of molding the secondary molded part Q can be transferred to the mold through the exposed surface P101.

The penetration part P100 is divided into a first end part P100A, a second end part P100B, and an intermediate part P100C, for example, in a height direction of the penetration part P100. The first end part P100A corresponds to a tip part of the penetration part P100. The second end part P100B corresponds to a base part of the penetration part P100. The intermediate part P100C is positioned between the first end part P100A and the second end part P100B. The top surface P111 is formed at a tip of the first end part P100A.

Examples of a structure defining the relationship between the exposed surface P101 of the penetration part P100 and the outer surface QF of the secondary molded part Q include a cave-in structure 501, a smooth structure 502, and a protrusion structure 503. Constitutions of the cave-in structure 501, the smooth structure 502, and the protrusion structure 503 can be arbitrarily selected. The constitutions of the cave-in structure 501, the smooth structure 502, and the protrusion structure 503 are not limited to the exemplified constitution.

FIG. 20 will be referred to. In the cave-in structure 501, the penetration part P100 is constituted such that it is caved in with respect to the outer surface QF of the covering part Q40 and a stepped part 501A is formed between the penetration part P100 and the outer surface QF.

A constitution of the cave-in structure 501 will be exemplified. In a first example, the entire top surface P111 of the penetration part P100 is exposed with respect to the covering part Q40. The side surface P112 of the penetration part P100 is covered by the covering part Q40.

The exposed surface P101 is constituted of the entire top surface P111.

In a second example, a portion of the top surface P111 of the penetration part P100 is exposed with respect to the covering part Q40. The remaining portion of the top surface P111 is covered by the covering part Q40. For example, a portion of the top surface P111 is a part positioned on an inward side with respect to a circumferential edge of the top surface P111. For example, the remaining portion of the top surface P111 is the circumferential edge of the top surface P111. The side surface P112 of the penetration part P100 is covered by the covering part Q40. The exposed surface P101 is constituted of a portion of the top surface P111.

FIG. 21 will be referred to. In the smooth structure 502, the penetration part P100 is constituted such that the exposed surface P101 constituted of the top surface P111 of the penetration part P100 and the outer surface QF of the secondary molded part Q positioned in the vicinity of the exposed surface P101 are smoothly connected to each other. A portion of the outer surface 20F of the molded article 20 constituted of the exposed surface P101 and the outer surface QF of the secondary molded part Q positioned in the vicinity of the exposed surface P101 is a smooth surface.

A constitution of the smooth structure 502 will be exemplified. In a first example, the entire top surface P111 of the penetration part P100 is exposed with respect to the covering part Q40. The side surface P112 of the penetration part P100 is covered by the covering part Q40. The exposed surface P101 is constituted of the entire top surface P111.

In a second example, a portion of the top surface P111 of the penetration part P100 is exposed with respect to the covering part Q40. The remaining portion of the top surface P111 is covered by the covering part Q40. For example, a portion of the top surface P111 is a part positioned on an inward side with respect to a circumferential edge of the top surface P111. For example, the remaining portion of the top surface P111 is the circumferential edge of the top surface P111. The side surface P112 of the penetration part P100 is covered by the covering part Q40. The exposed surface P101 is constituted of a portion of the top surface P111.

FIG. 22 will be referred to. In the protrusion structure 503, the penetration part P100 is constituted to protrude with respect to the outer surface QF of the covering part Q40 and a step is formed between the penetration part P100 and the outer surface QF. The penetration part P100 includes a penetration part protrusion part 503A protruding with respect to the outer surface QF.

A constitution of the protrusion structure 503 will be exemplified. In a first example, the penetration part protrusion part 503A includes a portion or the entirety of the first end part P100A of the penetration part P100. The outer surface P110 of the penetration part protrusion part 503A includes the top surface P111 and the side surface P112. The side surface P112 of the penetration part protrusion part 503A includes a portion or the entirety of the side surface P112 of the first end part P100A.

The entire top surface P111 of the penetration part protrusion part 503A is exposed with respect to the covering part Q40. The side surface P112 of the penetration part protrusion part 503A is exposed with respect to the covering part Q40. Other side surface P112 are covered by the covering part Q40. The exposed surface P101 is constituted of the top surface P111 of the penetration part protrusion part 503A and the side surface P112.

In a second example, the penetration part protrusion part 503A includes the entire first end part P100A of the penetration part P100 and a portion or the entirety of the intermediate part P100C. The outer surface P110 of the penetration part protrusion part 503A includes the top surface P111 and the side surface P112. The side surface P112 of the penetration part protrusion part 503A includes the entire side surface P112 of the first end part P100A and a portion or the entirety of the side surface P112 of the intermediate part P100C.

The entire top surface P111 of the penetration part protrusion part 503A is exposed with respect to the covering part Q40. The side surface P112 of the penetration part protrusion part 503A is exposed with respect to the covering part Q40. Other side surfaces P112 are covered by the covering part Q40. The exposed surface P101 is constituted of the top surface P111 of the penetration part protrusion part 503A and the side surface P112.

In a third example, the penetration part protrusion part 503A includes the entire first end part P100A of the penetration part P100, the entire intermediate part P100C, and a portion or the entirety of the second end part P100B. The outer surface P110 of the penetration part protrusion part 503A includes the top surface P111 and the side surface P112. The side surface P112 of the penetration part protrusion part 503A includes the entire side surface P112 of the first end part P100A, the entire side surface P112 of the intermediate part P100C, and a portion or the entirety of the side surface P112 of the second end part P100B.

The entire top surface P111 of the penetration part protrusion part 503A is exposed with respect to the covering part Q40. The side surface P112 of the penetration part protrusion part 503A is exposed with respect to the covering part Q40. In an example in which the penetration part protrusion part 503A includes a portion of the second end part P100B, the side surface P112 of the second end part P100A not included in the penetration part protrusion part 503A is covered by the covering part Q40. The exposed surface P101 is constituted of the top surface P111 of the penetration part protrusion part 503A and the side surface P112.

The outer surface QF of the secondary molded part Q is divided into a front surface, a rear surface, a first side surface, and a second side surface, for example, in the circumferential direction. The secondary molded part Q includes a gate related part. For example, a position of the gate related part in the circumferential direction is selected from the front surface, the rear surface, the first side surface, and the second side surface of the secondary molded part Q.

The gate related part includes the gate of the secondary molded part Q, a gate mark of the secondary molded part Q. or a gate corresponding part of the secondary molded part Q in which a gate is present in the secondary molding step. In an example, the gate corresponding part is formed when the outer surface QF of the secondary molded part Q in the molded article 20 is processed such that the gate of the secondary molded part Q and the gate mark of the secondary molded part Q do not remain.

For example, a position of the gate related part in the axial direction is selected from the first end part Q10A, the second end part Q10B, the constricted part Q20, and the tapered part Q30. For example, a gate position in the axial direction in the constricted part Q20 is selected from the first end part Q20A, the second end part Q20B, and the intermediate part Q20C.

In the front surface, the rear surface, the first side surface, and the second side surface of the secondary molded part Q, a surface on which the gate related part is formed will be referred to as "a gate corresponding surface of the secondary molded part Q". A surface positioned on a side opposite to the gate corresponding surface of the secondary molded part Q will be referred to as "an opposite surface of the secondary molded part Q".

In the front surface, the rear surface, the first side surface, and the second side surface of the secondary molded part Q, one surface positioned between the gate corresponding surface of the secondary molded part Q and the opposite surface of the secondary molded part Q will be referred to as "a first intermediate surface of the secondary molded part Q". In the front surface, the rear surface, the first side surface, and the second side surface of the secondary molded part Q, the other surface positioned between the gate corresponding surface of the secondary molded part Q and the opposite surface of the secondary molded part Q will be referred to as "a second intermediate surface of the secondary molded part Q".

In an example in which the gate related part is formed on the front surface of the secondary molded part Q, the gate corresponding surface of the secondary molded part Q is the front surface of the secondary molded part Q, and the opposite surface of the secondary molded part Q is the rear surface of the secondary molded part Q. In an example in which the gate related part is formed on the rear surface of the secondary molded part Q, the gate corresponding surface of the secondary molded part Q is the rear surface of the secondary molded part Q, and the opposite surface of the secondary molded part Q is the front surface of the secondary molded part Q.

In an example in which the gate related part is formed on the first side surface of the secondary molded part Q, the gate corresponding surface of the secondary molded part Q is the first side surface of the secondary molded part Q, and the opposite surface of the secondary molded part Q is the second side surface of the secondary molded part Q. In an example in which the gate related part is formed on the second side surface of the secondary molded part Q, the gate corresponding surface of the secondary molded part Q is the second side surface of the secondary molded part Q, and the opposite surface of the secondary molded part Q is the first side surface of the secondary molded part Q.

The outer surface PF of the primary molded part P is divided into the front surface, the rear surface, the first side surface, and the second side surface, for example, in the circumferential direction. In the front surface, the rear surface, the first side surface, and the second side surface of the primary molded part P, a surface corresponding to the gate corresponding surface of the secondary molded part Q will be referred to as "a gate corresponding surface of the primary molded part P". A surface corresponding to the opposite surface of the secondary molded part Q will be referred to as "an opposite surface of the primary molded part P". A surface corresponding to the first intermediate surface of the secondary molded part Q will be referred to as "a first intermediate surface of the primary molded part P". A surface corresponding to the second intermediate surface of the secondary molded part Q will be referred to as "a second intermediate surface of the primary molded part P".

A constitution of the exposed surface P101 of the penetration part P100 will be exemplified. In a first example, the exposed surface P101 includes a part corresponding to at least the opposite surface of the secondary molded part Q. The exposed surface P101 corresponding to the opposite surface of the secondary molded part Q constitutes a portion of the outer surface 20F of the molded article 20 together with the adjacent opposite surface of the secondary molded part Q.

In a second example, the exposed surface P101 includes a part corresponding to at least the opposite surface of the secondary molded part Q. The exposed surface P101 corresponding to the opposite surface of the secondary molded part Q constitutes a portion of the outer surface 20F of the molded article 20 together with the adjacent opposite surface of the secondary molded part Q.

In a third example, the exposed surface P101 includes a part corresponding to at least the first intermediate surface of the secondary molded part Q. The exposed surface P101 corresponding to the first intermediate surface of the secondary molded part Q constitutes a portion of the outer surface 20F of the molded article 20 together with the adjacent first intermediate surface of the secondary molded part Q.

In a fourth example, the exposed surface P101 includes a part corresponding to at least the second intermediate surface of the secondary molded part Q. The exposed surface P101 corresponding to the second intermediate surface of the secondary molded part Q constitutes a portion of the outer surface 20F of the molded article 20 together with the adjacent second intermediate surface of the secondary molded part Q.

In a fifth example, on the premise of the first example, the exposed surface P101 further includes a constitution of at least one of the third example and the fourth example. In a sixth example, on the premise of the fifth example, the exposed surface P101 further includes a constitution of the second example.

FIGS. 20 to 22 will be referred to. In an example, the penetration part P100 includes a circumferential end part P120. The circumferential end part P120 includes a first circumferential end part P121 and a second circumferential end part P122. The first circumferential end part P121 is positioned in the first circumferential direction with respect to the center of the penetration part P100 in the circumferential direction. The second circumferential end part P122 is positioned in the second circumferential direction with respect to the center of the penetration part P100 in the circumferential direction.

The length of the penetration part P100 in the circumferential direction will be referred to as "a circumferential length of the penetration part". In an example, the longest distance between the first circumferential end part P121 and the second circumferential end part P122 in the circumferential direction is selected as the circumferential length of the penetration part.

The center of the penetration part P100 in the circumferential direction will be referred to as "a circumferential center of the penetration part". A position of the circumferential center of the penetration part will be exemplified. In a first example, the circumferential center of the penetration part is positioned on the opposite surface of the primary molded part P. In a second example, the circumferential center of the penetration part is positioned on the gate corresponding surface of the primary molded part P. In a third example, the circumferential center of the penetration part is positioned on the first intermediate surface of the primary molded part P. In a fourth example, the circumferential center of the penetration part is positioned on the second intermediate surface of the primary molded part P.

A position of the first circumferential end part P121 in the circumferential direction will be exemplified. In a first example, the first circumferential end part P121 is positioned on the opposite surface of the primary molded part P. In a second example, the first circumferential end part P121 is positioned on the gate corresponding surface of the primary molded part P. In a third example, the first circumferential end part P121 is positioned on the first intermediate surface of the primary molded part P. In a fourth example, the first circumferential end part P121 is positioned on the second intermediate surface of the primary molded part P.

A position of the second circumferential end part P122 in the circumferential direction will be exemplified. In a first example, the second circumferential end part P122 is positioned on the opposite surface of the primary molded part P. In a second example, the second circumferential end part P122 is positioned on the gate corresponding surface of the primary molded part P. In a third example, the second circumferential end part P122 is positioned on the first intermediate surface of the primary molded part P. In a fourth example, the second circumferential end part P122 is positioned on the second intermediate surface of the primary molded part P.

Figure 23:
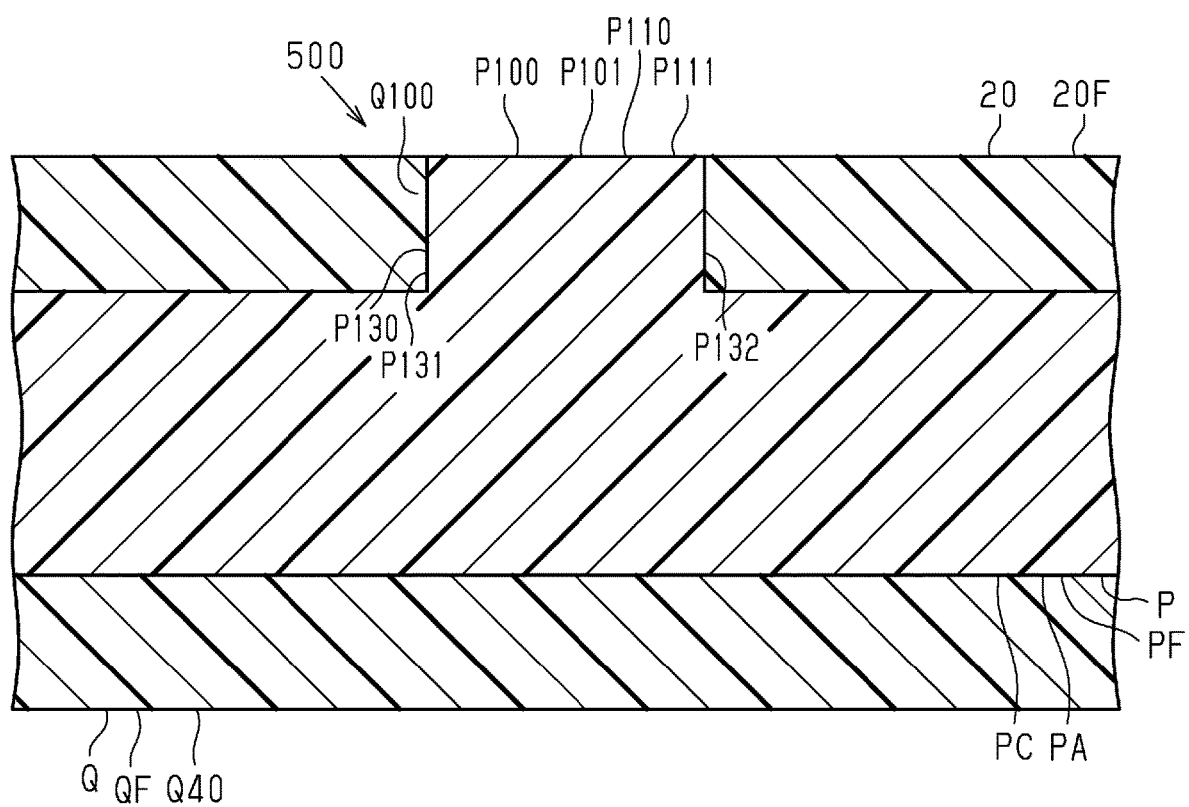
FIG. 23 is a cross-sectional view (1) of the molded article parallel to a second reference surface.
Figure 24:
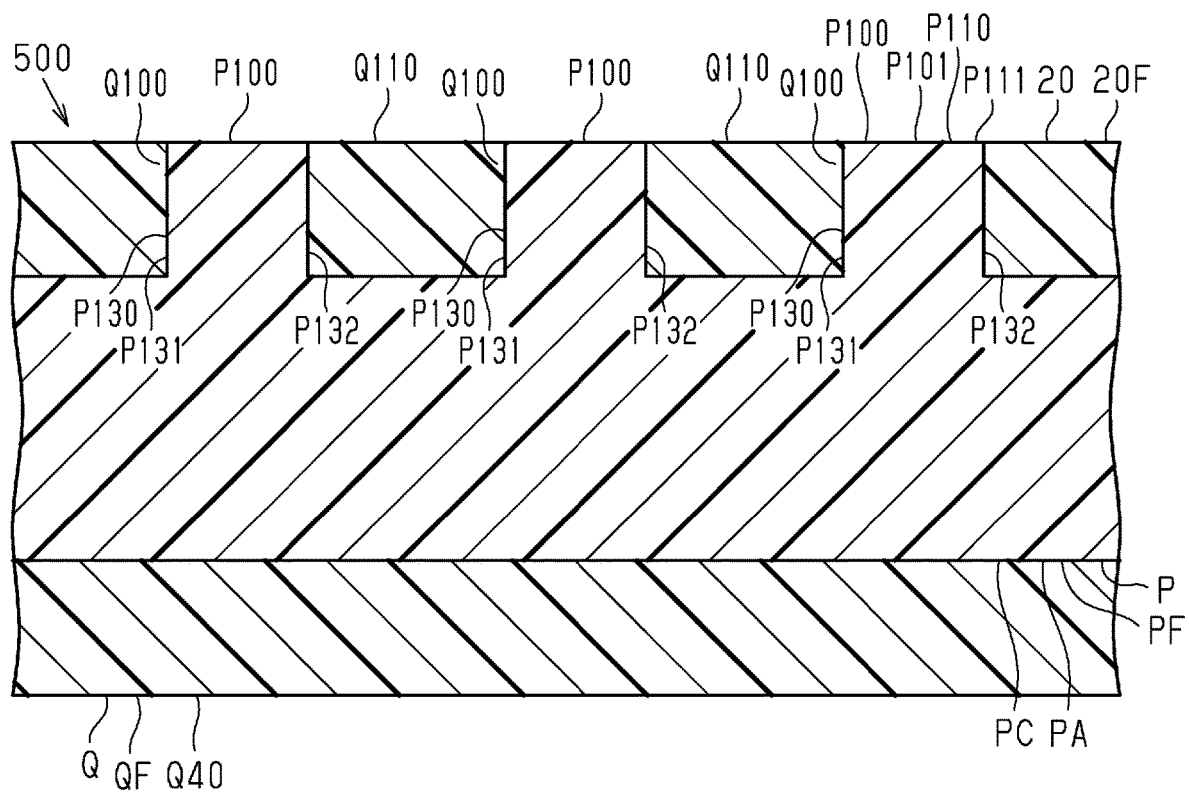
FIG. 24 is a cross-sectional view (2) of the molded article parallel to the second reference surface.
Figure 25:
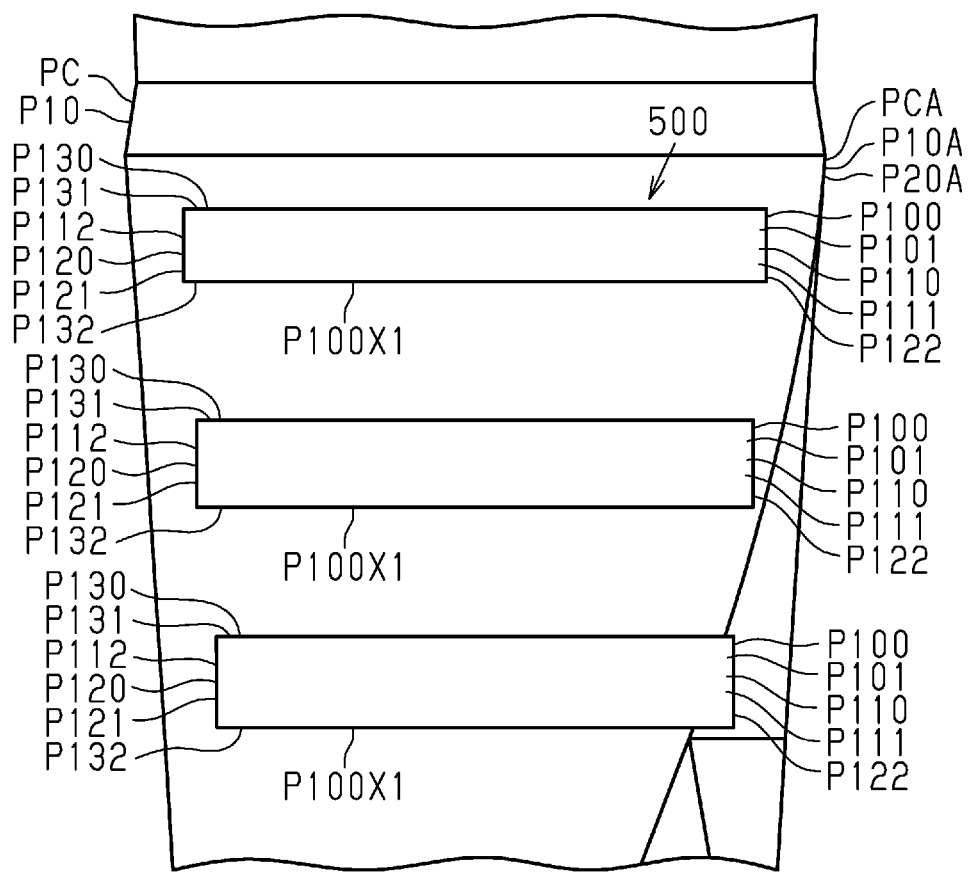
FIG. 25 is a front view of penetration parts of a first group.
Figure 26:
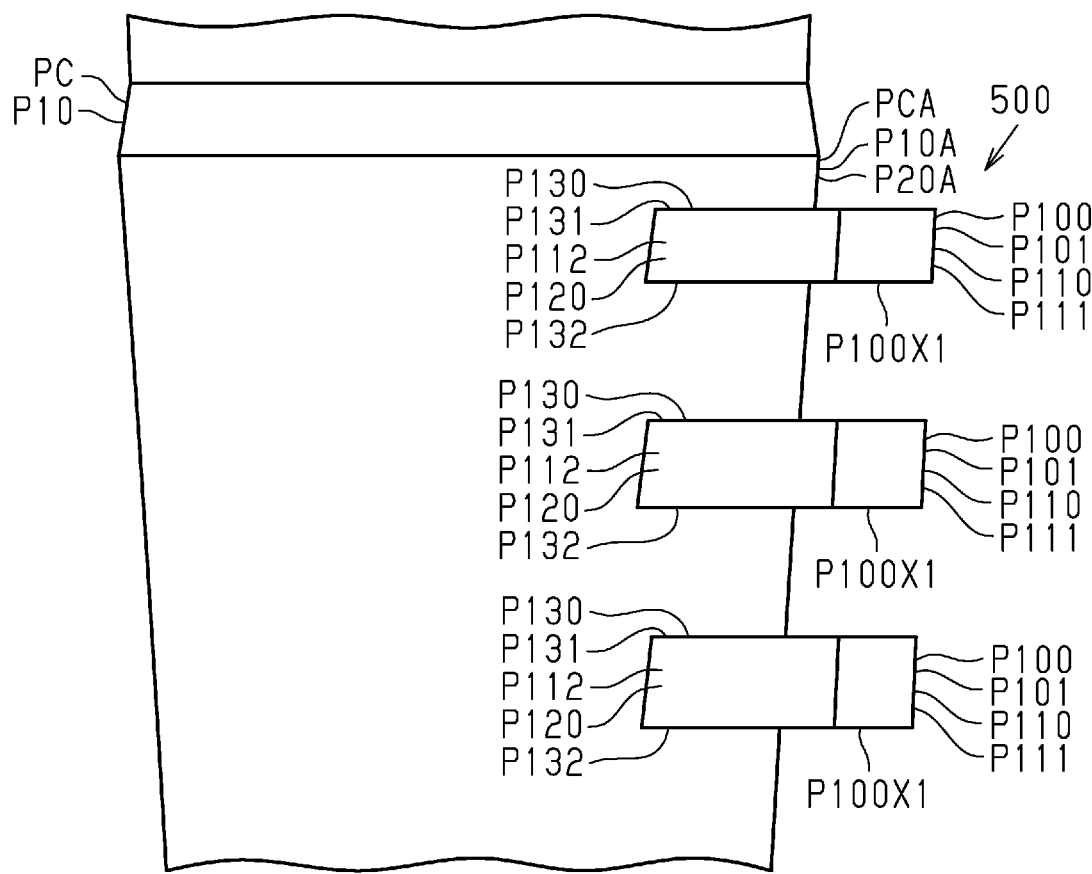
FIG. 26 is a side view of the penetration parts of the first group.
Figure 27:
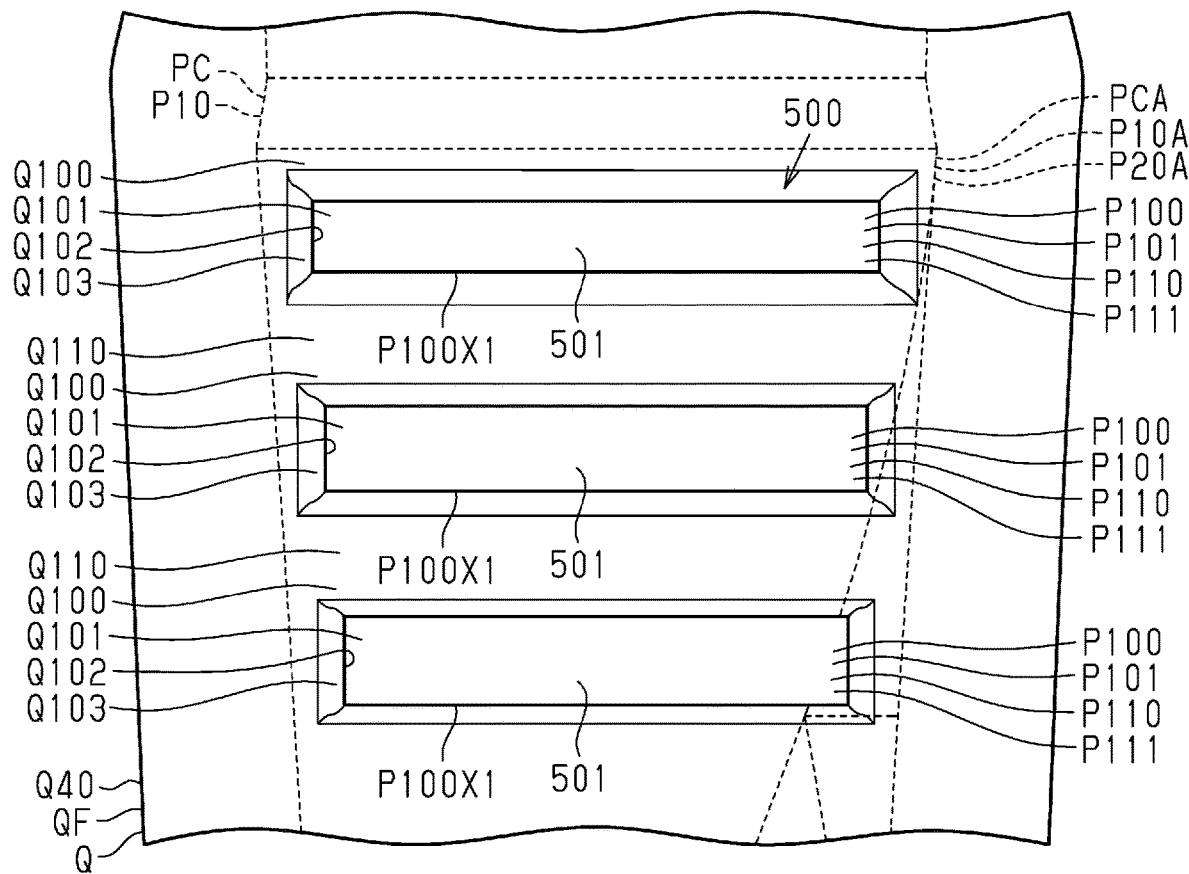
FIG. 27 is a front view of the penetration parts of the first group and a corresponding covering part.
Figure 28:
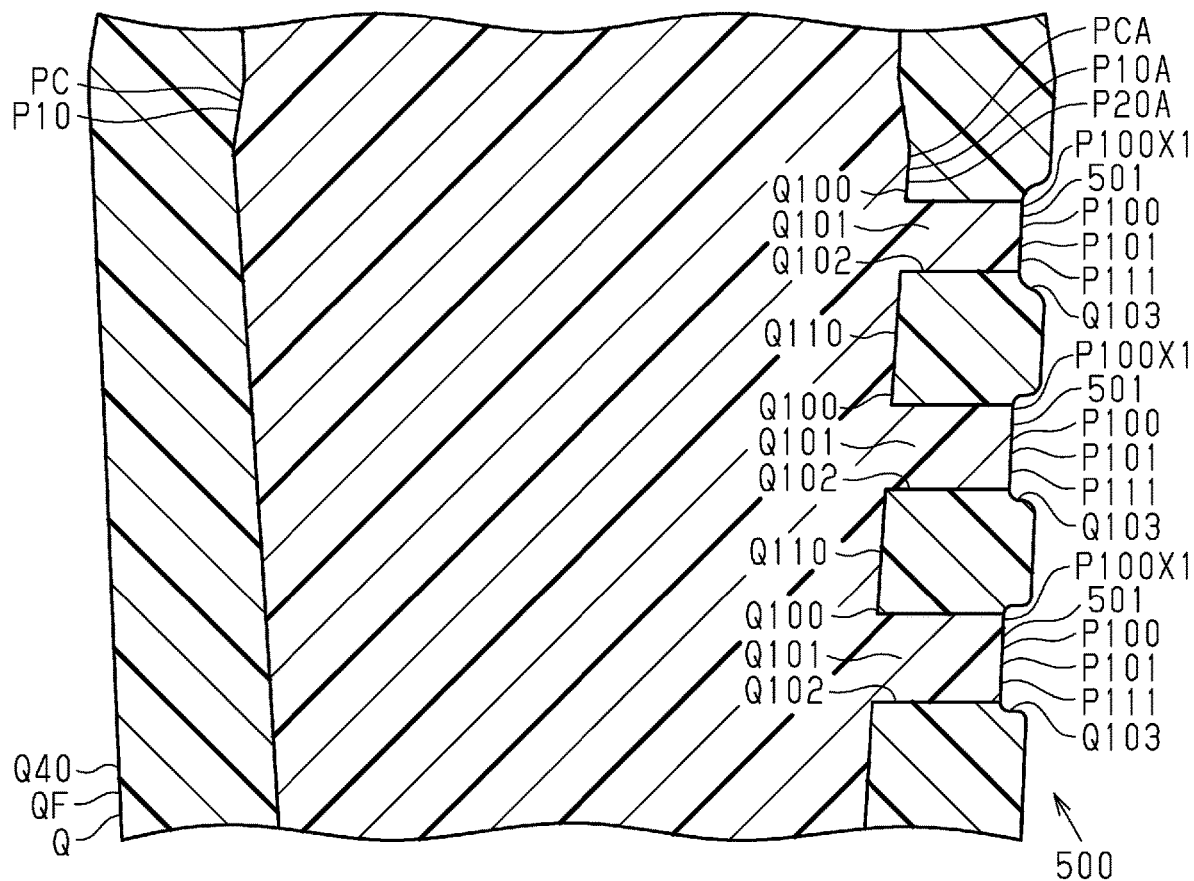
FIG. 28 is a side view of the penetration parts of the first group and the corresponding covering part.
Figure 29:
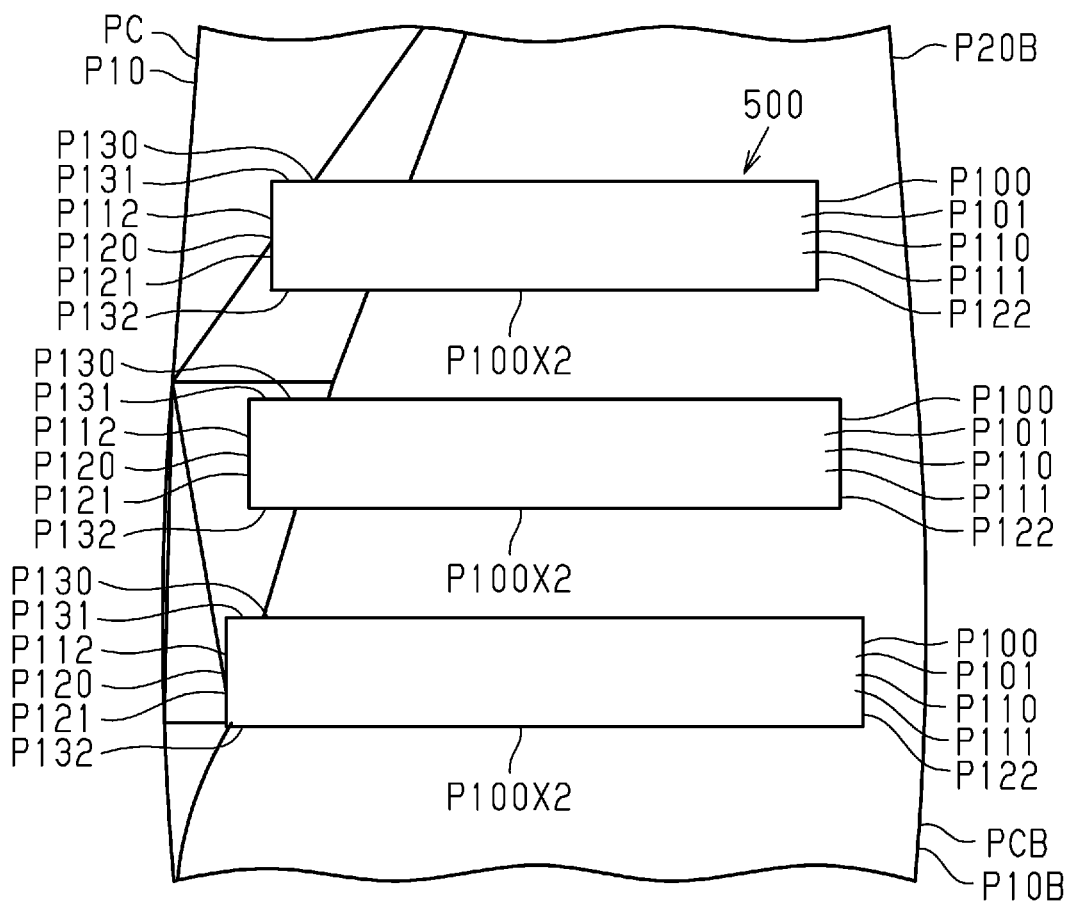
FIG. 29 is a front view of penetration parts of a second group.
Figure 30:
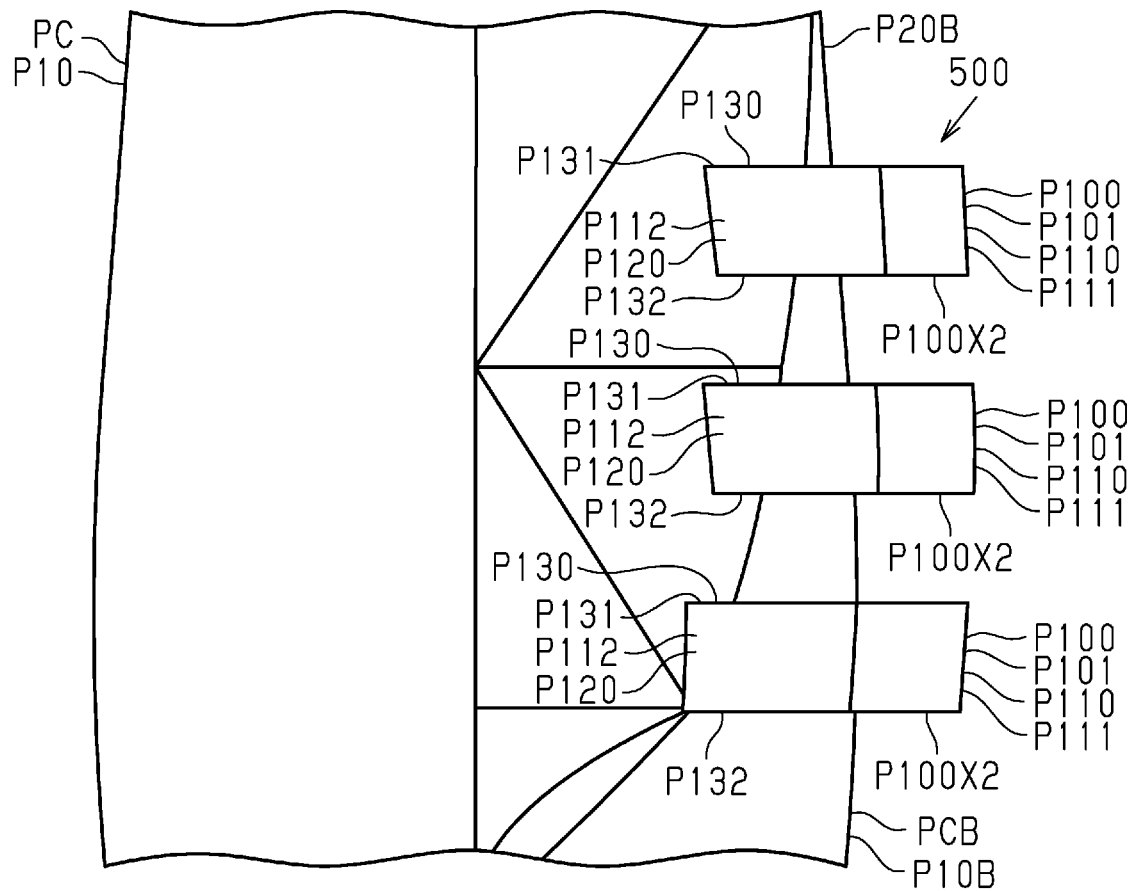
FIG. 30 is a side view of the penetration parts of the second group.
Figure 31:
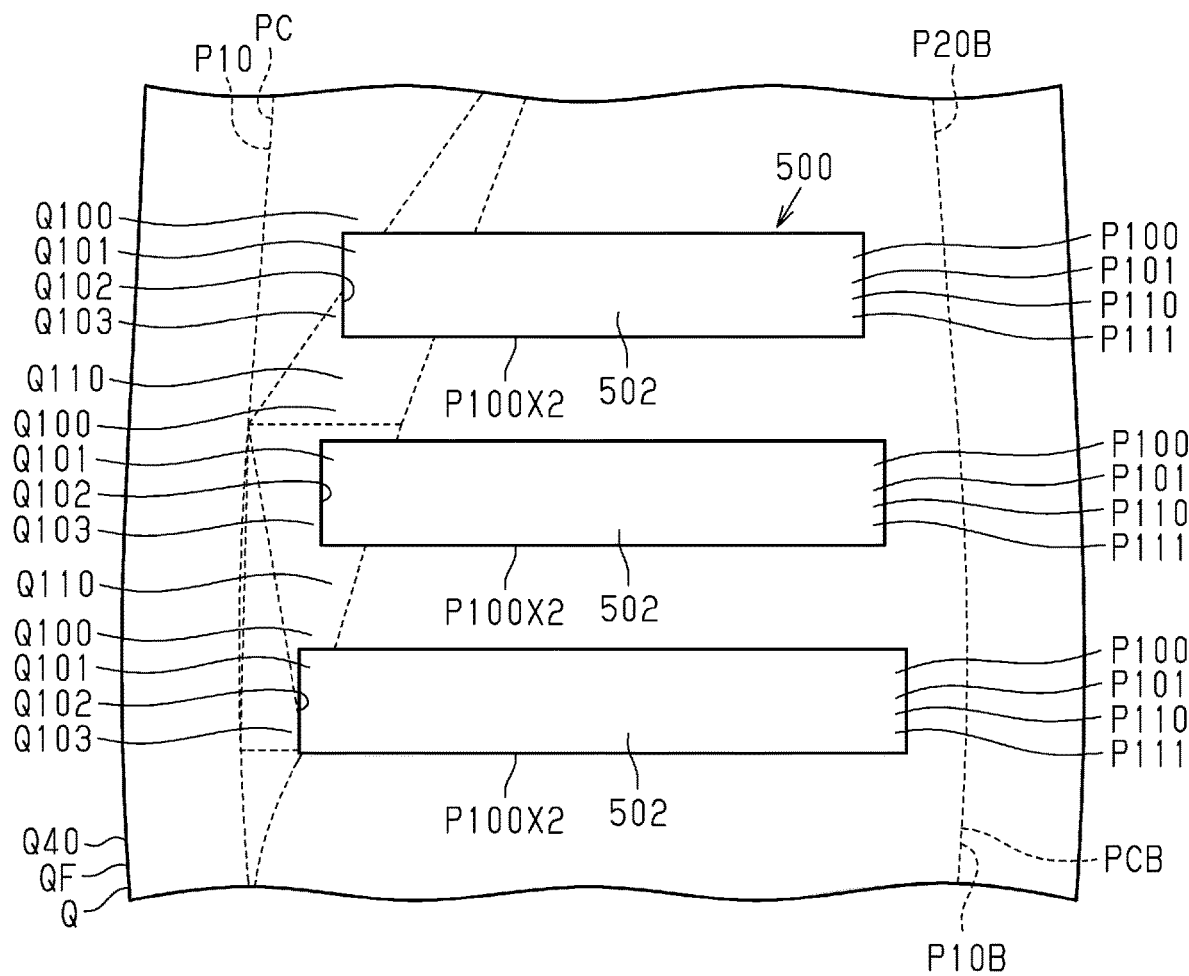
FIG. 31 is a front view of the penetration parts of the second group and a corresponding covering part.
Figure 32:
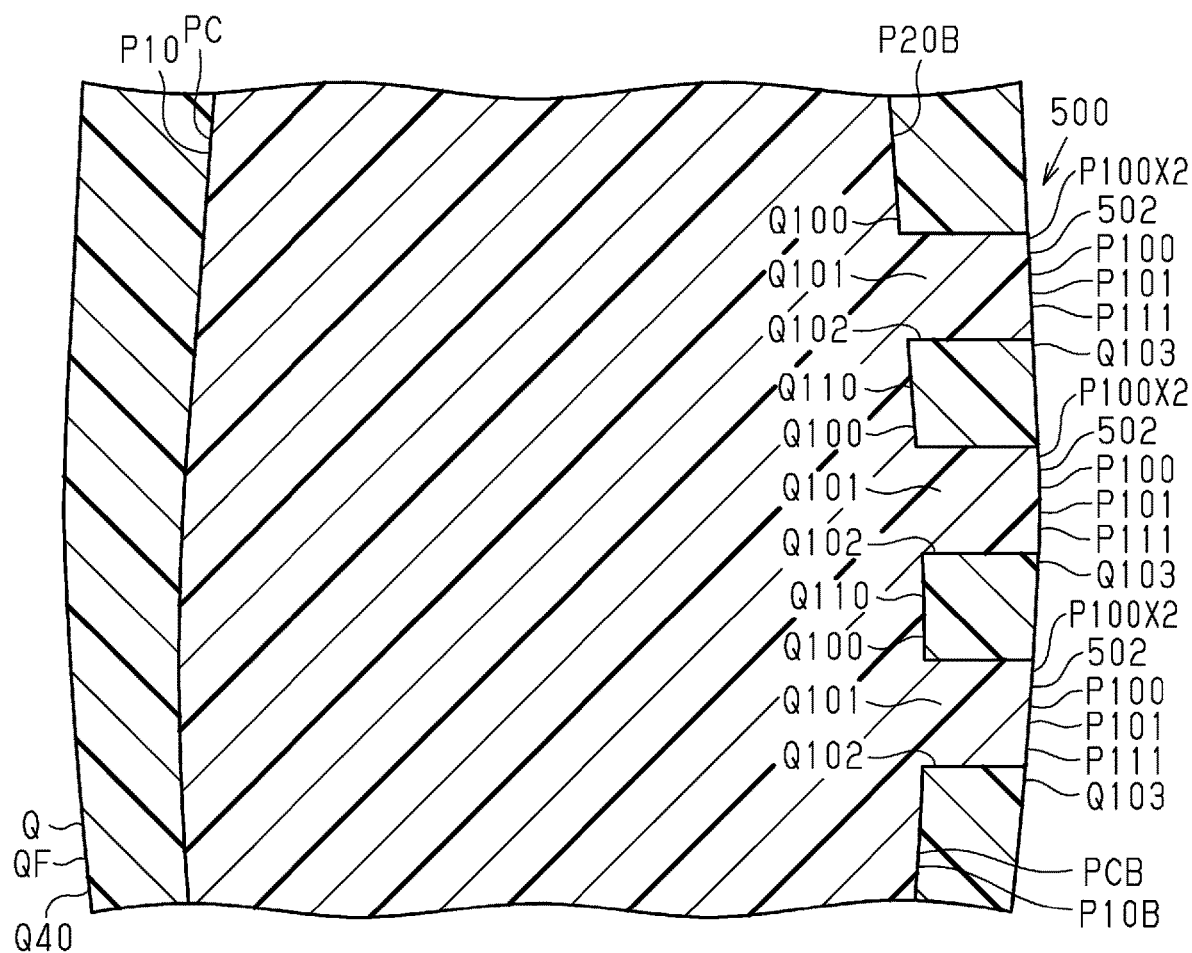
FIG. 32 is a side view of the penetration parts of the second group and the corresponding covering part.
Figure 33:
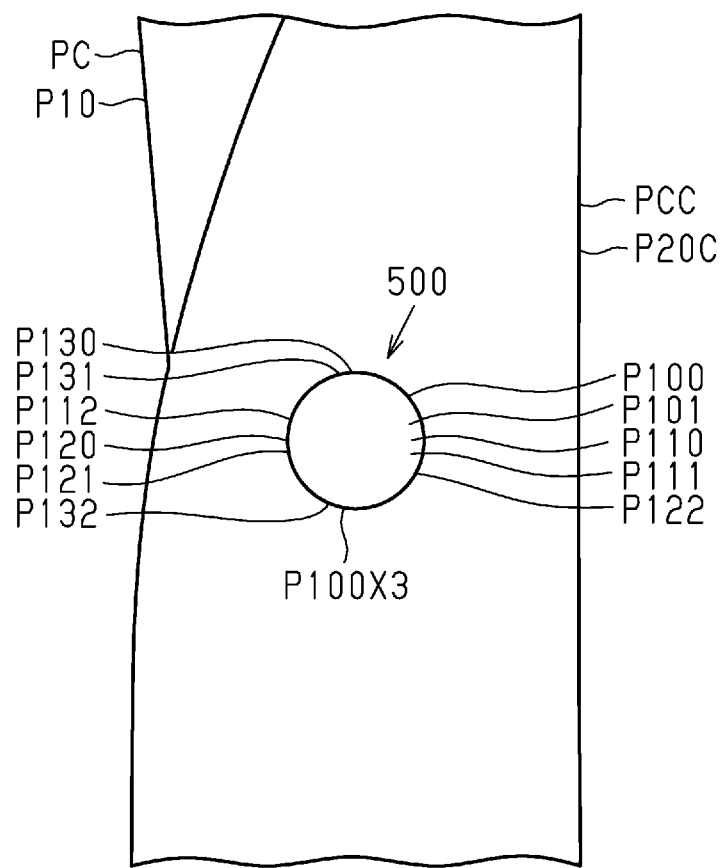
FIG. 33 is a front view of penetration parts of a third group.
Figure 34:
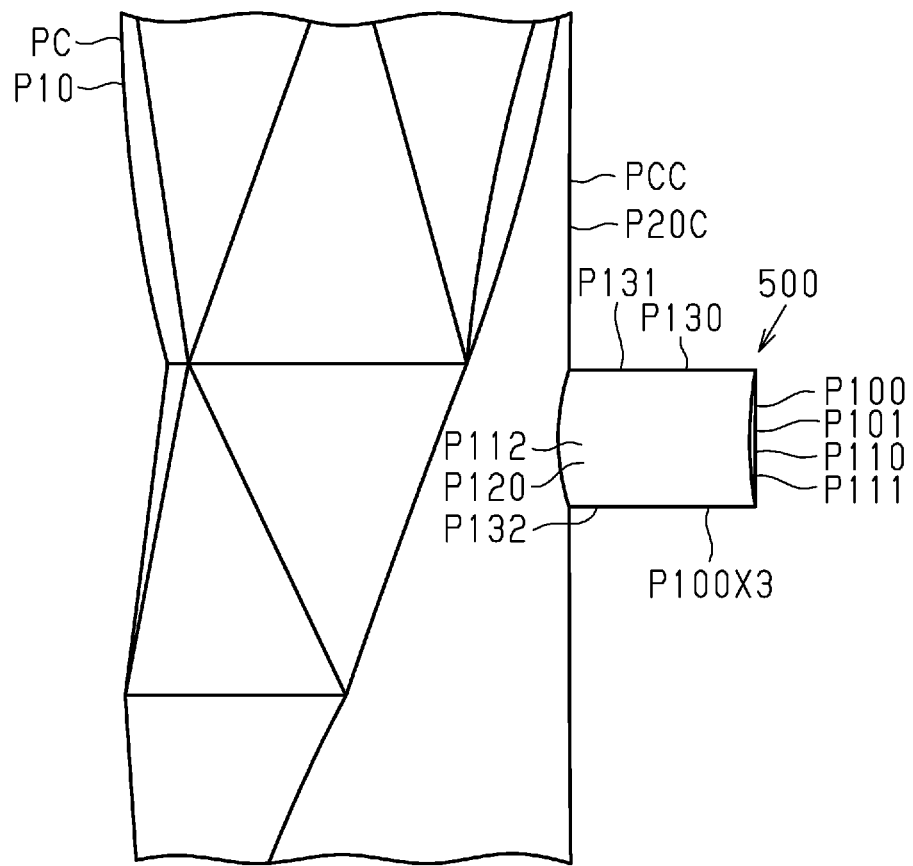
FIG. 34 is a side view of the penetration parts of the third group.
Figure 35:
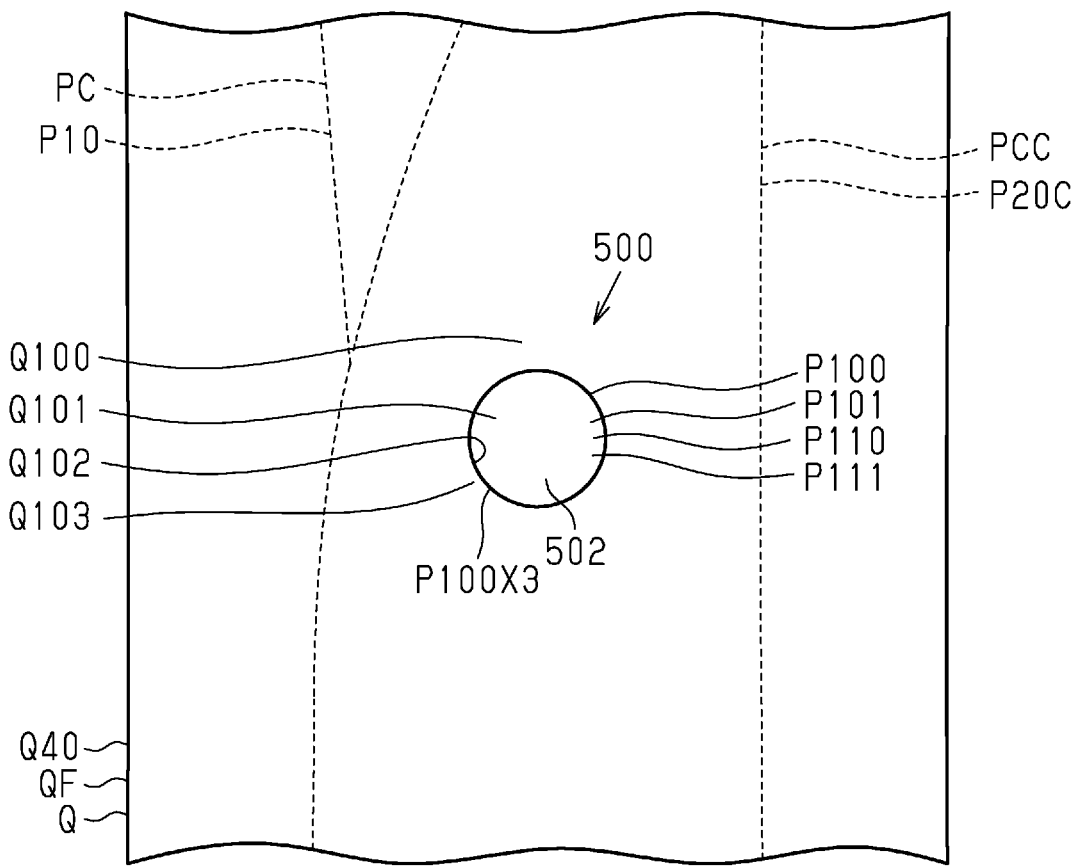
FIG. 35 is a front view of the penetration parts of the third group and a corresponding covering part.
Figure 36:
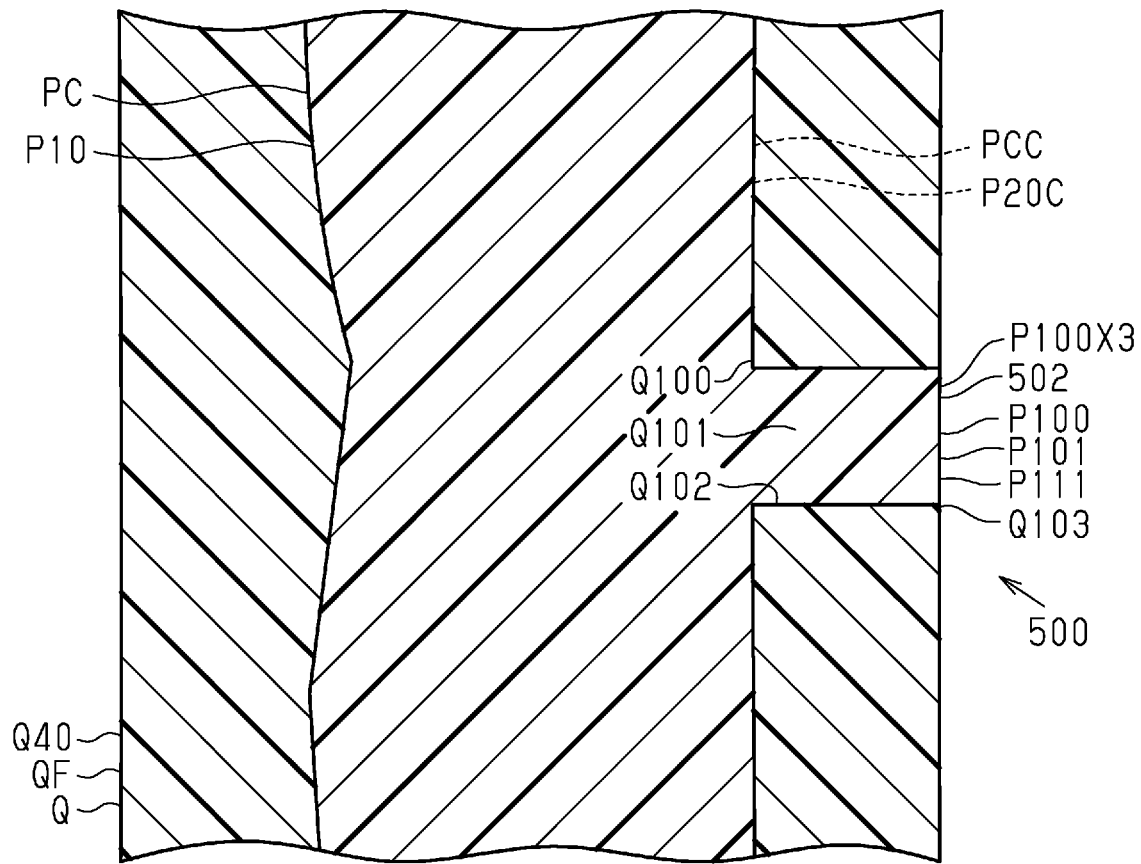
FIG. 36 is a side view of the penetration parts of the third group and the corresponding covering part.

FIGS. 23 and 24 will be referred to. In an example, the penetration part P100 includes an axial end part P130. The axial end part P130 includes a first axial end part P131 and a second axial end part P132. The first axial end part P131 is positioned in the first axial direction with respect to the center of the penetration part P100 in the axial direction. The second axial end part P132 is positioned in the second axial direction with respect to the center of the penetration part P100 in the axial direction. The length of the penetration part P100 in the axial direction will be referred to as "an axial length of the penetration part". In an example, the longest distance between the first axial end part P131 and the second axial end part P132 in the axial direction is selected as the axial length of the penetration part.

The center of the penetration part P100 in the axial direction will be referred to as "an axial center of the penetration part". A position of the axial center of the penetration part will be exemplified. In a first example, the axial center of the penetration part is positioned in the first end part PCA of the covering target part PC. In a second example, the axial center of the penetration part is positioned in the second end part PCB of the covering target part PC. In a third example, the axial center of the penetration part is positioned in the intermediate part PCC of the covering target part PC.

Examples of details of the third example include thirty-first to thirty-third examples. In the thirty-first example, the center of the penetration part is positioned in the first intermediate part PCCA of the covering target part PC. In the thirty-second example, the center of the penetration part is positioned in the second intermediate part PCCB of the covering target part PC. In the thirty-third example, the center of the penetration part is positioned at the center of the intermediate part PCC of the covering target part PC.

A position of the first axial end part P131 in the axial direction will be exemplified. In a first example, the first axial end part P131 is positioned in the first end part PCA of the covering target part PC. In a second example, the first axial end part P131 is positioned in the second end part PCB of the covering target part PC. In a third example, the first axial end part P131 is positioned in the intermediate part PCC of the covering target part PC.

Examples of details of the third example include thirty-first to thirty-third examples. In the thirty-first example, the first axial end part P131 is positioned in the first intermediate part PCCA of the covering target part PC. In the thirty-second example, the first axial end part P131 is positioned in the second intermediate part PCCB of the covering target part PC. In the thirty-third example, the first axial end part P131 is positioned at the center of the intermediate part PCC of the covering target part PC.

A position of the second axial end part P132 in the axial direction will be exemplified. In a first example, the second axial end part P132 is positioned in the first end part PCA of the covering target part PC. In a second example, the second axial end part P132 is positioned in the second end part PCB of the covering target part PC. In a third example, the second axial end part P132 is positioned in the intermediate part PCC of the covering target part PC.

Examples of details of the third example include thirty-first to thirty-third examples. In the thirty-first example, the second axial end part P132 is positioned in the first intermediate part PCCA of the covering target part PC. In the thirty-second example, the second axial end part P132 is positioned in the second intermediate part PCCB of the covering target part PC. In the thirty-third example, the second axial end part P132 is positioned at the center of the intermediate part PCC of the covering target part PC.

FIGS. 25 to 36 will be referred to. In an example, the penetration parts P100 are classified into a first type penetration part P100 (which will hereinafter be referred to as "a first type penetration part P100X1"), a second type penetration part P100 (which will hereinafter be referred to as "a second type penetration part P100X2"), and a third type penetration part P100 (which will hereinafter be referred to as "a third type penetration part P100X3") in accordance with the position of the axial center of the penetration part.

The first type penetration part P100X1 is positioned in at least the first end part PCA of the covering target part PC. The second type penetration part P100X2 is positioned in at least the second end part PCB of the covering target part PC. The third type penetration part P100X3 is positioned in at least the intermediate part PCC of the covering target part PC.

The position of the axial center of the penetration part in the first type penetration part P100X1 is the first end part PCA of the covering target part PC. The position of the axial center of the penetration part in the second type penetration part P100X2 is the second end part PCB of the covering target part PC. The position of the axial center of the penetration part in the third type penetration part P100X3 is the intermediate part PCC of the covering target part PC.

In an example, the first type penetration part P100X1 is classified into a first A type penetration part, a first B type penetration part, a first C type penetration part, and a first D type penetration part in accordance with the position of the circumferential center of the penetration part.

The position of the circumferential center of the penetration part in the first A type penetration part is the opposite surface of the primary molded part P. The position of the circumferential center of the penetration part in the first B type penetration part is the gate corresponding surface of the primary molded part P. The position of the circumferential center of the penetration part in the first C type penetration part is the first intermediate surface of the primary molded part P. The position of the circumferential center of the penetration part in the first D type penetration part is the second intermediate surface of the primary molded part P.

In an example, the second type penetration part P100X2 is classified into a second A type penetration part, a second B type penetration part, a second C type penetration part, and a second D type penetration part in accordance with the position of the circumferential center of the penetration part.

The position of the circumferential center of the penetration part in the second A type penetration part is the opposite surface of the primary molded part P. The position of the circumferential center of the penetration part in the second B type penetration part is the gate corresponding surface of the primary molded part P. The position of the circumferential center of the penetration part in the second C type penetration part is the first intermediate surface of the primary molded part P. The position of the circumferential center of the penetration part in the second D type penetration part is the second intermediate surface of the primary molded part P.

In an example, the third type penetration part P100X3 is classified into a third A type penetration part, a third B type penetration part, a third C type penetration part, and a third D type penetration part in accordance with the position of the circumferential center of the penetration part.

The position of the circumferential center of the penetration part in the third A type penetration part is the opposite surface of the primary molded part P. The position of the circumferential center of the penetration part in the third B type penetration part is the gate corresponding surface of the primary molded part P. The position of the circumferential center of the penetration part in the third C type penetration part is the first intermediate surface of the primary molded part P. The position of the circumferential center of the penetration part in the third D type penetration part is the second intermediate surface of the primary molded part P.

The constitution of the exposed structure 500 based on the classification of the penetration parts P100 will be exemplified.

In a first example, the exposed structure 500 includes one or a plurality of first type penetration parts P100X1. The exposed structure 500 does not include the second type penetration part P100X2 and the third type penetration part P100X3.

In a second example, the exposed structure 500 includes one or a plurality of second type penetration parts P100X2. The exposed structure 500 does not include the first type penetration part P100X1 and the third type penetration part P100X3.

In a third example, the exposed structure 500 includes one or a plurality of third type penetration parts P100X3. The exposed structure 500 does not include the first type penetration part P100X1 and the second type penetration part P100X2.

In a fourth example, the exposed structure 500 includes one or a plurality of first type penetration parts P100X1 and one or a plurality of second type penetration parts P100X2. The exposed structure 500 does not include the third type penetration part P100X3.

In a fifth example, the exposed structure 500 includes one or a plurality of first type penetration parts P100X1 and one or a plurality of third type penetration parts P100X3. The exposed structure 500 does not include the second type penetration part P100X2.

In a sixth example, the exposed structure 500 includes one or a plurality of second type penetration parts P100X2 and one or a plurality of third type penetration parts P100X3. The exposed structure 500 does not include the first type penetration part P100X1.

In a seventh example, the exposed structure 500 includes one or a plurality of first type penetration parts P100X1, one or a plurality of second type penetration parts P100X2, and one or a plurality of third type penetration parts P100X3.

The number of first type penetration parts P100X1 included in the exposed structure 500 will be referred to as "N1". The number of first A type penetration parts included in the exposed structure 500 will be referred to as "NIA". The number of first B type penetration parts included in the exposed structure 500 will be referred to as "NIB". The number of first C type penetration parts included in the exposed structure 500 will be referred to as "NIC". The number of first D type penetration parts included in the exposed structure 500 will be referred to as "NID". N1 is the sum of NIA, NIB. NIC, and NID.

The number of second type penetration parts P100X2 included in the exposed structure 500 will be referred to as "N2". The number of second A type penetration parts included in the exposed structure 500 will be referred to as "N2A". The number of second B type penetration parts included in the exposed structure 500 will be referred to as "N2B". The number of second C type penetration parts included in the exposed structure 500 will be referred to as "N2C". The number of second D type penetration parts included in the exposed structure 500 will be referred to as "N2D". N2 is the sum of N2A, N2B, N2C, and N2D.

The number of third type penetration parts P100X3 included in the exposed structure 500 will be referred to as "N3". The number of third A type penetration parts included in the exposed structure 500 will be referred to as "N3A". The number of third B type penetration parts included in the exposed structure 500 will be referred to as "N3B". The number of third C type penetration parts included in the exposed structure 500 will be referred to as "N3C". The number of third D type penetration parts included in the exposed structure 500 will be referred to as "N3D". N3 is the sum of N3A, N3B, N3C, and N3D.

Examples of a form of the exposed structure 500 based on the number of penetration parts P100 include a first form and a second form. In the first form, the exposed structure 500 includes one penetration part P100. In the second form, the exposed structure 500 includes a plurality of penetration parts P100.

The constitution of the exposed structure 500 of the first form will be exemplified. In a first example, N1 is 1. N2 is zero. N3 is zero. In a second example, N1 is zero. N2 is 1. N3 is zero. In a third example, N1 is zero. N2 is zero. N3 is 1.

The constitution of the exposed structure 500 of the second form will be exemplified. In a first example, N1 is 2 or larger. N2 is zero. N3 is zero. In a second example, N1 is 2 or larger. N2 is 1. N3 is zero. In a third example, N1 is 2 or larger. N2 is zero. N3 is 1. In a fourth example, N1 is 2 or larger. N2 is 2 or larger. N3 is zero.

In a fifth example, N1 is 2 or larger. N2 is zero or larger. N3 is 2 or larger. In a sixth example, N1 is 2 or larger. N2 is 1. N3 is 1. In a seventh example, N1 is 2 or larger. N2 is 2 or larger. N3 is 1. In an eighth example, N1 is 2 or larger. N2 is 1. N3 is 2 or larger.

In a ninth example, N1 is 2 or larger. N2 is 2 or larger. N3 is 2 or larger. In a tenth example, N1 is zero. N2 is 2 or larger. N3 is zero. In an eleventh example, N1 is 1. N2 is 2 or larger. N3 is zero. In a twelfth example, N1 is zero. N2 is 2 or larger. N3 is 1.

In a thirteenth example, N1 is zero. N2 is 2 or larger. N3 is 2 or larger. In a fourteenth example, N1 is 1. N2 is 2 or larger. N3 is 1. In a fifteenth example, N1 is 1. N2 is 2 or larger. N3 is 2 or larger. In a sixteenth example, N1 is zero. N2 is zero. N3 is 2 or larger.

In a seventeenth example, N1 is 1. N2 is zero. N3 is 2 or larger. In an eighteenth example, N1 is zero. N2 is 1. N3 is 2 or larger. In a nineteenth example, N1 is 1. N2 is 1. N3 is 2 or larger. In a twentieth example, N1 is 1. N2 is 2 or larger. N3 is 2 or larger.

In the exposed structure 500 of the second form, for example, a plurality of penetration parts P100 is classified into a first group, a second group, and a third group. The constitution of the exposed structure 500 based on the first to third groups will be exemplified. In a first example, the exposed structure 500 includes any one of the first to third groups. In a second example, the exposed structure 500 includes any two of the first to third groups. In a third example, the exposed structure 500 includes all of the first to third groups.

Each of the groups includes one or a plurality of penetration parts P100. The first group includes one or a plurality of first type penetration parts P100X1. The second group includes one or a plurality of second type penetration parts P100X2. The third group includes one or a plurality of third type penetration parts P100X3.

The number of first type penetration parts P100X1 included in the first group will be referred to as "NG1". The number of second type penetration parts P100X2 included in the second group will be referred to as "NG2". The number of third type penetration parts P100X3 included in the third group will be referred to as "NG3".

A relationship between the numbers of penetration parts P100 included in the respective groups will be exemplified. In a first example, NG1, NG2, and NG3 are equal to each other. In a second example, NG1 and NG2 differ from NG3. Examples of details of the second example include twenty-first to twenty-fourth examples. In the twenty-first example, NG1 and NG2 are larger than NG3. In the twenty-second example, on the premise of the twenty-first example, NG1 and NG2 are equal to each other. In the twenty-third example, on the premise of the twenty-first example, NG1 is larger than NG2. In the twenty-fourth example, on the premise of the twenty-first example, NG1 is smaller than NG2.

In a third example, NG1 and NG3 differ from NG2. Examples of details of the third example include thirty-first to thirty-fourth examples. In the thirty-first example, NG1 and NG3 are larger than NG2. In the thirty-second example, on the premise of the thirty-first example, NG1 and NG3 are equal to each other. In the thirty-third example, on the premise of the thirty-first example, NG1 is larger than NG3. In the thirty-fourth example, on the premise of the thirty-first example, NG1 is smaller than NG3.

In a fourth example, NG2 and NG3 differ from NG1. Examples of details of the fourth example include forty-first to forty-fourth examples. In the forty-first example, NG2 and NG3 are larger than NG1. In the forty-second example, on the premise of the forty-first example, NG2 and NG3 are equal to each other. In the forty-third example, on the premise of the forty-first example, NG2 is larger than NG3. In the forty-fourth example, on the premise of the forty-first example, NG2 is smaller than NG3.

The first type penetration parts P100X1 of the first group and the third type penetration parts P100X3 of the third group are provided with intervals therebetween in the axial direction.

The second type penetration parts P100X2 of the second group and the third type penetration parts P100X3 of the third group are provided with intervals therebetween in the axial direction.

A constitution of the first group when NG1 is 2 or larger will be exemplified. In a first example, the plurality of first type penetration parts P100X1 is arranged with intervals therebetween in a first predetermined direction. For example, the first predetermined direction is the axial direction or the circumferential direction.

In a second example, the plurality of first type penetration parts P100X1 is arranged with intervals therebetween in each of the first predetermined direction and a second predetermined direction. For example, the first predetermined direction is one of the axial direction and the circumferential direction. For example, the second predetermined direction is the other of the axial direction and the circumferential direction.

Intervals between the first type penetration parts P100X1 adjacent to each other in the first predetermined direction in the first group will be exemplified. In a first example, the intervals between the first type penetration parts P100X1 adjacent to each other in the first predetermined direction are narrower than lengths of the first type penetration parts P100X1 in the first predetermined direction.

In a second example, the intervals between the first type penetration parts P100X1 adjacent to each other in the first predetermined direction are wider than the lengths of the first type penetration parts P100X1 in the first predetermined direction. In a third example, the intervals between the first type penetration parts P100X1 adjacent to each other in the first predetermined direction are equal to the lengths of the penetration parts P100 in the first predetermined direction.

Intervals between the first type penetration parts P100X1 adjacent to each other in the second predetermined direction in the first group will be exemplified. In a first example, the intervals between the first type penetration parts P100X1 adjacent to each other in the second predetermined direction are narrower than the lengths of the first type penetration parts P100X1 in the second predetermined direction.

In a second example, the intervals between the first type penetration parts P100X1 adjacent to each other in the second predetermined direction are wider than the lengths of the first type penetration parts P100X1 in the second predetermined direction. In a third example, the intervals between the first type penetration parts P100X1 adjacent to each other in the second predetermined direction are equal to the lengths of the first type penetration parts P100X1 in the second predetermined direction.

A constitution of the second group when NG2 is 2 or larger will be exemplified. In a first example, the plurality of second type penetration parts P100X2 is arranged with intervals therebetween in the first predetermined direction. For example, the first predetermined direction is the axial direction or the circumferential direction.

In a second example, the plurality of second type penetration parts P100X2 is arranged with intervals therebetween in each of the first predetermined direction and the second predetermined direction. For example, the first predetermined direction is one of the axial direction and the circumferential direction. For example, the second predetermined direction is the other of the axial direction and the circumferential direction.

Intervals between the second type penetration parts P100X2 adjacent to each other in the first predetermined direction in the second group will be exemplified. In a first example, the intervals between the second type penetration parts P100X2 adjacent to each other in the first predetermined direction are narrower than lengths of the second type penetration parts P100X2 in the first predetermined direction.

In a second example, the intervals between the second type penetration parts P100X2 adjacent to each other in the first predetermined direction are wider than the lengths of the second type penetration parts P100X2 in the first predetermined direction. In a third example, the intervals between the second type penetration parts P100X2 adjacent to each other in the first predetermined direction are equal to the lengths of the penetration parts P100 in the first predetermined direction.

Intervals between the second type penetration parts P100X2 adjacent to each other in the second predetermined direction in the first group will be exemplified. In a first example, the intervals between the second type penetration parts P100X2 adjacent to each other in the second predetermined direction are narrower than the lengths of the second type penetration parts P100X2 in the second predetermined direction.

In a second example, the intervals between the second type penetration parts P100X2 adjacent to each other in the second predetermined direction are wider than the lengths of the second type penetration parts P100X2 in the second predetermined direction. In a third example, the intervals between the second type penetration parts P100X2 adjacent to each other in the second predetermined direction are equal to the lengths of the second type penetration parts P100X2 in the second predetermined direction.

A constitution of the third group when NG3 is 2 or larger will be exemplified. In a first example, the plurality of third type penetration parts P100X3 is arranged with intervals therebetween in the first predetermined direction. For example, the first predetermined direction is the axial direction or the circumferential direction.

In a second example, the plurality of third type penetration parts P100X3 is arranged with intervals therebetween in each of the first predetermined direction and the second predetermined direction. For example, the first predetermined direction is one of the axial direction and the circumferential direction. For example, the second predetermined direction is the other of the axial direction and the circumferential direction.

Intervals between the third type penetration parts P100X3 adjacent to each other in the first predetermined direction in the third group will be exemplified. In a first example, the intervals between the third type penetration parts P100X3 adjacent to each other in the first predetermined direction are narrower than lengths of the third type penetration parts P100X3 in the first predetermined direction.

In a second example, the intervals between the third type penetration parts P100X3 adjacent to each other in the first predetermined direction are wider than the lengths of the third type penetration parts P100X3 in the first predetermined direction. In a third example, the intervals between the third type penetration parts P100X3 adjacent to each other in the first predetermined direction are equal to the lengths of the penetration parts P100 in the first predetermined direction.

Intervals between the third type penetration parts P100X3 adjacent to each other in the second predetermined direction in the third group will be exemplified. In a first example, the intervals between the third type penetration parts P100X3 adjacent to each other in the second predetermined direction are narrower than the lengths of the third type penetration parts P100X3 in the second predetermined direction.

In a second example, the intervals between the third type penetration parts P100X3 adjacent to each other in the second predetermined direction are wider than the lengths of the third type penetration parts P100X3 in the second predetermined direction. In a third example, the intervals between the third type penetration parts P100X3 adjacent to each other in the second predetermined direction are equal to the lengths of the third type penetration parts P100X3 in the second predetermined direction.

In an example, the secondary molded part Q includes one or a plurality of division parts Q110. The division parts Q110 are provided between the penetration parts P100 adjacent to each other in the first predetermined direction or the second predetermined direction. The division parts Q110 are joined to the adjacent penetration parts P100.

FIGS. 25 to 36 will be referred to. In an example, the covering target part PC includes the primary handle constitution part P10.

A constitution of the first end part PCA of the covering target part PC will be exemplified. In a first example, the first end part PCA of the covering target part PC includes the first end part P10A of the primary handle constitution part P10. In a second example, the first end part PCA of the covering target part PC includes the first end part P10A of the primary handle constitution part P10 and the first end part P20A of the constricted part P20.

A constitution of the second end part PCB of the covering target part PC will be exemplified. In a first example, the second end part PCB of the covering target part PC includes the second end part P10B of the primary handle constitution part P10. In a second example, the second end part PCB of the covering target part PC includes the second end part P10B of the primary handle constitution part P10 and the second end part P20B of the constricted part P20.

A constitution of the intermediate part PCC of the covering target part PC will be exemplified. In a first example, the intermediate part PCC of the covering target part PC includes the intermediate part P20C of the constricted part P20, the first end part P20A, and the second end part P20B. In a second example, the intermediate part PCC of the covering target part PC includes the intermediate part P20C of the constricted part P20.

The exposed structure 500 includes a plurality of penetration parts P100 and a plurality of penetration disposition parts Q100. The plurality of penetration parts P100 is classified into the first group, the second group, and the third group. The first group includes three penetration parts P100. The second group includes three penetration parts P100. The third group includes one penetration part P100.

The gate related part of the secondary molded part Q includes a gate mark or a gate corresponding part. The position of the gate related part in the circumferential direction is set on the rear surface of the secondary molded part Q. The rear surface of the secondary molded part Q corresponds to the gate corresponding surface. The front surface of the secondary molded part Q corresponds to the opposite surface. The first side surface of the secondary molded part Q corresponds to the first intermediate surface. The second side surface of the secondary molded part Q corresponds to the second intermediate surface. The position of the gate related part in the axial direction is set in the intermediate part Q20C of the constricted part Q20.

FIGS. 25 to 28 will be referred to. In the illustrated example, the first end part PCA of the covering target part PC includes the first end part P10A of the primary handle constitution part P10 and the first end part P20A of the constricted part P20.

A type of the penetration parts P100 of the first group is a first A type. The penetration parts P100 of the first group are arranged with intervals therebetween in the axial direction. The division parts Q110 of the secondary molded part Q are provided between the penetration parts P100 adjacent to each other in the axial direction.

The penetration parts P100 of the first group are constituted such that they extend in the circumferential direction. The circumferential end parts P120 of the penetration parts P100 of the first group are positioned on the front surface of the covering target part PC. The circumferential lengths of the penetration parts are longer than the axial lengths of the penetration parts. The top surfaces P111 of the penetration parts P100 of the first group are curved surfaces. The centers on the curved surfaces are set in the inward radial direction of the molded article 20.

The penetration parts P100 of the first group and the covering part Q40 positioned in the vicinity thereof constitute the cave-in structures 501. A portion or the entirety of the top surfaces P111 of the penetration parts P100 is exposed with respect to the covering part Q40. The side surfaces P112 of the penetration parts P100 are covered by the covering part Q40. The exposed surfaces P101 are constituted of a portion or the entirety of the top surfaces P111.

Heights of steps formed between the exposed surfaces P101 of the penetration parts P100 and the outer surface QF of the covering part Q40 are determined on the basis of one or a plurality of predetermined matters related to the toothbrush 10A, for example. Examples of the predetermined matters related to the toothbrush 10A include operability when the toothbrush 10A is used and design of the molded article 20.

FIGS. 29 to 32 will be referred to. In the illustrated example, the second end part PCB of the covering target part PC includes the second end part P10B of the primary handle constitution part P10 and the second end part P20B of the constricted part P20.

A type of the penetration parts P100 of the second group is a second A type. The penetration parts P100 of the second group are arranged with intervals therebetween in the axial direction. The division parts Q110 of the secondary molded part Q are provided between the penetration parts P100 adjacent to each other in the axial direction.

The penetration parts P100 of the second group are constituted such that they extend in the circumferential direction. The circumferential end parts P120 of the penetration parts P100 of the second group are positioned on the front surface of the covering target part PC. The circumferential lengths of the penetration parts are longer than the axial lengths of the penetration parts. The top surfaces P111 of the penetration parts P100 of the second group are curved surfaces. The centers on the curved surfaces are set in the inward radial direction of the molded article 20.

The penetration parts P100 of the second group and the covering part Q40 positioned in the vicinity thereof constitute the smooth structure 502. A portion or the entirety of the top surfaces P111 of the penetration parts P100 is exposed with respect to the covering part Q40. The side surfaces P112 of the penetration parts P100 are covered by the covering part Q40. The exposed surfaces P101 are constituted of a portion or the entirety of the top surfaces P111.

Heights of steps formed between the exposed surfaces P101 of the penetration parts P100 and the outer surface QF of the covering part Q40 are determined on the basis of one or a plurality of predetermined matters related to the toothbrush 10A, for example. Examples of the predetermined matters related to the toothbrush 10A include operability when the toothbrush 10A is used and design of the molded article 20.

FIGS. 33 to 36 will be referred to. In the illustrated example, the intermediate part PCC of the covering target part PC includes the intermediate part P20C of the constricted part P20.

A type of the penetration parts P100 of the third group is a third A type. The intermediate part P100C of the penetration parts P100 is a pillar. The axial end parts P130 of the penetration parts P100 are positioned on the front surface of the covering target part PC. The circumferential end parts P120 of the penetration parts P100 are positioned on the front surface of the covering target part PC. The top surfaces P111 of the penetration parts P100 are curved surfaces. The centers on the curved surfaces are set in the inward radial direction of the molded article 20.

The penetration parts P100 of the third group and the covering part Q40 positioned in the vicinity thereof constitute the smooth structure 502. A portion or the entirety of the top surfaces P111 of the penetration parts P100 is exposed with respect to the covering part Q40. The side surfaces P112 of the penetration parts P100 are covered by the covering part Q40. The exposed surfaces P101 are constituted of a portion or the entirety of the top surfaces P111.

FIG. 1 will be referred to, A distance between a particular position of the second end part 110B of the main body 100 in the axial direction and a particular position of the first group will be referred to as "a particular distance". For example, the particular distance is determined on the basis of one or a plurality of predetermined matters related to the toothbrush 10A. Examples of the predetermined matters related to the toothbrush 10A include operability when the toothbrush 10A is used and design of the molded article 20.

For example, an end of the second end part 110B in the second axial direction is selected as the particular position of the second end part 110B. For example, the center of the first group in the axial direction is selected as the particular position of the first group. For example, the center between the first axial end part P131 positioned at an end in the first axial direction and the second axial end part P132 positioned at an end in the second axial direction in the first group is selected as the center of the first group.

In an example, the particular distance is set in consideration of operability when the toothbrush 10A is used. Examples of matters related to the operability include casiness of a grip on the handle 110. The particular distance is determined on the basis of a relationship with respect to a hand breadth of a hand set as a model (which will hereinafter be referred to as "a reference hand breadth").

In an example, the particular distance is a value obtained by multiplying the reference hand breadth by a predetermined coefficient. For example, the predetermined coefficient is selected from a range of 1 to 1.7. When a hand of a Japanese adult is set as a hand of a model, the reference hand breadth is selected from a range of 70 mm to 80 mm, for example.

FIG. 3 will be referred to, A straight line which passes through the center of the handle 110 in the axial direction in a front view of the molded article 20 and is parallel to the width direction will be referred to as "a handle reference line". A straight line which passes through the center of the neck 120 in the axial direction in a front view of the molded article 20 and is parallel to the width direction will be referred to as "a neck reference line".

A straight line which passes through the center of the head 130 in the axial direction in a front view of the molded article 20 and is parallel to the width direction will be referred to as "a head reference line". A straight line which passes through the center of the protrusion part 220 in the axial direction in a front view of the molded article 20 and is parallel to the width direction will be referred to as "a protrusion part reference line".

The main body 100 includes a first boundary part ZA corresponding to a boundary between the head 130 and the neck 120. The first boundary part ZA constitutes a portion of the head 130 and a portion of the neck 120.

The second end part 130B of the head 130 includes the first boundary part ZA. The first boundary part ZA that is a portion of the head 130 is a part having the longest distance to the head reference line in the axial direction in the second end part 130B of the head 130.

Regarding the second end part 130B of the head 130, a range from a predetermined part of the second end part 130B positioned in the first axial direction with respect to the first boundary part ZA to the first boundary part ZA will be referred to as "a predetermined range of the second end part 130B".

The first end part 120A of the neck 120 includes the first boundary part ZA. The first boundary part ZA that is a portion of the neck 120 is a part having the longest distance to the neck reference line in the axial direction in the first end part 120A of the neck 120.

Regarding the first end part 120A of the neck 120, a range from a predetermined part of the first end part 120A positioned in the second axial direction with respect to the first boundary part ZA to the first boundary part ZA will be referred to as "a predetermined range of the first end part 120A".

The main body 100 includes a first connection part JA. The first connection part JA includes the predetermined range of the second end part 130B of the head 130 and the predetermined range of the first end part 120A of the neck 120. Examples of a form of the first connection part JA include the first connection parts JA of first to seventh forms.

For example, the first connection part JA of the first form is constituted as follows.

In the predetermined range of the second end part 130B of the head 130, a width of the second end part 130B increases toward the second axial direction.

In the predetermined range of the first end part 120A of the neck 120, a width of the first end part 120A is uniform toward the second axial direction.

The width of the first connection part JA of the first form varies in the axial direction. The width of the first connection part JA increases toward the second axial direction in the predetermined range of the second end part 130B of the head 130 and is uniform toward the second axial direction in the predetermined range of the first end part 120A of the neck 120.

The first boundary part ZA is positioned at a boundary between a part in which the width of the first connection part JA increases toward the second axial direction and a part in which the width of the first connection part JA is uniform toward the second axial direction.

For example, the first connection part JA of the second form is constituted as follows.

In the predetermined range of the second end part 130B of the head 130, the width of the second end part 130B is uniform toward the second axial direction.

In the predetermined range of the first end part 120A of the neck 120, the width of the first end part 120A increases toward the second axial direction.

The width of the first connection part JA of the second form varies in the axial direction. The width of the first connection part JA is uniform toward the second axial direction in the predetermined range of the second end part 130B of the head 130 and increases toward the second axial direction in the predetermined range of the first end part 120A of the neck 120.

The first boundary part JA is positioned at a boundary between a part in which the width of the first connection part JA is uniform toward the second axial direction and a part in which the width of the first connection part JA increases toward the second axial direction.

For example, the first connection part JA of the third form is constituted as follows.

In the predetermined range of the second end part 130B of the head 130, the width of the second end part 130B decreases toward the second axial direction.

In the predetermined range of the first end part 120A of the neck 120, the width of the first end part 120A is uniform toward the second axial direction.

The width of the first connection part JA of the third form varies in the axial direction. The width of the first connection part JA decreases toward the second axial direction in the predetermined range of the second end part 130B of the head 130 and is uniform toward the second axial direction in the predetermined range of the first end part 120A of the neck 120.

The first boundary part ZA is positioned at a boundary between a part in which the width of the first connection part JA decreases toward the second axial direction and a part in which the width of the first connection part JA is uniform toward the second axial direction.

For example, the first connection part JA of the fourth form is constituted as follows.

In the predetermined range of the second end part 130B of the head 130, the width of the second end part 130B is uniform toward the second axial direction.

In the predetermined range of the first end part 120A of the neck 120, the width of the first end part 120A decreases toward the second axial direction.

The width of the first connection part JA of the fourth form varies in the axial direction.

The width of the first connection part JA is uniform toward the second axial direction in the predetermined range of the second end part 130B of the head 130 and decreases toward the second axial direction in the predetermined range of the first end part 120A of the neck 120.

The first boundary part ZA is positioned at a boundary between a part in which the width of the first connection part JA is uniform toward the second axial direction and a part in which the width of the first connection part JA decreases toward the second axial direction.

For example, the first connection part JA of the fifth form is constituted as follows.

In the predetermined range of the second end part 130B of the head 130, the width of the second end part 130B increases toward the second axial direction.

In the predetermined range of the first end part 120A of the neck 120, the width of the first end part 120A decreases toward the second axial direction.

The width of the first connection part JA of the fifth form varies in the axial direction. The width of the first connection part JA increases toward the second axial direction in the predetermined range of the second end part 130B of the head 130 and decreases toward the second axial direction in the predetermined range of the first end part 120A of the neck 120.

The first boundary part ZA is positioned at a boundary between a part in which the width of the first connection part JA increases toward the second axial direction and a part in which the width of the first connection part JA decreases toward the second axial direction.

For example, the first connection part JA of the sixth form is constituted as follows.

In the predetermined range of the second end part 130B of the head 130, the width of the second end part 130B decreases toward the second axial direction.

In the predetermined range of the first end part 120A of the neck 120, the width of the first end part 120A increases toward the second axial direction.

The width of the first connection part JA of the sixth form varies in the axial direction. The width of the first connection part JA decreases toward the second axial direction in the predetermined range of the second end part 130B of the head 130 and increases toward the second axial direction in the predetermined range of the first end part 120A of the neck 120.

The first boundary part ZA is positioned at a boundary between a part in which the width of the first connection part JA decreases toward the second axial direction and a part in which the width of the first connection part JA increases toward the second axial direction.

For example, the first connection part JA of the seventh form is constituted as follows.

The first connection part JA of the seventh form includes change in characteristic structure indicating the boundary between the head 130 and the neck 120. Change in characteristic structure indicates the boundary between the head 130 and the neck 120 from a viewpoint different from the width of the first connection part JA.

Change in characteristic structure will be exemplified. In a first example, change in characteristic structure includes a difference between a material of the head 130 and a material of the neck 120. In a second example, change in characteristic structure includes a difference between a shape of the outer surface PF of the head 130 and a shape of the outer surface PF of the neck 120. In a third example, change in characteristic structure includes a step formed between the head 130 and the neck 120. In a fourth example, change in characteristic structure includes at least two of the first to third examples.

A constitution related to the width of the first connection part JA of the seventh form will be exemplified.

In a first example, the constitution related to the width of the first connection part JA of the seventh form is similar to the constitution related to the width of the first connection part JA in any of the first to sixth forms.

In a second example, the constitution related to the width of the first connection part JA of the seventh form differs from the constitutions related to the width of the first connection part JA in the first to sixth forms.

In the predetermined range of the second end part 130B of the head 130, the width of the second end part 130B increases toward the second axial direction. In the predetermined range of the first end part 120A of the neck 120, the width of the first end part 120A increases toward the second axial direction.

In a third example, the constitution related to the width of the first connection part JA of the seventh form differs from the constitutions related to the width of the first connection part JA in the first to sixth forms.

In the predetermined range of the second end part 130B of the head 130, the width of the second end part 130B decreases toward the second axial direction. In the predetermined range of the first end part 120A of the neck 120, the width of the first end part 120A decreases toward the second axial direction.

In a fourth example, the constitution related to the width of the first connection part JA of the seventh form differs from the constitutions related to the width of the first connection part JA in the first to sixth forms.

In the predetermined range of the second end part 130B of the head 130, the width of the second end part 130B is uniform toward the second axial direction. In the predetermined range of the first end part 120A of the neck 120, the width of the first end part 120A is uniform toward the second axial direction.

The main body 100 includes a second boundary part ZB corresponding to a boundary between the neck 120 and the handle 110. The second boundary part ZB constitutes a portion of the neck 120 and a portion of the handle 110.

The second end part 120B of the neck 120 includes the second boundary part ZB. The second boundary part ZB that is a portion of the neck 120 is a part having the longest distance to the neck reference line in the axial direction in the second end part 120B of the neck 120.

Regarding the second end part 120B of the neck 120, a range from a predetermined part of the second end part 120B positioned in the first axial direction with respect to the second boundary part ZB to the second boundary part ZB will be referred to as "a predetermined range of the second end part 120B".

The first end part 110A of the handle 110 includes the second boundary part ZB. The second boundary part ZB that is a portion of the handle 110 is a part having the longest distance to the handle reference line in the axial direction in the first end part 110A of the handle 110.

Regarding the first end part 110A of the handle 110, a range from a predetermined part of the first end part 110A positioned in the second axial direction with respect to the second boundary part ZB to the second boundary part ZB will be referred to as "a predetermined range of the first end part 110A".

The main body 100 includes a second connection part JB. The second connection part JB includes the predetermined range of the second end part 120B of the neck 120 and the predetermined range of the first end part 110A of the handle 110. Examples of a form of the second connection part JB include the first connection parts JA of first to seventh forms.

For example, the second connection part JB of the first form is constituted as follows.

In the predetermined range of the second end part 120B of the neck 120, a width of the second end part 120B increases toward the second axial direction.

In the predetermined range of the first end part 110A of the handle 110, a width of the first end part 110A is uniform toward the second axial direction.

The width of the second connection part JB of the first form varies in the axial direction. The width of the second connection part JB increases toward the second axial direction in the predetermined range of the second end part 120B of the neck 120 and is uniform toward the second axial direction in the predetermined range of the first end part 110A of the handle 110.

The second boundary part ZB is positioned at a boundary between a part in which the width of the second connection part JB increases toward the second axial direction and a part in which the width of the second connection part JB is uniform toward the second axial direction.

For example, the second connection part JB of the second form is constituted as follows.

In the predetermined range of the second end part 120B of the neck 120, the width of the second end part 120B is uniform toward the second axial direction.

In the predetermined range of the first end part 110A of the handle 110, the width of the first end part 110A increases toward the second axial direction.

The width of the second connection part JB of the second form varies in the axial direction. The width of the second connection part JB is uniform toward the second axial direction in the predetermined range of the second end part 120B of the neck 120 and increases toward the second axial direction in the predetermined range of the first end part 110A of the handle 110.

The second boundary part ZB is positioned at a boundary between a part in which the width of the second connection part JB is uniform toward the second axial direction and a part in which the width of the second connection part JB increases toward the second axial direction.

For example, the second connection part JB of the third form is constituted as follows.

In the predetermined range of the second end part 120B of the neck 120, the width of the second end part 120B decreases toward the second axial direction.

In the predetermined range of the first end part 110A of the handle 110, the width of the first end part 110A is uniform toward the second axial direction.

The width of the second connection part JB of the third form varies in the axial direction. The width of the second connection part JB decreases toward the second axial direction in the predetermined range of the second end part 120B of the neck 120 and is uniform toward the second axial direction in the predetermined range of the first end part 110A of the handle 110.

The second boundary part ZB is positioned at a boundary between a part in which the width of the second connection part JB decreases toward the second axial direction and a part in which the width of the second connection part JB is uniform toward the second axial direction. For example, the second connection part JB of the fourth form is constituted as follows.

In the predetermined range of the second end part 120B of the neck 120, the width of the second end part 120B is uniform toward the second axial direction.

In the predetermined range of the first end part 110A of the handle 110, the width of the first end part 110A decreases toward the second axial direction.

The width of the second connection part JB of the fourth form varies in the axial direction. The width of the second connection part JB is uniform toward the second axial direction in the predetermined range of the second end part 120B of the neck 120 and decreases toward the second axial direction in the predetermined range of the first end part 110A of the handle 110.

The second boundary part ZB is positioned at a boundary between a part in which the width of the second connection part JB is uniform toward the second axial direction and a part in which the width of the second connection part JB decreases toward the second axial direction. For example, the second connection part JB of the fifth form is constituted as follows.

In the predetermined range of the second end part 120B of the neck 120, the width of the second end part 120B increases toward the second axial direction.

In the predetermined range of the first end part 110A of the handle 110, the width of the first end part 110A decreases toward the second axial direction.

The width of the second connection part JB of the fifth form varies in the axial direction. The width of the second connection part JB increases toward the second axial direction in the predetermined range of the second end part 120B of the neck 120 and decreases toward the second axial direction in the predetermined range of the first end part 110A of the handle 110.

The second boundary part ZB is positioned at a boundary between a part in which the width of the second connection part JB increases toward the second axial direction and a part in which the width of the second connection part JB decreases toward the second axial direction.

For example, the second connection part JB of the sixth form is constituted as follows.

In the predetermined range of the second end part 120B of the neck 120, the width of the second end part 120B decreases toward the second axial direction.

In the predetermined range of the first end part 110A of the handle 110, the width of the first end part 110A increases toward the second axial direction.

The width of the second connection part JB of the sixth form varies in the axial direction. The width of the second connection part JB decreases toward the second axial direction in the predetermined range of the second end part 120B of the neck 120 and increases toward the second axial direction in the predetermined range of the first end part 110A of the handle 110.

The second boundary part ZB is positioned at a boundary between a part in which the width of the second connection part JB decreases toward the second axial direction and a part in which the width of the second connection part JB increases toward the second axial direction.

For example, the second connection part JB of the seventh form is constituted as follows.

The second connection part JB of the seventh form includes change in characteristic structure indicating the boundary between the neck 120 and the handle 110. Change in characteristic structure indicates the boundary between the neck 120 and the handle 110 from a viewpoint different from the width of the second connection part JB.

Change in characteristic structure will be exemplified. In a first example, change in characteristic structure includes a difference between a material of the neck 120 and a material of the handle 110. In a second example, change in characteristic structure includes a difference between a shape of the outer surface PF of the neck 120 and a shape of the outer surface PF of the handle 110. In a third example, change in characteristic structure includes a step formed between the neck 120 and the handle 110. In a fourth example, change in characteristic structure includes at least two of the first to third examples.

A constitution related to the width of the second connection part JB of the seventh form will be exemplified.

In a first example, the constitution related to the width of the second connection part JB of the seventh form is similar to the constitution related to the width of the second connection part JB in any of the first to sixth forms.

In a second example, the constitution related to the width of the second connection part JB of the seventh form differs from the constitutions related to the width of the second connection part JB in the first to sixth forms.

In the predetermined range of the second end part 120B of the neck 120, the width of the second end part 120B increases toward the second axial direction. In the predetermined range of the first end part 110A of the handle 110, the width of the first end part 110A increases toward the second axial direction.

In a third example, the constitution related to the width of the second connection part JB of the seventh form differs from the constitutions related to the width of the second connection part JB in the first to sixth forms.

In the predetermined range of the second end part 120B of the neck 120, the width of the second end part 120B decreases toward the second axial direction. In the predetermined range of the first end part 110A of the handle 110, the width of the first end part 110A decreases toward the second axial direction.

In a fourth example, the constitution related to the width of the second connection part JB of the seventh form differs from the constitutions related to the width of the second connection part JB in the first to sixth forms.

In the predetermined range of the second end part 120B of the neck 120, the width of the second end part 120B is uniform toward the second axial direction. In the predetermined range of the first end part 110A of the handle 110, the width of the first end part 110A is uniform toward the second axial direction.

The main body 100 includes a third boundary part ZC corresponding to a boundary between the handle 110 and the protrusion part 220. The third boundary part ZC constitutes a portion of the handle 110 and a portion of the protrusion part 220.

The second end part 110B of the handle 110 includes the third boundary part/C. The third boundary part ZC that is a portion of the handle 110 is a part having the longest distance to the handle reference line in the axial direction in the second end part 110B of the handle 110.

Regarding the second end part 110B of the handle 110, a range from a predetermined part of the second end part 110B positioned in the first axial direction with respect to the third boundary part % C to the third boundary part ZC will be referred to as "a predetermined range of the second end part 110B".

The first end part 220A of the protrusion part 220 includes the third boundary part ZC. The third boundary part ZC that is a portion of the protrusion part 220 is a part having the longest distance to the protrusion part reference line in the axial direction in the first end part 220A of the protrusion part 220.

Regarding the first end part 220A of the protrusion part 220, a range from a predetermined part of the first end part 220A positioned in the second axial direction with respect to the third boundary part ZC to the third boundary part/C will be referred to as "a predetermined range of the first end part 220A".

The main body 100 includes a third connection part JC. The third connection part JC includes the predetermined range of the second end part 110B of the handle 110 and the predetermined range of the first end part 220A of the protrusion part 220. Examples of a form of the third connection part JC include the third connection part JC of first to seventh forms.

For example, the third connection part JC of the first form is constituted as follows.

In the predetermined range of the second end part 110B of the handle 110, a width of the second end part 110B increases toward the second axial direction.

In the predetermined range of the first end part 220A of the protrusion part 220, a width of the first end part 220A is uniform toward the second axial direction.

The width of the third connection part JC of the first form varies in the axial direction. The width of the third connection part JC increases toward the second axial direction in the predetermined range of the second end part 110B of the handle 110 and is uniform toward the second axial direction in the predetermined range of the first end part 220A of the protrusion part 220.

The third boundary part ZC is positioned at a boundary between a part in which the width of the third connection part JC increases toward the second axial direction and a part in which the width of the third connection part JC is uniform toward the second axial direction.

For example, the third connection part JC of the second form is constituted as follows.

In the predetermined range of the second end part 110B of the handle 110, the width of the second end part 110B is uniform toward the second axial direction.

In the predetermined range of the first end part 220A of the protrusion part 220, the width of the first end part 220A increases toward the second axial direction.

The width of the third connection part JC of the second form varies in the axial direction. The width of the third connection part JC is uniform toward the second axial direction in the predetermined range of the second end part 110B of the handle 110 and increases toward the second axial direction in the predetermined range of the first end part 220A of the protrusion part 220.

The third boundary part ZC is positioned at a boundary between a part in which the width of the third connection part JC is uniform toward the second axial direction and a part in which the width of the third connection part JC increases toward the second axial direction.

For example, the third connection part JC of the third form is constituted as follows.

In the predetermined range of the second end part 110B of the handle 110, the width of the second end part 110B decreases toward the second axial direction.

In the predetermined range of the first end part 220A of the protrusion part 220, the width of the first end part 220A is uniform toward the second axial direction.

The width of the third connection part JC of the third form varies in the axial direction. The width of the third connection part JC decreases toward the second axial direction in the predetermined range of the second end part 110B of the handle 110 and is uniform toward the second axial direction in the predetermined range of the first end part 220A of the protrusion part 220.

The third boundary part/C is positioned at a boundary between a part in which the width of the third connection part JC decreases toward the second axial direction and a part in which the width of the third connection part JC is uniform toward the second axial direction.

For example, the third connection part JC of the fourth form is constituted as follows.

In the predetermined range of the second end part 110B of the handle 110, the width of the second end part 110B is uniform toward the second axial direction.

In the predetermined range of the first end part 220A of the protrusion part 220, the width of the first end part 220A decreases toward the second axial direction.

The width of the third connection part JC of the fourth form varies in the axial direction. The width of the third connection part JC is uniform toward the second axial direction in the predetermined range of the second end part 110B of the handle 110 and decreases toward the second axial direction in the predetermined range of the first end part 220A of the protrusion part 220.

The third boundary part ZC is positioned at a boundary between a part in which the width of the third connection part JC is uniform toward the second axial direction and a part in which the width of the third connection part JC decreases toward the second axial direction.

For example, the third connection part JC of the fifth form is constituted as follows.

In the predetermined range of the second end part 110B of the handle 110, the width of the second end part 110B increases toward the second axial direction.

In the predetermined range of the first end part 220A of the protrusion part 220, the width of the first end part 220A decreases toward the second axial direction.

The width of the third connection part JC of the fifth form varies in the axial direction. The width of the third connection part JC increases toward the second axial direction in the predetermined range of the second end part 110B of the handle 110 and decreases toward the second axial direction in the predetermined range of the first end part 220A of the protrusion part 220.

The third boundary part ZC is positioned at a boundary between a part in which the width of the third connection part JC increases toward the second axial direction and a part in which the width of the third connection part JC decreases toward the second axial direction.

For example, the third connection part JC of the sixth form is constituted as follows.

In the predetermined range of the second end part 110B of the handle 110, the width of the second end part 110B decreases toward the second axial direction.

In the predetermined range of the first end part 220A of the protrusion part 220, the width of the first end part 220A increases toward the second axial direction.

The width of the third connection part JC of the sixth form varies in the axial direction. The width of the third connection part JC decreases toward the second axial direction in the predetermined range of the second end part 110B of the handle 110 and increases toward the second axial direction in the predetermined range of the first end part 220A of the protrusion part 220.

The third boundary part ZC is positioned at a boundary between a part in which the width of the third connection part JC decreases toward the second axial direction and a part in which the width of the third connection part JC increases toward the second axial direction.

For example, the third connection part JC of the seventh form is constituted as follows.

The third connection part JC of the seventh form includes change in characteristic structure indicating the boundary between the handle 110 and the protrusion part 220. Change in characteristic structure indicates the boundary between the handle 110 and the protrusion part 220 from a viewpoint different from the width of the third connection part JC.

Change in characteristic structure will be exemplified. In a first example, change in characteristic structure includes a difference between a material of the handle 110 and a material of the protrusion part 220. In a second example, change in characteristic structure includes a difference between a shape of the outer surface PF of the handle 110 and a shape of the outer surface PF of the protrusion part 220. In a third example, change in characteristic structure includes a step formed between the handle 110 and the protrusion part 220. In a fourth example, change in characteristic structure includes at least two of the first to third examples.

A constitution related to the width of the third connection part JC of the seventh form will be exemplified.

In a first example, the constitution related to the width of the third connection part JC of the seventh form is similar to the constitution related to the width of the third connection part JC in any of the first to sixth forms.

In a second example, the constitution related to the width of the third connection part JC of the seventh form differs from the constitutions related to the width of the third connection part JC in the first to sixth forms.

In the predetermined range of the second end part 110B of the handle 110, the width of the second end part 110B increases toward the second axial direction. In the predetermined range of the first end part 220A of the protrusion part 220, the width of the first end part 220A increases toward the second axial direction.

In a third example, the constitution related to the width of the third connection part JC of the seventh form differs from the constitutions related to the width of the third connection part JC in the first to sixth forms.

In the predetermined range of the second end part 110B of the handle 110, the width of the second end part 110B decreases toward the second axial direction. In the predetermined range of the first end part 220A of the protrusion part 220, the width of the first end part 220A decreases toward the second axial direction.

In a fourth example, the constitution related to the width of the third connection part JC of the seventh form differs from the constitutions related to the width of the third connection part JC in the first to sixth forms.

In the predetermined range of the second end part 110B of the handle 110, the width of the second end part 110B is uniform toward the second axial direction. In the predetermined range of the first end part 220A of the protrusion part 220, the width of the first end part 220A is uniform toward the second axial direction.

When a position of the first boundary part ZA in the axial direction is not defined by the foregoing examples, for example, the position of the first boundary part ZA is defined by the following method.

A distance between a tip part 130P of the head 130 and the first boundary part ZA in the axial direction will be referred to as "a first reference length". A length of the molded article 20 in the axial direction will be referred to as "a molded article length". A proportion of the first reference length to the molded article length will be referred to as "a first reference length rate".

In an example related to the molded article 20 in a state in which the protrusion part 220 has not been removed, the position of the first boundary part ZA in the axial direction is determined such that the first reference length rate is within a range of 14% to 54%.

In an example related to the molded article 20 in a state in which the protrusion part 220 has been removed, the position of the first boundary part ZA in the axial direction is determined such that the first reference length rate is within a range of 14% to 54%.

When a position of the second boundary part ZB in the axial direction is not defined by the foregoing examples, for example, the position of the second boundary part ZB is defined by the following method.

A distance between the tip part 130P of the head 130 and the second boundary part ZB in the axial direction will be referred to as "a second reference length". A proportion of the second reference length to the molded article length will be referred to as "a second reference length rate".

In an example related to the molded article 20 in a state in which the protrusion part 220 has not been removed, the position of the second boundary part ZB in the axial direction is determined such that the second reference length rate is within a range of 28% to 68%.

In an example related to the molded article 20 in a state in which the protrusion part 220 has been removed, the position of the second boundary part ZB in the axial direction is determined such that the second reference length rate is within a range of 29% to 69%.

When a position of the third boundary part 7C in the axial direction is not defined by the foregoing examples, for example, the position of the third boundary part ZC is defined by the following method.

A distance between the tip part 130P of the head 130 and the third boundary part % C in the axial direction will be referred to as "a third reference length". A proportion of the third reference length to the molded article length will be referred to as "a third reference length rate". In an example related to the molded article 20 in a state in which the protrusion part 220 has not been removed, the position of the third boundary part ZC in the axial direction is determined such that the third reference length rate is within a range of 56% to 96%.

The first end part 130A of the head 130 includes the tip part 130P. The tip part 130P is a part having the longest distance to the head reference line in the axial direction in the first end part 130A of the head 130.

For example, a length of the head 130 in the axial direction is defined as follows. The length of the head 130 in the axial direction is a distance between the tip part 130P of the head 130 and the first boundary part ZA in the axial direction.

For example, a length of the neck 120 in the axial direction is defined as follows. The length of the neck 120 in the axial direction is a distance between the second boundary part ZB and the first boundary part ZA in the axial direction.

For example, a length of the handle 110 in the axial direction is defined as follows. The length of the handle 110 in the axial direction is a distance between the second boundary part ZB and the third boundary part/C in the axial direction.

The second end part 220B of the protrusion part 220 includes a tip part 220P. The tip part 220P is a part having the longest distance to the protrusion part reference line in the axial direction in the second end part 220B of the protrusion part 220.

For example, a length of the protrusion part 220 in the axial direction is defined as follows. The length of the protrusion part 220 in the axial direction is a distance between the third boundary part ZC and the tip part 220P in the axial direction.

In the examples illustrated in FIGS. 3 and 4, each of the connection parts JA to JC is constituted as follows. The form of the first connection part JA is the foregoing third form of the first connection part JA. The form of the second connection part JB is the foregoing seventh form of the second connection part JB. Change in characteristic structure includes a difference between the material of the neck 120 and the material of the handle 110. The form of the third connection part JC is the foregoing third form of the third connection part JC.

A length of each part of the molded article 20 in the axial direction can be arbitrarily selected. The length of each part of the molded article 20 in the axial direction is not limited to the exemplified length.

In an example, the length of the handle 110 in the axial direction is longer than the length of the neck 120 in the axial direction. The length of the neck 120 in the axial direction is longer than the length of the head 130 in the axial direction.

In an example, the length of the protrusion part 220 in the axial direction is shorter than the length of the main body 100 in the axial direction. The length of the protrusion part 220 in the axial direction is shorter than the length of the handle 110 in the axial direction. The length of the protrusion part 220 in the axial direction is shorter than the length of the neck 120 in the axial direction. The length of the protrusion part 220 in the axial direction is shorter than the length of the head 130 in the axial direction. The length of the protrusion part 220 in the axial direction is shorter than the length of the main body protrusion part P40 in the axial direction.

Examples of motion of the secondary molded part Q with respect to the primary molded part P include movement of the secondary molded part Q with respect to the primary molded part P and rotation of the secondary molded part Q with respect to the primary molded part P. Movement of the secondary molded part Q with respect to the primary molded part P will be referred to as "relative movement of the secondary molded part Q". Rotation of the secondary molded part Q with respect to the primary molded part P will be referred to as "relative rotation of the secondary molded part Q".

Examples of relative movement of the secondary molded part Q include a first type relative movement, a second type relative movement, and a third type relative movement.

The first type relative movement is movement of the secondary molded part Q with respect to the primary molded part P in a direction including at least a component in the axial direction.

The second type relative movement is movement of the secondary molded part Q with respect to the primary molded part P in a direction including at least a component in the width direction.

The third type relative movement is movement of the secondary molded part Q with respect to the primary molded part P in a direction including at least a component in the thickness direction.

Examples of relative rotation of the secondary molded part Q include a first type relative rotation and a second type relative rotation.

The first type relative rotation is rotation of the secondary molded part Q with respect to the primary molded part P in a direction including at least a component in the first circumferential direction.

The second type relative rotation is rotation of the secondary molded part Q with respect to the primary molded part P in a direction including at least a component in the second circumferential direction.

FIGS. 7 and 8 will be referred to. The molded article 20 includes a restriction structure R. A constitution of the restriction structure R can be arbitrarily selected. The constitution of the restriction structure R is not limited to the exemplified constitution. The restriction structure R is constituted such that motion of the secondary molded part Q with respect to the primary molded part P is restricted. In an example, the restriction structure R is constituted such that at least one of relative movement of the secondary molded part Q and relative rotation of the secondary molded part Q is restricted.

For example, the restriction structure R includes one type or a plurality of types of inherent restriction structures. Each of the inherent restriction structures has a different structure. Each of the inherent restriction structures is constituted such that at least one of relative movement of the secondary molded part Q and relative rotation of the secondary molded part Q is restricted.

The inherent restriction structure is provided in the primary molded part P or the secondary molded part Q. Examples of the inherent restriction structure provided in the primary molded part P include a stepped part R10, a diameter varying part R20, a surface projection part R30, a protrusion part R40, a disposition part R50 (refer to FIG. 37 and the like), and an undercut part R60 (refer to FIG. 46 and the like). Examples of the inherent restriction structure provided in the secondary molded part Q include a surrounding part RQ.

In an example, the covering part Q40 is constituted such that the restriction structure R is covered. The covering part Q40 covers one or a plurality of inherent restriction structures of the plurality of types of inherent restriction structures.

In the illustrated example, the restriction structure R includes a plurality of types of inherent restriction structures. The restriction structure R includes the stepped part R10, the diameter varying part R20, the surface projection part R30, the protrusion part R40, and the surrounding part RQ.

A constitution of the stepped part R10 can be arbitrarily selected. The constitution of the stepped part R10 is not limited to the exemplified constitution. The stepped part R10 is constituted such that at least one of relative movement of the secondary molded part Q and relative rotation of the secondary molded part Q is restricted.

The stepped part R10 is provided in the primary molded part P. The stepped part R10 includes an intermediate surface. The intermediate surface is a surface provided between an upper part of the stepped part R10 and a lower part of the stepped part R10. The secondary molded part Q includes an end surface facing the intermediate surface of the stepped part R10 of the primary molded part P. The end surface of the secondary molded part Q is provided in an end part of the secondary molded part Q. In an example in which a stepped part is provided in the secondary molded part Q, the stepped part of the secondary molded part Q includes an end surface. Examples of the constitution of the stepped part R10 include first to seventh examples.

In the first example, the stepped part R10 is constituted such that the first type relative movement is restricted. In the second example, the stepped part R10 is constituted such that the second type relative movement is restricted. In the third example, the stepped part R10 is constituted such that the third type relative movement is restricted. In the fourth example, the stepped part R10 is constituted such that it has at least two constitutions of the first to third examples.

In the fifth example, the stepped part R10 is constituted such that the first type relative rotation is restricted. In the sixth example, the stepped part R10 is constituted such that the second type relative rotation is restricted. In the seventh example, the stepped part R10 is constituted such that it has both constitutions of the fifth example and the sixth example.

In the illustrated example, the restriction structure R includes one stepped part R10. The stepped part P11 of the primary molded part P corresponds to the stepped part R10 of the restriction structure R. The covering part Q40 covers the intermediate surface of the stepped part R10 and the lower part of the stepped part R10.

A constitution of the diameter varying part R20 can be arbitrarily selected. The constitution of the diameter varying part R20 is not limited to the exemplified constitution. The diameter varying part R20 is constituted such that a first relative movement is restricted.

The diameter varying part R20 is provided in the primary molded part P. The diameter varying part R20 is constituted such that the outer diameter varies in the axial direction. Examples of the diameter varying part R20 include a first example and a second example.

In the first example, the diameter varying part R20 is constituted such that relative movement in the first axial direction in the first type relative movement is restricted. In the diameter varying part R20, an outer diameter of the primary molded part P increases toward the first axial direction.

In the second example, the diameter varying part R20 is constituted such that relative movement in the second axial direction in the first type relative movement is restricted. In the diameter varying part R20, the outer diameter of the primary molded part P increases toward the second axial direction.

The restriction structure R includes one or a plurality of diameter varying parts R20. Examples of the diameter varying part R20 include a first diameter varying part R21, a second diameter varying part R22, a third diameter varying part R23, and a fourth diameter varying part R24.

The first diameter varying part R21 is constituted such that relative movement of the secondary molded part Q in the first axial direction or the second axial direction is restricted. The first diameter varying part R21 is positioned in the first axial direction with respect to other diameter varying parts R20. In an example, the first diameter varying part R21 is provided in the primary handle constitution part P10, the neck 120, or the head 130.

The second diameter varying part R22 is constituted such that relative movement of the secondary molded part Q in the first axial direction or the second axial direction is restricted. The second diameter varying part R22 is positioned in the second axial direction with respect to the first diameter varying part R21. In an example, the second diameter varying part R22 is provided in the primary handle constitution part P10, the neck 120, or the head 130.

The third diameter varying part R23 is constituted such that relative movement of the secondary molded part Q in the first axial direction or the second axial direction is restricted. The third diameter varying part R23 is positioned in the second axial direction with respect to the second diameter varying part R22. In an example, the third diameter varying part R23 is provided in the primary handle constitution part P10, the neck 120, or the head 130.

The fourth diameter varying part R24 is constituted such that relative movement of the secondary molded part Q in the first axial direction or the second axial direction is restricted. The fourth diameter varying part R24 is positioned in the second axial direction with respect to the second diameter varying part R22. In an example, the fourth diameter varying part R24 is provided in the primary handle constitution part P10, the neck 120, or the head 130.

A direction of relative movement related to relative movement of the secondary molded part Q restricted by the diameter varying part R20 will be referred to as "a restriction direction".

A relationship between the restriction directions of the diameter varying parts R20 in a form in which the restriction structure R includes the first diameter varying part R21 and the second diameter varying part R22 will be exemplified.

In a first example, the restriction direction in the first diameter varying part R21 is the first axial direction or the second axial direction. The restriction direction in the second diameter varying part R22 is the same direction as the restriction direction of the first diameter varying part R21.

In a second example, the restriction direction in the first diameter varying part R21 is the first axial direction or the second axial direction. The restriction direction in the second diameter varying part R22 is a direction opposite to the restriction direction of the first diameter varying part R21.

A relationship between the restriction directions of the diameter varying parts R20 in a form in which the restriction structure R includes the first diameter varying part R21, the second diameter varying part R22, and the third diameter varying part R23 will be exemplified.

In a first example, the restriction direction in the first diameter varying part R21 is the first axial direction or the second axial direction. The restriction direction in the second diameter varying part R22 is the same direction as the restriction direction of the first diameter varying part R21. The restriction direction in the third diameter varying part R23 is the same direction as the restriction direction of the first diameter varying part R21.

In a second example, the restriction direction in the first diameter varying part R21 is the first axial direction or the second axial direction. The restriction direction in the second diameter varying part R22 is a direction opposite to the restriction direction of the first diameter varying part R21. The restriction direction in the third diameter varying part R23 is the same direction as the restriction direction of the first diameter varying part R21.

In a third example, the restriction direction in the first diameter varying part R21 is the first axial direction or the second axial direction. The restriction direction in the second diameter varying part R22 is a direction opposite to the restriction direction of the first diameter varying part R21. The restriction direction in the third diameter varying part R23 is a direction opposite to the restriction direction of the first diameter varying part R21.

In a fourth example, the restriction direction in the first diameter varying part R21 is the first axial direction or the second axial direction. The restriction direction in the second diameter varying part R22 is the same direction as the restriction direction of the first diameter varying part R21. The restriction direction in the third diameter varying part R23 is a direction opposite to the restriction direction of the first diameter varying part R21.

A relationship between the restriction directions of the diameter varying parts R20 in a form in which the restriction structure R includes the first diameter varying part R21, the second diameter varying part R22, the third diameter varying part R23, and the fourth diameter varying part R24 will be exemplified.

In a first example, the restriction direction in the first diameter varying part R21 is the first axial direction or the second axial direction. The restriction direction in the second diameter varying part R22 is the same direction as the restriction direction of the first diameter varying part R21. The restriction direction in the third diameter varying part R23 is the same direction as the restriction direction of the first diameter varying part R21. The restriction direction in the fourth diameter varying part R24 is the same direction as the restriction direction of the first diameter varying part R21.

In a second example, the restriction direction in the first diameter varying part R21 is the first axial direction or the second axial direction. The restriction direction in the second diameter varying part R22 is a direction opposite to the restriction direction of the first diameter varying part R21. The restriction direction in the third diameter varying part R23 is the same direction as the restriction direction of the first diameter varying part R21. The restriction direction in the fourth diameter varying part R24 is the same direction as the restriction direction of the first diameter varying part R21.

In a third example, the restriction direction in the first diameter varying part R21 is the first axial direction or the second axial direction. The restriction direction in the second diameter varying part R22 is the same direction as the restriction direction of the first diameter varying part R21. The restriction direction in the third diameter varying part R23 is a direction opposite to the restriction direction of the first diameter varying part R21. The restriction direction in the fourth diameter varying part R24 is the same direction as the restriction direction of the first diameter varying part R21.

In a fourth example, the restriction direction in the first diameter varying part R21 is the first axial direction or the second axial direction. The restriction direction in the second diameter varying part R22 is the same direction as the restriction direction of the first diameter varying part R21. The restriction direction in the third diameter varying part R23 is the same direction as the restriction direction of the first diameter varying part R21. The restriction direction in the fourth diameter varying part R24 is a direction opposite to the restriction direction of the first diameter varying part R21.

In a fifth example, the restriction direction in the first diameter varying part R21 is the first axial direction or the second axial direction. The restriction direction in the second diameter varying part R22 is a direction opposite to the restriction direction of the first diameter varying part R21. The restriction direction in the third diameter varying part R23 is the same direction as the restriction direction of the first diameter varying part R21. The restriction direction in the fourth diameter varying part R24 is a direction opposite to the restriction direction of the first diameter varying part R21.

In a sixth example, the restriction direction in the first diameter varying part R21 is the first axial direction or the second axial direction. The restriction direction in the second diameter varying part R22 is a direction opposite to the restriction direction of the first diameter varying part R21. The restriction direction in the third diameter varying part R23 is a direction opposite to the restriction direction of the first diameter varying part R21. The restriction direction in the fourth diameter varying part R24 is the same direction as the restriction direction of the first diameter varying part R21.

In a seventh example, the restriction direction in the first diameter varying part R21 is the first axial direction or the second axial direction. The restriction direction in the second diameter varying part R22 is the same direction as the restriction direction of the first diameter varying part R21. The restriction direction in the third diameter varying part R23 is a direction opposite to the restriction direction of the first diameter varying part R21. The restriction direction in the fourth diameter varying part R24 is a direction opposite to the restriction direction of the first diameter varying part R21.

In an eighth example, the restriction direction in the first diameter varying part R21 is the first axial direction or the second axial direction. The restriction direction in the second diameter varying part R22 is a direction opposite to the restriction direction of the first diameter varying part R21. The restriction direction in the third diameter varying part R23 is a direction opposite to the restriction direction of the first diameter varying part R21. The restriction direction in the fourth diameter varying part R24 is a direction opposite to the restriction direction of the first diameter varying part R21.

In the illustrated example, the restriction structure R includes the first diameter varying part R21 to the fourth diameter varying part R24. The covering part Q40 covers the first diameter varying part R21 to the fourth diameter varying part R24.

The first end part P20A of the constricted part P20 and a portion of the intermediate part P20C correspond to the first diameter varying part R21. A portion of the intermediate part P20C is a part positioned in the first axial direction with respect to the thinnest part in the constricted part P20.

The second end part P20B of the constricted part P20 and a portion of the intermediate part P20C correspond to the second diameter varying part R22. A portion of the intermediate part P20C is a part positioned in the second axial direction with respect to the thinnest part in the constricted part P20.

The tapered part P30 of the primary molded part P corresponds to the third diameter varying part R23. The main body protrusion part P40 of the primary molded part P corresponds to the fourth diameter varying part R24.

A constitution of the surface projection part R30 can be arbitrarily selected. The constitution of the surface projection part R30 is not limited to the exemplified constitution. The surface projection part R30 is constituted such that relative movement of the secondary molded part Q and relative rotation of the secondary molded part Q are restricted.

The surface projection part R30 is provided in the primary molded part P. The surface projection part R30 is constituted such that unevenness is applied to the outer surface PF of the primary molded part P.

In the illustrated example, the restriction structure R includes one surface projection part R30. The surface projection part 410 of the primary molded part P corresponds to the surface projection part R30 of the restriction structure R. One surface projection part 410 is constituted of a group of a plurality of geometrically-shaped surfaces 420 which are adjacent to each other in a manner of sharing a side or a vertex. The covering part Q40 covers the surface projection part R30.

A constitution of the protrusion part R40 can be arbitrarily selected. The constitution of the protrusion part R40 is not limited to the exemplified constitution. The protrusion part R40 is constituted such that relative movement of the secondary molded part Q and relative rotation of the secondary molded part Q are restricted.

The protrusion part R40 is provided in the primary molded part P. The protrusion part R40 is constituted to protrude in a direction intersecting a center axis of the primary molded part P with respect to the outer surface PF of the primary molded part P.

Examples of a form in which a plurality of protrusion parts R40 is included in the restriction structure R include an example A and an example B. In the example A, the plurality of protrusion parts R40 is regularly disposed. In the example B, the plurality of protrusion parts R40 is irregularly disposed. Examples of details of the example A include examples A1 to A12.

In the example A1, the restriction structure R includes a group of the plurality of protrusion parts R40 arrayed in the axial direction. In the example A2, the restriction structure R includes a plurality of groups in the example A1.

In the example A3, the restriction structure R includes a group of the plurality of protrusion parts R40 arrayed in the width direction. In the example A4, the restriction structure R includes a plurality of groups in the example A3.

In the example A5, the restriction structure R includes a group of the plurality of protrusion parts R40 arrayed in the thickness direction. In the example A6, the restriction structure R includes a plurality of groups in the example A5.

In the example A7, the restriction structure R includes a group of the plurality of protrusion parts R40 arrayed in the circumferential direction. In the example A8, the restriction structure R includes a plurality of groups in the example A7.

In the example A9, the restriction structure R includes a group of the plurality of protrusion parts R40 arrayed in a direction different from those in the examples A1 to A8. In the example A10, the restriction structure R includes a plurality of groups in the example A9.

In the example A11, the restriction structure R includes at least two of the constitutions of the examples A1 to A10. In the example A12, the restriction structure R includes at least one of the constitutions of the examples A1 to A11 and the constitution of the example B.

In the illustrated example, the restriction structure R includes a plurality of protrusion parts R40. The protrusion parts P13 of the primary molded part P correspond to the protrusion parts R40 of the restriction structure R. The covering part Q40 covers the plurality of protrusion parts R40.

A constitution of the surrounding part RQ can be arbitrarily selected. The constitution of the surrounding part RQ is not limited to the exemplified constitution. The surrounding part RQ is constituted such that relative movement of the secondary molded part Q and relative rotation of the secondary molded part Q are restricted.

The surrounding part RQ is provided in the secondary molded part Q. The surrounding part RQ is constituted such that it extends in the circumferential direction. The surrounding part RQ restricts relative movement of the secondary molded part Q and relative rotation of the secondary molded part Q by widening a joint area between the primary molded part P and the secondary molded part Q in the circumferential direction.

In an example, the surrounding part RQ is constituted such that the outer surface PF of the primary molded part P positioned in the vicinity of the surrounding part RQ and the outer surface QF of the surrounding part RQ are connected to each other. A portion of the outer surface 20F of the molded article 20 constituted of the outer surface QF of the surrounding part RQ and the outer surface PF of the primary molded part P positioned in the vicinity of the surrounding part RQ is a smooth surface.

Figure 37:
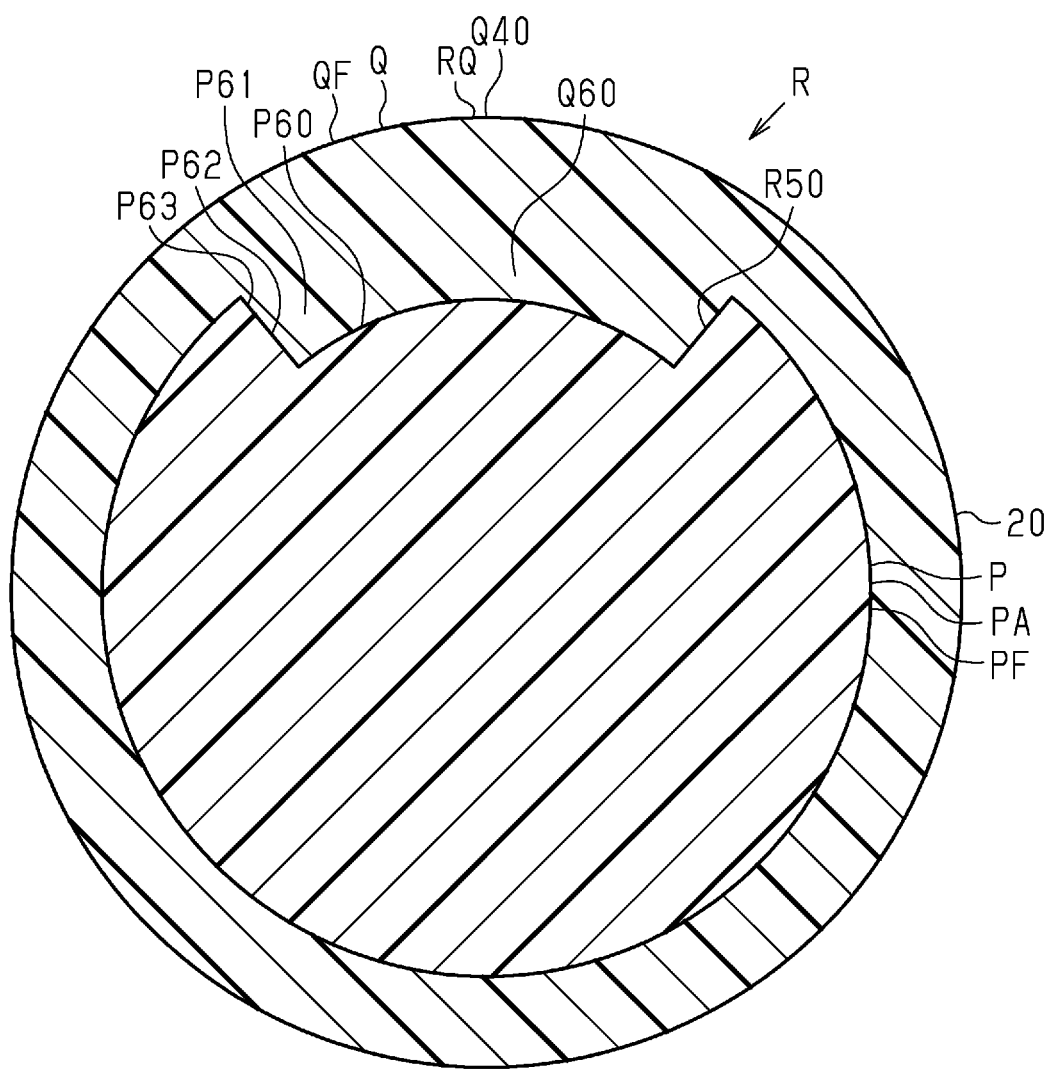
FIG. 37 is a cross-sectional view of the molded article according to a sixth embodiment.
Figure 40:
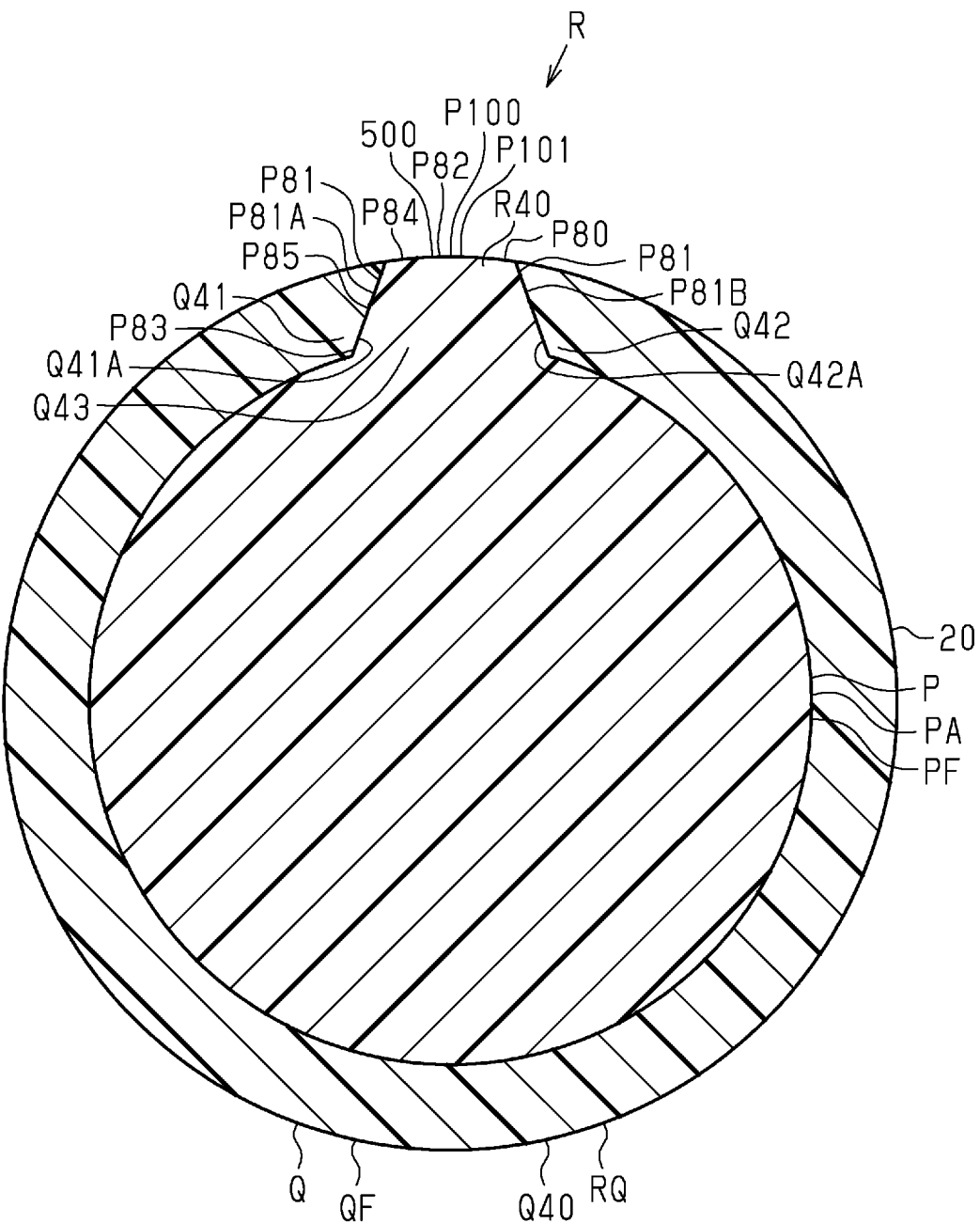
FIG. 40 is a cross-sectional view of the molded article according to a ninth embodiment.

Examples of the surrounding part RQ include an example A and an example B. In the example A, the surrounding part RQ is constituted such that it makes one round around the primary molded part P. FIG. 37 illustrates an example of the example A. In the example B, a length of the surrounding part RQ in the circumferential direction is shorter than one round around the primary molded part P. FIG. 40 illustrates an example of the example B. The surrounding part RQ of the example B includes a first circumferential end part Q41 and a second circumferential end part Q42 in the circumferential direction.

In an example, the first circumferential end part Q41 is constituted such that the outer surface PF of the primary molded part P positioned in the vicinity of the first circumferential end part Q41 and the outer surface QF of the first circumferential end part Q41 are connected to each other. A portion of the outer surface 20F of the molded article 20 constituted of the outer surface QF of the first circumferential end part Q41 and the outer surface PF of the primary molded part P positioned in the vicinity of the first circumferential end part Q41 is a smooth surface.

In an example, the second circumferential end part Q42 is constituted such that the outer surface PF of the primary molded part P positioned in the vicinity of the second circumferential end part Q42 and the outer surface QF of the second circumferential end part Q42 are connected to each other. A portion of the outer surface 20F of the molded article 20 constituted of the outer surface QF of the second circumferential end part Q42 and the outer surface PF of the primary molded part P positioned in the vicinity of the second circumferential end part Q42 is a smooth surface.

In a cross section of the molded article 20 parallel to the third reference surface, a segment connecting the center axis of the primary molded part P and a part closest to the center axis of the primary molded part P in the first circumferential end part Q41 to each other will be referred to as "a first segment". In a cross section of the molded article 20 parallel to the third reference surface, a segment connecting the center axis of the primary molded part P and a part closest to the center axis of the primary molded part P in the second circumferential end part Q42 to each other will be referred to as "a second segment". In a cross section of the molded article parallel to the third reference surface, an angle formed by the first segment and the second segment will be referred to as "a circumferential angle".

Regarding details of the example B, the circumferential angle is included in a predetermined range related to the circumferential angle. The predetermined range will be exemplified. In a first example, the predetermined range is a range of a lower limit circumferential angle or larger. In a second example, the predetermined range is a range of an upper limit circumferential angle or smaller. In a third example, the predetermined range is a range of the lower limit circumferential angle to the upper limit circumferential angle.

For example, the lower limit circumferential angle is selected from 5°, 10°, and 15°. For example, the upper limit circumferential angle is selected from 180°. 270°, and 355°. Examples of the predetermined range of the third example include third A to third I examples as follows.

In the third A example, the predetermined range is a range of 5° to 180°. In the third B example, the predetermined range is a range of 5° to 270°. In the third C example, the predetermined range is a range of 5° to 355°.

In the third D example, the predetermined range is a range of 10° to 180°. In the third E example, the predetermined range is a range of 10° to 270°. In the third F example, the predetermined range is a range of 10° to 355°.

In the third G example, the predetermined range is a range of 15° to 180°. In the third H example, the predetermined range is a range of 15° to 270°. In the third I example, the predetermined range is a range of 15° to 355°.

In the illustrated example, the restriction structure R includes one surrounding part RQ. The covering part Q40 making one round around the primary handle constitution part P10 corresponds to the surrounding part RQ of the restriction structure R.

FIGS. 1 to 8 will be referred to. The molded article 20 is molded by injection molding. For example, the method of manufacturing the molded article 20 includes a primary molding step, a secondary molding step, and a removing step. The secondary molding step is performed after the primary molding step is performed. The removing step is performed after the secondary molding step is performed.

In the primary molding step, a primary mold is used. The primary mold is used for molding the primary molded part P. For example, the primary mold includes a stationary mold, a movable mold, and one or a plurality of ejector pins. The primary mold includes as many ejector pins as the number of pressurized parts included in the pressurized structure 200.

In the secondary molding step, a secondary mold is used. The secondary mold is used for molding the secondary molded part Q. For example, the secondary mold includes a stationary mold, a movable mold, and one or a plurality of ejector pins. The secondary mold includes as many ejector pins as the number of pressurized parts included in the pressurized structure 200.

The movable mold can move in the first predetermined direction with respect to the stationary mold. The first predetermined direction includes a closing direction and an opening direction. The closing direction is a direction in which the movable mold approaches the stationary mold. The opening direction is a direction opposite to the closing direction.

For example, the plurality of ejector pins includes a first ejector pin and a second ejector pin. The first ejector pin corresponds to the particular part 210 of the pressurized structure 200. For example, a tip surface of the first ejector pin is a flat surface. The second ejector pin corresponds to the protrusion part 220 of the pressurized structure 200. For example, a tip surface of the second ejector pin is a flat surface.

The plurality of ejector pins can relatively move in the second predetermined direction with respect to the movable mold. The second predetermined direction includes an extrusion direction and an intrusion direction. The extrusion direction is a direction in which the plurality of ejector pins protrudes from the movable mold. The intrusion direction is a direction opposite to the extrusion direction.

For example, the primary molding step includes steps A1 to A5. The step A2 is performed after the step A1 is performed. The step A3 is performed after the step A2 is performed. The step A4 is performed after the step A3 is performed. The step A5 is performed after the step A4 is performed. The steps A1 to A4 correspond to the molding step and the primary molding step. The step A5 corresponds to the extruding step and the primary extruding step.

In the step A1, the primary mold is subjected to mold clamping. In mold clamping, the movable mold moves in the closing direction with respect to the stationary mold. A primary cavity is formed between the movable mold and the stationary mold. A shape of the primary cavity corresponds to a shape of the primary molded part P.

In the step A2, the primary cavity is filled with a resin material corresponding to the primary molded part P. The resin material in a melted state flows in the primary cavity.

In the step A3, the filled resin material is cooled. The resin material is solidified. In the primary cavity, the primary molded part P illustrated in FIG. 7 is molded. A parting line is formed in a part corresponding to a boundary between the movable mold and the stationary mold in the primary molded part P.

In the step A4, the primary mold is subjected to mold opening. In mold opening, the movable mold moves in the opening direction with respect to the stationary mold. The movable mold is separated from the stationary mold.

In the step A5, the first ejector pin and the second ejector pin move in the extrusion direction with respect to the movable mold. The first ejector pin presses the particular part 210 of the primary molded part P in the extrusion direction. The second ejector pin presses the protrusion part 220 of the primary molded part P in the extrusion direction. The primary molded part P is separated from the movable mold and is taken out from the primary mold. The primary molded part P is set in the movable mold of the secondary mold.

When the protrusion part 220 is constituted as a part different from the gate of the primary molded part P, in an example, the gate of the primary molded part P is connected to a rear surface of the first end part P10A of the primary handle constitution part P10. The gate of the primary molded part P is removed before the primary molded part P is set in the movable mold of the secondary mold. When the protrusion part 220 includes the gate of the primary molded part P, the primary molded part P is set in the movable mold of the secondary mold without removing the gate.

For example, the secondary molding step includes steps B1 to B5. The step B2 is performed after the step B1 is performed. The step B3 is performed after the step B2 is performed. The step B4 is performed after the step B3 is performed. The step B5 is performed after the step B4 is performed. The steps B1 to B4 correspond to the molding step and the secondary molding step. The step B5 corresponds to the extruding step and the secondary extruding step.

In the step B1, the secondary mold is subjected to mold clamping. In mold clamping, the movable mold moves in the closing direction with respect to the stationary mold. A secondary cavity is formed between the movable mold and the stationary mold. The secondary cavity is formed in the vicinity of the primary handle constitution part P10 of the primary molded part P. A shape of the secondary cavity corresponds to a shape of the secondary molded part Q.

The primary molded part P is fixed to the secondary mold. A state in which the primary molded part P is fixed to the secondary mold will be referred to as "a fixed state". In the fixed state, a part of the primary molded part P positioned in the first axial direction with respect to the secondary cavity and a part of the primary molded part P positioned in the second axial direction with respect to the secondary cavity are fixed to the secondary mold.

The neck 120 and the head 130 are positioned in the first axial direction with respect to the secondary cavity. The neck 120 and the head 130 are fixed to the secondary mold. The protrusion part 220 is positioned in the second axial direction with respect to the secondary cavity. The protrusion part 220 is fixed to the secondary mold.

In the step B2, the secondary cavity is filled with a resin material corresponding to the secondary molded part Q. The resin material in a melted state flows in the secondary cavity.

In the step B3, the filled resin material is cooled. The resin material is solidified. In the secondary cavity, the secondary molded part Q is molded on the outer surface PF of the primary molded part P. The molded article 20 illustrated in FIG. 3 is molded by molding of the secondary molded part Q. A parting line is formed in a part corresponding to a boundary between the movable mold and the stationary mold in the secondary molded part Q.

In the step B4, the secondary mold is subjected to mold opening. In mold opening, the movable mold moves in the opening direction with respect to the stationary mold. The movable mold is separated from the stationary mold.

In the step B5, the first ejector pin and the second ejector pin move in the extrusion direction with respect to the movable mold. The first ejector pin presses the particular part 210 of the pressurized structure 200 in the extrusion direction. The second ejector pin presses the protrusion part 220 of the pressurized structure 200 in the extrusion direction. The molded article 20 is separated from the movable mold and is taken out from the secondary mold. The molded article 20 is set in a cutting processing apparatus.

In the removing step, the protrusion part 220 of the molded article 20 is removed by the cutting processing apparatus. The molded article 20 illustrated in FIG. 1 is manufactured by performing the removing step.

For example, a method of manufacturing the toothbrush 10A includes a fixing step. The fixing step is performed after the method of manufacturing the molded article 20 is performed. In the fixing step, the plurality of tufts is fixed to the head 130 of the molded article 20. The toothbrush 10A illustrated in FIG. 1 is manufactured by performing the fixing step.

(Effect 1)

For example, it is possible to achieve the following effects by means of the constitution exemplified in each of the embodiments.

In the secondary molding step, a resin material corresponding to the secondary molded part Q is supplied to a part around the primary molded part P. Due to a force applied to the primary molded part P from a resin material corresponding to the secondary molded part Q, deformation may occur in the covering target part PC of the primary molded part P. Deformation of the primary molded part P occurring in the secondary molding step will be referred to as "deformation during the secondary molding". The primary molded part P in which deformation during the secondary molding has occurred will be referred to as "a heteromorphic primary molded part P".

With regard to the presence or absence of occurrence of deformation during the secondary molding, a state of the molded article 20 is classified into a state in which deformation during the secondary molding has occurred and a state in which deformation during the secondary molding has not occurred. For example, deformation during the secondary molding is classified into vertical deformation, lateral deformation, and complex deformation on the basis of the direction of deformation.

Vertical deformation is deformation in the thickness direction. Lateral deformation is deformation in the width direction. Complex deformation includes vertical deformation and lateral deformation. The heteromorphic primary molded part P in which vertical deformation has occurred includes a part biased in the thickness direction with respect to the undeformed primary molded part P. The heteromorphic primary molded part P in which lateral deformation has occurred includes a part biased in the width direction with respect to the undeformed primary molded part P.

The presence or absence of vertical deformation or lateral deformation of the primary molded part P in the molded article 20 can be confirmed as follows, for example. The shape of the primary molded part P of the molded article 20 in a front view contrasts with the designed shape of the primary molded part P. Examples of a contrast method include visual recognition or image analysis.

When a part biased in the thickness direction is included in the primary molded part P of the molded article 20 with respect to the designed primary molded part P, it is judged that the primary molded part P corresponds to the heteromorphic primary molded part P in which vertical deformation has occurred.

When a part biased in the width direction is included in the primary molded part P of the molded article 20 with respect to the designed primary molded part P, it is judged that the primary molded part P corresponds to the heteromorphic primary molded part P in which lateral deformation has occurred.

A state in which deformation during the secondary molding has occurred denotes a state in which vertical deformation, lateral deformation, or complex deformation has occurred. A state in which deformation during the secondary molding has not occurred denotes a state in which vertical deformation, lateral deformation, or complex deformation has not occurred.

A state in which deformation during the secondary molding has been curbed denotes a state in which none of vertical deformation, lateral deformation, and complex deformation has occurred or a state in which a degree of vertical deformation, lateral deformation, or complex deformation is small. A state in which the degree of vertical deformation, lateral deformation, or complex deformation is small denotes a state in which an amount of deformation of the molded article 20 due to vertical deformation, lateral deformation, or complex deformation is small compared to the molded article 20 not including the exposed structure 500 which has been manufactured under the same conditions.

A state in which lateral deformation has been curbed denotes a state in which lateral deformation has not occurred or a state in which the degree of lateral deformation is small. A state in which the degree of lateral deformation is small denotes a state in which the amount of deformation of the molded article 20 due to lateral deformation is small compared to the molded article 20 not including the exposed structure 500 which has been manufactured under the same conditions.

A state in which vertical deformation has been curbed denotes a state in which vertical deformation has not occurred or a state in which the degree of vertical deformation is small. A state in which the degree of vertical deformation is small denotes a state in which the amount of deformation of the molded article 20 due to vertical deformation is small compared to the molded article 20 not including the exposed structure 500 which has been manufactured under the same conditions.

A state in which complex deformation has been curbed denotes a state in which complex deformation has not occurred or a state in which the degree of complex deformation is small. A state in which the degree of complex deformation is small denotes a state in which the amount of deformation of the molded article 20 due to complex deformation is small compared to the molded article 20 not including the exposed structure 500 which has been manufactured under the same conditions.

A state in which lateral deformation in complex deformation has been curbed denotes a state in which the degree of lateral deformation in complex deformation is small. A state in which the degree of lateral deformation in complex deformation is small denotes a state in which the amount of deformation of the molded article 20 due to lateral deformation in complex deformation is small compared to the molded article 20 not including the exposed structure 500 which has been manufactured under the same conditions.

A state in which vertical deformation in complex deformation has been curbed denotes a state in which the degree of vertical deformation in complex deformation is small. A state in which the degree of vertical deformation in complex deformation is small denotes a state in which the amount of deformation of the molded article 20 due to vertical deformation in complex deformation is small compared to the molded article 20 not including the exposed structure 500 which has been manufactured under the same conditions.

In an example of the molded article 20, the molded article 20 includes the primary molded part P that includes the covering target part PC, the secondary molded part Q that includes the covering part Q40 covering the covering target part PC, and the exposed structure 500 that includes one or a plurality of penetration parts P100 penetrating the covering part Q40. The penetration parts P100 include the exposed surface P101 exposed with respect to the covering part Q40. The penetration parts P100 is provided in the primary molded part P such that a force received by the primary molded part P from a resin material corresponding to the secondary molded part Q so as to deform the primary molded part P in the secondary molding step of molding the secondary molded part Q is able to be transferred to the mold through the exposed surface P101.

According to the foregoing constitution, for example, it is possible to achieve the following effects. Since the covering target part PC of the primary molded part P is covered by the covering part Q40 of the secondary molded part Q, an area of a part in which the primary molded part P and the secondary molded part Q are joined to each other increases. A position of the secondary molded part Q with respect to the primary molded part P is made stable. In the secondary molding step of molding the secondary molded part Q, the exposed surface P101 of the penetration part P100 comes into contact with the mold. Since a force received by the primary molded part P from a resin material corresponding to the secondary molded part Q is transferred to the mold, deformation during the secondary molding is curbed.

In an example of the molded article 20, the penetration parts P100 is constituted to protrude with respect to the outer surface PF of the covering target part PC.

According to the foregoing constitution, for example, it is possible to achieve the following effects. The exposed surface P101 of the penetration part P100 is likely to appropriately come into contact with the mold.

In an example of the molded article 20, the exposed structure 500 includes a plurality of first type penetration parts P100X1.

According to the foregoing constitution, for example, it is possible to achieve the following effects. The effect of curbing deformation during the secondary molding is enhanced.

In an example of the molded article 20, the exposed structure 500 includes a plurality of second type penetration parts P100X2.

According to the foregoing constitution, for example, it is possible to achieve the following effects. The effect of curbing deformation during the secondary molding is enhanced.

In an example of the molded article 20, the primary molded part P includes a recessed part P60 including a disposition space P61. The disposition space P61 is constituted such that a portion of the secondary molded part Q is able to be disposed.

According to the foregoing constitution, for example, it is possible to achieve the following effects. The effect of curbing deformation during the secondary molding is enhanced.

In an example of the molded article 20, the primary molded part P includes a protrusion part P80 covered by the covering part Q40 of the secondary molded part Q.

According to the foregoing constitution, for example, it is possible to achieve the following effects. The effect of curbing deformation during the secondary molding is enhanced.

In an example of the molded article 20, a raw material of the secondary molded part Q includes a transparent resin or a translucent resin.

According to the foregoing constitution, for example, it is possible to achieve the following effects. It is possible to expect that design of the molded article 20 be improved.

In an example of the molded article 20, a raw material of the primary molded part P includes a polyacetal, a polypropylene, or a saturated polyester-based resin.

According to the foregoing constitution, for example, it is possible to achieve the following effects. Wear resistance of the primary molded part P and physical properties of the toothbrush 10A are improved. For example, the physical properties of the toothbrush 10A are an epilation strength related to tufts.

In an example of the molded article 20, a thermoplastic resin forming the secondary molded part Q is a transparent resin or a translucent resin.

According to the foregoing constitution, for example, it is possible to achieve the following effects. It is possible to expect that design of the molded article 20 be improved.

In an example of the molded article 20, the molded article 20 is the molded article 20 for the toothbrush 10A.

According to the foregoing constitution, for example, it is possible to achieve the following effects. It is possible to achieve the foregoing various effects in the toothbrush 10A.

(Effect 2)

For example, it is possible to achieve the following effects by means of the constitution exemplified in each of the embodiments.

In an example of the molded article 20, the exposed structure 500 includes a plurality of first type penetration parts P100X1. The plurality of first type penetration parts P100X1 is arranged with intervals therebetween in the axial direction.

According to the foregoing constitution, for example, it is possible to achieve the following effects. The effect of curbing deformation during the secondary molding is enhanced. In an example of the molded article 20, the exposed structure 500 includes a plurality of second type penetration parts P100X2. The plurality of second type penetration parts P100X2 is arranged with intervals therebetween in the axial direction.

According to the foregoing constitution, for example, it is possible to achieve the following effects. The effect of curbing deformation during the secondary molding is enhanced.

In an example of the molded article 20, the secondary molded part Q includes the gate corresponding surface corresponding to the gate related part of the secondary molded part Q and the opposite surface positioned on a side opposite to the gate corresponding surface. The exposed surface P101 includes at least a part corresponding to the opposite surface.

According to the foregoing constitution, for example, it is possible to achieve the following effects. The effect of curbing deformation during the secondary molding is enhanced.

In an example of the molded article 20, the exposed surface P101 is provided such that it does not overlap the parting line of the molded article 20.

According to the foregoing constitution, for example, it is possible to achieve the following effects. It is possible to expect that design of the molded article 20 be improved.

In an example of the molded article 20, the covering target part PC includes the constricted part P20.

According to the foregoing constitution, for example, it is possible to achieve the following effects. Stability related to the position of the secondary molded part Q with respect to the primary molded part P is further enhanced.

In an example of the molded article 20, the exposed surface P101 related to at least one penetration part P100 includes a curved surface.

According to the foregoing constitution, for example, it is possible to achieve the following effects. A force applied to the primary molded part P in the secondary molding step is likely to be dispersed throughout a wide range. For example, this contributes to enhancement of the effect of curbing deformation during the secondary molding.

In an example of the molded article 20, the exposed surface P101 related to at least one penetration part P100 is positioned in the inward radial direction with respect to the outer surface QF of the secondary molded part Q.

According to the foregoing constitution, for example, it is possible to achieve the following effects. The exposed surface P101 is likely to be inconspicuous. For example, this contributes to improvement in design of the molded article 20.

In an example of the molded article 20, the exposed structure 500 includes one or a plurality of penetration parts P100. At least one penetration part P100 included in the exposed structure 500 is provided on an opposite surface of the covering target part PC.

According to the foregoing constitution, for example, it is possible to achieve the following effects. Vertical deformation or vertical deformation in complex deformation is curbed.

In an example of the molded article 20, the exposed structure 500 includes one or a plurality of first type penetration parts P100X1 provided on the opposite surface of the covering target part PC, and one or a plurality of second type penetration parts P100X2 provided on the opposite surface of the covering target part PC.

According to the foregoing constitution, for example, it is possible to achieve the following effects. The effect of curbing deformation during the secondary molding is enhanced.

In an example of the molded article 20, at least one penetration part P100 and the covering part Q40 positioned in the vicinity thereof constitute the cave-in structure 501.

According to the foregoing constitution, for example, it is possible to achieve the following effects. The exposed surface P101 of the penetration part P100 is likely to be inconspicuous. It is possible to expect that design of the molded article 20 be improved. Hand slippage with respect to the handle 110 is unlikely to occur when using the toothbrush 10A. Operability of the toothbrush 10A is improved.

In an example of the molded article 20, the exposed structure 500 includes the first group related to the penetration parts P100. A value obtained by multiplying the reference hand breadth by a predetermined coefficient is set as a particular distance that is a distance between the particular position of the second end part 110B of the main body 100 and the particular position of the first group in the axial direction.

According to the foregoing constitution, for example, it is possible to achieve the following effects. The handle 110 is likely to be gripped. Operability when the toothbrush 10A is used is improved.

(Effect 3)

For example, it is possible to achieve the following effects by means of the constitution exemplified in each of the embodiments.

In an example of the molded article 20, the molded article 20 includes the primary molded part P that is formed of a hard thermoplastic resin, the secondary molded part Q that is formed of a hard thermoplastic resin, and the restriction structure R that restricts motion of the secondary molded part Q with respect to the primary molded part P. The secondary molded part Q includes the covering part Q40 covering the outer surface PF of the primary molded part P.

According to the foregoing constitution, for example, it is possible to achieve the following effects. Since motion of the secondary molded part Q with respect to the primary molded part P is restricted by the restriction structure R, the position of the secondary molded part Q with respect to the primary molded part P is made stable. Since the covering part Q40 is included in the secondary molded part Q, the area of a part in which the primary molded part P and the secondary molded part Q are joined to each other increases. In this regard as well, the position of the secondary molded part Q with respect to the primary molded part P is made stable.

In an example of the molded article 20, the covering part Q40 includes the first end part Q40A, the second end part Q40B, and the intermediate part Q40C in the axial direction of the molded article 20. The first end part Q40A, the second end part Q40B, and the intermediate part Q40C are joined to the outer surface PF of the primary molded part P.

According to the foregoing constitution, for example, it is possible to achieve the following effects. The effect of restricting motion of the secondary molded part Q with respect to the primary molded part P is enhanced.

In an example of the molded article 20, the covering part Q40 is constituted such that at least a portion of the restriction structure R is covered.

According to the foregoing constitution, for example, it is possible to achieve the following effects. A hand of a user is unlikely to touch the restriction structure R.

In an example of the molded article 20, the restriction structure R includes the diameter varying part R20 provided in the primary molded part P. The diameter varying part R20 is constituted such that the outer diameter varies in the axial direction of the molded article 20.

According to the foregoing constitution, for example, it is possible to achieve the following effects. Motion of the secondary molded part Q with respect to the primary molded part P is appropriately restricted.

In an example of the molded article 20, the restriction structure R includes the surface projection part R30 provided in the primary molded part P. The surface projection part R30 is constituted such that a projection is applied to the outer surface PF of the primary molded part P.

According to the foregoing constitution, for example, it is possible to achieve the following effects. Motion of the secondary molded part Q with respect to the primary molded part P is appropriately restricted.

In an example of the molded article 20, the restriction structure R includes the protrusion part R40 provided in the primary molded part P. The protrusion part R40 is constituted to protrude in a direction intersecting the center axis of the molded article 20.

According to the foregoing constitution, for example, it is possible to achieve the following effects. Motion of the secondary molded part Q with respect to the primary molded part P is appropriately restricted.

In an example of the molded article 20, the restriction structure R includes the disposition part R50 provided in the primary molded part P. The disposition part R50 includes a space in which a portion of the secondary molded part Q is disposed.

According to the foregoing constitution, for example, it is possible to achieve the following effects. Motion of the secondary molded part Q with respect to the primary molded part P is appropriately restricted.

In an example of the molded article 20, the restriction structure R includes the undercut part R60 provided in the primary molded part P.

According to the foregoing constitution, for example, it is possible to achieve the following effects. Motion of the secondary molded part Q with respect to the primary molded part P is appropriately restricted.

In an example of the molded article 20, the restriction structure R includes the surrounding part RQ provided in the secondary molded part Q. The surrounding part RQ is constituted such that it extends in the circumferential direction of the molded article 20.

According to the foregoing constitution, for example, it is possible to achieve the following effects. Motion of the secondary molded part Q with respect to the primary molded part P is appropriately restricted.

In an example of the molded article 20, the molded article 20 includes the primary molded part P, the secondary molded part Q provided in the primary molded part P, and the decoration part 400 provided in the primary molded part P. The secondary molded part Q is constituted of a transparent resin or a translucent resin and includes the decoration exterior part Q50 covering the decoration part 400.

According to the foregoing constitution, for example, it is possible to achieve the following effects. Since the decoration part 400 is provided on the outer surface PF of the primary molded part P, it is possible to expect that design of the oral care product 10 be improved. Since the decoration part 400 is covered by the decoration exterior part Q50, the decoration part 400 is visually recognized via the decoration exterior part Q50. In this regard as well, it is possible to expect that design of the oral care product 10 be improved.

In an example of the molded article 20, the decoration part 400 includes the surface projection part 410 applying unevenness to the outer surface PF of the primary molded part P.

According to the foregoing constitution, for example, it is possible to achieve the following effects. Since incident light is reflected in diverse directions, it is possible to expect that design of the oral care product 10 be improved. Since the decoration part 400 including the surface projection part 410 is covered by the decoration exterior part Q50, operability of the oral care product 10 is improved.

In an example of the molded article 20, the surface projection part 410 includes a plurality of geometrically-shaped surfaces 420.

According to the foregoing constitution, for example, it is possible to achieve the following effects. The appearance of the surface projection part 410 is well-organized, and it is possible to expect that design of the oral care product 10 be improved.

In an example of the molded article 20, the geometrically-shaped surfaces 420 is a surface having a polygonal shape.

According to the foregoing constitution, for example, it is possible to achieve the following effects. The appearance of the surface projection part 410 is well-organized, and it is possible to expect that design of the oral care product 10 be improved.

In an example of the molded article 20, the surface projection part 410 includes the mountain shape part 430. The mountain shape part 430 is constituted of at least two geometrically-shaped surfaces 420.

According to the foregoing constitution, for example, it is possible to achieve the following effects. A three-dimensional effect in the surface projection part 410 is emphasized, and it is possible to expect that design of the oral care product 10 be improved.

In an example of the molded article 20, the surface projection part 410 includes the valley shape part 440. The valley shape part 440 is constituted of at least two geometrically-shaped surfaces 420.

According to the foregoing constitution, for example, it is possible to achieve the following effects. A three-dimensional effect in the surface projection part 410 is emphasized, and it is possible to expect that design of the oral care product 10 be improved.

In an example of the molded article 20, the plurality of geometrically-shaped surfaces 420 is disposed along the reference line. The reference line is a helix.

According to the foregoing constitution, for example, it is possible to achieve the following effects. Disposition of the plurality of geometrically-shaped surfaces 420 is well-organized, and it is possible to expect that design of the oral care product 10 be improved.

In an example of the molded article 20, the molded article 20 includes the handle 110.

The primary molded part P includes the primary handle constitution part P10 constituting the handle 110. The secondary molded part Q includes the secondary handle constitution part Q10 constituting the handle 110. The decoration part 400 is provided on the outer surface PF of the primary handle constitution part P10. The secondary handle constitution part Q10 includes the decoration exterior part Q50.

According to the foregoing constitution, for example, it is possible to achieve the following effects. Since the decoration part 400 is provided in the handle 110 that is one of main parts of the molded article 20, it is possible to expect that design of the oral care product 10 be improved.

In an example of the molded article 20, the molded article 20 is used for the toothbrush 10A.

According to the foregoing constitution, for example, it is possible to achieve the following effects. It is possible to expect that design of the toothbrush 10A be improved.

In an example of the oral care product 10, the oral care product 10 includes the molded article 20.

According to the foregoing constitution, for example, it is possible to achieve the following effects. It is possible to expect that design of the oral care product 10 be improved.

In an example of the molded article 20, the molded article 20 has the following constitution. The molded article 20 includes the main body 100 and the pressurized structure 200 constituted such that it can be pressurized by means of the ejector pins. The pressurized structure 200 includes the protrusion part 220 protruding with respect to the main body 100.

According to the foregoing constitution, for example, it is possible to achieve the following effects. The protrusion part 220 can be pressed by means of the ejector pins in the extruding step. For this reason, the pressurized part is reduced in the molded article 20. When the pressurized part is reduced in the molded article 20, for example, it is possible to achieve the following effects. It is possible to expect that design of the oral care product 10 be improved. A foreign matter is unlikely to gather on a surface of the main body 100.

Examples of a state in which the pressurized part is reduced in the molded article 20 include a state in which the pressurized part is not present in the molded article 20, and a state in which the area of the pressurized part in the main body 100 of the molded article 20 is small compared to the molded article 20 provided with no protrusion part 220.

In an example of the molded article 20, the protrusion part 220 is constituted as the removal scheduled part 300 scheduled to be removed.

According to the foregoing constitution, for example, it is possible to achieve the following effects. It is possible to manufacture the molded article 20 including no pressurized part of the protrusion part 220.

In an example of the molded article 20, the protrusion part 220 is connected to the end part of the main body 100.

According to the foregoing constitution, for example, it is possible to achieve the following effects. It is possible to curb an influence of the protrusion part 220 regarding design of the shape of the main body 100.

In an example of the molded article 20, the protrusion part 220 is thinner than the main body 100.

According to the foregoing constitution, for example, it is possible to achieve the following effects. It is possible to reduce the amount of material to be used for molding of the protrusion part 220.

In an example of the molded article 20, the protrusion part 220 is shorter than the main body 100.

According to the foregoing constitution, for example, it is possible to achieve the following effects. It is possible to reduce the amount of material to be used for molding of the protrusion part 220.

In an example of the molded article 20, the molded article 20 has the following constitution. The molded article 20 includes the primary molded part P and the secondary molded part Q provided on the outer surface PF of the primary molded part P. The primary molded part P includes the primary main body constitution part PA constituting the main body 100, and the protrusion part 220. The secondary molded part Q includes the secondary main body constitution part QA constituting the main body 100.

According to the foregoing constitution, for example, it is possible to achieve the following effects. It is possible to reduce the pressurized part in the secondary main body constitution part QA.

In an example of the toothbrush 10A, the toothbrush 10A includes the molded article 20.

According to the foregoing constitution, for example, it is possible to achieve the following effects. It is possible to expect that design of the toothbrush 10A be improved.

In an example of the toothbrush 10A, the toothbrush 10A has the following constitution. The toothbrush 10A includes the molded article 20 in which the protrusion part 220 is constituted as the removal scheduled part 300. The toothbrush 10A is in a state in which the protrusion part 220 has been removed.

According to the foregoing constitution, for example, it is possible to achieve the following effects. It is possible to expect that design of the toothbrush 10A be improved.

In an example of the method of manufacturing the molded article 20, the manufacturing method includes the following steps. The manufacturing method includes the molding step of molding the molded article 20 inside the mold, and the extruding step of pressing the molded article 20 by means of the ejector pins after the molding step is performed. In the extruding step, the protrusion part 220 is pressed by means of the ejector pins.

According to the foregoing constitution, for example, it is possible to achieve the following effects. It is possible to reduce the pressurized part in the main body 100.

In an example of the method of manufacturing the molded article 20, the manufacturing method includes the following steps. The molding step includes the primary molding step of molding the primary molded part P. and the secondary molding step of molding the secondary molded part Q. The extruding step includes the primary extruding step of pressing the protrusion part 220 of the primary molded part P after the primary molding step is performed, and the secondary extruding step of pressing the protrusion part 220 of the secondary molded part Q after the secondary molding step is performed.

According to the foregoing constitution, for example, it is possible to achieve the following effects. It is possible to reduce the pressurized part in the secondary molded part Q.

In an example of the method of manufacturing the molded article 20, the manufacturing method further includes the removing step of removing the protrusion part 220 after the extruding step is performed.

According to the foregoing constitution, for example, it is possible to achieve the following effects. It is possible to reduce the pressurized part in the molded article 20.

In an example of the molded article 20, the molded article 20 has the following constitution. The secondary molded part Q includes the secondary handle constitution part Q10. The secondary handle constitution part Q10 covers the outer surface PF of the primary handle constitution part P10. A transparent resin or a translucent resin is used as the raw material of the secondary molded part Q.

According to the foregoing constitution, for example, it is possible to achieve the following effects. It is possible to visually recognize the primary handle constitution part P10 from the outside of the molded article 20. It is possible to expect that design of the oral care product 10 be improved.

In an example of the molded article 20, the primary handle constitution part P10 of the primary molded part P includes one or a plurality of protrusion parts P13.

According to the foregoing constitution, for example, it is possible to achieve the following effects. Movement of the secondary molded part Q with respect to the primary molded part P in the axial direction is restricted by the protrusion parts P13. The position of the secondary molded part Q with respect to the primary molded part P is made stable.

In an example of the molded article 20, the primary handle constitution part P10 of the primary molded part P includes the constricted part P20.

According to the foregoing constitution, for example, it is possible to achieve the following effects. It is possible to expect that design of the oral care product 10 be improved. Movement of the secondary molded part Q with respect to the primary molded part P in the axial direction is restricted by the constricted part P20 of the secondary molded part Q. The position of the secondary molded part Q with respect to the primary molded part P is made stable.

In an example of the molded article 20, the secondary handle constitution part Q10 of the secondary molded part Q includes the constricted part Q20.

According to the foregoing constitution, for example, it is possible to achieve the following effects. It is possible to expect that design of the oral care product 10 be improved. The handle 110 is likely to be gripped.

In an example of the molded article 20, the molded article 20 has the following constitution. The first end part Q20A of the constricted part Q20 corresponds to the first end part P20A of the constricted part P20. The second end part Q20B of the constricted part Q20 corresponds to the second end part P20B of the constricted part P20. The intermediate part Q20C of the constricted part Q20 corresponds to the intermediate part P20C of the constricted part P20. According to the foregoing constitution, for example, it is possible to achieve the following effects. It is possible to expect that design of the oral care product 10 be improved.

In an example of the molded article 20, the molded article 20 includes the decoration part 400.

According to the foregoing constitution, for example, it is possible to achieve the following effects. It is possible to expect that design of the oral care product 10 be improved.

In an example of the method of manufacturing the molded article 20, the secondary cavity is filled with a resin material in the fixed state of the primary molded part P.

According to the foregoing constitution, for example, it is possible to achieve the following effects. As the secondary cavity is filled with a resin material, the primary handle constitution part P10 of the primary molded part P receives a force from the resin material. Since the primary molded part P is in the fixed state, warpage of the primary handle constitution part P10 is curbed.

Second Embodiment

The molded article 20 according to the present embodiment is constituted on the premise of the first embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The exposed structure 500 according to the present embodiment includes one or a plurality of first type penetration parts P100X1. The constitution related to the first type penetration parts P100X1 including the shapes of the first type penetration parts P100X1, the number of first type penetration parts P100X1, and the disposition form of the first type penetration parts P100X1 can be arbitrarily selected.

An area of the exposed surface P101 related to each of the first type penetration parts P100X1 will be referred to as "a first type individual area". An area of the exposed surfaces P101 related to all of the first type penetration parts P100X1 will be referred to as "a first type total area". The first type total area is a total value of the first type individual areas of all of the first type penetration parts P100X1 included in the exposed structure 500. When the number of first type penetration parts P100X1 included in the exposed structure 500 is 1, the first type total area is equal to the first type individual area.

In an example, the first type total area is included in a predetermined range related to the first type total area. The predetermined range will be exemplified. In a first example, the predetermined range is a range of a lower limit total area or larger. In a second example, the predetermined range is a range of an upper limit total area or smaller. In a third example, the predetermined range is a range of the lower limit total area to the upper limit total area.

For example, the lower limit total area is selected from 0.5 $mm^2$, 2.5 $mm^2$, and 5 $mm^2$. For example, the upper limit total area is selected from 30 $mm^2$, 60 $mm^2$, and 90 $mm^2$. Examples of the predetermined range of the third example include third A to third I examples as follows. In the third A example, the predetermined range is a range of 0.5 $mm^2$ to 30 $mm^2$. In the third B example, the predetermined range is a range of 0.5 $mm^2$ to 60 $mm^2$. In the third C example, the predetermined range is a range of 0.5 $mm^2$ to 90 $mm^2$.

In the third D example, the predetermined range is a range of 2.5 $mm^2$ to 30 $mm^2$. In the third E example, the predetermined range is a range of 2.5 $mm^2$ to 60 $mm^2$. In the third F example, the predetermined range is a range of 2.5 $mm^2$ to 90 $mm^2$.

In the third G example, the predetermined range is a range of 5 $mm^2$ to 30 $mm^2$. In the third H example, the predetermined range is a range of 5 $mm^2$ to 60 $mm^2$. In the third I example, the predetermined range is a range of 5 $mm^2$ to 90 $mm^2$.

(Effects)

For example, it is possible to achieve the following effects by means of the constitution exemplified in the present embodiment.

In an example of the molded article 20, the first type total area is equal to or larger than the lower limit total area.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the first type total area is equal to or smaller than the upper limit total area.

According to the foregoing constitution, for example, it is possible to achieve the following effects. The first type penetration parts P100X1 are likely to be inconspicuous. For example, this contributes to improvement in design of the molded article 20.

In an example of the molded article 20, the first type total area is within a range of 0.5 $mm^2$ or larger.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the first type total area is within a range of 90 $mm^2$ or smaller.

According to the foregoing constitution, for example, it is possible to achieve the following effects. The first type penetration parts P100X1 are likely to be inconspicuous. For example, this contributes to improvement in design of the molded article 20.

Third Embodiment

The molded article 20 according to the present embodiment is constituted on the premise of the first or second embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The exposed structure 500 according to the present embodiment includes one or a plurality of second type penetration parts P100X2. The constitution related to the second type penetration parts P100X2 including the shapes of the second type penetration parts P100X2, the number of second type penetration parts P100X2, and the disposition form of the second type penetration parts P100X2 can be arbitrarily selected.

An area of the exposed surface P101 related to each of the second type penetration parts P100X2 will be referred to as "a second type individual area". An area of the exposed surface P101 related to all of the second type penetration parts P100X2 will be referred to as "a second type total area". The second type total area is a total value of the second type individual areas of all of the second type penetration parts P100X2 included in the exposed structure 500. When the number of second type penetration parts P100X2 included in the exposed structure 500 is 1, the second type total area is equal to the second type individual area.

In an example, the second type total area is included in a predetermined range related to the second type total area. The predetermined range will be exemplified. In a first example, the predetermined range is a range of a lower limit total area or larger. In a second example, the predetermined range is a range of an upper limit total area or smaller. In a third example, the predetermined range is a range of the lower limit total area to the upper limit total area.

For example, the lower limit total area is selected from 0.5 mm$^2$, 2.5 mm$^2$, and 5 mm$^2$. For example, the upper limit total area is selected from 30 mm$^2$, 60 mm$^2$, and 90 mm$^2$. Examples of the predetermined range of the third example include third A to third I examples as follows.

In the third A example, the predetermined range is a range of 0.5 mm$^2$ to 30 mm$^2$. In the third B example, the predetermined range is a range of 0.5 mm$^2$ to 60 mm$^2$. In the third C example, the predetermined range is a range of 0.5 mm$^2$ to 90 mm$^2$.

In the third D example, the predetermined range is a range of 2.5 mm$^2$ to 30 mm$^2$. In the third E example, the predetermined range is a range of 2.5 mm$^2$ to 60 mm$^2$. In the third F example, the predetermined range is a range of 2.5 mm$^2$ to 90 mm$^2$.

In the third G example, the predetermined range is a range of 5 mm$^2$ to 30 mm$^2$. In the third H example, the predetermined range is a range of 5 mm$^2$ to 60 mm$^2$. In the third I example, the predetermined range is a range of 5 mm$^2$ to 90 mm$^2$.

(Effects)

For example, it is possible to achieve the following effects by means of the constitution exemplified in the present embodiment.

In an example of the molded article 20, the second type total area is equal to or larger than the lower limit total area.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the second type total area is equal to or smaller than the upper limit total area.

According to the foregoing constitution, for example, it is possible to achieve the following effects. The second type penetration parts P100X2 are likely to be inconspicuous. For example, this contributes to improvement in design of the molded article 20.

In an example of the molded article 20, the second type total area is within a range of 0.5 mm$^2$ or larger.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the second type total area is within a range of 90 mm$^2$ or smaller.

According to the foregoing constitution, for example, it is possible to achieve the following effects. The second type penetration parts P100X2 are likely to be inconspicuous. For example, this contributes to improvement in design of the molded article 20.

Fourth Embodiment

The molded article 20 according to the present embodiment is constituted on the premise of any of the first to third embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The exposed structure 500 according to the present embodiment includes one or a plurality of third type penetration parts P100X3. The constitution related to the third type penetration parts P100X3 including the shapes of the third type penetration parts P100X3, the number of third type penetration parts P100X3, and the disposition form of the third type penetration parts P100X3 can be arbitrarily selected.

An area of the exposed surface P101 related to each of the third type penetration parts P100X3 will be referred to as "a third type individual area". An area of the exposed surface P101 related to all of the third type penetration parts P100X3 will be referred to as "a third type total area". The third type total area is a total value of the third type individual areas of all of the third type penetration parts P100X3 included in the exposed structure 500. When the number of third type penetration parts P100X3 included in the exposed structure 500 is 1, the third type total area is equal to the third type individual area.

In an example, the third type total area is included in a predetermined range related to the third type total area. The predetermined range will be exemplified. In a first example, the predetermined range is a range of a lower limit total area or larger. In a second example, the predetermined range is a range of an upper limit total area or smaller. In a third example, the predetermined range is a range of the lower limit total area to the upper limit total area.

For example, the lower limit total area is selected from 0.5 mm$^2$, 2.5 mm$^2$, and 5 mm$^2$. For example, the upper limit total area is selected from 30 mm$^2$, 60 mm$^2$, and 90 mm$^2$. Examples of the predetermined range of the third example include third A to third I examples as follows.

In the third A example, the predetermined range is a range of 0.5 mm$^2$ to 30 mm$^2$. In the third B example, the predetermined range is a range of 0.5 mm$^2$ to 60 mm$^2$. In the third C example, the predetermined range is a range of 0.5 mm$^2$ to 90 mm$^2$.

In the third D example, the predetermined range is a range of 2.5 mm$^2$ to 30 mm$^2$. In the third E example, the predetermined range is a range of 2.5 mm$^2$ to 60 mm$^2$. In the third F example, the predetermined range is a range of 2.5 mm$^2$ to 90 mm$^2$.

In the third G example, the predetermined range is a range of 5 mm$^2$ to 30 mm$^2$. In the third H example, the predetermined range is a range of 5 mm$^2$ to 60 mm$^2$. In the third I example, the predetermined range is a range of 5 mm$^2$ to 90 mm$^2$.

(Effects)

For example, it is possible to achieve the following effects by means of the constitution exemplified in the present embodiment.

In an example of the molded article 20, the third type total area is equal to or larger than the lower limit total area.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the third type total area is equal to or smaller than the upper limit total area.

According to the foregoing constitution, for example, it is possible to achieve the following effects. The third type penetration parts P100X3 are likely to be inconspicuous. For example, this contributes to improvement in design of the molded article 20.

In an example of the molded article 20, the third type total area is within a range of 0.5 mm$^2$ or larger.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the third type total area is within a range of 90 mm$^2$ or smaller.

According to the foregoing constitution, for example, it is possible to achieve the following effects. The third type penetration parts P100X3 are likely to be inconspicuous. For example, this contributes to improvement in design of the molded article 20.

Fifth Embodiment

The molded article 20 according to the present embodiment is constituted on the premise of any of the first to fourth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The exposed structure 500 according to the present embodiment includes one or a plurality of first type penetration parts P100X1 and one or a plurality of second type penetration parts P100X2. The constitution related to the first type penetration parts P100X1 including the shapes of the first type penetration parts P100X1, the number of first type penetration parts P100X1, and the disposition form of the first type penetration parts P100X1 can be arbitrarily selected. The constitution related to the second type penetration parts P100X2 including the shapes of the second type penetration parts P100X2, the number of second type penetration parts P100X2, and the disposition form of the second type penetration parts P100X2 can be arbitrarily selected.

The total value of the first type total area and the second type total area will be referred to as "a complex type total area". In an example, the complex type total area is included in a predetermined range related to the complex type total area. The predetermined range will be exemplified. In a first example, the predetermined range is a range of a lower limit total area or larger. In a second example, the predetermined range is a range of an upper limit total area or smaller. In a third example, the predetermined range is a range of the lower limit total area to the upper limit total area.

For example, the lower limit total area is selected from 1 mm$^2$, 5 mm$^2$, and 10 mm$^2$. For example, the upper limit total area is selected from 60 mm$^2$, 120 mm$^2$, and 180 mm$^2$. Examples of the predetermined range of the third example include third A to third I examples as follows.

In the third A example, the predetermined range is a range of 1 mm$^2$ to 60 mm$^2$. In the third B example, the predetermined range is a range of 1 mm$^2$ to 120 mm$^2$. In the third C example, the predetermined range is a range of 1 mm$^2$ to 180 mm$^2$.

In the third D example, the predetermined range is a range of 5 mm$^2$ to 60 mm$^2$. In the third E example, the predetermined range is a range of 5 mm$^2$ to 120 mm$^2$. In the third F example, the predetermined range is a range of 5 mm$^2$ to 180 mm$^2$.

In the third G example, the predetermined range is a range of 10 mm$^2$ to 60 mm$^2$. In the third H example, the predetermined range is a range of 10 mm$^2$ to 120 mm$^2$. In the third I example, the predetermined range is a range of 10 mm$^2$ to 180 mm$^2$.

(Effects)

For example, it is possible to achieve the following effects by means of the constitution exemplified in the present embodiment.

In an example of the molded article 20, the complex type total area is equal to or larger than the lower limit total area.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the complex type total area is equal to or smaller than the upper limit total area.

According to the foregoing constitution, for example, it is possible to achieve the following effects. At least one of the first type penetration parts P100X1 and the second type penetration parts P100X2 is likely to be inconspicuous. For example, this contributes to improvement in design of the molded article 20.

In an example of the molded article 20, the complex type total area is within a range of 1 mm$^2$ or larger.

According to the foregoing constitution, for example, it is possible to achieve the following effects. A contact area between the exposed structure 500 and the mold increases. The effect of curbing deformation during the secondary molding is enhanced. The effect of curbing vertical deformation or vertical deformation in complex deformation is enhanced.

In an example of the molded article 20, the complex type total area is within a range of 180 mm$^2$ or smaller.

According to the foregoing constitution, for example, it is possible to achieve the following effects. At least one of the first type penetration parts P100X1 and the second type penetration parts P100X2 is likely to be inconspicuous. For example, this contributes to improvement in design of the molded article 20.

Sixth Embodiment

The molded article 20 according to the present embodiment is constituted on the premise of the first embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

FIG. 37 will be referred to, FIG. 37 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The primary molded part P includes the recessed part P60. A constitution of the recessed part P60 can be arbitrarily selected. The constitution of the recessed part P60 is not limited to the exemplified constitution. The recessed part P60 is constituted such that it is recessed with respect to the outer surface PF of the primary molded part P.

For example, the recessed part P60 is provided in the primary main body constitution part PA. The recessed part P60 includes the disposition space P61, a disposition surface P62, and an opening part P63. The disposition space P61 is constituted such that a portion of the secondary molded part Q can be disposed therein. The disposition surface P62 defines the disposition space P61. The opening part P63 opens on the outer surface PF of the primary molded part P.

A position of the opening part P63 in the circumferential direction of the primary molded part P will be exemplified. In a first example, the opening part P63 opens on the front surface of the primary molded part P. In a second example, the opening part P63 opens on the rear surface of the primary molded part P. In a third example, the opening part P63 opens on the first side surface of the primary molded part P. In a fourth example, the opening part P63 opens on the second side surface of the primary molded part P.

A position of the recessed part P60 in the axial direction of the primary molded part P will be exemplified. In a first example, the recessed part P60 is provided in the primary handle constitution part P10. In a second example, the recessed part P60 is provided in the neck 120. In a third example, the recessed part P60 is provided in the head 130.

In a fourth example, the recessed part P60 is provided in the primary handle constitution part P10 and the neck 120. In a fifth example, the recessed part P60 is provided in the neck 120 and the head 130. In a sixth example, the recessed part P60 is provided in the primary handle constitution part P10, the neck 120, and the head 130.

The constitution of the recessed part P60 related to mold-releasing from the primary mold will be exemplified. In a first example, the recessed part P60 is constituted such that it becomes non-undercut with respect to the primary mold. For example, the side surface of the disposition surface P62 is parallel to the second reference surface or the third reference surface. In a second example, the recessed part P60 is constituted such that it becomes undercut with respect to the primary mold. For example, the disposition surface P62 includes the side surface inclined with respect to the second reference surface or the third reference surface.

In the secondary molding step, a resin material corresponding to the secondary molded part Q flows into the disposition space P61 of the recessed part P60. The disposition space P61 functions as a flow channel for a resin material corresponding to the secondary molded part Q. A flow of a resin material corresponding to the secondary molded part Q differs between a case in which the recessed part P60 is included in the primary molded part P and a case in which the recessed part P60 is not included in the primary molded part P.

The secondary molded part Q includes an internal projecting part Q60. The internal projecting part Q60 is disposed in the recessed part P60. The internal projecting part Q60 is constituted such that it fills the disposition space P61 of the recessed part P60. The outer surface QF of the internal projecting part Q60 is joined to the disposition surface P62 of the recessed part P60.

The restriction structure R includes the disposition part R50. A constitution of the disposition part R50 can be arbitrarily selected. The constitution of the disposition part R50 is not limited to the exemplified constitution. The disposition part R50 is constituted such that relative movement of the secondary molded part Q and relative rotation of the secondary molded part Q are restricted.

The disposition part R50 is provided in the primary molded part P. The disposition part R50 is constituted such that it is recessed with respect to the outer surface PF of the primary molded part P. The recessed part P60 of the primary molded part P corresponds to the disposition part R50 of the restriction structure R.

Examples of a form in which a plurality of disposition parts R50 is included in the restriction structure R include an example A and an example B. In the example A, the plurality of disposition parts R50 is regularly disposed. In the example B, the plurality of disposition parts R50 is irregularly disposed. Examples of details of the example A include examples A1 to A12. In the example A1, the restriction structure R includes a group of the plurality of disposition parts R50 arrayed in the axial direction. In the example A2, the restriction structure R includes a plurality of groups in the example A1.

In the example A3, the restriction structure R includes a group of the plurality of disposition parts R50 arrayed in the width direction. In the example A4, the restriction structure R includes a plurality of groups in the example A3.

In the example A5, the restriction structure R includes a group of the plurality of disposition parts R50 arrayed in the thickness direction. In the example A6, the restriction structure R includes a plurality of groups in the example A5.

In the example A7, the restriction structure R includes a group of the plurality of disposition parts R50 arrayed in the circumferential direction. In the example A8, the restriction structure R includes a plurality of groups in the example A7.

In the example A9, the restriction structure R includes a group of the plurality of disposition parts R50 arrayed in a direction different from those in the examples A1 to A8. In the example A10, the restriction structure R includes a plurality of groups in the example A9.

In the example A11, the restriction structure R includes at least two of the constitutions of the examples A1 to A10. In the example A12, the restriction structure R includes at least one of the constitutions of the examples A1 to A11 and the constitution of the example B.

In an example according to the present embodiment, the restriction structure R includes the undercut part R60. A constitution of the undercut part R60 can be arbitrarily selected. The constitution of the undercut part R60 is not limited to the exemplified constitution. The undercut part R60 is constituted such that relative movement of the secondary molded part Q and relative rotation of the secondary molded part Q are restricted.

The undercut part R60 is provided in the primary molded part P. The recessed part P60 of the primary molded part P corresponds to the undercut part R60 of the restriction structure R. Examples of the constitution of the undercut part R60 include first to seventh examples.

In the first example, the undercut part R60 is constituted such that the first type relative movement is restricted. In the second example, the undercut part R60 is constituted such that the second type relative movement is restricted. In the third example, the undercut part R60 is constituted such that the third type relative movement is restricted. In the fourth example, the undercut part R60 is constituted such that it has at least two constitutions of the first to third examples.

In the fifth example, the undercut part R60 is constituted such that the first type relative rotation is restricted. In the sixth example, the undercut part R60 is constituted such that the second type relative rotation is restricted. In the seventh example, the undercut part R60 is constituted such that it has both constitutions of the fifth example and the sixth example.

In an example in which the recessed part P60 is constituted such that it becomes undercut, the restriction structure R includes the disposition part R50 and the undercut part R60. The recessed part P60 of the primary molded part P corresponds to the disposition part R50 and the undercut part R60 of the restriction structure R. In a form in which the undercut part R60 is included in the restriction structure R, a slide mold is used for molding of the molded article 20, for example.

In a constitution in which the penetration part P100 and the recessed part P60 are included in the primary molded part P, for example, it is possible to achieve the following effects. The effect of curbing deformation during the secondary molding is enhanced. It is assumed that change in flow of a resin material corresponding to the secondary molded part Q has affected by providing the recessed part P60.

Seventh Embodiment

The molded article 20 according to the present embodiment is constituted on the premise of the first or sixth embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 38:
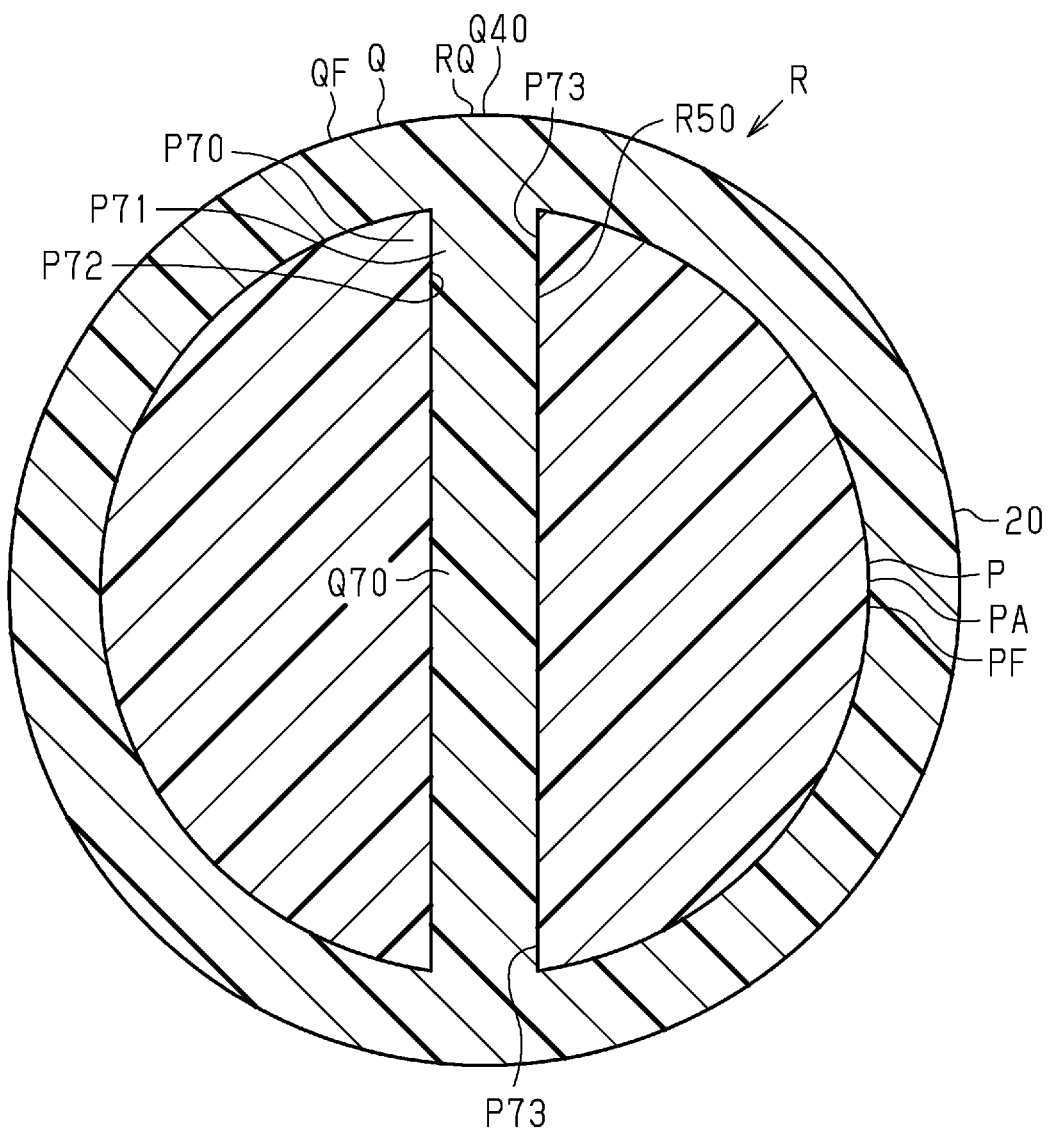
FIG. 38 is a cross-sectional view of the molded article according to a seventh embodiment.

FIG. 38 will be referred to, FIG. 38 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The primary molded part P includes a penetration disposition part P70. A constitution of the penetration disposition part P70 can be arbitrarily selected. The constitution of the penetration disposition part P70 is not limited to the exemplified constitution. The penetration disposition part P70 is constituted such that it penetrates the primary molded part P.

For example, the penetration disposition part P70 is provided in the primary main body constitution part PA. The penetration disposition part P70 includes a penetration space P71, an inner circumferential surface P72, and two opening parts P73. The penetration space P71 is constituted such that a portion of the secondary molded part Q can be disposed therein. The inner circumferential surface P72 defines the penetration space P71. The opening parts P73 open on the outer surface PF of the primary molded part P. One opening part P73 is provided in one end part of the penetration disposition part P70. The other opening part P73 is provided in the other end part of the penetration disposition part P70.

Positions of the opening parts P73 in the circumferential direction of the primary molded part P will be exemplified. In a first example, one opening part P73 opens on the front surface of the primary molded part P. The other opening part P73 opens on the rear surface of the primary molded part P. In a second example, one opening part P73 opens on the first side surface of the primary molded part P. The other opening part P73 opens on the second side surface of the primary molded part P.

A position of the penetration disposition part P70 in the axial direction of the primary molded part P will be exemplified. In a first example, the penetration disposition part P70 is provided in the primary handle constitution part P10. In a second example, the penetration disposition part P70 is provided in the neck 120. In a third example, the penetration disposition part P70 is provided in the head 130.

In a fourth example, the penetration disposition part P70 is provided in the primary handle constitution part P10 and the neck 120. In a fifth example, the penetration disposition part P70 is provided in the neck 120 and the head 130. In a sixth example, the penetration disposition part P70 is provided in the primary handle constitution part P10, the neck 120, and the head 130.

The constitution of the penetration disposition part P70 related to mold-releasing from the primary mold will be exemplified. In a first example, the penetration disposition part P70 is constituted such that it becomes non-undercut with respect to the primary mold. For example, a center axis of the penetration disposition part P70 is parallel to the thickness direction. In a second example, the penetration disposition part P70 is constituted such that it becomes undercut with respect to the primary mold. For example, the center axis of the penetration disposition part P70 is inclined with respect to the thickness direction.

In the secondary molding step, a resin material corresponding to the secondary molded part Q passes through the penetration space P71 of the penetration disposition part P70. The penetration space P71 functions as a flow channel for a resin material corresponding to the secondary molded part Q. A flow of a resin material corresponding to the secondary molded part Q differs between a case in which the penetration disposition part P70 is included in the primary molded part P and a case in which the penetration disposition part P70 is not included in the primary molded part P.

The secondary molded part Q includes a penetration projecting part Q70. The penetration projecting part Q70 is disposed in the penetration disposition part P70. The penetration projecting part Q70 is constituted such that it fills the penetration space P71 of the penetration disposition part P70. The outer surface QF of the penetration projecting part Q70 is joined to the inner circumferential surface P72 of the penetration disposition part P70.

The restriction structure R includes the disposition part R50. The penetration disposition part P70 of the primary molded part P corresponds to the disposition part R50 of the restriction structure R. In an example, the penetration disposition part P70 corresponds to the undercut part R60 of the restriction structure R.

Eighth Embodiment

The molded article 20 according to the present embodiment is constituted on the premise of the sixth and seventh embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 39:
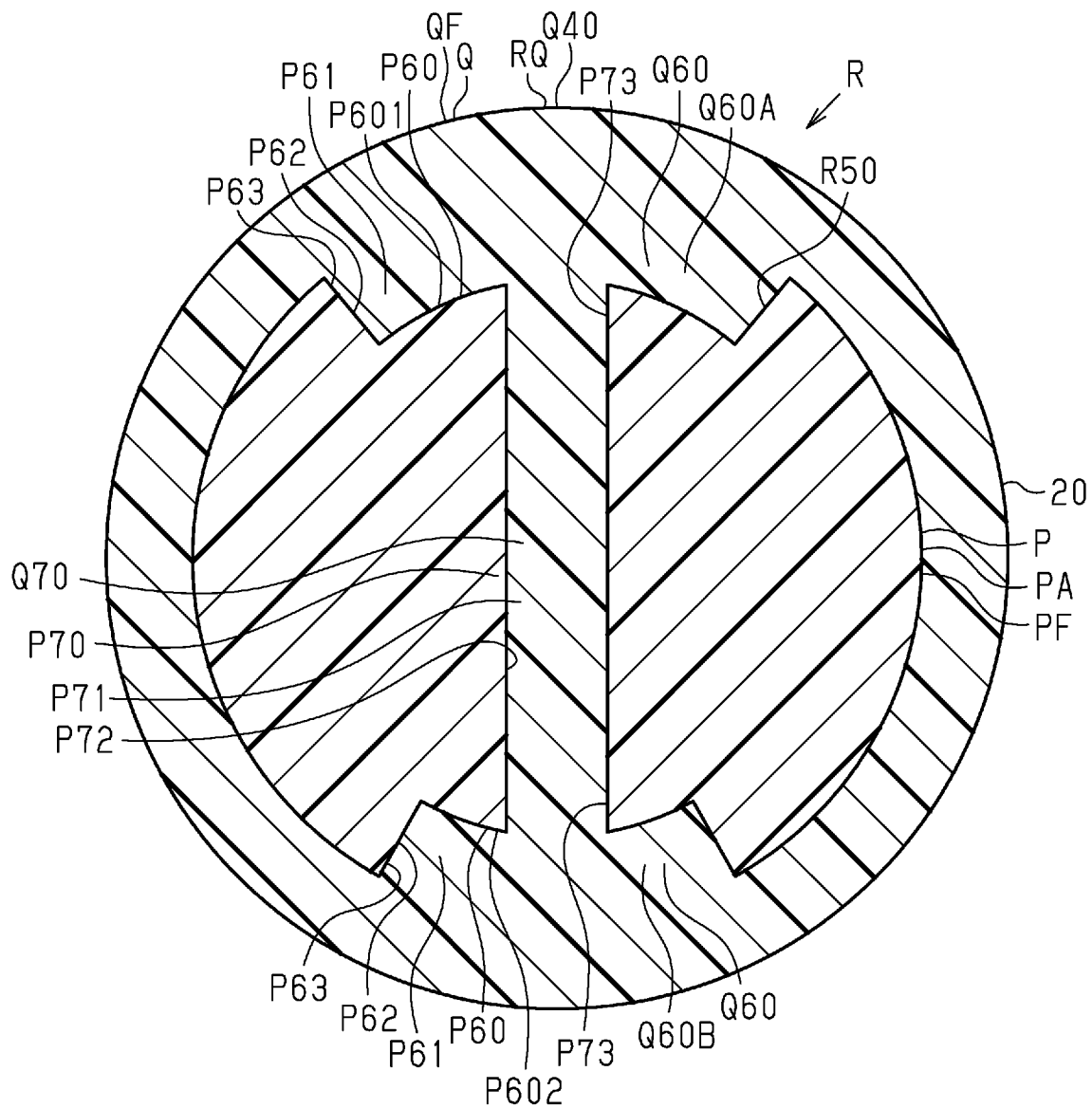
FIG. 39 is a cross-sectional view of the molded article according to an eighth embodiment.

FIG. 39 will be referred to, FIG. 39 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The primary molded part P includes a plurality of recessed parts P60. A constitution related to the plurality of recessed parts P60 can be arbitrarily selected. The constitution related to the plurality of recessed parts P60 is not limited to the exemplified constitution. For example, the plurality of recessed parts P60 includes a first recessed part P601 and a second recessed part P602. The first recessed part P601 is provided at a position opposite to the second recessed part P602 in the radial direction.

For example, the first recessed part P601 is provided in the primary main body constitution part PA. The first recessed part P601 includes the disposition space P61, the disposition surface P62, and the opening part P63. The disposition space P61 is constituted such that it is recessed with respect to the outer surface PF of the primary molded part P. The disposition surface P62 defines the disposition space P61. The opening part P63 opens on the outer surface PF of the primary molded part P.

A position of the first recessed part P601 in the circumferential direction of the primary molded part P will be exemplified. In a first example, the first recessed part P601 is provided on the front surface of the primary molded part P. In a second example, the first recessed part P601 is provided on the rear surface of the primary molded part P. In a third example, the first recessed part P601 is provided on the first side surface of the primary molded part P. In a fourth example, the first recessed part P601 is provided on the second side surface of the primary molded part P.

The position of the first recessed part P601 in the axial direction of the primary molded part P will be exemplified. In a first example, the first recessed part P601 is provided in the primary handle constitution part P10. In a second example, the first recessed part P601 is provided in the neck 120. In a third example, the first recessed part P601 is provided in the head 130.

In a fourth example, the first recessed part P601 is provided in the primary handle constitution part P10 and the neck 120. In a fifth example, the first recessed part P601 is provided in the neck 120 and the head 130. In a sixth example, the first recessed part P601 is provided in the primary handle constitution part P10, the neck 120, and the head 130.

For example, the second recessed part P602 is provided in the primary main body constitution part PA. The second recessed part P602 includes the disposition space P61, the disposition surface P62, and the opening part P63. The disposition space P61 is constituted such that it is recessed with respect to the outer surface PF of the primary molded part P. The disposition surface P62 defines the disposition space P61. The opening part P63 opens on the outer surface PF of the primary molded part P.

A position of the second recessed part P602 in the circumferential direction of the primary molded part P will be exemplified. In a first example, the second recessed part P602 is provided on the rear surface of the primary molded part P. In a second example, the second recessed part P602 is provided on the front surface of the primary molded part P. In a third example, the second recessed part P602 is provided on the second side surface of the primary molded part P. In a fourth example, the second recessed part P602 is provided on the first side surface of the primary molded part P.

The position of the second recessed part P602 in the axial direction of the primary molded part P will be exemplified. In a first example, the second recessed part P602 is provided in the primary handle constitution part P10. In a second example, the second recessed part P602 is provided in the neck 120. In a third example, the second recessed part P602 is provided in the head 130.

In a fourth example, the second recessed part P602 is provided in the primary handle constitution part P10 and the neck 120. In a fifth example, the second recessed part P602 is provided in the neck 120 and the head 130. In a sixth example, the second recessed part P602 is provided in the primary handle constitution part P10, the neck 120, and the head 130.

A relationship between the length of the first recessed part P601 and the length of the second recessed part P602 in the axial direction will be exemplified. In a first example, the length of the first recessed part P601 is longer than the length of the second recessed part P602. In a second example, the length of the first recessed part P601 is shorter than the length of the second recessed part P602. In a third example, the length of the first recessed part P601 is equal to the length of the second recessed part P602.

A relationship between the length of the first recessed part P601 and the length of the second recessed part P602 in the circumferential direction will be exemplified. In a first example, the length of the first recessed part P601 is longer than the length of the second recessed part P602. In a second example, the length of the first recessed part P601 is shorter than the length of the second recessed part P602. In a third example, the length of the first recessed part P601 is equal to the length of the second recessed part P602.

The primary molded part P includes the penetration disposition part P70. The penetration disposition part P70 connects the first recessed part P601 and the second recessed part P602 to each other. The penetration disposition part P70 is provided inside the primary molded part P. The penetration disposition part P70 penetrates the primary molded part P. The penetration disposition part P70 opens on the disposition surface P62 of the first recessed part P601 and the disposition surface P62 of the second recessed part P602.

The secondary molded part Q includes a plurality of internal projecting parts Q60. A constitution related to the plurality of internal projecting parts Q60 can be arbitrarily selected. The constitution related to the plurality of internal projecting parts Q60 is not limited to the exemplified constitution. For example, the plurality of internal projecting parts Q60 includes a first internal projecting part Q60A and a second internal projecting part Q60B.

The first internal projecting part Q60A is disposed in the first recessed part P601. The first internal projecting part Q60A is constituted such that it fills the disposition space P61 of the first recessed part P601. The first internal projecting part Q60A is joined to the disposition surface P62 of the first recessed part P601.

The second internal projecting part Q60B is disposed in the second recessed part P602. The second internal projecting part Q60B is constituted such that it fills the disposition space P61 of the second recessed part P602. The second internal projecting part Q60B is joined to a bottom surface of the disposition surface P62 of the second recessed part P602.

The secondary molded part Q includes the penetration projecting part Q70. The penetration projecting part Q70 connects the first internal projecting part Q60A and the second internal projecting part Q60B to each other.

The restriction structure R includes the disposition part R50. The recessed part P60 of the primary molded part P corresponds to the disposition part R50 of the restriction structure R.

Ninth Embodiment

The molded article 20 according to the present embodiment is constituted on the premise of any of the first to eighth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

FIG. 40 will be referred to, FIG. 40 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The primary molded part P includes one or a plurality of protrusion parts P80. A constitution related to the protrusion parts P80 can be arbitrarily selected. The constitution related to the protrusion parts P80 is not limited to the exemplified constitution. The protrusion parts P80 protrude in the radial direction with respect to the outer surface PF of the primary molded part P.

Positions of the protrusion parts P80 in the circumferential direction of the primary molded part P will be exemplified. In a first example, the protrusion parts P80 are provided on the front surface of the primary molded part P. In a second example, the protrusion parts P80 are provided on the rear surface of the primary molded part P. In a third example, the protrusion parts P80 are provided on the first side surface of the primary molded part P. In a fourth example, the protrusion parts P80 are provided on the second side surface of the primary molded part P. The positions of the protrusion parts P80 in the axial direction of the primary molded part P will be exemplified. In a first example, the protrusion parts P80 are provided in the primary handle constitution part P10. In a second example, the protrusion parts P80 are provided in the neck 120. In a third example, the protrusion parts P80 are provided in the head 130.

In a fourth example, the protrusion parts P80 are provided in the primary handle constitution part P10 and the neck 120. In a fifth example, the protrusion parts P80 are provided in the neck 120 and the head 130. In a sixth example, the protrusion parts P80 are provided in the primary handle constitution part P10, the neck 120, and the head 130.

For example, the protrusion part P80 includes a side surface P81 and a top surface P82. The side surface P81 includes a first side surface P81A and a second side surface P81B. The first side surface P81A is positioned in the first axial direction with respect to the center of the protrusion part P80 in the width direction. The second side surface P81B is positioned in the second axial direction with respect to the center of the protrusion part P80 in the width direction.

For example, the protrusion part P80 includes a base part P83, an apex part P84, and an intermediate part P85. The base part P83 is connected to the outer surface PF of the primary molded part P positioned in the vicinity of the protrusion part P80. The apex part P84 includes the top surface P82. The intermediate part P85 is positioned between the base part P83 and the apex part P84 in the height direction of the protrusion part P80.

A constitution of the protrusion part P80 related to mold-releasing from the primary mold will be exemplified. In a first example, the protrusion part P80 is constituted such that it becomes non-undercut with respect to the primary mold. In a second example, the protrusion part P80 is constituted such that it becomes undercut with respect to the primary mold.

For example, a width of the protrusion part P80 is indicated by a distance between the first side surface P81A and the second side surface P81B in a cross section parallel to the third reference surface. Setting of the width of the protrusion part P80 with respect to the height direction of the protrusion part P80 will be exemplified.

In a first example, the width of the protrusion part P80 decreases toward the apex part P84 from the base part P83 of the protrusion part P80. FIG. 40 illustrates the first example. In a second example, the width of the protrusion part P80 is uniform in the height direction of the protrusion part P80. In a third example, the width of the protrusion part P80 increases from the base part P83 of the protrusion part P80 toward the apex part P84. In a fourth example, the width of the protrusion part P80 increases from the intermediate part P85 toward the base part P83 and the apex part P84.

In the secondary molding step, a resin material corresponding to the secondary molded part Q passes through a part around the protrusion part P80. The protrusion part P80 functions as a part for guiding a flow of a resin material corresponding to the secondary molded part Q. A flow of a resin material corresponding to the secondary molded part Q differs between a case in which the protrusion part P80 is included in the primary molded part P and a case in which the protrusion part P80 is not included in the primary molded part P.

The secondary molded part Q includes the covering part Q40. The covering part Q40 includes the first circumferential end part Q41 and the second circumferential end part Q42. The first circumferential end part Q41 includes an end surface Q41A. The second circumferential end part Q42 includes an end surface Q42A.

The secondary molded part Q includes a non-connection part Q43. The non-connection part Q43 is formed between the end surface Q41A and the end surface Q42A. The protrusion part P80 is disposed in the non-connection part Q43. The end surface Q41A is joined to the first side surface P81A of the protrusion part P80. The end surface Q42A is joined to the second side surface P81B of the protrusion part P80.

A portion or the entirety of the top surface P82 of the protrusion part P80 is not covered by the covering part Q40. A portion or the entirety of the top surface P82 is exposed with respect to the covering part Q40. In an example in which the protrusion part P80 is provided in the covering target part PC of the primary molded part P, the protrusion part P80 corresponds to the penetration part P100 of the exposed structure 500. The exposed surface P101 is constituted of a portion or the entirety of the top surface P111.

The top surface P82 and the outer surface QF of the covering part Q40 positioned in the vicinity of the top surface P82 constitute a portion of the outer surface 20F of the molded article 20. The covering part Q40 is constituted such that the top surface P82 and the outer surface QF of the covering part Q40 are connected to each other. A portion of the outer surface 20F of the molded article 20 constituted of the outer surface QF of the covering part Q40 and the top surface P82 is a smooth surface.

The restriction structure R includes the protrusion part R40 and the surrounding part RQ. The protrusion part P80 of the primary molded part P corresponds to the protrusion part R40 of the restriction structure R. The covering part Q40 of the secondary molded part Q corresponds to the surrounding part RQ of the restriction structure R.

In an example, the primary molded part P includes the recessed part P60 exemplified in the premised embodiment. A relationship between the recessed part P60 and the protrusion part P80 will be exemplified.

In a first example, the recessed part P60 and the protrusion part P80 are arranged adjacent to each other in the axial direction. The recessed part P60 and the protrusion part P80 are adjacent to each other. In a second example, the recessed part P60 and the protrusion part P80 are arranged with an interval therebetween in the axial direction. In a third example, the recessed part P60 and the protrusion part P80 are arranged adjacent to each other in the circumferential direction. In a fourth example, the recessed part P60 and the protrusion part P80 are arranged with an interval therebetween in the circumferential direction.

In a constitution in which the penetration part P100 and the protrusion part P80 are included in the primary molded part P, for example, it is possible to achieve the following effects. The effect of curbing deformation during the secondary molding is enhanced. It is assumed that change in flow of a resin material corresponding to the secondary molded part Q has affected by providing the protrusion part P80.

In a constitution in which the penetration part P100, the recessed part P60, and the protrusion part P80 are included in the primary molded part P, for example, it is possible to achieve the following effects. The effect of curbing deformation during the secondary molding is enhanced. It is assumed that change in flow of a resin material corresponding to the secondary molded part Q has affected by providing the recessed part P60 and the protrusion part P80.

Tenth Embodiment

The molded article 20 according to the present embodiment is constituted on the premise of the ninth embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 41:
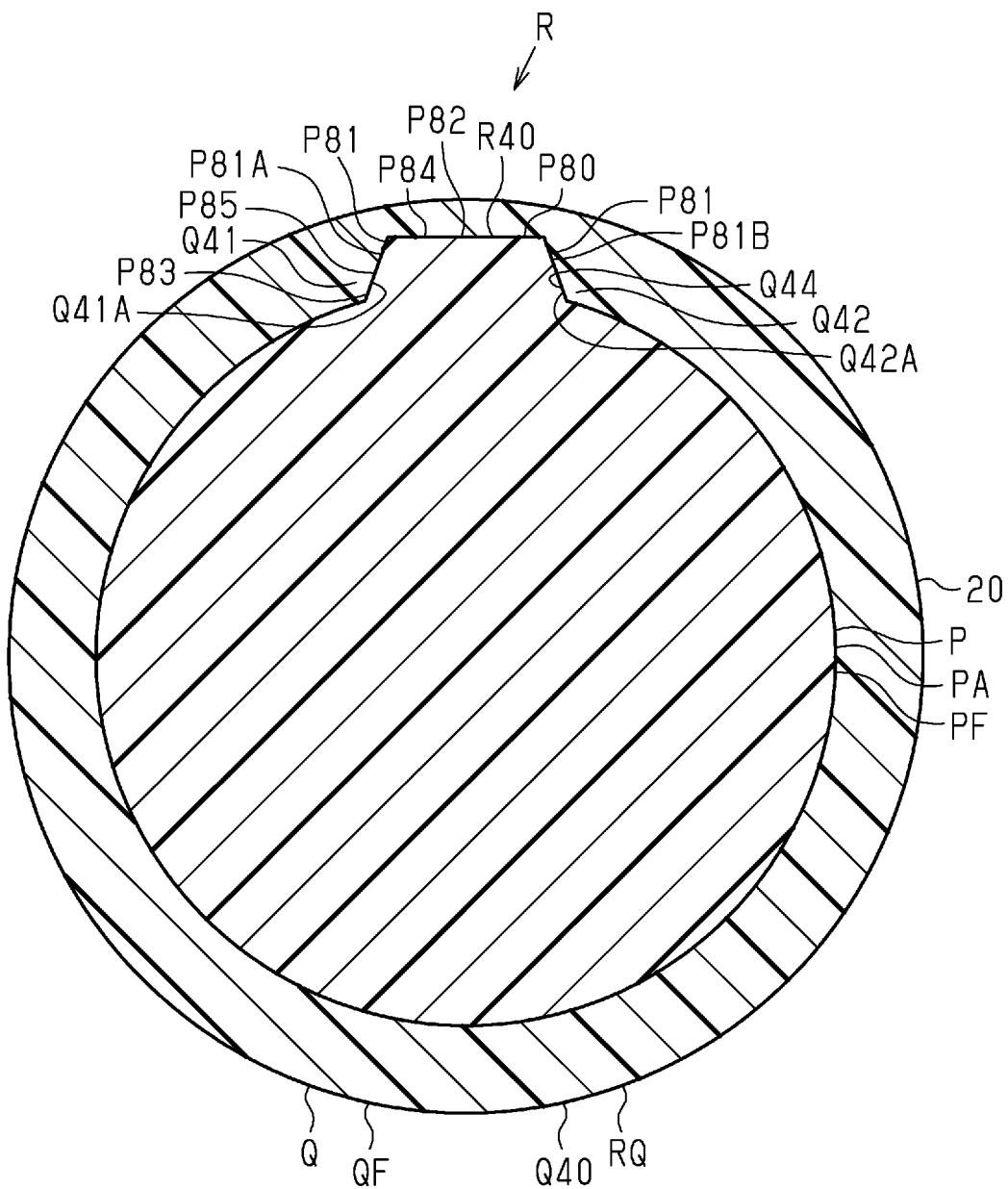
FIG. 41 is a cross-sectional view of the molded article according to a tenth embodiment.

FIG. 41 will be referred to, FIG. 41 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

In the present embodiment, the constitution of the covering part Q40 differs from that in the premised embodiment. The covering part Q40 includes an inner recessed part Q44. The inner recessed part Q44 is constituted such that it is recessed toward the radial direction with respect to an inner surface of the covering part Q40. The protrusion part P80 is disposed in the inner recessed part Q44. The inner recessed part Q44 covers the top surface P82 of the protrusion part P80.

Eleventh Embodiment

The molded article 20 according to the present embodiment is constituted on the premise of the ninth or tenth embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 42:
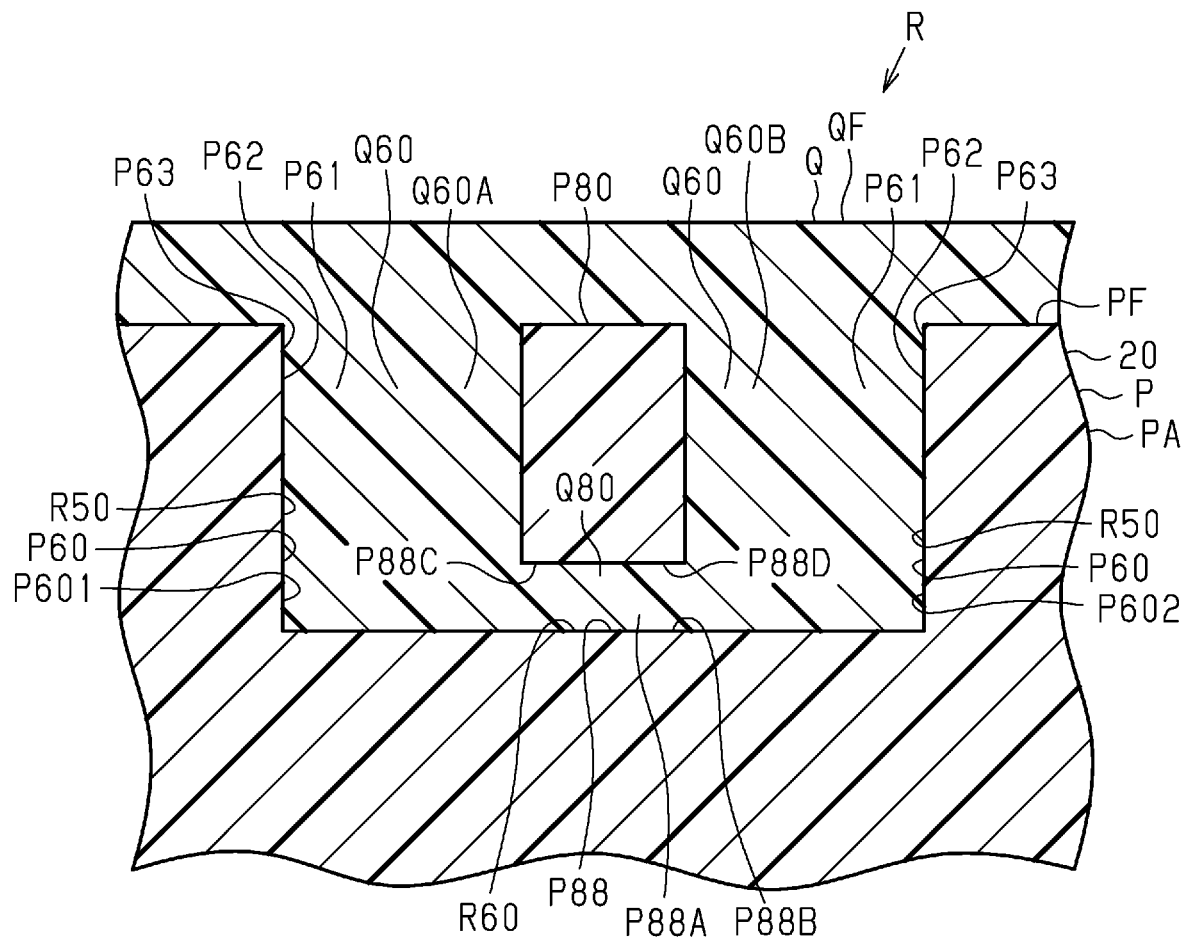
FIG. 42 is a cross-sectional view of the molded article according to an eleventh embodiment.

FIG. 42 will be referred to, FIG. 42 illustrates a cross section of the molded article 20 parallel to the second reference surface. The constitution of the molded article 20 according to the present embodiment includes a constitution in which a portion of the molded article 20 according to the premised embodiment is changed such that it matches the shape of the illustrated cross section.

The primary molded part P may adopt the following first or second form, for example, as a constitution related to the protrusion part P80. FIG. 42 illustrates an example of the first form.

The primary molded part P of the first form includes a plurality of recessed parts P60 and one protrusion part P80. The plurality of recessed parts P60 includes the first recessed part P601 and the second recessed part P602. For example, the protrusion part P80 is positioned between the first recessed part P601 and the second recessed part P602. The primary molded part P of the second form has a constitution similar to that of the ninth embodiment or the tenth embodiment.

The protrusion part P80 includes a hollow part P88. The hollow part P88 is constituted such that it becomes undercut with respect to the primary mold. For example, the hollow part P88 includes an internal space P88A and an inner circumferential surface P88B.

The internal space P88A is formed such that a portion of the secondary molded part Q can be disposed therein. The inner circumferential surface P88B defines the internal space P88A. The constitution of the protrusion part P80 will be exemplified.

In a first example, the internal space P88A penetrates the protrusion part P80. The hollow part P88 includes a first opening part P88C and a second opening part P88D. For example, a center axis of the hollow part P88 is parallel to a predetermined direction. For example, the predetermined direction is the axial direction or the width direction.

The first opening part P88C opens on an end surface of the hollow part P88 in the first axial direction. The second opening part P88D opens on an end surface of the hollow part P88 in the second axial direction.

In a second example, the internal space P88A does not penetrate the protrusion part P80. The hollow part P88 includes one of the first opening part P88C and the second opening part P88D. For example, the center axis of the hollow part P88 is parallel to the predetermined direction. For example, the predetermined direction is the axial direction or the width direction.

The secondary molded part Q includes a hollow projecting part Q80. The hollow projecting part Q80 is disposed in the internal space P88A of the hollow part P88. The hollow projecting part Q80 is constituted such that it fills the internal space P88A. The hollow projecting part Q80 is joined to the inner circumferential surface P88B of the hollow part P88.

When the form of the primary molded part P is the first form, the secondary molded part Q includes a plurality of internal projecting parts Q60. The plurality of internal projecting parts Q60 includes the first internal projecting part Q60A and the second internal projecting part Q60B. The first internal projecting part Q60A is disposed in the first recessed part P601. The second internal projecting part Q60B is disposed in the second recessed part P602. The hollow projecting part Q80 is connected to one of or both the first internal projecting part Q60A and the second internal projecting part Q60B.

The restriction structure R includes the undercut part R60. The hollow part P88 of the primary molded part P corresponds to the undercut part R60 of the restriction structure R.

Twelfth Embodiment

The molded article 20 according to the present embodiment is constituted on the premise of the ninth to eleventh embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 43:
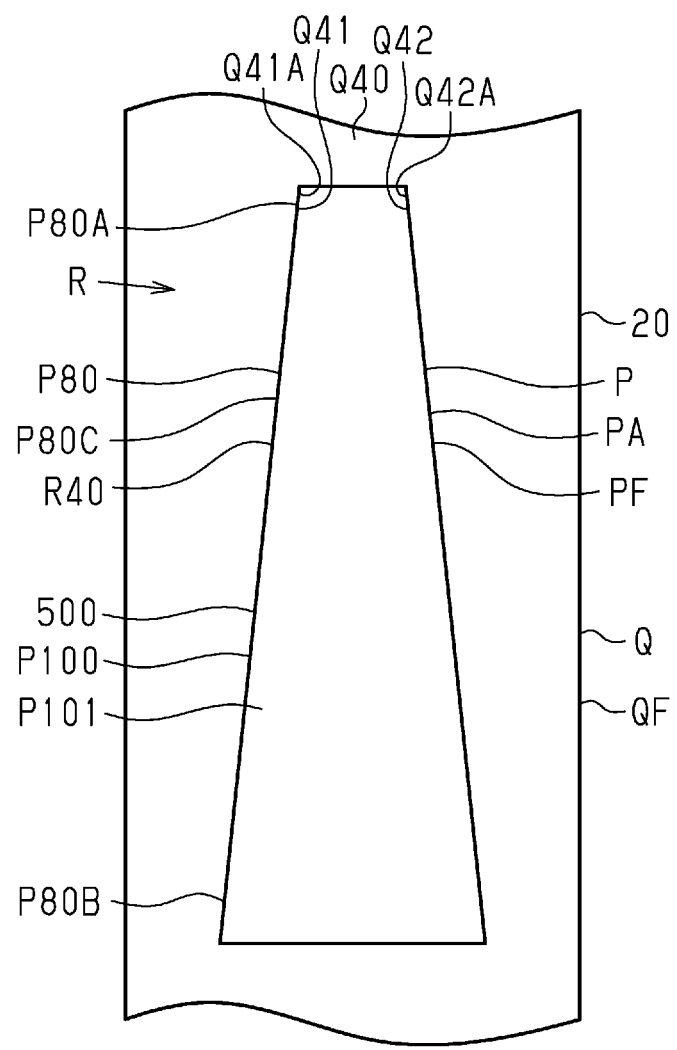
FIG. 43 is a plan view of the molded article according to a twelfth embodiment.

FIG. 43 will be referred to, FIG. 43 illustrates a flat surface of the molded article 20. The protrusion part P80 is constituted such that it extends in the axial direction. The protrusion part P80 includes a first end part P80A, a second end part P80B, and an intermediate part P80C in the axial direction.

The first end part P80A is positioned in the first axial direction with respect to the center of the protrusion part P80 in the axial direction. The second end part P80B is positioned in the second axial direction with respect to the center of the protrusion part P80 in the axial direction. The intermediate part P80C is positioned between the first end part P80A and the second end part P80B.

Setting of the width of the protrusion part P80 with respect to an extending direction of the protrusion part P80 will be exemplified. In a first example, the width of the protrusion part P80 increases from the first end part P80A toward the second end part P80B. FIG. 43 illustrates the first example. In a second example, the width of the protrusion part P80 decreases from the first end part P80A toward the second end part P80B.

In a third example, the width of the protrusion part P80 increases from the intermediate part P80C toward the first end part P80A or the second end part P80B. In a fourth example, the width of the protrusion part P80 decreases from the intermediate part P80C toward the first end part P80A or the second end part P80B. In a fifth example, the width of the protrusion part P80 is uniform in the axial direction.

Thirteenth Embodiment

The molded article 20 according to the present embodiment is constituted on the premise of the twelfth embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 44:
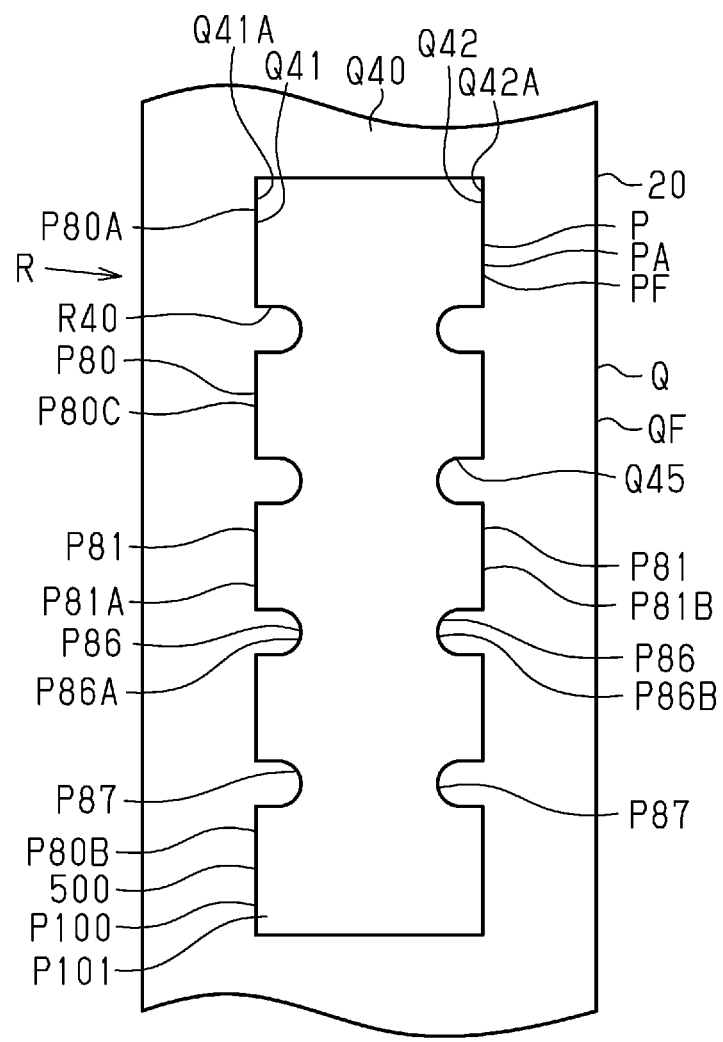
FIG. 44 is a plan view of the molded article according to a thirteenth embodiment.

FIG. 44 will be referred to, FIG. 44 illustrates a flat surface of the molded article 20. Setting of the width of the protrusion part P80 with respect to the extending direction of the protrusion part P80 conforms to that in the premised embodiment. In the illustrated example, setting of the width of the protrusion part P80 is that in the fifth example illustrated in the premised embodiment.

The protrusion part P80 includes a side part projection part P86. A constitution of the side part projection part P86 can be arbitrarily selected. The constitution of the side part projection part P86 is not limited to the exemplified constitution. The side part projection part P86 is provided on the side surface P81 of the protrusion part P80. The side part projection part P86 is constituted such that a projection is applied to the side surface P81 of the protrusion part P80.

The side part projection part P86 includes at least one of a first side part projection part P86A and a second side part projection part P86B. The first side part projection part P86A is provided on the first side surface P81A. The second side part projection part P86B is provided on the second side surface P81B.

The side part projection part P86 includes one or a plurality of side part recessed parts P87. The side part recessed parts P87 are constituted such that they are recessed with respect to the side surface P81. The covering part Q40 includes one or a plurality of projecting parts Q45. The projecting parts Q45 are disposed in the side part recessed parts P87. The projecting parts Q45 are constituted such that they fill spaces of the side part recessed parts P87. The projecting parts Q45 are joined to surfaces of the side part recessed parts P87. The projecting parts Q45 are provided in a manner of corresponding to the constitution of the side part projection part P86.

In an example in which the first side part projection part P86A is included in the side part projection part P86, one or a plurality of projecting parts Q45 is provided in the first circumferential end part Q41 of the covering part Q40. The projecting parts Q45 are constituted to protrude with respect to the end surface Q41A.

In an example in which the second side part projection part P86B is included in the side part projection part P86, one or a plurality of projecting parts Q45 is provided in the second circumferential end part Q42 of the covering part Q40. The projecting parts Q45 are constituted to protrude with respect to the end surface Q42A.

Fourteenth Embodiment

The molded article 20 according to the present embodiment is constituted on the premise of any of the ninth to thirteenth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 45:
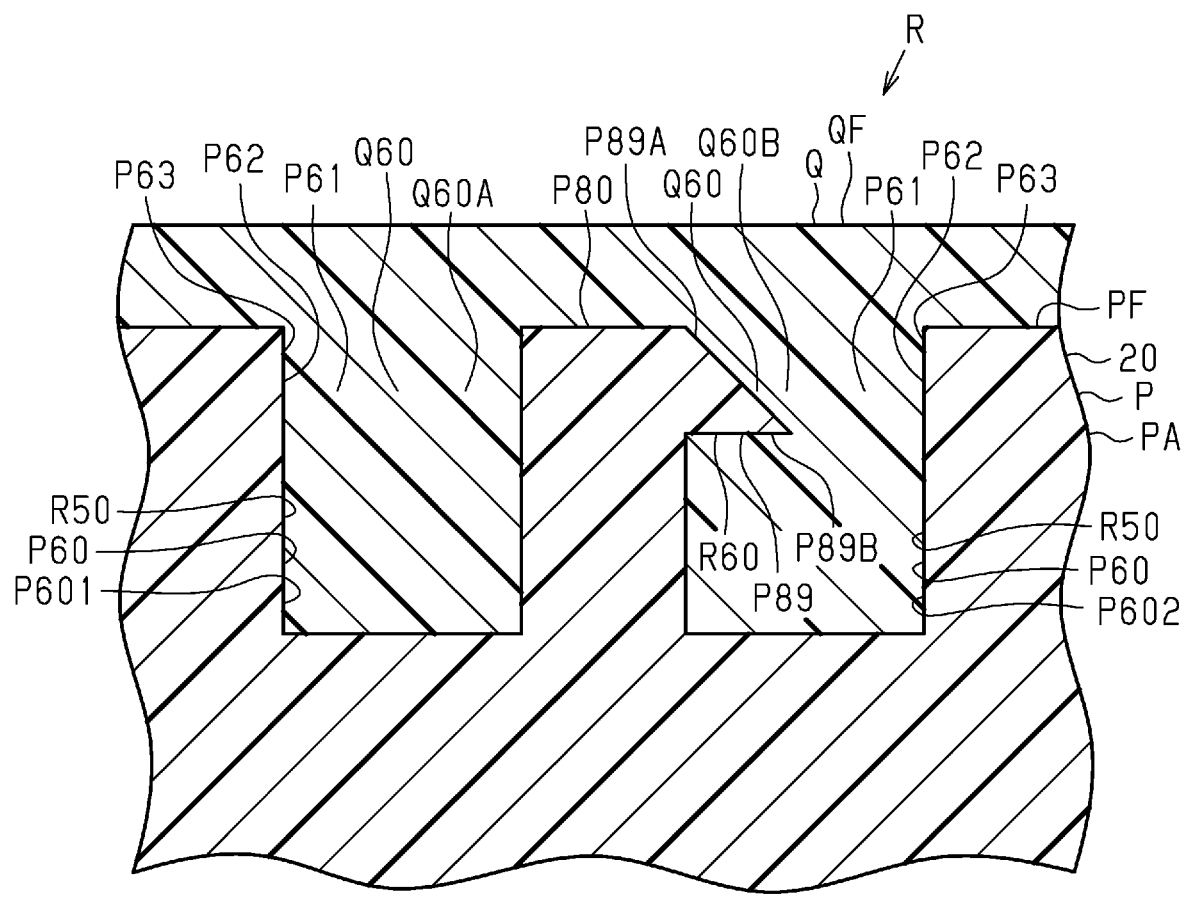
FIG. 45 is a cross-sectional view of the molded article according to a fourteenth embodiment.

FIG. 45 will be referred to, FIG. 45 illustrates a cross section of the molded article 20 parallel to the second reference surface. The constitution of the molded article 20 according to the present embodiment includes a constitution in which a portion of the molded article 20 according to the premised embodiment is changed such that it matches the shape of the illustrated cross section.

The primary molded part P includes a plurality of recessed parts P60 and one protrusion part P80. The plurality of recessed parts P60 includes the first recessed part P601 and the second recessed part P602. For example, the protrusion part P80 is positioned between the first recessed part P601 and the second recessed part P602 in the axial direction or the width direction.

The protrusion part P80 includes a hook P89. A constitution of the hook P89 can be arbitrarily selected. The constitution of the hook P89 is not limited to the exemplified constitution. The hook P89 is constituted such that it becomes undercut with respect to the primary mold.

In an example, the hook P89 is constituted to protrude in the predetermined direction with respect to an end surface of the protrusion part P80. For example, the predetermined direction is the axial direction or the width direction. The hook P89 includes an inclined surface P89A and a bottom surface P89B. The inclined surface P89A is inclined with respect to the third reference surface or the second reference surface. The bottom surface P89B is parallel to the first reference surface.

The secondary molded part Q includes the internal projecting part Q60 disposed in the first recessed part P601 and the internal projecting part Q60 disposed in the second recessed part P602. In an example, the internal projecting part Q60 disposed in the second recessed part P602 is joined to the inclined surface P89A and the bottom surface P89B of the hook P89.

The restriction structure R includes the undercut part R60. The hook P89 of the primary molded part P corresponds to the undercut part R60 of the restriction structure R.

Fifteenth Embodiment

The molded article 20 according to the present embodiment is constituted on the premise of any of the first to fourteenth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 46:
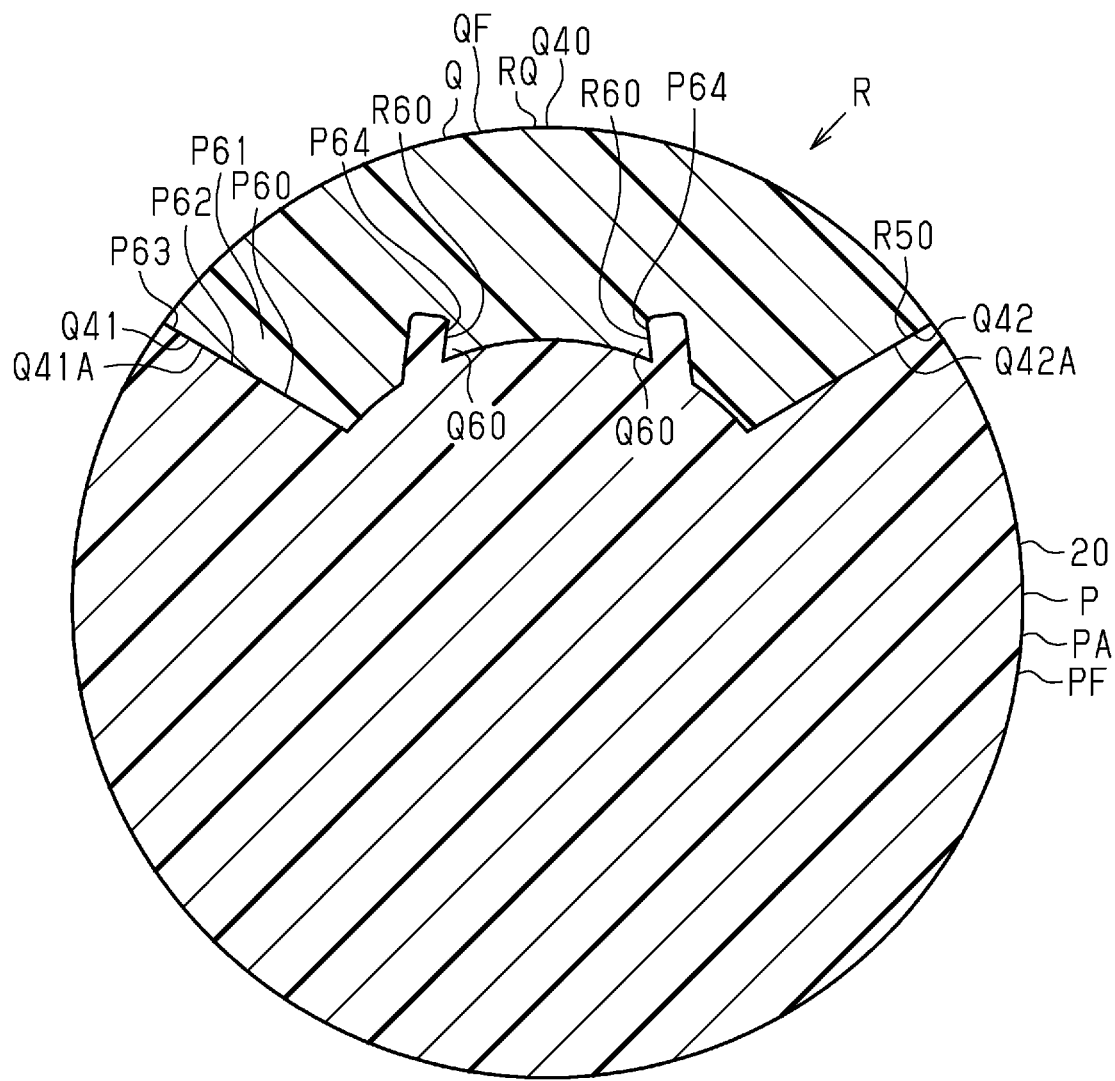
FIG. 46 is a cross-sectional view (1) of the molded article according to a fifteenth embodiment.
Figure 47:
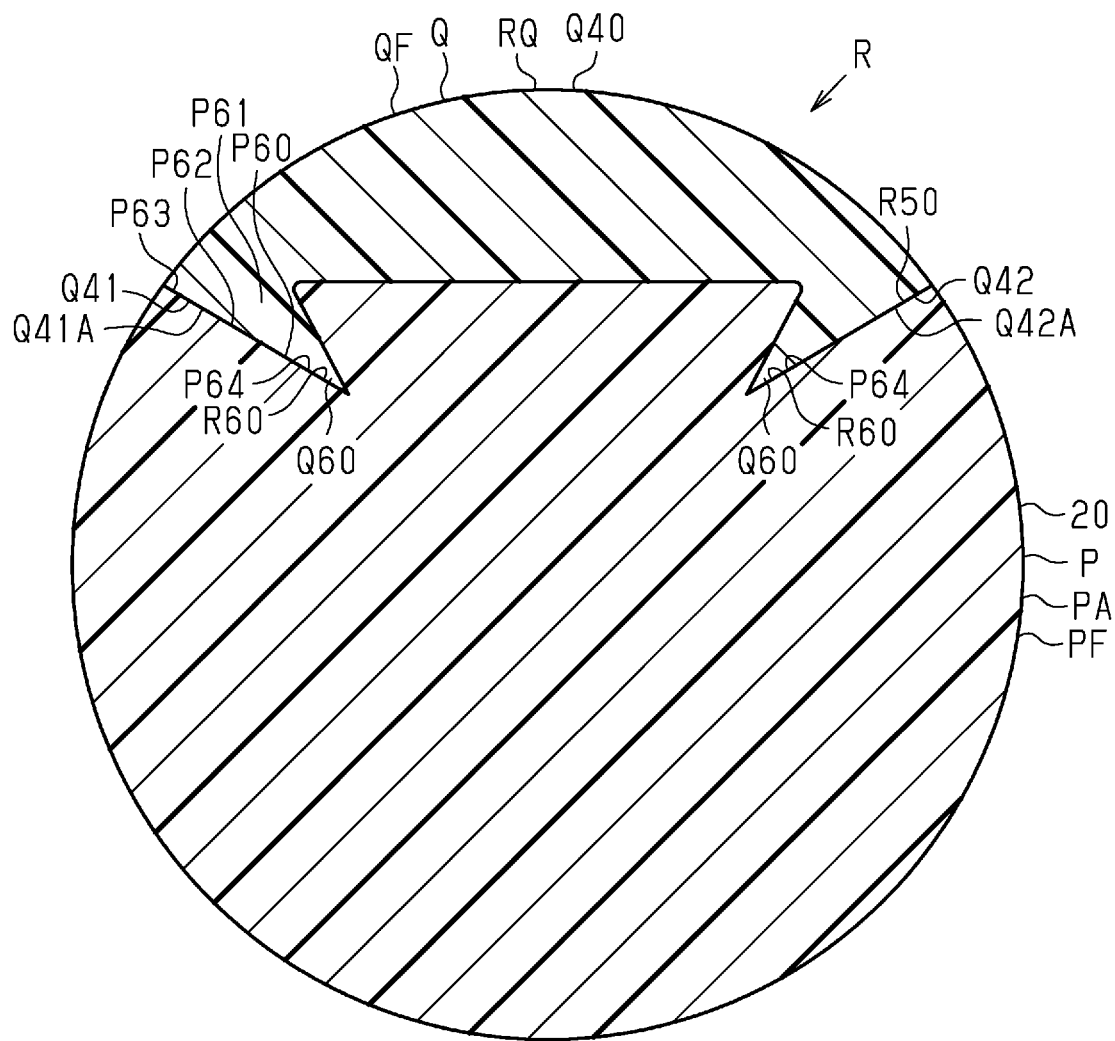
FIG. 47 is a cross-sectional view (2) of the molded article according to the fifteenth embodiment.
Figure 48:
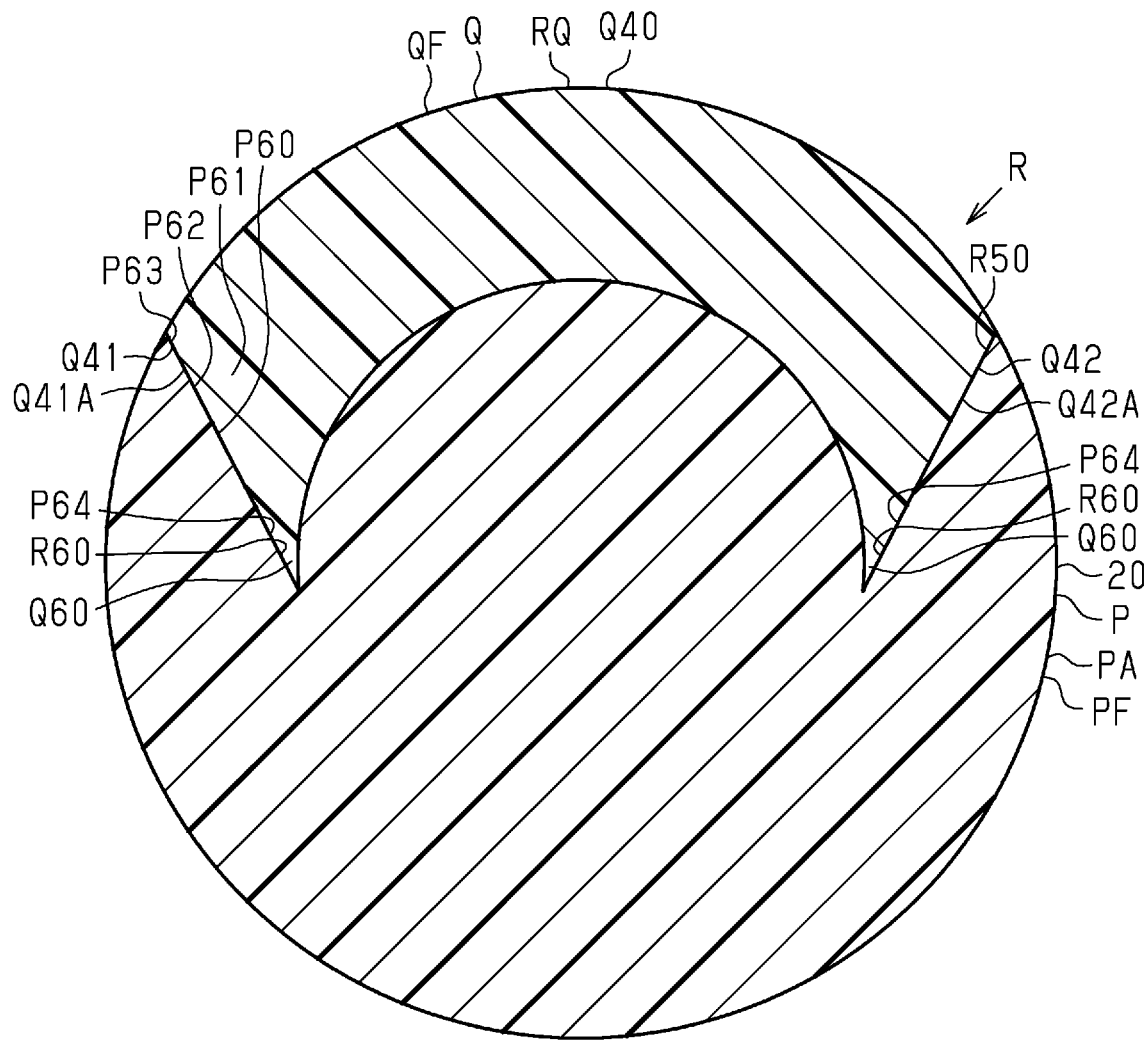
FIG. 48 is a cross-sectional view (3) of the molded article according to the fifteenth embodiment.

FIGS. 46 to 48 will be referred to, FIGS. 46 to 48 illustrate cross sections of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The recessed part P60 of the primary molded part P includes one or a plurality of wedge parts P64. The wedge parts P64 are constituted such that a portion of the secondary molded part Q can be disposed therein. The wedge parts P64 are constituted such that they become undercut with respect to the primary mold. For example, the wedge parts P64 are provided in a bottom part of the recessed part P60. The disposition space P61 of the recessed part P60 includes spaces formed in the wedge parts P64.

The covering part Q40 of the secondary molded part Q includes the internal projecting part Q60. The internal projecting part Q60 is disposed in the disposition space P61 of the recessed part P60 including the spaces of the wedge parts P64. The internal projecting part Q60 is constituted such that it fills the disposition space P61 of the recessed part P60 including the spaces of the wedge parts P64. The internal projecting part Q60 is joined to the disposition surface P62 of the recessed part P60 including surfaces of the wedge parts P64.

The restriction structure R includes the undercut part R60. The wedge parts P64 of the primary molded part P correspond to the undercut part R60 of the restriction structure R.

Sixteenth Embodiment

The molded article 20 according to the present embodiment is constituted on the premise of any of the first to fifteenth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 49:
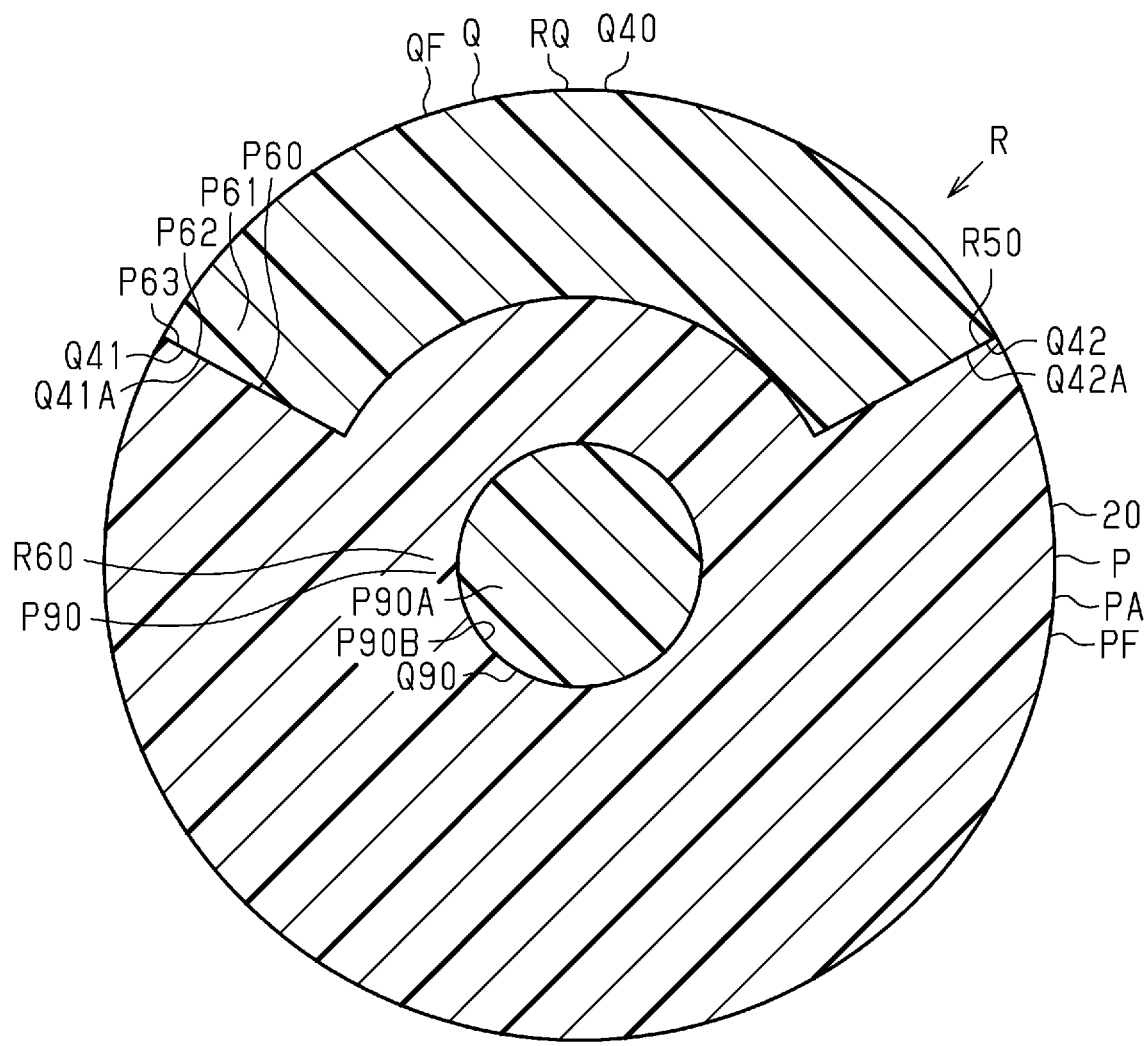
FIG. 49 is a cross-sectional view of the molded article according to a sixteenth embodiment.

FIG. 49 will be referred to, FIG. 49 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The primary main body constitution part PA of the primary molded part P includes a main body hollow part P90. A constitution of the main body hollow part P90 can be arbitrarily selected. The constitution of the main body hollow part P90 is not limited to the exemplified constitution.

The main body hollow part P90 is constituted such that it becomes undercut with respect to the primary mold.

For example, the main body hollow part P90 includes an internal space P90A and an inner circumferential surface P90B. The internal space P90A is formed such that a portion of the secondary molded part Q can be disposed. The inner circumferential surface P90B defines the internal space P90A. A constitution of the primary molded part P related to the main body hollow part P90 will be exemplified.

In a first example, the internal space P90A does not penetrate the primary main body constitution part PA. The main body hollow part P90 includes a first opening part. For example, a center axis of the main body hollow part P90 is parallel to the predetermined direction. For example, the predetermined direction is the axial direction or the width direction. The first opening part opens on the outer surface PF of the primary main body constitution part PA.

In a second example, the main body hollow part P90 penetrates the primary main body constitution part PA. The main body hollow part P90 includes the first opening part and a second opening part. For example, the center axis of the main body hollow part P90 is parallel to the predetermined direction. For example, the predetermined direction is the axial direction or the width direction. The first opening part and the second opening part open on the outer surface PF of the primary main body constitution part PA.

A position of the main body hollow part P90 in the axial direction of the primary main body constitution part PA will be exemplified. In a first example, the main body hollow part P90 is provided in the primary handle constitution part P10. In a second example, the main body hollow part P90 is provided in the neck 120. In a third example, the main body hollow part P90 is provided in the head 130.

In a fourth example, the main body hollow part P90 is provided in the primary handle constitution part P10 and the neck 120. In a fifth example, the main body hollow part P90 is provided in the neck 120 and the head 130. In a sixth example, the main body hollow part P90 is provided in the primary handle constitution part P10, the neck 120, and the head 130.

The secondary molded part Q includes a main body hollow projecting part Q90. The main body hollow projecting part Q90 is disposed in the internal space P90A of the main body hollow part P90. The main body hollow projecting part Q90 is constituted such that it fills the internal space P90A. The main body hollow projecting part Q90 is joined to the inner circumferential surface P90B of the main body hollow part P90.

The covering part Q40 is connected to the main body hollow projecting part Q90 via at least one of the first opening part and the second opening part of the main body hollow part P90.

The restriction structure R includes the undercut part R60. The main body hollow part P90 of the primary molded part P corresponds to the undercut part R60 of the restriction structure R.

Seventeenth Embodiment

The molded article 20 according to the present embodiment is constituted on the premise of any of the first to sixteenth embodiments. The molded article 20 according to the present embodiment has a constitution in common with that of the premised embodiment. In the following description, major differences between the molded article 20 according to the present embodiment and the molded article 20 according to the premised embodiment will be described.

A portion or the entirety of the description related to the constitution of the molded article 20 according to the present embodiment in common with that of the molded article 20 according to the premised embodiment will be omitted.

Figure 50:
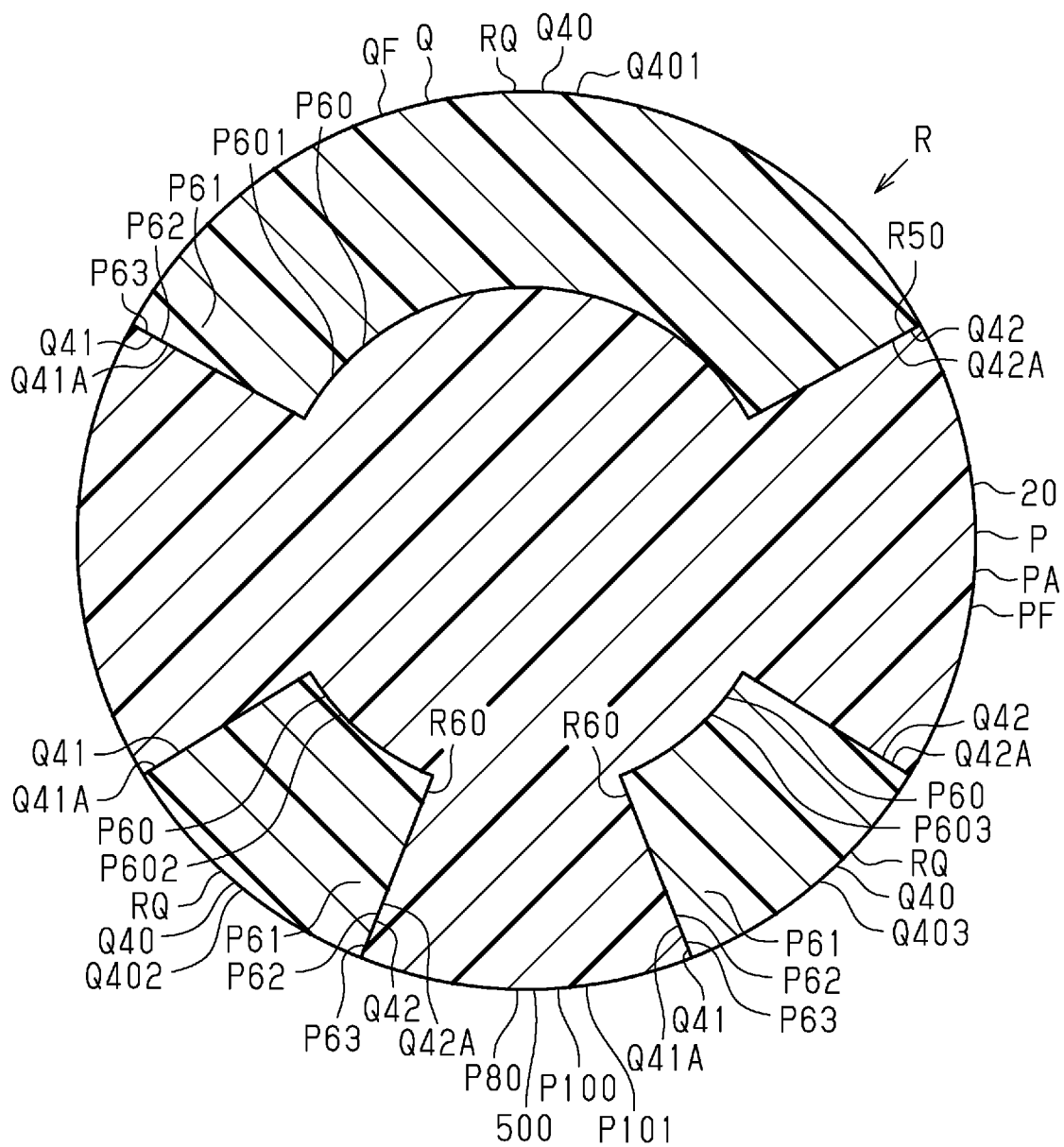
FIG. 50 is a cross-sectional view of the molded article according to a seventeenth embodiment.

FIG. 50 will be referred to, FIG. 50 illustrates a cross section of the molded article 20 parallel to the third reference surface. The constitution of the molded article 20 according to the present embodiment includes a constitution in which a portion of the molded article 20 according to the premised embodiment is changed such that it matches the shape of the illustrated cross section.

The primary molded part P includes a plurality of recessed parts P60. A constitution related to the plurality of recessed parts P60 can be arbitrarily selected. The constitution related to the plurality of recessed parts P60 is not limited to the exemplified constitution. For example, the plurality of recessed parts P60 includes the first recessed part P601, the second recessed part P602, and a third recessed part P603. The first recessed part P601 is provided at a position opposite to the second recessed part P602 and the third recessed part P603 in the radial direction.

Constitutions of the first recessed part P601 and the second recessed part P602 conform to the constitutions of the first recessed part P601 and the second recessed part P602 in the eighth embodiment.

For example, the third recessed part P603 is provided in the primary main body constitution part PA. The third recessed part P603 includes the disposition space P61, the disposition surface P62, and the opening part P63. The disposition space P61 is constituted such that it is recessed with respect to the outer surface PF of the primary molded part P. The disposition surface P62 defines the disposition space P61. The opening part P63 opens on the outer surface PF of the primary molded part P.

A position of the third recessed part P603 in the circumferential direction of the primary molded part P will be exemplified. In a first example, the third recessed part P603 is provided on the rear surface of the primary molded part P. In a second example, the third recessed part P603 is provided on the front surface of the primary molded part P. In a third example, the third recessed part P603 is provided on the second side surface of the primary molded part P. In a fourth example, the third recessed part P603 is provided on the first side surface of the primary molded part P.

A position of the third recessed part P603 in the axial direction of the primary molded part P will be exemplified. In a first example, the third recessed part P603 is provided in the primary handle constitution part P10. In a second example, the third recessed part P603 is provided in the neck 120. In a third example, the third recessed part P603 is provided in the head 130.

In a fourth example, the third recessed part P603 is provided in the primary handle constitution part P10 and the neck 120. In a fifth example, the third recessed part P603 is provided in the neck 120 and the head 130. In a sixth example, the third recessed part P603 is provided in the primary handle constitution part P10, the neck 120, and the head 130.

A relationship between a length of the first recessed part P601, a length of the second recessed part P602, and a length of the third recessed part P603 in the axial direction will be exemplified. In a first example, the length of the first recessed part P601 is longer than the length of the second recessed part P602 and the length of the third recessed part P603. In a second example, the length of the first recessed part P601 is shorter than the length of the second recessed part P602 and the length of the third recessed part P603. In a third example, the length of the first recessed part P601 is equal to the length of the second recessed part P602 and the length of the third recessed part P603.

A relationship between the length of the second recessed part P602 and the length of the third recessed part P603 in the axial direction will be exemplified. In a first example, the length of the second recessed part P602 is longer than the length of the third recessed part P603. In a second example, the length of the second recessed part P602 is shorter than the length of the third recessed part P603. In a third example, the length of the second recessed part P602 is equal to the length of the third recessed part P603.

A relationship between the length of the first recessed part P601, the length of the second recessed part P602, and the length of the third recessed part P603 in the circumferential direction will be exemplified. In a first example, the length of the first recessed part P601 is longer than the length of the second recessed part P602 and the length of the third recessed part P603. In a second example, the length of the first recessed part P601 is shorter than the length of the second recessed part P602 and the length of the third recessed part P603. In a third example, the length of the first recessed part P601 is equal to the length of the second recessed part P602 and the length of the third recessed part P603.

A relationship between the length of the second recessed part P602 and the length of the third recessed part P603 in the circumferential direction will be exemplified. In a first example, the length of the second recessed part P602 is longer than the length of the third recessed part P603. In a second example, the length of the second recessed part P602 is shorter than the length of the third recessed part P603. In a third example, the length of the second recessed part P602 is equal to the length of the third recessed part P603.

The primary molded part P includes the protrusion part P80. The protrusion part P80 is positioned between the second recessed part P602 and the third recessed part P603 in the circumferential direction. The protrusion part P80 protrudes in the radial direction with respect to the bottom surface of the disposition surface P62 of the second recessed part P602 and the bottom surface of the disposition surface P62 of the third recessed part P603. The protrusion part P80 is constituted such that it becomes undercut with respect to the primary mold.

The secondary molded part Q includes a plurality of covering parts Q40. A constitution related to the plurality of covering parts Q40 can be arbitrarily selected. The constitution related to the plurality of covering parts Q40 is not limited to the exemplified constitution. For example, the plurality of covering parts Q40 includes a first covering part Q401, a second covering part Q402, and a third covering part Q403.

The first covering part Q401 is disposed in the first recessed part P601. The first covering part Q401 is constituted such that it fills the disposition space P61 of the first recessed part P601. The first covering part Q401 includes the first circumferential end part Q41 and the second circumferential end part Q42. The first covering part Q401 is joined to the disposition surface P62 of the first recessed part P601.

The second covering part Q402 is disposed in the second recessed part P602. The second covering part Q402 is constituted such that it fills the disposition space P61 of the second recessed part P602. The second covering part Q402 includes the first circumferential end part Q41 and the second circumferential end part Q42. The second covering part Q402 is joined to the disposition surface P62 of the second recessed part P602.

The third covering part Q403 is disposed in the third recessed part P603. The third covering part Q403 is constituted such that it fills the disposition space P61 of the third recessed part P603. The third covering part Q403 includes the first circumferential end part Q41 and the second circumferential end part Q42. The third covering part Q403 is joined to the disposition surface P62 of the third recessed part P603.

In an example, the secondary molded part Q includes at least one of a first connection part to a third connection part. The first connection part connects the first covering part Q401 and the second covering part Q402 to each other. The second connection part connects the first covering part Q401 and the third covering part Q403 to each other. The third connection part connects the second covering part Q402 and the third covering part Q403 to each other. Each of the connection parts is provided on the outer surface PF of the primary molded part P or in a hole penetrating the primary molded part P.

The restriction structure R includes the disposition part R50 and the undercut part R60. The recessed part P60 of the primary molded part P corresponds to the disposition part R50 of the restriction structure R. The protrusion part P80 of the primary molded part P corresponds to the undercut part R60 of the restriction structure R.

Eighteenth Embodiment

The molded article 20 according to the present embodiment is constituted on the premise of any of the first to seventeenth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The surface projection part 410 according to the present embodiment includes a plurality of geometrically-shaped surfaces 420. The constitution related to the surface projection part 410 including the shapes of the geometrically-shaped surfaces 420 and the disposition form of the geometrically-shaped surfaces 420 can be arbitrarily selected.

The total number of the geometrically-shaped surfaces 420 included in the surface projection part 410 will be referred to as "a total surface number GNT". In an example, the total surface number GNT is included in a predetermined range related to the total surface number GNT. The predetermined range will be exemplified. In a first example, the predetermined range is a range of a lower limit surface number GNT1 or larger. In a second example, the predetermined range is a range of an upper limit surface number GNT2 or smaller. In a third example, the predetermined range is a range of the lower limit surface number GNT1 to the upper limit surface number GNT2.

For example, the lower limit surface number GNT1 is selected from 4, 12, and 20. For example, the upper limit surface number GNT2 is selected from 100, 150, and 200. Examples of the predetermined range of the third example include third A to third I examples as follows.

In the third A example, the predetermined range is a range of 4 to 100. In the third B example, the predetermined range is a range of 4 to 150. In the third C example, the predetermined range is a range of 4 to 200.

In the third D example, the predetermined range is a range of 12 to 100. In the third E example, the predetermined range is a range of 12 to 150. In the third F example, the predetermined range is a range of 12 to 200.

In the third G example, the predetermined range is a range of 20 to 100. In the third H example, the predetermined range is a range of 20 to 150. In the third I example, the predetermined range is a range of 20 to 200.

When the total surface number GNT is equal to or larger than the lower limit surface number GNT1, the surface projection part 410 is likely to be conspicuous. When the total surface number GNT is equal to or smaller than the upper limit surface number GNT2, room for forming a surface other than the geometrically-shaped surfaces 420 increases on an outer surface of the molded article 20.

The sum of areas of the geometrically-shaped surfaces 420 will be referred to as "a total area GST". In an example, the total area GST is included in a predetermined range related to the total area GST. The predetermined range will be exemplified. In a first example, the predetermined range is a range of a lower limit area GST1 or larger. In a second example, the predetermined range is a range of an upper limit area GST2 or smaller. In a third example, the predetermined range is a range of the lower limit area GST1 to the upper limit area GST2.

For example, the lower limit area GST1 is selected from 28 mm², 84 mm², and 140 mm². For example, the upper limit area GST2 is selected from 700 mm², 1,050 mm², and 1,400 mm². Examples of the predetermined range of the third example include third A to third I examples as follows.

In the third A example, the predetermined range is a range of 28 mm² to 700 mm². In the third B example, the predetermined range is a range of 28 mm² to 1,050 mm². In the third C example, the predetermined range is a range of 28 mm² to 1,400 mm².

In the third D example, the predetermined range is a range of 84 mm² to 700 mm². In the third E example, the predetermined range is a range of 84 mm² to 1,050 mm². In the third F example, the predetermined range is a range of 84 mm² to 1,400 mm².

In the third G example, the predetermined range is a range of 140 mm² to 700 mm². In the third H example, the predetermined range is a range of 140 mm² to 1,050 mm². In the third I example, the predetermined range is a range of 140 mm² to 1,400 mm².

When the total area GST is equal to or larger than the lower limit area GST1, the surface projection part 410 is likely to be conspicuous. When the total area GST is equal to or smaller than the upper limit area GST2, room for forming a surface other than the geometrically-shaped surfaces 420 increases on the outer surface of the molded article 20.

A proportion of the total area GST to a surface area of the molded article 20 will be referred to as "a total area ratio". In an example, the total area ratio is included in a predetermined range related to the total area ratio. The predetermined range will be exemplified. In a first example, the predetermined range is a range of a lower limit area ratio GSX1 or larger. In a second example, the predetermined range is a range of an upper limit area ratio GSX2 or smaller. In a third example, the predetermined range is a range of the lower limit area ratio GSX1 to the upper limit area ratio GSX2.

For example, the lower limit area ratio GSX1 is selected from 0.6%, 1.8%, and 3.1%. For example, the upper limit area ratio GSX2 is selected from 16%, 24%, and 32%. Examples of the predetermined range of the third example include third A to third I examples as follows.

In the third A example, the predetermined range is a range of 0.6% to 16%. In the third B example, the predetermined range is a range of 0.6% to 24%. In the third C example, the predetermined range is a range of 0.6% to 32%.

In the third D example, the predetermined range is a range of 1.8% to 16%. In the third E example, the predetermined range is a range of 1.8% to 24%. In the third F example, the predetermined range is a range of 1.8% to 32%.

In the third G example, the predetermined range is a range of 3.1% to 16%. In the third H example, the predetermined range is a range of 3.1% to 24%. In the third I example, the predetermined range is a range of 3.1% to 32%.

When the total area ratio is equal to or larger than the lower limit area ratio GSX1, the surface projection part 410 is likely to be conspicuous. When the total area ratio is equal to or smaller than the upper limit area ratio GSX2, room for forming a surface other than the geometrically-shaped surfaces 420 increases on the outer surface of the molded article 20.

Nineteenth Embodiment

The molded article 20 according to the present embodiment is constituted on the premise of any of the first to eighteenth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The surface projection part 410 according to the present embodiment includes at least one mountain shape part 430. An angle of the apex part of the mountain shape part 430 will be referred to as "an apex part angle GGA". The apex part angle GGA corresponds to an angle formed by two geometrically-shaped surfaces 420 sharing a side corresponding to the apex part of the mountain shape part 430.

In an example, the apex part angle GGA is included in a predetermined range related to the apex part angle GGA. The predetermined range will be exemplified. In a first example, the predetermined range is a range of a lower limit angle GGA1 or larger. In a second example, the predetermined range is a range of an upper limit angle GGA2 or smaller. In a third example, the predetermined range is a range of the lower limit angle GGA1 to the upper limit angle GGA2.

For example, the lower limit angle GGA1 is selected from 45°, 90°, and 135°. For example, the upper limit angle GGA2 is selected from 170°, 175°, and 180°. Examples of the predetermined range of the third example include third A to third I examples as follows.

In the third A example, the predetermined range is a range of 45° to 170°. In the third B example, the predetermined range is a range of 45° to 175°. In the third C example, the predetermined range is a range of 45° to 180°.

In the third D example, the predetermined range is a range of 90° to 170°. In the third E example, the predetermined range is a range of 90° to 175°. In the third F example, the predetermined range is a range of 90° to 180°.

In the third G example, the predetermined range is a range of 135° to 170°. In the third H example, the predetermined range is a range of 135° to 175°. In the third I example, the predetermined range is a range of 135° to 180°.

When the apex part angle GGA is equal to or larger than the lower limit angle GGA1, the mountain shape part 430 is likely to be conspicuous. When the apex part angle GGA is equal to or smaller than the upper limit angle GGA2, a height of the mountain shape part 430 is likely to be controlled.

Twentieth Embodiment

The molded article 20 according to the present embodiment is constituted on the premise of any of the first to nineteenth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The surface projection part 410 according to the present embodiment includes at least one valley shape part 440. An angle of the bottom part of the valley shape part 440 will be referred to as "a bottom part angle GGB". The bottom part angle GGB corresponds to an angle formed by two geometrically-shaped surfaces 420 sharing a side corresponding to the bottom part of the valley shape part 440.

In an example, the bottom part angle GGB is included in a predetermined range related to the bottom part angle GGB. The predetermined range will be exemplified. In a first example, the predetermined range is a range of a lower limit angle GGB1 or larger. In a second example, the predetermined range is a range of an upper limit angle GGB2 or smaller. In a third example, the predetermined range is a range of the lower limit angle GGB1 to the upper limit angle GGB2.

For example, the lower limit angle GGB1 is selected from 45°, 90°, and 135°. For example, the upper limit angle GGB2 is selected from 170°, 175°, and 180°. Examples of the predetermined range of the third example include third A to third I examples as follows.

In the third A example, the predetermined range is a range of 45° to 170°. In the third B example, the predetermined range is a range of 45° to 175°. In the third C example, the predetermined range is a range of 45° to 180°.

In the third D example, the predetermined range is a range of 90° to 170°. In the third E example, the predetermined range is a range of 90° to 175°. In the third F example, the predetermined range is a range of 90° to 180°.

In the third G example, the predetermined range is a range of 135° to 170°. In the third H example, the predetermined range is a range of 135° to 175°. In the third I example, the predetermined range is a range of 135° to 180°.

When the bottom part angle GGB is equal to or larger than the lower limit angle GGB1, the valley shape part 440 is likely to be conspicuous. When the bottom part angle GGB is equal to or smaller than the upper limit angle GGB2, a depth of the valley shape part 440 is likely to be controlled.

(Twenty-First Embodiment)

The molded article 20 according to the present embodiment is constituted on the premise of any of the first to twentieth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The surface projection part 410 according to the present embodiment includes a plurality of geometrically-shaped surfaces 420. The disposition form of the plurality of geometrically-shaped surfaces 420 is the 111th disposition form. The surface projection part 410 includes one 111th group. The plurality of geometrically-shaped surfaces 420 includes a plurality of first type geometrically-shaped surfaces 421 and a plurality of second type geometrically-shaped surfaces 422.

The total number of the first type geometrically-shaped surfaces 421 included in the surface projection part 410 will be referred to as "a first type surface number GNA". In an example, the first type surface number GNA is included in a predetermined range related to the first type surface number GNA. The predetermined range will be exemplified. In a first example, the predetermined range is a range of a lower limit surface number GNA1 or larger. In a second example, the predetermined range is a range of an upper limit surface number GNA2 or smaller. In a third example, the predetermined range is a range of the lower limit surface number GNA1 to the upper limit surface number GNA2.

For example, the lower limit surface number GNA1 is selected from 4, 12, and 20. For example, the upper limit surface number GNA2 is selected from 100, 150, and 200. Examples of the predetermined range of the third example include third A to third I examples as follows.

In the third A example, the predetermined range is a range of 4 to 100. In the third B example, the predetermined range is a range of 4 to 150. In the third C example, the predetermined range is a range of 4 to 200.

In the third D example, the predetermined range is a range of 12 to 100. In the third E example, the predetermined range is a range of 12 to 150. In the third F example, the predetermined range is a range of 12 to 200.

In the third G example, the predetermined range is a range of 20 to 100. In the third H example, the predetermined range is a range of 20 to 150. In the third I example, the predetermined range is a range of 20 to 200.

When the first type surface number GNA is equal to or larger than the lower limit surface number GNA1, the first type geometrically-shaped surfaces 421 are likely to be conspicuous. When the first type surface number GNA is equal to or smaller than the upper limit surface number GNA2, room for forming the second type geometrically-shaped surfaces 422 increases.

The total number of the second type geometrically-shaped surfaces 422 included in the surface projection part 410 will be referred to as "a second type surface number GNB". In an example, the second type surface number GNB is included in a predetermined range related to the second type surface number GNB. The predetermined range will be exemplified. In a first example, the predetermined range is a range of a lower limit surface number GNB1 or larger. In a second example, the predetermined range is a range of an upper limit surface number GNB2 or smaller. In a third example, the predetermined range is a range of the lower limit surface number GNB1 to the upper limit surface number GNB2.

For example, the lower limit surface number GNB1 is selected from 1, 8, and 15. For example, the upper limit surface number GNB2 is selected from 20, 30, and 40. Examples of the predetermined range of the third example include third A to third I examples as follows.

In the third A example, the predetermined range is a range of 1 to 20. In the third B example, the predetermined range is a range of 1 to 30. In the third C example, the predetermined range is a range of 1 to 40.

In the third D example, the predetermined range is a range of 8 to 20. In the third E example, the predetermined range is a range of 8 to 30. In the third F example, the predetermined range is a range of 8 to 40.

In the third G example, the predetermined range is a range of 15 to 20. In the third H example, the predetermined range is a range of 15 to 30. In the third I example, the predetermined range is a range of 15 to 40.

When the second type surface number GNB is equal to or larger than the lower limit surface number GNB1, the surface projection part 410 can be constituted of two types of surfaces, such as the first type geometrically-shaped surfaces 421 and the second type geometrically-shaped surfaces 422. When the second type surface number GNB is equal to or smaller than the upper limit surface number GNB2, room for forming the first type geometrically-shaped surfaces 421 increases.

A proportion of the first type surface number GNA to the total surface number GNT will be referred to as "a first type surface number ratio". In an example, the first type surface number ratio is included in a predetermined range related to the first type surface number ratio. The predetermined range will be exemplified. In a first example, the predetermined range is a range of a lower limit surface number ratio GN11 or larger. In a second example, the predetermined range is a range of an upper limit surface number ratio GN12 or smaller. In a third example, the predetermined range is a range of the lower limit surface number ratio GN11 to the upper limit surface number ratio GN12.

For example, the lower limit surface number ratio GN11 is selected from 9%, 28%, and 50%. For example, the upper limit surface number ratio GN12 is selected from 87%, 95%, and 99%. Examples of the predetermined range of the third example include third A to third I examples as follows.

In the third A example, the predetermined range is a range of 9% to 87%. In the third B example, the predetermined range is a range of 9% to 95%. In the third C example, the predetermined range is a range of 9% to 99%.

In the third D example, the predetermined range is a range of 28% to 87%. In the third E example, the predetermined range is a range of 28% to 95%. In the third F example, the predetermined range is a range of 28% to 99%.

In the third G example, the predetermined range is a range of 50% to 87%. In the third H example, the predetermined range is a range of 50% to 95%. In the third I example, the predetermined range is a range of 50% to 99%.

When the first type surface number ratio is equal to or larger than the lower limit surface number ratio GN11, the first type geometrically-shaped surfaces 421 are likely to be conspicuous. When the first type surface number ratio is equal to or smaller than the upper limit surface number ratio GN12, room for forming the second type geometrically-shaped surfaces 422 increases.

A proportion of the second type surface number GNB to the total surface number GNT will be referred to as "a second type surface number ratio". In an example, the second type surface number ratio is included in a predetermined range related to the second type surface number ratio. The predetermined range will be exemplified. In a first example, the predetermined range is a range of a lower limit surface number ratio GN21 or larger. In a second example, the predetermined range is a range of an upper limit surface number ratio GN22 or smaller. In a third example, the predetermined range is a range of the lower limit surface number ratio GN21 to the upper limit surface number ratio GN22.

For example, the lower limit surface number ratio GN21 is selected from 1%, 5%, and 13%. For example, the upper limit surface number ratio GN22 is selected from 50%, 72%, and 91%. Examples of the predetermined range of the third example include third A to third I examples as follows.

In the third A example, the predetermined range is a range of 1% to 50%. In the third B example, the predetermined range is a range of 1% to 72%. In the third C example, the predetermined range is a range of 1% to 91%.

In the third D example, the predetermined range is a range of 5% to 50%. In the third E example, the predetermined range is a range of 5% to 72%. In the third F example, the predetermined range is a range of 5% to 91%.

In the third G example, the predetermined range is a range of 13% to 50%. In the third H example, the predetermined range is a range of 13% to 72%. In the third I example, the predetermined range is a range of 13% to 91%.

When the second type surface number ratio is equal to or larger than the lower limit surface number ratio GN21, the surface projection part 410 can be constituted of two types of surfaces, such as the first type geometrically-shaped surfaces 421 and the second type geometrically-shaped surfaces 422. When the second type surface number ratio is equal to or smaller than the upper limit surface number ratio GN22, room for forming the first type geometrically-shaped surfaces 421 increases.

An area of the first type geometrically-shaped surface 421 will be referred to as "a first type area GSA". In an example, the first type area GSA is included in a predetermined range related to the first type area GSA. The predetermined range will be exemplified. In a first example, the predetermined range is a range of a lower limit area GSA1 or larger. In a second example, the predetermined range is a range of an upper limit area GSA2 or smaller. In a third example, the predetermined range is a range of the lower limit area GSA1 to the upper limit area GSA2.

For example, the lower limit area GSA1 is selected from $0.2\ mm^2$, $1\ mm^2$, and $2\ mm^2$. For example, the upper limit area GSA2 is selected from $30\ mm^2$, $40\ mm^2$, and $50\ mm^2$. Examples of the predetermined range of the third example include third A to third I examples as follows.

In the third A example, the predetermined range is a range of $0.2\ mm^2$ to $30\ mm^2$. In the third B example, the predetermined range is a range of $0.2\ mm^2$ to $40\ mm^2$. In the third C example, the predetermined range is a range of $0.2\ mm^2$ to $50\ mm^2$.

In the third D example, the predetermined range is a range of $1\ mm^2$ to $30\ mm^2$. In the third E example, the predetermined range is a range of $1\ mm^2$ to $40\ mm^2$. In the third F example, the predetermined range is a range of $1\ mm^2$ to $50\ mm^2$.

In the third G example, the predetermined range is a range of $2\ mm^2$ to $30\ mm^2$. In the third H example, the predetermined range is a range of $2\ mm^2$ to $40\ mm^2$. In the third I example, the predetermined range is a range of $2\ mm^2$ to $50\ mm^2$.

When the first type area GSA is equal to or larger than the lower limit area GSA1, the first type geometrically-shaped surfaces 421 are likely to be conspicuous. When the first type area GSA is equal to or smaller than the upper limit area GSA2, room for forming the second type geometrically-shaped surfaces 422 increases.

An area of the second type geometrically-shaped surfaces 422 will be referred to as "a second type area GSB". In an example, the second type area GSB is included in a predetermined range related to the second type area GSB. The predetermined range will be exemplified. In a first example, the predetermined range is a range of a lower limit area GSB1 or larger. In a second example, the predetermined range is a range of an upper limit area GSB2 or smaller. In a third example, the predetermined range is a range of the lower limit area GSB1 to the upper limit area GSB2.

For example, the lower limit area GSB1 is selected from 0.2 mm$^2$, 1 mm$^2$, and 2 mm$^2$. For example, the upper limit area GSB2 is selected from 30 mm$^2$, 40 mm$^2$, and 50 mm$^2$. Examples of the predetermined range of the third example include third A to third I examples as follows.

In the third A example, the predetermined range is a range of 0.2 mm$^2$ to 30 mm$^2$. In the third B example, the predetermined range is a range of 0.2 mm$^2$ to 40 mm$^2$. In the third C example, the predetermined range is a range of 0.2 mm$^2$ to 50 mm$^2$.

In the third D example, the predetermined range is a range of 1 mm$^2$ to 30 mm$^2$. In the third E example, the predetermined range is a range of 1 mm$^2$ to 40 mm$^2$. In the third F example, the predetermined range is a range of 1 mm$^2$ to 50 mm$^2$.

In the third G example, the predetermined range is a range of 2 mm$^2$ to 30 mm$^2$. In the third H example, the predetermined range is a range of 2 mm$^2$ to 40 mm$^2$. In the third I example, the predetermined range is a range of 2 mm$^2$ to 50 mm$^2$.

When the second type area GSB is equal to or larger than the lower limit area GSB1, the second type geometrically-shaped surfaces 422 are likely to be conspicuous. When the second type area GSB is equal to or smaller than the upper limit area GSB2, room for forming the first type geometrically-shaped surfaces 421 increases.

The sum of areas of the first type geometrically-shaped surfaces 421 will be referred to as "a first type total area GSAT". In an example, the first type total area GSAT is included in a predetermined range related to the first type total area GSAT. The predetermined range will be exemplified. In a first example, the predetermined range is a range of a lower limit area GSAT1 or larger. In a second example, the predetermined range is a range of an upper limit area GSAT2 or smaller. In a third example, the predetermined range is a range of the lower limit area GSAT1 to the upper limit area GSAT2.

For example, the lower limit area GSAT1 is selected from 28 mm$^2$, 84 mm$^2$, and 140 mm$^2$. For example, the upper limit area GSAT2 is selected from 500 mm$^2$, 750 mm$^2$, and 1,000 mm$^2$. Examples of the predetermined range of the third example include third A to third I examples as follows.

In the third A example, the predetermined range is a range of 28 mm$^2$ to 500 mm$^2$. In the third B example, the predetermined range is a range of 28 mm$^2$ to 750 mm$^2$. In the third C example, the predetermined range is a range of 28 mm$^2$ to 1,000 mm$^2$.

In the third D example, the predetermined range is a range of 84 mm$^2$ to 500 mm$^2$. In the third E example, the predetermined range is a range of 84 mm$^2$ to 750 mm$^2$. In the third F example, the predetermined range is a range of 84 mm$^2$ to 1,000 mm$^2$.

In the third G example, the predetermined range is a range of 140 mm$^2$ to 500 mm$^2$. In the third H example, the predetermined range is a range of 140 mm$^2$ to 750 mm$^2$. In the third I example, the predetermined range is a range of 140 mm$^2$ to 1,000 mm$^2$.

When the first type total area GSAT is equal to or larger than the lower limit area GSAT1, the first type geometrically-shaped surfaces 421 are likely to be conspicuous. When the first type total area GSAT is equal to or smaller than the upper limit area GSAT2, room for forming the second type geometrically-shaped surfaces 422 increases.

The sum of areas of the second type geometrically-shaped surfaces 422 will be referred to as "a second type total area GSBT". In an example, the second type total area GSBT is included in a predetermined range related to the second type total area GSBT. The predetermined range will be exemplified. In a first example, the predetermined range is a range of a lower limit area GSBT1 or larger. In a second example, the predetermined range is a range of an upper limit area GSBT2 or smaller. In a third example, the predetermined range is a range of the lower limit area GSBT1 to the upper limit area GSBT2.

For example, the lower limit area GSBT1 is selected from 2.8 mm$^2$, 16.8 mm$^2$, and 28 mm$^2$. For example, the upper limit area GSBT2 is selected from 100 mm$^2$, 150 mm$^2$, and 200 mm$^2$. Examples of the predetermined range of the third example include third A to third I examples as follows.

In the third A example, the predetermined range is a range of 2.8 mm$^2$ to 100 mm$^2$. In the third B example, the predetermined range is a range of 2.8 mm$^2$ to 150 mm$^2$. In the third C example, the predetermined range is a range of 2.8 mm$^2$ to 200 mm$^2$.

In the third D example, the predetermined range is a range of 16.8 mm$^2$ to 100 mm$^2$. In the third E example, the predetermined range is a range of 16.8 mm$^2$ to 150 mm$^2$. In the third F example, the predetermined range is a range of 16.8 mm$^2$ to 200 mm$^2$.

In the third G example, the predetermined range is a range of 28 mm$^2$ to 100 mm$^2$. In the third H example, the predetermined range is a range of 28 mm$^2$ to 150 mm$^2$. In the third I example, the predetermined range is a range of 28 mm$^2$ to 200 mm$^2$.

When the second type total area GSBT is equal to or larger than the lower limit area GSBT1, the second type geometrically-shaped surfaces 422 are likely to be conspicuous. When the second type total area GSBT is equal to or smaller than the upper limit area GSBT2, room for forming the first type geometrically-shaped surfaces 421 increases.

A proportion of the first type total area GSAT to the total area GST will be referred to as "a first type area ratio". In an example, the first type area ratio is included in a predetermined range related to the first type area ratio. The predetermined range will be exemplified. In a first example, the predetermined range is a range of a lower limit area ratio GS11 or larger. In a second example, the predetermined range is a range of an upper limit area ratio GS12 or smaller. In a third example, the predetermined range is a range of the lower limit area ratio GS11 to the upper limit area ratio GS12.

For example, the lower limit area ratio GS11 is selected from 2%, 8%, and 20%. For example, the upper limit area ratio GS12 is selected from 95%, 98%, and 99%. Examples of the predetermined range of the third example include third A to third I examples as follows.

In the third A example, the predetermined range is a range of 2% to 95%. In the third B example, the predetermined range is a range of 2% to 98%. In the third C example, the predetermined range is a range of 2% to 99%.

In the third D example, the predetermined range is a range of 8% to 95%. In the third E example, the predetermined range is a range of 8% to 98%. In the third F example, the predetermined range is a range of 8% to 99%.

In the third G example, the predetermined range is a range of 20% to 95%. In the third H example, the predetermined range is a range of 20% to 98%. In the third I example, the predetermined range is a range of 20% to 99%.

When the first type area ratio is equal to or larger than the lower limit area ratio GS11, the first type geometrically-shaped surfaces 421 are likely to be conspicuous. When the first type area ratio is equal to or smaller than the upper limit area ratio GS12, room for forming the second type geometrically-shaped surfaces 422 increases.

A proportion of the second type total area GSBT to the total area GST will be referred to as "a second type area ratio". In an example, the second type area ratio is included in a predetermined range related to the second type area ratio. The predetermined range will be exemplified. In a first example, the predetermined range is a range of a lower limit area ratio GS21 or larger. In a second example, the predetermined range is a range of an upper limit area ratio GS22 or smaller. In a third example, the predetermined range is a range of the lower limit area ratio GS21 to the upper limit area ratio GS22.

For example, the lower limit area ratio GS21 is selected from 1%, 2%, and 4%. For example, the upper limit area ratio GS22 is selected from 42%, 64%, and 88%. Examples of the predetermined range of the third example include third A to third I examples as follows.

In the third A example, the predetermined range is a range of 1% to 42%. In the third B example, the predetermined range is a range of 1% to 64%. In the third C example, the predetermined range is a range of 1% to 88%.

In the third D example, the predetermined range is a range of 2% to 42%. In the third E example, the predetermined range is a range of 2% to 64%. In the third F example, the predetermined range is a range of 2% to 88%.

In the third G example, the predetermined range is a range of 4% to 42%. In the third H example, the predetermined range is a range of 4% to 64%. In the third I example, the predetermined range is a range of 4% to 88%.

When the second type area ratio is equal to or larger than the lower limit area ratio GS21, the second type geometrically-shaped surfaces 422 are likely to be conspicuous. When the second type area ratio is equal to or smaller than the upper limit area ratio GS22, room for forming the first type geometrically-shaped surfaces 421 increases.

(Twenty-second embodiment)

The molded article 20 according to the present embodiment is constituted on the premise of any of the first to twenty-first embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The largest outer diameter of the protrusion part 220 will be referred to as "an outer diameter RP". A size of the outer diameter RP can be arbitrarily selected. The size of the outer diameter RP is not limited to the exemplified size. In an example, the outer diameter RP is equal to the largest width of the protrusion part 220.

In an example, the outer diameter RP is included in a predetermined range. The predetermined range will be exemplified. In a first example, the predetermined range is a range of a lower limit outer diameter or larger. In a second example, the predetermined range is a range of an upper limit outer diameter or smaller. In a third example, the predetermined range is a range of the lower limit outer diameter to the upper limit outer diameter.

For example, the lower limit outer diameter is selected from 0.5 mm and 1 mm. For example, the upper limit outer diameter is selected from 3 mm and 7 mm. Examples of the predetermined range of the third example include thirty-first to thirty-fourth examples as follows.

In the thirty-first example, the predetermined range is a range of 0.5 mm to 3 mm. In the thirty-second example, the predetermined range is a range of 0.5 mm to 7 mm. In the thirty-third example, the predetermined range is a range of 1 mm to 3 mm. In the thirty-fourth example, the predetermined range is a range of 1 mm to 7 mm.

When the outer diameter RP is equal to or larger than the lower limit outer diameter, the protrusion part 220 is unlikely to be damaged. When the outer diameter RP is equal to or smaller than the upper limit outer diameter, the protrusion part 220 is likely to be removed.

(Twenty-Third Embodiment)

The molded article 20 according to the present embodiment is constituted on the premise of any of the first to twenty-second embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

A length of the protrusion part 220 in the axial direction will be referred to as "a length LP". In an example, the length LP is included in a predetermined range. The predetermined range will be exemplified. In a first example, the predetermined range is a range of a lower limit length or larger. In a second example, the predetermined range is a range of an upper limit length or smaller. In a third example, the predetermined range is a range of the lower limit length to the upper limit length.

For example, the lower limit length is selected from 0.5 mm and 5 mm. For example, the upper limit length is selected from 25 mm and 30 mm. Examples of the predetermined range of the third example include thirty-first to thirty-fourth examples as follows.

In the thirty-first example, the predetermined range is a range of 0.5 mm to 25 mm. In the thirty-second example, the predetermined range is a range of 0.5 mm to 30 mm. In the thirty-third example, the predetermined range is a range of 5 mm to 25 mm. In the thirty-fourth example, the predetermined range is a range of 5 mm to 30 mm.

When the length LP is equal to or larger than the lower limit length, a degree of freedom in selection related to the constitution of the ejector pins increases. When the length LP is equal to or smaller than the upper limit length, the protrusion part 220 is likely to be removed.

(Twenty-Fourth Embodiment)

The molded article 20 according to the present embodiment is constituted on the premise of any of the first to twenty-third embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The largest outer diameter of the handle 110 will be referred to as "an outer diameter RA". A value obtained by dividing the outer diameter RP by the outer diameter RA will be referred to as "a first outer diameter rate". A size of the outer diameter RA can be arbitrarily selected. The size of the outer diameter RA is not limited to the exemplified size. In an example, the outer diameter RA is equal to the largest width of the handle 110.

The largest outer diameter of the neck 120 will be referred to as "an outer diameter RB". A value obtained by dividing the outer diameter RP by the outer diameter RB will be referred to as "a second outer diameter rate". A size of the outer diameter RB can be arbitrarily selected. The size of the outer diameter RB is not limited to the exemplified size. In an example, the outer diameter RB is equal to the largest width of the neck 120.

The largest outer diameter of the head 130 will be referred to as "an outer diameter RC". A value obtained by dividing the outer diameter RP by the outer diameter RC will be referred to as "a third outer diameter rate". A size of the outer diameter RC can be arbitrarily selected. The size of the outer diameter RC is not limited to the exemplified size. In an example, the outer diameter RC is equal to the largest width of the head 130.

In an example, the first outer diameter rate is included in a predetermined range related to the first outer diameter rate. The predetermined range will be exemplified. In a first example, the predetermined range is a range of a lower limit rate X11 or larger. In a second example, the predetermined range is a range of an upper limit rate X12 or smaller. In a third example, the predetermined range is a range of the lower limit rate X11 to the upper limit rate X12.

For example, the lower limit rate X11 is selected from 0.02 and 0.06. For example, the upper limit rate X12 is selected from 0.3 and 1.4. Examples of the predetermined range of the third example include thirty-first to thirty-fourth examples as follows.

In the thirty-first example, the predetermined range is a range of 0.02 to 0.3. In the thirty-second example, the predetermined range is a range of 0.02 to 1.4. In the thirty-third example, the predetermined range is a range of 0.06 to 0.3. In the thirty-fourth example, the predetermined range is a range of 0.06 to 1,4.

When the first outer diameter rate is equal to or larger than the lower limit rate X11, the protrusion part 220 is unlikely to be damaged. When the first outer diameter rate is equal to or smaller than the upper limit rate X12, the protrusion part 220 is likely to be removed.

In an example, the second outer diameter rate is included in a predetermined range related to the second outer diameter rate. The predetermined range will be exemplified. In a first example, the predetermined range is a range of a lower limit rate X21 or larger. In a second example, the predetermined range is a range of an upper limit rate X22 or smaller. In a third example, the predetermined range is a range of the lower limit rate X21 to the upper limit rate X22.

For example, the lower limit rate X21 is selected from 0.04 and 0.2. For example, the upper limit rate X22 is selected from 0.8 and 7. Examples of the predetermined range of the third example include thirty-first to thirty-fourth examples as follows.

In the thirty-first example, the predetermined range is a range of 0.04 to 0.8. In the thirty-second example, the predetermined range is a range of 0.04 to 7. In the thirty-third example, the predetermined range is a range of 0.2 to 0.8. In the thirty-fourth example, the predetermined range is a range of 0.2 to 7.

When the second outer diameter rate is equal to or larger than the lower limit rate X21, the protrusion part 220 is unlikely to be damaged. When the second outer diameter rate is equal to or smaller than the upper limit rate X22, the protrusion part 220 is likely to be removed.

In an example, the third outer diameter rate is included in a predetermined range related to the third outer diameter rate. The predetermined range will be exemplified. In a first example, the predetermined range is a range of a lower limit rate X31 or larger. In a second example, the predetermined range is a range of an upper limit rate X32 or smaller. In a third example, the predetermined range is a range of the lower limit rate X31 to the upper limit rate X32.

For example, the lower limit rate X31 is selected from 0.02 and 0.06. For example, the upper limit rate X32 is selected from 0.3 and 2.3. Examples of the predetermined range of the third example include thirty-first to thirty-fourth examples as follows.

In the thirty-first example, the predetermined range is a range of 0.02 to 0.3. In the thirty-second example, the predetermined range is a range of 0.02 to 2.3. In the thirty-third example, the predetermined range is a range of 0.06 to 0.3. In the thirty-fourth example, the predetermined range is a range of 0.06 to 2.3.

When the third outer diameter rate is equal to or larger than the lower limit rate X31, the protrusion part 220 is unlikely to be damaged. When the third outer diameter rate is equal to or smaller than the upper limit rate X32, the protrusion part 220 is likely to be removed.

(Twenty-Fifth Embodiment)

The molded article 20 according to the present embodiment is constituted on the premise of any of the first to twenty-fourth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

A length of the handle 110 in the axial direction will be referred to as "a length LA". A length of the neck 120 in the axial direction will be referred to as "a length LB". A length of the head 130 in the axial direction will be referred to as "a length LC". A value obtained by dividing the length LP by the length LA will be referred to as "a first length rate". A value obtained by dividing the length LP by the length LB will be referred to as "a second length rate". A value obtained by dividing the length LP by the length LC will be referred to as "a third length rate".

In an example, the first length rate is included in a predetermined range related to the first length rate. The predetermined range will be exemplified. In a first example, the predetermined range is a range of a lower limit rate Y11 or larger. In a second example, the predetermined range is a range of an upper limit rate Y12 or smaller. In a third example, the predetermined range is a range of the lower limit rate Y11 to the upper limit rate Y12.

For example, the lower limit rate Y11 is selected from 0.003 and 0.05. For example, the upper limit rate Y12 is selected from 0.8 and 1.5. Examples of the predetermined range of the third example include thirty-first to thirty-fourth examples as follows.

In the thirty-first example, the predetermined range is a range of 0.003 to 0.8. In the thirty-second example, the predetermined range is a range of 0.003 to 1.5. In the thirty-third example, the predetermined range is a range of 0.05 to 0.8. In the thirty-fourth example, the predetermined range is a range of 0.05 to 1.5.

When the first length rate is equal to or larger than the lower limit rate Y11, a degree of freedom in selection related to the constitution of the ejector pins increases. When the first length rate is equal to or smaller than the upper limit rate Y12, the protrusion part 220 is likely to be removed.

In an example, the second length rate is included in a predetermined range related to the second length rate. The predetermined range will be exemplified. In a first example, the predetermined range is a range of a lower limit rate Y21 or larger. In a second example, the predetermined range is a range of an upper limit rate Y22 or smaller. In a third example, the predetermined range is a range of the lower limit rate Y21 to the upper limit rate Y22.

For example, the lower limit rate Y21 is selected from 0.003 and 0.04. For example, the upper limit rate Y22 is selected from 0.9 and 3. Examples of the predetermined range of the third example include thirty-first to thirty-fourth examples as follows.

In the thirty-first example, the predetermined range is a range of 0.003 to 0.9. In the thirty-second example, the predetermined range is a range of 0.003 to 3. In the thirty-third example, the predetermined range is a range of 0.04 to 0.9. In the thirty-fourth example, the predetermined range is a range of 0.04 to 3.

When the second length rate is equal to or larger than the lower limit rate Y21, a degree of freedom in selection related to the constitution of the ejector pins increases. When the second length rate is equal to or smaller than the upper limit rate Y22, the protrusion part 220 is likely to be removed.

In an example, the third length rate is included in a predetermined range related to the third length rate. The predetermined range will be exemplified. In a first example, the predetermined range is a range of a lower limit rate Y31 or larger. In a second example, the predetermined range is a range of an upper limit rate Y32 or smaller. In a third example, the predetermined range is a range of the lower limit rate Y31 to the upper limit rate Y32.

For example, the lower limit rate Y31 is selected from 0.01 and 0.09. For example, the upper limit rate Y32 is selected from 1.2 and 8.6. Examples of the predetermined range of the third example include thirty-first to thirty-fourth examples as follows.

In the thirty-first example, the predetermined range is a range of 0.01 to 1.2. In the thirty-second example, the predetermined range is a range of 0.01 to 8.6. In the thirty-third example, the predetermined range is a range of 0.09 to 1.2. In the thirty-fourth example, the predetermined range is a range of 0.09 to 8.6.

When the third length rate is equal to or larger than the lower limit rate Y31, a degree of freedom in selection related to the constitution of the ejector pins increases. When the third length rate is equal to or smaller than the upper limit rate Y32, the protrusion part 220 is likely to be removed.

(Twenty-Sixth Embodiment)

The molded article 20 according to the present embodiment is constituted on the premise of any of the first to twenty-fifth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, a position of the protrusion part 220 with respect to the main body 100 in the molded article 20 differs from that in the premised embodiment. Examples related to the position of the protrusion part 220 include the following examples.

In an example 11, the protrusion part 220 is connected to the first side part P10C of the primary handle constitution part P10 of the primary molded part P. The protrusion part 220 protrudes toward the first width direction with respect to the primary handle constitution part P10.

In an example 12, the protrusion part 220 is connected to the second side part P10D of the primary handle constitution part P10 of the primary molded part P. The protrusion part 220 protrudes toward the second width direction with respect to the primary handle constitution part P10.

In an example 13, the protrusion part 220 is connected to the front surface of the primary handle constitution part P10 of the primary molded part P. The protrusion part 220 protrudes toward the first thickness direction with respect to the primary handle constitution part P10.

In an example 21, the protrusion part 220 is connected to the first side part 120C of the neck 120. The protrusion part 220 protrudes toward the first width direction with respect to the neck 120.

In an example 22, the protrusion part 220 is connected to the second side part 120D of the neck 120. The protrusion part 220 protrudes toward the second width direction with respect to the neck 120.

In an example 23, the protrusion part 220 is connected to the front surface of the neck 120. The protrusion part 220 protrudes toward the first thickness direction with respect to the neck 120.

In an example 31, the protrusion part 220 is connected to the first side part 130C of the head 130. The protrusion part 220 protrudes toward the first width direction with respect to the head 130.

In an example 32, the protrusion part 220 is connected to the second side part 130D of the head 130. The protrusion part 220 protrudes toward the second width direction with respect to the head 130.

In an example 33, the protrusion part 220 is connected to the front surface of the head 130. The protrusion part 220 protrudes toward the first thickness direction with respect to the head 130.

In an example 34, the protrusion part 220 is connected to the first end part 130A of the head 130. The protrusion part 220 protrudes toward the axial direction with respect to the head 130.

For example, it is possible to achieve the effects as follows by means of the constitution exemplified in the embodiment.

In an example of the molded article 20, the protrusion part 220 is provided on the front surface of the primary handle constitution part P10 of the primary molded part P.

According to the foregoing constitution, for example, it is possible to achieve the following effects. The ejector pins can be disposed at positions corresponding to the front surface of the primary handle constitution part P10 of the primary molded part P. In the primary extruding step or the secondary extruding step, the protrusion part 220 can be pressed by means of the ejector pins.

The primary molded part P can be taken out from the primary mold without pressing the front surface of the outer surface PF of the primary handle constitution part P10 by means of the ejector pins. The molded article 20 can be taken out from the secondary mold without pressing the front surface of the outer surface QF of the secondary handle constitution part Q10 by means of the ejector pins. It is possible to expect that design of the oral care product 10 be improved.

A foreign matter is unlikely to gather on the surface of the main body 100.

(Twenty-Seventh Embodiment)

The molded article 20 according to the present embodiment is constituted on the premise of the twenty-sixth embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, the number of protrusion parts 220 in the molded article 20 differs from that in the premised embodiment. The pressurized structure 200 includes a plurality of protrusion parts 220. Examples related to the constitution of the plurality of protrusion parts 220 include the following examples.

In an example S, the pressurized structure 200 includes the protrusion part 220 according to the first embodiment and at least one of the protrusion parts 220 of the examples 11 to 34 according to the twenty-sixth embodiment.

In an example T, the pressurized structure 200 includes at least two of the protrusion parts 220 of the examples 11 to 34 according to the twenty-sixth embodiment. The pressurized structure 200 does not include the protrusion part 220 according to the first embodiment.

Examples included in the example S include the following examples.

In an example S11, the pressurized structure 200 includes at least one of the protrusion part 220 according to the first embodiment, and the protrusion part 220 of the example 11 and the protrusion part 220 of the example 12 according to the twenty-sixth embodiment.

In an example S12, the pressurized structure 200 is constituted on the premise of the example S11. The pressurized structure 200 does not include the particular part 210.

In an example S13, the pressurized structure 200 includes the protrusion part 220 according to the first embodiment and the protrusion part 220 of the example 13 according to the twenty-sixth embodiment.

In an example S14, the pressurized structure 200 is constituted on the premise of the example S13. The pressurized structure 200 does not include the particular part 210.

In an example S21, the pressurized structure 200 includes at least one of the protrusion part 220 according to the first embodiment, and the protrusion part 220 of the example 21 and the protrusion part 220 of the example 22 according to the twenty-sixth embodiment.

In an example S22, the pressurized structure 200 is constituted on the premise of the example S21. The pressurized structure 200 does not include the particular part 210.

In an example S23, the pressurized structure 200 includes the protrusion part 220 according to the first embodiment and the protrusion part 220 of the example 23 according to the twenty-sixth embodiment.

In an example S24, the pressurized structure 200 is constituted on the premise of the example S23. The pressurized structure 200 does not include the particular part 210.

In an example S31, the pressurized structure 200 includes at least one of the protrusion part 220 according to the first embodiment, and the protrusion part 220 of the example 31 and the protrusion part 220 of the example 32 according to the twenty-sixth embodiment.

In an example S32, the pressurized structure 200 is constituted on the premise of the example S31. The pressurized structure 200 does not include the particular part 210.

In an example S33, the pressurized structure 200 includes the protrusion part 220 according to the first embodiment and the protrusion part 220 of the example 33 according to the twenty-sixth embodiment.

In an example S34, the pressurized structure 200 is constituted on the premise of the example S33. The pressurized structure 200 does not include the particular part 210.

In an example S35, the pressurized structure 200 includes the protrusion part 220 according to the first embodiment and the protrusion part 220 of the example 34 according to the twenty-sixth embodiment.

In an example S36, the pressurized structure 200 is constituted on the premise of the example S35. The pressurized structure 200 does not include the particular part 210.

Examples included in the example T include the following examples.

In an example T11, the pressurized structure 200 includes the protrusion part 220 of the example 11 and the protrusion part 220 of the example 12 according to the twenty-sixth embodiment.

In an example T12, the pressurized structure 200 is constituted on the premise of the example T11. The pressurized structure 200 does not include the particular part 210.

In an example T13, the pressurized structure 200 includes the protrusion part 220 of the example 11, the protrusion part 220 of the example 12, the protrusion part 220 of the example 21, and the protrusion part 220 of the example 22 according to the twenty-sixth embodiment.

In an example T14, the pressurized structure 200 is constituted on the premise of the example T13. The pressurized structure 200 does not include the particular part 210.

In an example T15, the pressurized structure 200 includes the protrusion part 220 of the example 11, the protrusion part 220 of the example 12, the protrusion part 220 of the example 31, and the protrusion part 220 of the example 32 according to the twenty-sixth embodiment.

In an example T16, the pressurized structure 200 is constituted on the premise of the example T15. The pressurized structure 200 does not include the particular part 210.

In an example T17, the pressurized structure 200 includes the protrusion part 220 of the example 21, the protrusion part 220 of the example 22, the protrusion part 220 of the example 31, and the protrusion part 220 of the example 32 according to the twenty-sixth embodiment.

In an example T18, the pressurized structure 200 is constituted on the premise of the example T17. The pressurized structure 200 does not include the particular part 210.

In an example T19, the pressurized structure 200 includes the protrusion part 220 of the example 11, the protrusion part 220 of the example 12, the protrusion part 220 of the example 21, the protrusion part 220 of the example 22, the protrusion part 220 of the example 31, and the protrusion part 220 of the example 32 according to the twenty-sixth embodiment.

In an example T20, the pressurized structure 200 is constituted on the premise of the example T19. The pressurized structure 200 does not include the particular part 210.

In an example T21, the pressurized structure 200 is constituted on the premise of any of the examples T11 to T20. The pressurized structure 200 further includes at least one of the protrusion part 220 of the example 13, the protrusion part 220 of the example 23, and the protrusion part 220 of the example 33 according to the twenty-sixth embodiment.

In an example T22, the pressurized structure 200 includes at least two of the protrusion part 220 of the example 13, the protrusion part 220 of the example 23, and the protrusion part 220 of the example 33 according to the twenty-sixth embodiment.

In an example T23, the pressurized structure 200 is constituted on the premise of the example T22. The pressurized structure 200 does not include the particular part 210.

In an example T24, the pressurized structure 200 is constituted on the premise of any of the examples T11 to T23. The pressurized structure 200 further includes the protrusion part 220 of the example 34 according to the twenty-sixth embodiment.

Shapes of the plurality of protrusion parts 220 in a form in which the pressurized structure 200 includes a plurality of protrusion parts 220 will be exemplified. In a first example, the shapes of the plurality of protrusion parts 220 are the same. In a second example, the shapes of the plurality of protrusion parts 220 differ. In a third example, the shapes of at least two of the plurality of protrusion parts 220 are the same. In a fourth example, the shapes of at least two of the plurality of protrusion parts 220 differ.

(Twenty-Eighth Embodiment)

The molded article 20 according to the present embodiment is constituted on the premise of any of the first to twenty-seventh embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, a position of the particular part 210 and a position of the protrusion part 220 in the molded article 20 differ from those in the premised embodiment. The particular part 210 is provided on the rear surface of the primary molded part P. In a first example, the particular part 210 is provided on the rear surface of the head 130. In a second example, the particular part 210 is provided on the rear surface of the neck 120. In a third example, the particular part 210 is provided on the rear surface of the handle 110.

Regarding the examples related to the position of the protrusion part 220, the example 11, the example 12, the example 21, the example 22, the example 31, the example 32, and the example 34 according to the twenty-sixth embodiment are also in common with those in the present embodiment.

Other examples related to the position of the protrusion part 220 include the following examples.

In the example 14, the protrusion part 220 is connected to the rear surface of the primary handle constitution part P10 of the primary molded part P. The protrusion part 220 protrudes toward the second thickness direction with respect to the primary handle constitution part P10.

In the example 24, the protrusion part 220 is connected to the rear surface of the neck 120. The protrusion part 220 protrudes toward the second thickness direction with respect to the neck 120.

In the example 35, the protrusion part 220 is connected to the rear surface of the head 130. The protrusion part 220 protrudes toward the second thickness direction with respect to the head 130.

For example, it is possible to achieve the following effects by means of the constitution exemplified in the embodiment.

In an example of the molded article 20, the protrusion part 220 is provided on the rear surface of the primary handle constitution part P10 of the primary molded part P.

According to the foregoing constitution, for example, it is possible to achieve the following effects. The ejector pins can be disposed at positions corresponding to the rear surface of the primary handle constitution part P10 of the primary molded part P. In the primary extruding step or the secondary extruding step, the protrusion part 220 can be pressed by means of the ejector pins.

The primary molded part P can be taken out from the primary mold without pressing the rear surface of the outer surface PF of the primary handle constitution part P10 by means of the ejector pins. The molded article 20 can be taken out from the secondary mold without pressing the rear surface of the outer surface QF of the secondary handle constitution part Q10 by means of the ejector pins. It is possible to expect that design of the oral care product 10 be improved. A foreign matter is unlikely to gather on the surface of the main body 100.

(Twenty-Ninth Embodiment)

The molded article 20 according to the present embodiment is constituted on the premise of any of the first to twenty-eighth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, a method of manufacturing the molded article 20 and a form of the toothbrush 10A provided to a user differ from those in the premised embodiment. The method of manufacturing the molded article 20 as a pre-step for manufacturing the toothbrush 10A includes no removing step. A molded article 20 in which the protrusion part 220 has not been removed is provided to a user.

The protrusion part 220 may adopt a form constituted as the removal scheduled part 300 or a form constituted as a non-removal scheduled part which is not scheduled to be removed from the molded article 20.

When the protrusion part 220 is constituted as the removal scheduled part 300, a user selects whether or not the protrusion part 220 is removed from the molded article 20.

A form of using the toothbrush 10A by a user will be exemplified. In a first example, the toothbrush 10A including the protrusion part 220 is used for cleaning teeth. In a second example, the protrusion part 220 is removed by a user. The toothbrush 10A including no protrusion part 220 is used for cleaning teeth.

Thirtieth Embodiment

The molded article 20 according to the present embodiment is constituted on the premise of the twenty-ninth embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, a structure of the protrusion part 220 in the molded article 20 differs from that in the premised embodiment. The protrusion part 220 includes a functional part.

Examples of the constitution of the functional part include the following examples.

In a first example, the functional part includes a first attachment part. For example, the first attachment part is constituted such that it can be fitted to a first type target. Examples of the first type target include a stand and a holder.

In a second example, the functional part includes a second attachment part. For example, the second attachment part is constituted such that a second type target can be attached thereto. Examples of the second type target include an auxiliary article related to oral care. Examples of the auxiliary article include a brush and a mirror.

In a third example, the functional part includes an opening part. The opening part is provided with a hole. The opening part is constituted such that a third type target can be inserted thereinto. Examples of the third type target include a hook and a strap.

In a fourth example, the functional part includes a hook. The hook is constituted such that it can be hung in a holder.

(Thirty-First Embodiment)

The molded article 20 according to the present embodiment is constituted on the premise of any of the first to thirtieth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The molded article 20 is a single-colored molded article. In a first example, the molded article 20 has an appearance similar to that of the molded article 20 according to the premised embodiment. A mold used for molding of the molded article 20 includes a cavity corresponding to the shape of the molded article 20 according to the premised embodiment. In a second example, the molded article 20 includes the primary molded part P and does not include the secondary molded part Q. A mold used for molding of the primary molded part P includes a cavity corresponding to the shape of the primary molded part P according to the premised embodiment.

(Thirty-Second Embodiment)

The molded article 20 according to the present embodiment is constituted on the premise of any of the first to thirtieth embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

The secondary molded part Q includes the secondary main body constitution part QA and one or a plurality of protrusion parts. The protrusion parts of the secondary molded part Q are constituted in conformity with the protrusion parts 220 of the primary molded part P according to the premised embodiment.

For example, the protrusion parts of the secondary molded part Q are classified into a secondary handle protrusion part provided in the handle 110, a secondary neck protrusion part provided in the neck 120, and a secondary head protrusion part provided in the head 130.

In an example in which the secondary handle protrusion part is included in the secondary molded part Q, the secondary main body constitution part QA includes the secondary handle constitution part Q10 and one or a plurality of secondary handle protrusion parts.

The secondary handle protrusion parts are provided in the secondary handle constitution part Q10. A constitution of the secondary handle protrusion parts conforms to the constitution of the protrusion parts 220 provided in the primary handle constitution part P10 according to the premised embodiment.

A relationship between the secondary handle protrusion parts and the protrusion parts 220 of the primary molded part P will be exemplified. In a first example, the secondary handle protrusion parts are constituted such that the corresponding protrusion parts 220 of the primary molded part P are covered.

In a second example, the secondary handle protrusion parts are constituted such that they substitute for the corresponding protrusion parts 220 of the primary molded part P. The corresponding protrusion parts 220 of the primary molded part P are omitted. In a third example, the secondary handle protrusion parts are provided in parts separated from the protrusion parts 220 of the primary molded part P.

In an example in which the secondary neck protrusion part is included in the secondary molded part Q, the secondary main body constitution part QA includes the secondary handle constitution part Q10, a secondary neck constitution part, and one or a plurality of secondary neck protrusion parts. The secondary neck constitution parts are provided on the outer surface PF of the neck 120 of the primary main body constitution part PA.

The secondary neck protrusion parts are provided in the secondary neck constitution part. A constitution of the secondary neck protrusion parts conforms to the constitution of the protrusion parts 220 provided in the neck 120 according to the premised embodiment.

A relationship between the secondary neck protrusion parts and the protrusion parts 220 of the primary molded part P will be exemplified. In a first example, the secondary neck protrusion parts are constituted such that the corresponding protrusion parts 220 of the primary molded part P are covered.

In a second example, the secondary neck protrusion parts are constituted such that they substitute for the corresponding protrusion parts 220 of the primary molded part P. The corresponding protrusion parts 220 of the primary molded part P are omitted. In a third example, the secondary neck protrusion parts are provided in parts separated from the protrusion parts 220 of the primary molded part P.

In an example in which the secondary head protrusion part is included in the secondary molded part Q, the secondary main body constitution part QA includes the secondary handle constitution part Q10, a secondary head constitution part, and one or a plurality of secondary head protrusion parts. The secondary head constitution part is provided on the outer surface PF of the head 130 of the primary main body constitution part PA.

The secondary head protrusion parts are provided in the secondary head constitution part. A constitution of the secondary head protrusion parts conforms to the constitution of the protrusion parts 220 provided in the head 130 according to the premised embodiment.

A relationship between the secondary head protrusion parts and the protrusion parts 220 of the primary molded part P will be exemplified.

In a first example, the secondary head protrusion parts are constituted such that the corresponding protrusion parts 220 of the primary molded part P are covered.

In a second example, the secondary head protrusion parts are constituted such that they substitute for the corresponding protrusion parts 220 of the primary molded part P. The corresponding protrusion parts 220 of the primary molded part P are omitted.

In a third example, the secondary head protrusion parts are provided in parts separated from the protrusion parts 220 of the primary molded part P.

(Thirty-Third Embodiment)

The molded article 20 according to the present embodiment is constituted on the premise of any of the first to thirty-second embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, the oral care product 10 is an interdental brush. The interdental brush includes a molded article and a functional member. The molded article has a constitution conforming to the constitution of the molded article 20 of the toothbrush 10A exemplified in the premised embodiment. A method of manufacturing a molded article includes a step conforming to the method of manufacturing the molded article 20.

(Thirty-Fourth Embodiment)

The molded article 20 according to the present embodiment is constituted on the premise of any of the first to thirty-second embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, the oral care product 10 is a mucous membrane care brush. The mucous membrane care brush includes a molded article and a functional member. The molded article has a constitution conforming to the constitution of the molded article 20 of the toothbrush 10A exemplified in the premised embodiment. A method of manufacturing a molded article includes a step conforming to the method of manufacturing the molded article 20.

(Thirty-Fifth Embodiment)

The molded article 20 according to the present embodiment is constituted on the premise of any of the first to thirty-second embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, the oral care product 10 is a floss with a holder. The floss with a holder includes a molded article and a functional member. The molded article has a constitution conforming to the constitution of the molded article 20 of the toothbrush 10A exemplified in the premised embodiment. A method of manufacturing a molded article includes a step conforming to the method of manufacturing the molded article 20.

(Thirty-Sixth Embodiment)

The molded article 20 according to the present embodiment is constituted on the premise of any of the first to thirty-second embodiments. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

In the present embodiment, the oral care product 10 is a check mirror. The check mirror includes a molded article and a functional member. The molded article has a constitution conforming to the constitution of the molded article 20 of the toothbrush 10A exemplified in the premised embodiment. A method of manufacturing a molded article includes a step conforming to the method of manufacturing the molded article 20.

(Thirty-Seventh Embodiment)

The molded article 20 according to the present embodiment is constituted on the premise of the first embodiment. The molded article 20 according to the present embodiment has a constitution in common with that of the premised embodiment. In the following description, major differences between the molded article 20 according to the present embodiment and the molded article 20 according to the premised embodiment will be described. A portion or the entirety of the description related to the constitution of the molded article 20 according to the present embodiment in common with that of the molded article 20 according to the premised embodiment will be omitted.

Figure 51:
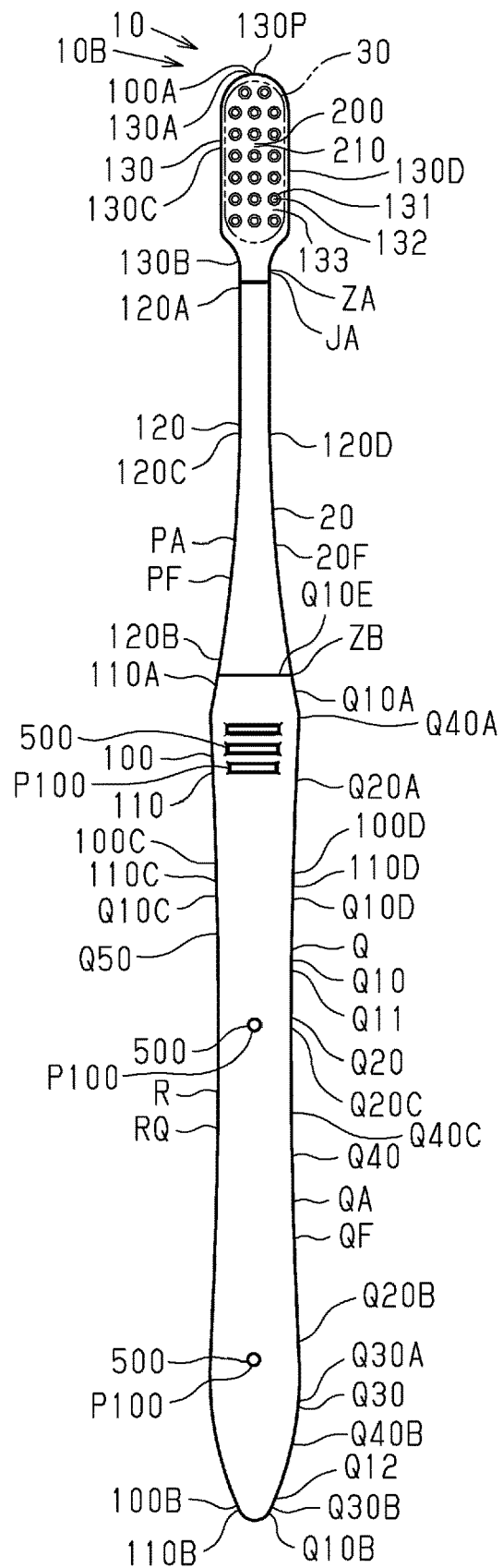
FIG. 51 is a front view of a toothbrush according to a thirty-seventh embodiment.

FIG. 51 will be referred to, FIG. 51 illustrates a front view of a toothbrush. In the present embodiment, the oral care product 10 is a toothbrush 10B. The toothbrush 10B according to the present embodiment does not include the decoration part 400.

EXAMPLES

Table 1 will be referred to, Table 1 shows an example of results of a measurement test for measuring characteristics of the toothbrush 10A. Measurement items in the measurement test are the magnitude of vertical deformation of the primary molded part P. 30 types of samples are used in the measurement test.

The items in Table 1 respectively indicate the following matters. "First type" indicates "first type total area". "Second type" indicates "second type total area". "Third type" indicates "third type total area". "Complex type" indicates "complex type total area".

TABLE 1

| Sample No. | Area [mm²] | | | | Evaluation results |
| --- | --- | --- | --- | --- | --- |
| | First type | Second type | Third type | Complex type | |
| 1 | 20.5 | 25.5 | 0.785 | 46 | A |
| 2 | 15.09 | 25.5 | 6.11 | 40.59 | A |
| 3 | 20.5 | 17.87 | 6.11 | 38.37 | A |
| 4 | 8.06 | 25.5 | 6.11 | 33.56 | A |
| 5 | 20.5 | 9.43 | 6.11 | 29.93 | A |
| 6 | 12.44 | 16.07 | 6.11 | 28.51 | A |
| 7 | 8.06 | 17.87 | 3.055 | 25.93 | A |
| 8 | 5.41 | 17.87 | 6.11 | 23.28 | A |
| 9 | 5.41 | 13.155 | 6.11 | 18.565 | A |
| 10 | 5.41 | 12.345 | 6.11 | 17.755 | A |
| 11 | 8.06 | 9.43 | 6.11 | 17.49 | A |
| 12 | 5.41 | 9.43 | 6.11 | 14.84 | A |
| 13 | 8.06 | 4.715 | 6.11 | 12.775 | A |
| 14 | 0 | 25.5 | 6.11 | 25.5 | B |
| 15 | 0 | 21.685 | 6.11 | 21.685 | B |
| 16 | 0 | 16.07 | 6.11 | 16.07 | B |
| 17 | 0 | 12.345 | 6.11 | 12.345 | B |
| 18 | 0 | 9.43 | 6.11 | 9.43 | B |
| 19 | 0 | 4.715 | 6.11 | 4.715 | B |
| 20 | 0 | 25.5 | 0 | 25.5 | C |
| 21 | 0 | 21.685 | 0 | 21.685 | C |
| 22 | 0 | 16.07 | 0 | 16.07 | C |
| 23 | 0 | 12.345 | 0 | 12.345 | C |
| 24 | 0 | 9.43 | 0 | 9.43 | D |
| 25 | 0 | 4.715 | 0 | 4.715 | D |
| 26 | 20.5 | 25.5 | 0 | 46 | B |
| 27 | 7.03 | 0 | 0.785 | 7.03 | D |
| 28 | 7.03 | 0 | 0 | 7.03 | D |
| 29 | 0 | 0 | 1.77 | 0 | B |
| 30 | 0 | 0 | 0 | 0 | E |

The first type total area, the second type total area, the third type total area, and the complex type total area in each of the samples are set as described in the diagrams. The constitutions of the first to twenty-ninth samples conform to the constitution according to the first embodiment. The constitution of the thirtieth sample differs from the constitution according to the first embodiment in that it does not include the exposed structure 500, and the constitution conforms to the constitution according to the first embodiment in other respects.

The exposed structures 500 of the first to thirteenth samples include three first type penetration parts P100X1, three second type penetration parts P100X2, and one third type penetration part P100X3. The first type penetration parts P100X1 are the first A type penetration parts. The second type penetration parts P100X2 are the second A type penetration parts. The third type penetration part P100X3 is the third A type penetration part.

The exposed structures 500 of the fourteenth to nineteenth samples include three second type penetration parts P100X2 and one third type penetration part P100X3. The first type penetration parts P100X1 are the first A type penetration parts. The second type penetration parts P100X2 are the second A type penetration parts. The third type penetration part P100X3 is the third A type penetration part.

The exposed structures 500 of the twentieth to twenty-fifth samples include three second type penetration parts P100X2. The second type penetration parts P100X2 are the second A type penetration parts.

The exposed structures 500 of the twenty-sixth sample includes three first type penetration parts P100X1 and three second type penetration parts P100X2. The first type penetration parts P100X1 are the first A type penetration parts. The second type penetration parts P100X2 are the second A type penetration parts.

The exposed structures 500 of the twenty-seventh sample includes three first type penetration parts P100X1 and one third type penetration part P100X3. The first type penetration parts P100X1 are the first A type penetration parts. The third type penetration part P100X3 is the third A type penetration part.

The exposed structures 500 of the twenty-eighth sample includes three first type penetration parts P100X1. The first type penetration parts P100X1 are the first A type penetration parts.

The exposed structures 500 of the twenty-ninth sample includes one third type penetration part P100X3. The third type penetration part P100X3 is the third A type penetration part.

In the measurement test, the molded article 20 was manufactured by performing the secondary molding step using each of the samples. The state of the manufactured molded article was visually confirmed. The state of the confirmed molded article 20 was classified into one of five levels.

A first level is a case in which the following state has been confirmed. Vertical deformation and lateral deformation have not occurred in the covering target part PC. A second level is a case in which the following state has been confirmed. At least one of vertical deformation and lateral deformation has occurred in the covering target part PC. The degree of deformation was small. The part in which vertical deformation or lateral deformation has occurred in the covering target part PC was covered by the covering part Q40.

A third level is a case in which the following state has been confirmed. At least one of vertical deformation and lateral deformation has occurred in the covering target part PC. The degree of deformation was significant compared to the second level. At least a portion of the part in which deformation has occurred in the covering target part PC was exposed to the outer surface QF of the covering part Q40. The area of the exposed part in the covering target part PC was small.

A fourth level is a case in which the following state has been confirmed. At least one of vertical deformation and lateral deformation has occurred in the covering target part PC. The degree of deformation was significant compared to the third level. At least a portion of the part in which deformation has occurred in the covering target part PC was exposed to the outer surface QF of the covering part Q40. The area of the exposed part in the covering target part PC was significant compared to the third level.

The fifth level is a case in which the following state has been confirmed. At least one of vertical deformation and lateral deformation has occurred in the covering target part PC. The degree of deformation was significant compared to the fourth level. At least a portion of the part in which deformation has occurred in the covering target part PC was exposed to the outer surface QF of the covering part Q40. The area of the exposed part in the covering target part PC was significant compared to the fourth level.

In the field of "measurement results" in Table 1, the states of the molded articles 20 are stated as follows. "A" indicates a case in which the state of the visually confirmed molded article corresponds to the first level. "B" indicates a case in which the state of the visually confirmed molded article 20 corresponds to the second level. "C" indicates a case in which the state of the visually confirmed molded article 20 corresponds to the third level. "D" indicates a case in which the state of the visually confirmed molded article 20 corresponds to the fourth level. "E" indicates a case in which the state of the visually confirmed molded article 20 corresponds to the fifth level.

A molded article for an oral care product according to the disclosure includes a primary molded part that includes a covering target part, a secondary molded part that includes a covering part covering the covering target part, and an exposed structure that includes one or a plurality of penetration parts penetrating the covering part. The penetration part includes an exposed surface exposed with respect to the covering part. The penetration part is provided in the primary molded part such that a force received by the primary molded part from a resin material corresponding to the secondary molded part so as to deform the primary molded part in a secondary molding step of molding the secondary molded part is able to be transferred to a mold through the exposed surface.

According to this molded article, for example, it is possible to achieve the following effects. Since the covering target part of the primary molded part is covered by the covering part of the secondary molded part, an area of a part in which the primary molded part and the secondary molded part are joined to each other increases. A position of the secondary molded part with respect to the primary molded part is made stable. In the secondary molding step of molding the secondary molded part, the exposed surface of the penetration part comes into contact with the mold. Since a force received by the primary molded part from a resin material corresponding to the secondary molded part is transferred to the mold, deformation of the primary molded part in the secondary molding step is curbed.

In an example of the molded article for an oral care product, the penetration part is constituted to protrude with respect to an outer surface of the covering target part.

According to this molded article, for example, it is possible to achieve the following effects. The exposed surface of the penetration part is likely to appropriately come into contact with the mold.

In an example of the molded article for an oral care product, the exposed structure includes a plurality of first type penetration parts.

According to this molded article, for example, it is possible to achieve the following effects. An effect of curbing deformation of the primary molded part in the secondary molding step is enhanced.

In an example of the molded article for an oral care product, the exposed structure includes a plurality of second type penetration parts.

According to this molded article, for example, it is possible to achieve the following effects. The effect of curbing deformation of the primary molded part in the secondary molding step is enhanced.

In an example of the molded article for an oral care product, a total value of areas of the exposed surfaces related to all of the first type penetration parts is within a range of 0.5 mm$^2$ or larger.

According to this molded article, for example, it is possible to achieve the following effects. A contact area between the exposed structure and the mold increases. The effect of curbing deformation of the primary molded part in the secondary molding step is enhanced.

In an example of the molded article for an oral care product, a total value of areas of the exposed surfaces related to all of the first type penetration parts is within a range of 90 mm$^2$ or smaller.

According to this molded article, for example, it is possible to achieve the following effects. The first type penetration parts are likely to be inconspicuous.

In an example of the molded article for an oral care product, a total value of areas of the exposed surfaces related to all of the second type penetration parts is within a range of 0.5 mm$^2$ or larger.

According to this molded article, for example, it is possible to achieve the following effects. A contact area between the exposed structure and the mold increases. The effect of curbing deformation of the primary molded part in the secondary molding step is enhanced.

In an example of the molded article for an oral care product, a total value of areas of the exposed surfaces related to all of the second type penetration parts is within a range of 90 mm$^2$ or smaller.

According to this molded article, for example, it is possible to achieve the following effects. The second type penetration parts are likely to be inconspicuous.

In an example of the molded article for an oral care product, a total value of areas of the exposed surfaces related to all of the first type penetration parts and areas of the exposed surfaces related to all of the second type penetration parts is within a range of 1 mm$^2$ or larger.

According to this molded article, for example, it is possible to achieve the following effects. A contact area between the exposed structure and the mold increases. The effect of curbing deformation of the primary molded part in the secondary molding step is enhanced.

In an example of the molded article for an oral care product, a total value of areas of the exposed surfaces related to all of the first type penetration parts and areas of the exposed surfaces related to all of the second type penetration parts is within a range of 180 mm$^2$ or smaller.

According to this molded article, for example, it is possible to achieve the following effects. At least one of the first type penetration parts and the second type penetration parts is likely to be inconspicuous.

In an example of the molded article for an oral care product, the exposed structure includes a plurality of third type penetration parts. A total value of areas of the exposed surfaces related to all of the third type penetration parts is within a range of 0.5 mm$^2$ or larger.

According to this molded article, for example, it is possible to achieve the following effects. A contact area between the exposed structure and the mold increases. The effect of curbing deformation of the primary molded part in the secondary molding step is enhanced.

In an example of the molded article for an oral care product, a total value of areas of the exposed surfaces related to all of the third type penetration parts is within a range of 90 mm$^2$ or smaller.

According to this molded article, for example, it is possible to achieve the following effects. The third type penetration parts are likely to be inconspicuous.

In an example of the molded article for an oral care product, the primary molded part includes a recessed part including a disposition space. The disposition space is constituted such that a portion of the secondary molded part is able to be disposed.

According to this molded article, for example, it is possible to achieve the following effects. The effect of curbing deformation of the primary molded part in the secondary molding step is enhanced.

In an example of the molded article for an oral care product, the primary molded part includes a protrusion part covered by the covering part.

According to this molded article, for example, it is possible to achieve the following effects. The effect of curbing deformation of the primary molded part in the secondary molding step is enhanced.

In an example of the molded article for an oral care product, a raw material of the secondary molded part includes a transparent resin or a translucent resin.

According to this molded article, for example, it is possible to achieve the following effects. It is possible to expect that design of the molded article be improved.

In an example of the molded article for an oral care product, a raw material of the primary molded part includes a polyacetal, a polypropylene, or a saturated polyester-based resin.

According to this molded article, for example, it is possible to achieve the following effects. Wear resistance of the primary molded part is improved.

In an example of the molded article for an oral care product, the molded article is a molded article for a toothbrush.

According to this molded article, for example, it is possible to achieve the following effects. It is possible to achieve the foregoing various effects in a toothbrush.

An oral care product according to the disclosure includes the molded article for an oral care product.

According to this oral care product, for example, it is possible to achieve the following effects. It is possible to achieve effects similar to the effects achieved by the molded article for an oral care product.

According to the molded article for an oral care product and the oral care product according to the disclosure, the position of the secondary molded part with respect to the primary molded part is made stable.

The forms which can be adopted by the molded article for an oral care product and the oral care product according to the disclosure are not limited to the description stated in each of the foregoing embodiments. The molded article for an oral care product and the oral care product according to the disclosure may adopt a form different from the forms exemplified in each of the embodiments. Examples thereof include forms in which a portion of the constitution of each of the embodiments is replaced, changed, or omitted, or forms in which a new constitution is added to each of the embodiments.

What is claimed is:

1. A molded article for an oral care product comprising:
    a primary molded part that comprises a covering target part;
    a secondary molded part that comprises a covering part covering the covering target part; and
    an exposed structure that comprises a plurality of first type penetration parts penetrating the covering part, wherein the covering part extends continuously along an outer surface of the primary molded part, from a first side surface of each of the plurality of the first type penetration parts to a second side surface of each of the plurality of the first type penetration parts opposite to the first side surface,
    wherein each of the plurality of first type penetration parts comprises an exposed surface exposed with respect to the covering part, the plurality of first type penetration parts is arranged with intervals therebetween in a first predetermined direction parallel to a central axis of the molded article, and,
    the plurality of first type penetration parts is provided in the primary molded part such that a force received by the primary molded part from a resin material corresponding to the secondary molded part so as to deform the primary molded part in a secondary molding step of molding the secondary molded part is able to be transferred to a mold through the exposed surface.

2. The molded article for an oral care product according to claim 1,
    wherein the penetration part is constituted to protrude with respect to an outer surface of the covering target part.

3. The molded article for an oral care product according to claim 1,
    wherein the exposed structure comprises a plurality of second type penetration parts.

4. The molded article for an oral care product according to claim 3,
    wherein a total value of areas of the exposed surfaces related to all of the second type penetration parts is within a range of 0.5 mm$^2$ or larger.

5. The molded article for an oral care product according to claim 3,
    wherein a total value of areas of the exposed surfaces related to all of the second type penetration parts is within a range of 90 mm$^2$ or smaller.

6. The molded article for an oral care product according to claim 3,
    wherein a total value of areas of the exposed surfaces related to all of the first type penetration parts and areas of the exposed surfaces related to all of the second type penetration parts is within a range of 1 mm$^2$ or larger.

7. The molded article for an oral care product according to claim 3,
    wherein a total value of areas of the exposed surfaces related to all of the first type penetration parts and areas of the exposed surfaces related to all of the second type penetration parts is within a range of 180 mm$^2$ or smaller.

8. The molded article for an oral care product according to claim 1,
wherein a total value of areas of the exposed surfaces related to all of the first type penetration parts is within a range of 0.5 mm$^2$ or larger.

9. The molded article for an oral care product according to claim 1,
wherein a total value of areas of the exposed surfaces related to all of the first type penetration parts is within a range of 90 mm$^2$ or smaller.

10. The molded article for an oral care product according to claim 1,
wherein the exposed structure comprises a plurality of third type penetration parts, and
wherein a total value of areas of the exposed surfaces related to all of the third type penetration parts is within a range of 0.5 mm$^2$ or larger.

11. The molded article for an oral care product according to claim 10,
wherein a total value of areas of the exposed surfaces related to all of the third type penetration parts is within a range of 90 mm$^2$ or smaller.

12. The molded article for an oral care product according to claim 1,
wherein the primary molded part comprises a protrusion part covered by the covering part.

13. The molded article for an oral care product according to claim 1,
wherein a raw material of the secondary molded part comprises a transparent resin or a translucent resin.

14. The molded article for an oral care product according to claim 1,
wherein a raw material of the primary molded part comprises a polyacetal, a polypropylene, or a saturated polyester-based resin.

15. The molded article for an oral care product according to claim 1, which is a molded article for a toothbrush.

16. A oral care product comprising:
the molded article for an oral care product according to claim 1.

* * * * *